US008068599B2

(12) United States Patent
Sarin et al.

(10) Patent No.: US 8,068,599 B2
(45) Date of Patent: Nov. 29, 2011

(54) CALL CENTER APPLICATION DATA AND INTEROPERATION ARCHITECTURE FOR A TELECOMMUNICATION SERVICE CENTER

(75) Inventors: Amit Sarin, Bangalore (IN);
Shubhabrata Sengupta, Bangalore (IN); Sunandita Ganguly, Bangalore (IN); Amit Kumar Tewari, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 922 days.

(21) Appl. No.: 12/077,803

(22) Filed: Mar. 21, 2008

(65) Prior Publication Data

US 2009/0175436 A1 Jul. 9, 2009

(30) Foreign Application Priority Data

Jan. 9, 2008 (IN) .............................. 73/MUM/2008

(51) Int. Cl.
*H04M 3/00* (2006.01)

(52) U.S. Cl. .............. 379/265.09; 379/265.12; 717/101; 726/25

(58) Field of Classification Search ............... 379/265.01
See application file for complete search history.

(56) References Cited

U.S. PATENT DOCUMENTS

| 6,611,590 B1* | 8/2003 | Lu et al. ............... 379/265.09 |
| 7,533,416 B2* | 5/2009 | Chawro et al. ............ 726/25 |
| 2007/0226678 A1* | 9/2007 | Li et al. ...................... 717/101 |

FOREIGN PATENT DOCUMENTS

| EP | 0 230 279 A2 | 7/1987 |
| WO | WO 2004/063940 A1 | 7/2004 |

OTHER PUBLICATIONS

Geppert, Andreas, Scherrer, Stefan, Dittrich, Klaus R., Derived Types and Subschemas: Towards Better Support for Logical Data Independence in Object-Oriented Data Models, Jun. 1, 1993, pp. 1-16, Technical Report IFI-93.27, Universität Zürich, Switzerland.
European Search Report, dated Jun. 18, 2009, pp. 1-6, European Application No. 09250056.0-1238, European Patent Office, The Netherlands.

* cited by examiner

*Primary Examiner* — Creighton Smith
(74) *Attorney, Agent, or Firm* — Brinks Hofer Gilson & Lione

(57) ABSTRACT

A call center application data and interoperation architecture provides a centralized design for managing applications providing call center functionality. The architecture integrates information flow using a mater data repository for all applications for all aspects of a call center operation. The architecture provides employee information at defined levels through the complete employment life cycle, including the initial hiring and termination. The architecture provides the employee information by integrating human resources information with call center applications such as Employee attendance and Leave management, ID management, Transport management, Commitment logs, and Movement management, or any other application.

20 Claims, 120 Drawing Sheets

Figure 4

| Maple_tbl_CommentMst | |
|---|---|
| inCommentId | |
| inStatusId | |
| vcComment1 | |
| vcComment2 | |
| inCommentType | |
| bolActive | |
| vcNotes | |
| dtCreatedOn | |
| inCreatedBy | |
| dtmodifiedOn | |
| inModifiedBy | 408 |

| Maple_tbl_CaseFlowError | |
|---|---|
| inErrorId | |
| vcErrorDescription | |
| inErrorType | |
| vcComment | |
| bolActive | |
| dtCreatedOn | |
| inCreatedBy | |
| inModifiedBy | |
| dtModifiedOn | 406 |

| Maple_tbl_BatchMst | |
|---|---|
| inBatchId | |
| vcBatchNo | |
| vcBatchDetails | |
| inBatchType | |
| bolActive | |
| inCreatedBy | |
| dtCreatedOn | |
| inModifiedBy | |
| dtModifiedOn | |
| dtReceivedOn | |
| inCaseCount | |
| inLOB | |
| inErrorID | |
| dtCompletedOn | |
| vcRevenueStream | 404 |

| Maple_CaseFlow_Franchise | |
|---|---|
| inFranchiseId | |
| vcFranchise | |
| inSiteId | |
| vcComment | |
| bolActive | |
| dtCreatedOn | |
| inCreatedBy | |
| inModifiedBy | |
| dtModifiedOn | 402 |

MCMS - AIM   106

400

Manage Processes

Process Type: Select Process Type [v]                    Results per page: [10 v]

| Process Name | Process Alias | Process Type | Time Zone | Process Go Live date |
|---|---|---|---|---|
| ☐ ACCS.Popcorn.India DIAL | ACCS.Popcorn.India DIAL | Process | (GMT-6:00) Central Time (US & Canada) | Feb 15 2007 |
| ☐ ACCS.Popcorn.India DSL | ACCS.Popcorn.India DSL | Process | (GMT-6:00) Central Time (US & Canada) | Dec 15 2006 |
| ☐ Quality | ACCS.Popcorn.India DSL | Process | (GMT+05:30) Calcutta, Chennai, Mumbai, New Delhi | Dec 15 2006 |
| ☐ Training | Quality | Process | (GMT+05:30) Calcutta, Chennai, Mumbai, New Delhi | Dec 15 2006 |
| ☐ ACCS.India Ops Control | Training | Process | (GMT+05:30) Calcutta, Chennai, Mumbai, New Delhi | Dec 15 2006 |
| ☐ Human Resource | ACCS.India Ops Control | Process | (GMT) Greenwich Mean Time: Dublin,Edinburgh, Lisbon, London | Dec 15 2006 |
| ☐ ACCS.India.Maple-SOE | Human Resource | Process | (GMT-6:00) Central Time (US & Canada) | Feb 15 2007 |
| ☐ ACCS.Popcorn.India DIAL-Bench | ACCS.India.Maple-SOE | Process | (GMT) Greenwich Mean Time: Dublin,Edinburgh, Lisbon, London | Apr 02 2007 |
| ☐ ACCS.India.Felix | ACCS.Popcorn.India DIAL-Bench | Process | | |
| ☐ ACCA.India.BBT | ACCS.India.Felix | Process | (GMT-6:00) Central Time (US & Canada) | May 01 2007 |
| | ACCA.India.BBT | Process | | |

Total Records: 16 - Page: 1 of 2                                       Prev. <<[1 2]> >>   [Next]

[Deactivate Selected]                                        [Create New Process] [Cancel]

Figure 14

Manage Processes

Process Information:-

| | | |
|---|---|---|
| Process name:- | ACCS.Popcorn.India.DIAL | Process Alias:- ACCS.Popcorn.India.DIAL |
| Process Type:- | Process | Parent Process:- ACCS-India |
| Process Go live date:- | 15-02-2007 | Head Count Required:- 141 |
| Time Zone:- | (GMT-06:00) Central Time (US & Canada) | |
| Locations:- | ☐ Mumbai  ☑ Bangalore | ☑ Active |

Process Commitments Logs::-

☑ Side by Side monitoring ☑ Remote monitoring ☑ Team huddle ☑ One on One with agent
☑ Conduct team meeting ☑ One on One with TL's ☑ Team meeting ☑ Skip level meeting with Agent
☑ TL coaching ☑ Attend Calibration

Process Business Ids::-

☑ Network Id ☑ Avaya Id ☑ CRM ID DSL ☑ FTS ID
☑ Yahoo AMT ID ☐ ASI/BBT ID ☐ Virginmedia Employee ID ☐ Citrix
☐ Gateway ☐ Oneline ☐ Onyx ☐ Sabs
☑ Enterprise ID ☐ CTUK Login ID ☑ Wave ☐ Repcode
☐ Cardpoint ☐ Transact V4 ID ☐ Transact V3 ID ☐ SMS ID
☑ CRM ID DIAL ☐ CRM ID2 ☐ CRM ID3 ☐ CRN Admin
☑ CRM BBT ☐ KANA ☐ GDNINDIA NT ID ☑ IEX ID
☐ Extension ID ☑ AUTHCODE ☐ CRM ID ASI

Process Designations ::-

☐ Director ☐ Vice President ☑ Senior Manager ☑ Manager
☑ Deputy Manager ☑ Team Leader ☑ SME ☐ Senior Executive
☑ CSR ☐ Analyst ☐ Senior Analyst ☐ Senior Specialist
☐ Specialist ☐ Senior Assistant ☐ Quality Analyst ☐ Scheduling Analyst
☐ Information Analyst ☐ Real Time Analyst ☐ Operation Coordinator ☐ Software Analyst
☐ Quality Analyst ☐ Trainer ☐ N/A ☐ Software Developer
☐ Senior Process Associate ☐ Process Associate ☐ Operations Manager ☐ SDL

[ New Process ] [ Save Process Details ] [ Cancel ]

Figure 15

View Process Details

Manage Process Chart | Manage Process Team | Edit Process Information

Process Information ::-

| | | | |
|---|---|---|---|
| Process Name: | ACCS.Popcorn.India DIAL | Process Alias: | ACCS.Popcorn.India DIAL |
| Process Type: | Process | Parent Process: | ACCS-India |
| Process Go live date: | 2/15/2007 12:00:00 AM | Head Count Required: | 141 |

Geographical information::-

Time Zone: (GMT-06:00) Central Time (US & Canada)
Locations: Bangalore

Process Designations::-

| | | | |
|---|---|---|---|
| Senior Manager | | Manager | Deputy Manager |
| Team Leader | | SME | CSR |

Version Info ::-

| | | | |
|---|---|---|---|
| Created By : | Neeraj Bablu (10308880) | Created On: | 08/22/2006 |
| Modified By: | Janish Kollarkandy Sasidharan (10056673) | Modified On: | 08/22/2006 |

[Cancel]

Figure 16

Manage Process Teams

Team Information ::-

Location Name: Bangalore ▽
Supervisour Name: Ananda ▽ ☑ Active
Parent Team: --Divya ▽
Team Name: Ananda

[Save Team Details] [Cancel]

Team Hierarchy ::-

Results per page: 15 ▽ ☒

| Team Member Name | Designation | Resource Type | Company Tenure (Month) | Process Tenure |
|---|---|---|---|---|
| Mohammed | CSR | Dedicated | 22 | |
| Pankaj | CSR | Dedicated | 43 | |
| Arvind | CSR | Dedicated | 21 | |
| Sharada | SME | Dedicated | 28 | |
| Gokulnath | CSR | Dedicated | 16 | |
| Buddha Jyothi | CSR | Dedicated | 15 | |
| Rishi Palsingh | CSR | Dedicated | 13 | |
| Rakshith | CSR | Dedicated | 10 | |
| Tanush | CSR | Dedicated | 9 | |
| Azra | CSR | Dedicated | 8 | |
| Girish | CSR | Dedicated | 8 | |
| Jayashree | CSR | Dedicated | 8 | |
| Joy | CSR | Dedicated | 5 | |
| Sougato | CSR | Dedicated | 5 | |
| Balasubramani | CSR | Dedicated | 5 | |

Total Records: 18 - Page: 1 of 2    Prev. << <[1 2]> >> Next

Figure 19

View Organization Information

Hierarchy Details::-

Employee Code: 10322058
Process Name: ACCS,Popcorn,India DIAL
Supervisor: Ananda
Designation: CSR
HR Representative: Rupesh
Date of Joining : Wednesday, August 16, 2006

Employee Name: Rishi
Team Name: Ananda
Skip Level Name: Divya
Level: H-III
Company Tenure: 13 Months

Network Details::-

Enterprise Id: rishi.p
Network Id: rishi
Address: House No#36,
Niketan Hostle,

Network Domain: APAINDBNG01
Location: Bangalore
State: Karnataka
Country: India
City: Bangalore

Version Information::-

Created On: 10/18/2006
Created By:

Approved On: Not Modified Yet
Approved By: Not Modified Yet

[Cancel]

Figure 20

Manage User Group

Results per page: 10 ▾ ☒

| | User Group Name | Description | Created By | Created On | Active |
|---|---|---|---|---|---|
| ☐ | Administrator | Built in User Group for the System Administrator. | | 08/29/2006 | True |
| ☐ | Deputy Manager (DIAL,DSL) | Built For Deputy Manager. | | 08/29/2006 | True |
| ☐ | Senior Manager (DIAL,DSL) | Built For Senior Manager. | | 09/19/2006 | True |
| ☐ | General Manager (DIAL,DSL) | Built For General Manager. | | 09/19/2006 | True |
| ☐ | Team Member's (DIAL,DSL) | Built in User Group Account for the Teammember's. | | 09/19/2006 | True |
| ☐ | Team Leader DIAL | Built in User Group Account for the 'Team Leader' | | 11/01/2006 | True |
| ☐ | Human Resource | Builts For Human Resource | | 11/23/2006 | True |
| ☐ | Scheduling Team | Builts For Scheduling Team | | 12/18/2006 | True |
| ☐ | Maple Team Member's | Built in User Group Account for the Maple Teammember's. | | 12/21/2006 | True |
| ☐ | Intradey Team Leaders | Built in User Group Account for the Intradey Team | | 12/21/2006 | True |

Total Records: 36 - Page: 1 of 4

Prev. << <[1 2 3 4 ]> >> Next

Deactivate Selected          New User Group    Cancel

Figure 21

Manage Holidays

Home > Administration > Manage > Manage Holidays

| Holiday Type: | Select Holiday Type ▼ | | Year: 2007 | Results per page: 5 ▼ | |
|---|---|---|---|---|---|
| Action | Date | Holiday Name | Holiday Type | Created On | Created By |
| Select | Monday Jan 01 2007 | New Year/Bakrid | Fixed | 01/25/2007 | |
| Select | Monday Jan 15 2007 | Makara Sankranthi / Uttarayana Punyakala/Pongal | Optional | 01/25/2007 | |
| Select | Tuesday Jan 16 2007 | Thiruvalluvar Day | Optional | 01/25/2007 | |
| Select | Wednesday Jan 17 2007 | Uzhavar Thirunal | Optional | 01/25/2007 | |
| Select | Tuesday Jan 23 2007 | Basant Panchami | Optional | 01/25/2007 | |

Total Records: 38 - Page: 1 of 8　　　　Prev << <[1 2 3 4 5 6 7 8]> >> Next

Holiday Details ::

Holiday Date :: [          ] (DD/MM/YYYY)
Holiday Type :: [Select Holiday Type ▼]  ☑ Active
Holiday Name :: [          ]
Locations :: ☐ Mumbai  ☐ Bangalore Notes :: [                    ]

[ Save Holiday Details ]  [ New Holiday ]  [ Cancel ]

Manage Roster

| ☐ | Roster Ticket No | Date From | Date To | Total Uploaded | Error Count | Total HeadCount | Notes | Uploaded By | Uploaded On |
|---|---|---|---|---|---|---|---|---|---|
| ☐ | RST0000257 | 10/09/2007 | 16/09/2007 | 152 | 0 | 152 | Leo Template. | Ambuj Sinha | Sep 07 2007 |
| ☐ | RST0000256 | 10/09/2007 | 16/09/2007 | 37 | 152 | 189 | Maple Template. | Arun Rana | Sep 07 2007 |
| ☐ | RST0000255 | 10/09/2007 | 16/09/2007 | 176 | 0 | 176 | DSL Mumbai Template. | Ambuj Sinha | Sep 07 2007 |
| ☐ | RST0000254 | 10/09/2007 | 16/09/2007 | 96 | 0 | 96 | DSL Bangalore Template. | Ambuj Sinha | Sep 07 2007 |
| ☐ | RST0000253 | 10/09/2007 | 16/09/2007 | 159 | 0 | 159 | DIAL Template. | Ambuj Sinha | Sep 07 2007 |
| ☐ | RST0000252 | 10/09/2007 | 16/09/2007 | 183 | 0 | 183 | BBT Mumbai Template. | Ambuj Sinha | Sep 07 2007 |
| ☐ | RST0000251 | 10/09/2007 | 16/09/2007 | 156 | 0 | 156 | Felix Template. | Ambuj Sinha | Sep 07 2007 |
| ☐ | RST0000250 | 10/09/2007 | 16/09/2007 | 35 | 0 | 35 | Operation Control Template. | Ambuj Sinha | Sep 07 2007 |
| ☐ | RST0000249 | 03/09/2007 | 09/09/2007 | 141 | 0 | 141 | Leo Template. | Ambuj Sinha | Aug 31 2007 |
| ☐ | RST0000248 | 03/09/2007 | 09/09/2007 | 179 | 0 | 179 | DSL Mumbai | Ambuj Sinha | Aug 31 2007 |

Total Records: 227 - Page: 1 of 23    Prev. << <[ 1 2 3 4 5 6 7 8 9 10 ]> 22 Next Results per page: 10

[ Delete Selected ]                                      [ Upload Roster ]   [ Cancel ]

| Employee Code | Employee Name | Movement Type | From Process | From Team | To Process | To Team |
|---|---|---|---|---|---|---|
| 10086628 | Joshua | Movement In | ACCS.Popcorn.India DIAL | Nesting DIAL | ACCS.Popcorn.India DIAL | Amit |
| 10398161 | Sailesh | Movement In | ACCS.Popcorn.India DIAL | Nesting DIAL | ACCS.Popcorn.India DIAL | Amit |
| 10381278 | Siva | Movement In | ACCS.Popcorn.India DIAL | Nesting DIAL | ACCS.Popcorn.India DIAL | Amit |
| 10394055 | Adarsh | Movement In | ACCS.Popcorn.India DIAL | Nesting DIAL | ACCS.Popcorn.India DIAL | Rajesh |
| 10383961 | Coutinho | Movement In | ACCS.Popcorn.India DIAL | Nesting DIAL | ACCS.Popcorn.India DIAL | Rajesh |
| 10377936 | John | Movement In | ACCS.Popcorn.India DIAL | Nesting DIAL | ACCS.Popcorn.India DIAL | Rajesh |
| 10086639 | Joshua | Movement In | ACCS.Popcorn.India DIAL | Nesting DIAL | ACCS.Popcorn.India DIAL | Rajesh |
| 10398161 | Sailesh | Movement In | ACCS.Popcorn.India DIAL | Nesting DIAL | ACCS.Popcorn.India DIAL | Rajesh |
| 10386082 | Sameer | Movement In | ACCS.Popcorn.India DIAL | Nesting DIAL | ACCS.Popcorn.India DIAL | Rajesh |
| 10381278 | Siva | Movement In | ACCS.Popcorn.India DIAL | Nesting DIAL | ACCS.Popcorn.India DIAL | Rajesh |

Total Records: 0 - Page: 0 of 0

View Attrition

Search Employee:  [Search] [Clear Search]  Location: _____  Results per page
Process Name: [Select Process ▼]  Team Name: _____  Select Location
  Select Team

| Ticket Number | Employee Name | Last Working date | Attrition Type | Location | Current Status |
|---|---|---|---|---|---|
| ATT0000695 | Ekta | 09/06/2007 | Unmanaged | Mumbai | Approval Pending |
| ATT0000694 | Kshitij | 08/31/2007 | Absconded | Mumbai | Approval Pending |
| ATT0000693 | Lavanya | 07/27/2007 | Absconded | Mumbai | Approval Pending |
| ATT0000692 | Noel | 08/02/2007 | Unmanaged | Mumbai | Approval Pending |
| ATT0000691 | RanjitSingh | 08/29/2007 | Absconded | Bangalore | Approval Pending |
| ATT0000690 | Ricky | 08/20/2007 | Absconded | Bangalore | Approval Pending |
| ATT0000689 | Munmun Chik | 10/05/2007 | Unmanaged | Bangalore | Approval Pending |
| ATT0000688 | Arindam | 10/05/2007 | Unmanaged | Bangalore | Approval Pending |
| ATT0000687 | Surnitha | 09/01/2007 | Absconded | Bangalore | Approved |
| ATT0000686 | Sathien | 08/31/2007 | Absconded | Bangalore | Approved |
| ATT0000685 | Gagan | 09/01/2007 | Absconded | Bangalore | Released Back |
| ATT0000684 | Kavitne | 09/02/2007 | Absconded | Bangalore | Approved |
| ATT0000683 | Badari | 09/01/2007 | Absconded | Bangalore | Approved |
| ATT0000683 | Sailesh | 08/31/2007 | Absconded | Bangalore | Approval Pending |
| ATT0000682 | Rajiv | 08/28/2007 | Unmanaged | Mumbai | Approval Pending |
| ATT0000681 | Hazel | 08/30/2007 | Absconded | Mumbai | Approved |
| ATT0000680 | Manjunath | 08/28/2007 | Absconded | Bangalore | Approved |
| ATT0000679 | Kamal | 08/31/2007 | Unmanaged | Mumbai | Approved |
| ATT0000677 | Jadhav | 08/14/2007 | Absconded | Bangalore | Approved |
| ATT0000676 | Victoria | 08/26/2007 | Managed | Bangalore | Approved |

Total Records: 456 - Page: 1 of 23    Prev. << <[1 2 3 4 5 6 7 8 9 10]>

[Report New Attrition]

Figure 35

Report New Attrition

Employee Code:- [10285418] (Search)

Employee Code: 10285418  Employee Name: Ekta
Process Name: ACCS.Popcorn.India DSL  Team Name: Team Leader 48
Supervisor Name: Prasad  Location: Mumbai
Designation: CSR  Level: G-I[ ]
Date of Joining: Monday, February 06, 2006  Company Tenure: 19 Months
HR Representative: Sameer Employee Exit Information:-

Resignation Type :-  Resignation date:-
◉ Unmanaged ○ Absconding ○ Managed  [08/06/2007]
Reason1:-  Last Working date :-
[Want to move out Contact Center/BPO ▽]  [09/06/2007]

Reason2:-  Reason3:-
[Wants To Move Into Software Firm ▽]  [N/a ▽]

Employee Performance (6 months scorecard) & CAP History

July'07-Ee, June'07-Me, May'07-Me, Apr'07-Me+, Mar'07-Ee, Feb'07-Me
No Cap History ☐ Notice Period Waver (Cancel)   (Next) (Previous)   (Save Attrition)

Manage Attrition

Search Employee: [    ] [Search] [Clear Search]　　Location　　Results per page:

Process Name: [Select Process ▼]　Team Name:　[Select Location]

[Select Team]

| Ticket Number | Employee Name | Resignation date | Last Working date | Attrition Type | Location | Current Sta... |
|---|---|---|---|---|---|---|
| ATT0000692 | Noel | 08/03/2007 | 08/02/2007 | Unmanaged | Mumbai | Approval Pending |
| ATT0005585 | Anand | 06/20/2007 | 07/20/2007 | Unmanaged | Mumbai | Approval Pending |
| ATT0000625 | Nitesh | 08/01/2007 | 08/01/2007 | Unmanaged | Mumbai | Approval Pending |
| ATT0000666 | Roy | 08/01/2007 | 09/01/2007 | Unmanaged | Mumbai | Approval Pending |
| ATT0000272 | Kenroy | 02/05/2007 | 03/05/2007 | Unmanaged | Mumbai | Approval Pending |
| ATT0000394 | Amita | 04/03/2007 | 04/03/2007 | Unmanaged | Mumbai | Approval Pending |
| ATT0000416 | Suchit | 03/14/2007 | 04/14/2007 | Unmanaged | Mumbai | Approval Pending |
| ATT0000200 | Sajiv | 01/16/2007 | 02/16/2007 | Unmanaged | Mumbai | Approval Pending |
| ATT0000235 | Glen | 01/29/2007 | 03/02/2007 | Unmanaged | Mumbai | Approval Pending |
| ATT0000271 | Gagandeep | 03/09/2007 | 03/11/2007 | Unmanaged | Mumbai | Approval Pending |

Total Records: 133 - Page: 1 of 14　　Prev.　<< <[1 2 3 4 5 6 7 8 9 10]> >>

Figure 39

Approved/Denied Attrition

Employee Details:-

View Exit Report

| | |
|---|---|
| Employee Code: 10333939 | Ticket No: ATT0000692 |
| Process Name: ACCS.Popcorn India DSL | Employee Name: Noel |
| Supervisor Name: Suchita | Team Name: Nesting DSL Mumbai |
| Designation: CSR | Location: Mumbai |
| Date of Joining: Thursday, May 31, 2007 | Level: H-III |
| | Company Tenure: 4 Months |

Employee Exit Information:

HR Representative: Sameer     Initiated On: 09/06/2007
Attrition Type: Unmanaged     Initiated By: Kanik
Reason1: Further Studies     Notice Period: -1 days
Reason2:     Reason 3:

Resignation date:- [08/03/2007]     Last Working date:- [08/02/2007]

Action:- [Approved ▽]

Comments:- [Approved ◁▷]

☐ Documents Received

[Save Attrition] [Cancel]

Figure 40

Attrition Report

Search Employee:
From Date: 09/01/2007
To Date: 09/07/2007
Process Name: Select Process ▼

[Search] [Clear Search]

Results per page: 10 ▼
Location: Select Location ▼
Team Name: Select Team ▼

| Employee Code | Employee Name | Attrition Type | Last Working Day | Resignation Date | Reason | Current Status |
|---|---|---|---|---|---|---|
| 10285418 | Ekta | Jhmanaged | 09/06/2007 | 08/06/2007 | Went to move out Contact Center/BPO | Approval Pending |
| 10366951 | Kshitij | Absconded | 08/31/2007 | | Absconding | Approval Pending |
| 10376167 | Lavanya | Absconded | 07/27/2007 | | Absconding | Approval Pending |
| 10383939 | Woel | Jhmanaged | 08/02/2007 | 08/08/2007 | Further Studies | Approval Pending |
| 10376249 | RanjiSingh | Absconded | 08/29/2007 | | Absconding | Approval Pending |
| 10373264 | Ricky | Absconded | 08/20/2007 | | Fradulent Certificate | Approval Pending |
| 10350168 | Munmun | Jhmanaged | 10/05/2007 | 09/05/2007 | Health Reasons | Approval Pending |
| 10350169 | Arindam | Jhmanaged | 10/05/2007 | 09/05/2007 | Health Reasons | Approval Pending |
| 10382506 | Sumitha | Absconded | 09/01/2007 | 09/01/2007 | Absconding | Approved |
| 10383726 | Sathish | Absconded | 08/31/2007 | 08/31/2007 | Absconding | Approved |

Total Records: 17 - Page 1 of 2

[Cancel]

Prev. << <[1 2]> >> Next

Employee Summary

Home > Questions > Attrition > Reports

Results per page: 20

| View Exit Report | Employee Name | Attrition Type | Last Working Date | Resignation Date | Status | Location |
|---|---|---|---|---|---|---|
| ATT000035 | Stefi | UnManaged | 07/12/2007 | 07/12/2007 | Approved | Mumbai |
| ATT000053 | Nikhil | UnManaged | 07/22/2007 | 07/22/2007 | Approved | Mumbai |
| ATT000040 | Ronnie | Absconded | 07/27/2007 | 01/01/2001 | Approved | Mumbai |
| ATT000018 | khozema | Absconded | 07/31/2007 | 01/01/2001 | Approved | Mumbai |
| ATT000019 | Dobson | Absconded | 08/03/2007 | 01/01/2001 | Approved | Mumbai |
| ATT000023 | Manoj | Absconded | 08/02/2007 | 01/01/2001 | Approved | Mumbai |
| ATT000029 | Babar | Absconded | 08/02/2007 | 01/01/2001 | Approved | Mumbai |
| ATT000097 | Middeeter | Absconded | 07/31/2007 | 01/01/2001 | Approved | Mumbai |
| ATT000016 | Bhavashro | Absconded | 07/26/2007 | 01/01/2001 | Approved | Mumbai |
| ATT000027 | Connie | Absconded | 06/30/2007 | 01/01/2001 | Approved | Mumbai |
| ATT000058 | Angie | Absconded | 08/01/2007 | 01/01/2001 | Approved | Mumbai |
| ATT000099 | Natasha | Absconded | 08/02/2007 | 01/01/2001 | Approved | Mumbai |

Total Records: 12 - Page 1 of 1    Prev << (1) >> Next

| | Organization Level | Log Type | Commitment Type | Commitment | Target | Created On |
|---|---|---|---|---|---|---|
| ☐ | E | DM Activity | Individual Commitment | TL coaching | 4 | Dec 14 2006 |
| ☑ | F | DM Activity | Individual Commitment | TL coaching | 4 | Dec 14 2006 |
| ☐ | | DM Activity | Team Commitment | Skip level meeting with Agent | 1 | Dec 14 2006 |
| ☐ | | DM Activity | Team Commitment | Team meeting | 2 | Dec 14 2006 |
| ☐ | E | DM Activity | Individual Commitment | One on One with TL's | 4 | Dec 14 2006 |
| ☐ | F | DM Activity | Individual Commitment | One on One with TL's | 4 | Dec 14 2006 |
| ☐ | | DM Activity | Individual Commitment | TL coaching | 4 | Dec 14 2006 |
| ☐ | | DM Activity | Individual Commitment | TL coaching | 4 | Dec 14 2006 |
| ☐ | | DM Activity | Team Commitment | Skip level meeting with Agent | 1 | Dec 14 2006 |
| ☐ | | DM Activity | Team Commitment | Team meeting | 2 | Dec 14 2006 |
| ☐ | E | DM Activity | Individual Commitment | One on One with TL's | 4 | Dec 14 2006 |
| ☐ | F | DM Activity | Individual Commitment | One on One with TL's | 4 | Dec 14 2006 |

Manage Commitment Target

Log Type: DM Activity   Process Name: ACCS,Popcorn,India DLA1

[Save Commitment Targets]   [Close]

| | Employee Name | Organization Level | Commitment Target | Target | Comments |
|---|---|---|---|---|---|
| ☐ | Rajdeep | G + H | 3 | 3 | Remote Monitoring |
| ☑ | Sangita | G + H | 3 | 3 | Remote Monitoring |
| ☐ | Vijay | G + H | 3 | 0 | |
| ☐ | Chaya | G + H | 3 | 0 | |
| ☐ | Vijayashri | G + H | 3 | 0 | |
| ☐ | Sumesh | G + H | 3 | 0 | |
| ☐ | John | G + H | 3 | 0 | |
| ☐ | Lakshmi | G + H | 3 | 0 | |
| ☐ | Lalitha | G + H | 3 | 0 | |
| ☐ | Saikanth | G + H | 3 | 0 | |
| ☐ | Rahul | G + H | 3 | 0 | |
| ☐ | Puja | G + H | 3 | 0 | |
| | | | Save Commitment | Close | |

Figure 54

Commitment Summary

Month:- July 2007          (dd/MM/yyyy)

Process Name:- ACCS,Popcorn,India DIAL

Preview Commitments

Team Name:- Asif Masood

| Employee Code | Employee Name | Log Type | Log Name | Target Assigned | Target Scheduled | Target Achieved |
|---|---|---|---|---|---|---|
| 10083209 | Asif | Team Commitment | Conduct Team meeting | 2 | 0 | 0 |
| 10083209 | Asif | Team Commitment | Attend Calibration | 2 | 0 | 0 |
| 10083209 | Asif | Team Commitment | Team huddle | 22 | | |
| 10083209 | Asif | Individual Commitment | One on One with agent | 28 | 22 | 22 |
| 10083209 | Asif | Individual Commitment | Remote monitoring | 42 | 33 | 33 |
| 10083209 | Asif | Individual Commitment | Side by Side monitoring | 28 | 22 | 22 |

Figure 56

Vacation Planner

☐ On behalf of

Please select the date range to plan the vacation.

From Date :- 10-09-2007   (dd/MM/YYYY)
To Date :- 17-09-2007   (dd/MM/YYYY)

[Plan Vacation]  [Cancel]
        5702

* If somebody applied before you submit, Leave Quota may diminish.

Manage Leave Allocation

Please select the date to allocate the leaves.

Location Name :- Bangalore

From Date : 18-09-2007 (dd-MM-yyyy)
To Date : 24-09-2007 (dd-MM-yyyy)
Process Name : ACC5.India Ops Control

[Allocate Leave]

Results per page: 10

| Sr No | Planned date | Location | Head Estimated | Percentage Allocate | Total Leaves | Leave Applied till date | Leave Approved till date | Balance Leave | Action |
|---|---|---|---|---|---|---|---|---|---|
| 2 | Tuesday Sep 18 2007 | Bangalore | 0 | 0 | 0 | 0 | 0 | 0 | View Allocation |
| 4 | Wednesday Sep 19 2007 | Bangalore | 0 | 0 | 0 | 0 | 0 | 0 | View Allocation |
| 6 | Thursday Sep 20 2007 | Bangalore | 0 | 0 | 0 | 0 | 0 | 0 | View Allocation |
| 8 | Friday Sep 21 2007 | Bangalore | 0 | 0 | 0 | 0 | 0 | 0 | View Allocation |
| 10 | Saturday Sep 22 2007 | Bangalore | 0 | 0 | 0 | 0 | 0 | 0 | View Allocation |
| 12 | Sunday Sep 23 2007 | Bangalore | 0 | 0 | 0 | 0 | 0 | 0 | View Allocation |
| 14 | Monday Sep 24 2007 | Bangalore | 35 | 6.80 | 2 | 0 | 1 | 1 | View Allocation |

Total Records: 7 - Page: 1 of 1

Prev. << [1] >> Next

[Cancel]

Figure 59

Manage Leave Allocation

Process Name:- ACCS.India Ops Control ▽

Location Name:- Bangalore ▽

Allocation Date:- 24-09-2007 🔲 (dd-MM-yyyy)

[Get Allocation] [New Allocation]

| ☐ | Sr No | Level | Leave Allocated | Leave Applied | Still Open | Head Count Estimated | % Allocation | Comments |
|---|---|---|---|---|---|---|---|---|
| ☐ | 1 | Level A | 0 | 0 | 0 | 0 | 0 | |
| ☐ | 2 | Level B | 0 | 0 | 0 | 0 | 0 | |
| ☐ | 3 | Level C | 0 | 0 | 0 | 0 | 0 | |
| ☐ | 4 | Level D | 0 | 0 | 0 | 0 | 0 | |
| ☐ | 5 | Level E | 0 | 0 | 0 | 0 | 0 | |
| ☐ | 6 | Level F | 0 | 0 | 0 | 0 | 0 | |
| ☐ | 7 | Level G + H | 0 | 0 | 1 | 35 | 6.80 | |

[Save Allocation] [Cancel]

Figure 60

Employee Name :- Gibin
Leave From :- Wednesday, June 06, 2007
Total Leaves Applied :- 2
Process Name :- ACCS.India.BST
Level :- G-III
Current Status :- Leave Applied Ticket No :- LEV/0000037
Leave To :- Thursday, June 07, 2007
Location :- Mumbai
Team Name :- Anup
HR Representative :- Sameer
Current Owner :- Anup Leave Week day | Leave On | Leave Type | Reason
Wednesday | Jun 06, 2007 | Planned Leave | family occasion
Thursday | Jun 07, 2007 | Planned Leave | family occasion Total Records: 0 - Page: 0 of 0

View Leave Quota                                View WorkFlow History

Action : Request Forwarded for Action
        Select Next Action
        [highlighted option]
        Approved By Supervisor
        Leave Canceled
Next Owner :
Comments :

[ Save Details ]  [ Cancel ]

Verify Attendance

Process Name :- ACCS-Popcorn,India DIAL     Date of Attendance :- 18/11/2006
Team Name :- Amit     Supervisor Name :- Amit

| Sr No | Employee Name | Rostered Status | Self Marked | No. of days continuously absent | User status | status |
|---|---|---|---|---|---|---|
| 1 | Chethan | Scheduled | No | 0 days | Active | Present |
| 2 | Prashant | Scheduled | No | 0 days | Active | UnPaid Leave |
| 3 | Harish | Scheduled | No | 0 days | Active | Sick Leave |
| 4 | Ranjith | Scheduled | No | 0 days | Active | Present |
| 5 | NUTHAPPA | Scheduled | No | 0 days | Active | UnPaid Leave |
| 6 | Keshava | Scheduled | No | 0 days | Active | Unapproved Absence( NCN ) |
| 7 | Cheton | Scheduled | No | 0 days | Active | Present |
| 8 | Prajwal | Scheduled | No | 0 days | Active | Present |
| 9 | Abhishek | Scheduled | No | 0 days | Active | Paid Leave |
| 10 | Vineet | Scheduled | No | 0 days | Active | Present |
| 11 | Kiran | Scheduled | No | 0 days | Active | UnPaid Leave |

Save Attendance    Cancel    Reset Details

Figure 67

Attendance Report

From Date: 09/04/2007  To Date: 09/04/2007  Results per page: 10

Process Name: Select Process   Team Name: Select Team

| EmployeeCode | Employee Name | Attendance Date | Roster Status | Status |
|---|---|---|---|---|
| 10371515 | Samson | 09/04/2007 | Leave Scheduled | Planned Leave |
| 10370449 | Praveen | 09/04/2007 | Scheduled | Not Marked |
| 10372467 | Waseem | 09/04/2007 | Scheduled | Not Marked |
| 10338046 | Ghousia | 09/04/2007 | Scheduled | Not Marked |
| 10361689 | Hafifa | 09/04/2007 | Weekly Off | Weekly Off |
| 10364229 | Sunitha | 09/04/2007 | Weekly Off | Weekly Off |
| 10377934 | Zakiullah | 09/04/2007 | Scheduled | Not Marked |
| 10383978 | Secki | 09/04/2007 | Weekly Off | Weekly Off |
| 10385723 | Radha | 09/04/2007 | Weekly Off | Weekly Off |
| 10303411 | Al Faisal | 09/04/2007 | Scheduled | Unapproved Absence (NCNS) |

Total Records: 1142 - Page: 1 of 115   Prev. << <[1 2 3 4 5 6 7 8 9 10]> >> Next

Please enter the details of your New call below.

☐ On Behalf Of:
7202

Full Name Of person: Ambu)
NT ID: ambu)
Employee Code: 10404743
Supervisor Employee Code: 10002306
Employee Email: ambu)
Location(Floor,Room): BDC2
Problem Summary: Login Problem
Cannot Login To Oneview, Authentication Failure Comments:

Please choose Yes, if this issue has repeated within last 48 Hrs. from the Repeat call drop.

Repeat Call: ☐ Yes
Repeat Caller ID:
Attachment:                                      Browse

Figure 72

Contact Details

Address Information:

Address: House No. 52, 1st Floor, 2nd Main,Anugraha Layout,Behind Vijaya Bank Enclave Area: Bilekahalli Contact Type: Correspondence Address City: Bangalore
State: Karnataka
Country or Region: India
Postal Code: 560076

Voice Contact Information:

Landline Number:
Email Address: ambuj
Transport Required: ☑ Yes

Mobile Number: 9886546263
Fax Number:

Version Information:

Created On: 8/10/2007 8:44:00 PM
Created By: Ambuj

Approved On: 8/10/2007 8:44:00 PM
Approved By: Ambuj

[ Save Address Information ]   [ Cancel ]

Figure 73

My Leave Balance

Employee Information :-

Employee Code :10305407
Process Name :ACCS.India Ops Control
Supervisor Name :Sunandita
Designation :Software Analyst Employee Name :Amit
Team Name :Sunandita
Skip Level :Amit
Level :F-1

Employee Leave Balance:-

| Sr No | Leave Type | Leave Balance |
|---|---|---|
| 2 | Compensatory Leave | 40 Hours |
| 3 | Optional Holiday | 0 Hours |
| 1 | Planned Leave | 106 Hours |

[Cancel]

My Attendance

Employee Details :-

| | |
|---|---|
| Employee Code : 10404743 | Employee Name : Anubuj |
| Process Name : ACCS-India Ops Control | Team Name : Sunandita |
| Supervisor Name : Sunandita | Skip Level : Amit |
| Designation : Software Developer | Level : F-11 |

Shift Details :-

| | |
|---|---|
| Shift Start Time : 12:00 | Shift End Time : 22:00 |
| Roster Status : Scheduled | Attendance Status : Present |

Comments :

[ Mark Attendance ]   [ Cancel ]

Figure 77

Change Password

Please enter and verify a new password below. Fields marked with an asterisk * are required Remember that your new password:
- Must be at least 6 characters long.
- Cannot equal or contain your username.
- Must be case sensitive.

*Old Password: ••••••••
*New Password: ••••••••
*Verify New Password: : ••••••••

[Change Password]   [Close]

Figure 78

My Team Hierarchy

Search Employee Code: 10404743    Search    Clear Search

Location : Bangalore
Process Name : ACCS India Ops Control    Team Name: Sunandita
                                          Sort By: Company Tenure (Mon) ∨ Descending ∨

| Sr No | Team Member Name | Designation | Company Tenure (Month) | Level | Supervisor Name |
|---|---|---|---|---|---|
| 1 | Amit | Software Analyst | 14 | F-I | Sunandita |
| 2 | Arun | Software Developer | 2 | F-III | Sunandita |
| 3 | Ambuj | Software Developer | 1 | G-III | Sunandita |

Figure 79

Search Employee

*Please enter the employee code & click on button to search employee.

Employee Code : [    ]

[Cancel]

Search Employee

*Please enter the employee code & click on button to search employee.

Employee Code : 10404743

Hierarchy Details::-

| | |
|---|---|
| Employee Code: 10404743 | Employee Name: Ambuj |
| Process Name: ACCS.India Ops Control | Team Name: Sunandita |
| Supervisor: Sunandita | Skip Level Name: Amit Sarin |
| Designation: Software Developer | Level: G-III |
| HR Representative: Mini | Company Tenure: 1 Months |
| Date of Joining: Tuesday, July 31, 2007 | |

Network Details::-

| | |
|---|---|
| Enterprise Id: ambuj | Network Domain: APAINDBNG01 |
| Network Id: ambuj | Location: Bangalore |
| Address: House No. 52 | State: Karnataka |
| | Country: India |
| | City: Bangalore |

Version Information::-

| | |
|---|---|
| Created On: 08/08/2007 | Approved On: Not Modified Yet |
| Created By: | Approved By: Not Modified Yet |

[Cancel]

Figure 80

My Schedule

Employee Code: 10404743  
Process Name: ACCS.India Ops Control  
Supervisor Name: Sunandita  
Designation: Software Developer  
Location: Bangalore  
HR Representative: Mini Employee Name: Ambuj  
Team Name: Sunandita  
Skip Level: Amit  
Level: G-III  
Company Tenure: 1 Months  
Date of Joining: 07/31/2007

August 2007

July | | | | | | September
---|---|---|---|---|---|---
Sun | Mon | Tue | Wed | Thu | Fri | Sat
29 | 30 | 31 | 1 Not Available | 2 Not Available | 3 Not Available | 4 Not Available
5 Not Available | 6 Not Available | 7 Not Available | 8 Not Available | 9 Not Available | 10 Not Available | 11 Not Available
12 Not Available | 13 Not Available | 14 Not Available | 15 Not Available | 16 Not Available | 17 Not Available | 18 Not Available
19 Not Available | 20 Not Marked 12:00-21:00 | 21 Not Marked 12:00-21:00 | 22 Present 12:00-22:00 | 23 Present 12:00-22:00 | 24 Present 12:00-22:00 | 25 Weekly Off 00:00-00:00
26 Weekly Off 00:00-00:00 | 27 Present 12:00-22:00 | 28 Scheduled 12:00-22:00 | 29 Scheduled 12:00-22:00 | 30 Scheduled 12:00-22:00 | 31 Scheduled 12:00-22:00 | 1
2 | 3 | 4 | 5 | 6 | 7 | 8

Holiday List

Location: Mumbai
Holiday Type: Select Holiday Type
Year: 2007
Results per page: 10

| Date | Holiday Name | Holiday Type | Created On | Created By |
|---|---|---|---|---|
| Monday Jan 01 2007 | New Year/Bakrid | Fixed | 01/25/2007 | |
| Monday Jan 15 2007 | Makara Sankranthi / Uttarayana Punyakala/Pongal | Optional | 01/25/2007 | |
| Tuesday Jan 16 2007 | Thiruvalluvar Day | Optional | 01/25/2007 | |
| Wednesday Jan 17 2007 | Uzhavar Thirunal | Optional | 01/25/2007 | |
| Tuesday Jan 23 2007 | Basant Panchami | Optional | 01/25/2007 | |
| Friday Jan 26 2007 | Republic Day | Fixed | 01/25/2007 | |
| Tuesday Jan 30 2007 | Muharram | Optional | 01/25/2007 | |
| Friday Feb 16 2007 | Mahashivarathri | Optional | 01/25/2007 | |
| Sunday Mar 04 2007 | Holi | Optional | 01/25/2007 | |
| Monday Mar 19 2007 | Chandramana Ugadi/Telugu New Year/Gudi Padwa/Cheti | Optional | 01/25/2007 | |

Total Records: 36 - Page: 1 of 4       Prev  (1 2 3 4)  Next

[Cancel]

Manage Batch

Batch Type : Select Batch Type

Results per page: [ ]

| Action | Batch Number | Batch Type | No. of Cases | Received On | Created by | Active |
|---|---|---|---|---|---|---|
| ☐ Edit | GS226GS219TUforTEWUpgradeSABS20070824 | Simple | 159 | 08/28/2007 | Pradeep | True |
| ☐ Edit | GS607 3for20PerpDiscountSABS20070824 | Simple | 2460 | 08/27/2007 | Prosenjit | True |
| ☐ Edit | 3forC30-Add BBcharge240807 | Simple | 174 | 08/27/2007 | Prosenjit | True |
| ☐ Edit | OneviewTESThatch | Simple | 1321 | 08/27/2007 | Amit | False |
| ☐ Edit | BB and Phone Saving - Add BB Charge 240807_175 | Simple | 175 | 08/27/2007 | Prosenjit | True |

Total Records: 336 - Page: 1 of 68    <Prev> [1 2 3 4 5 6 7 8 9 10] <Next>

Batch Distributions:

Fields marked with an asterisk * are required.

*Batch Number : GS226GS219TUforTEWUpgradeSABS20078
*Batch Type : Simple
*Line of Business : SABS
Error Type : Others
*Batch Received Date : 08/28/2007
No of Case : 159
Notes : 159

☑ Active

[ Save Batch ]  [ Clear ]  [ Close ]

Figure 99

Manage Error Type

Line of Business: Icoms

| | Action | Line of Business | Error Type | Created On | Created By | Active |
|---|---|---|---|---|---|---|
| ☐ | Edit | Icoms | Name Audits Error | 02/15/2007 | Daliya | True |
| ☐ | Edit | Icoms | H2mt Error | 01/16/2007 | Daliya | True |
| ☐ | Edit | Icoms | InCorrect Address | | | True |
| ☐ | Edit | Icoms | Returned Mail Error | | | True |
| ☐ | Edit | Icoms | Campaign Errors | | | True |

Results per page: 5

Total Records: 10 - Page: 1 of 2   Prev << (1 2) >> Next

Add Error Type ::

Select Line of Business: Icoms
Error Type: Name Audits Error
   Title Error
Comments:

☑ Active

[Save] [Add New] [Close]

Figure 100

Manage Franchise

| Action | Site ID | Franchise Name | Created On | Created By | Active |
|--------|---------|----------------|------------|------------|--------|
| ☐ Edit | 26 | Remainder | 07/26/2007 | Oakiya | True |
| ☐ Edit | 28 | Glasgow | 07/26/2007 | Oakiya | True |
| ☐ Edit | 25 | Wales | 07/26/2007 | Oakiya | True |
| ☐ Edit | 24 | Luton | 07/26/2007 | Oakiya | True |
| ☐ Edit | 22 | Gateshead | 03/09/2007 | Oakiya | True |

Results per page: 5

Total Records: 26 - Page: 1 of 6    Prev [1 2 3 4 5 6] 22 Next

Add Error Type ::

Franchise Name: Remainder

Site ID: 26

Remainder    ☑ Active

Comments:

[ Save ] [ Add New ] [ Close ]

SOE Call Type Tracker

Call Count for Amit

System: ⦿ ICOMS ◯ SABS

Sales Type: ⦿ Concessions ◯ FieldSales

Results per page: 20

Choose Call Type:

| | Call ID | Call Type | Call Description |
|---|---|---|---|
| ☐ | 1 | Service Check | Check the serviceability of an address |
| ☑ | 2 | Reschedule order | Reschedule the install date |
| ☑ | 3 | Add/ Modify info to account | Add any notes/services to an account/order |
| ☑ | 4 | Load order | Load either a new or xsell account |
| ☑ | 5 | Cancel Order | Request a canx of an order |
| ☑ | 6 | Check for previous debt | Check address for previous debt |
| ☑ | 7 | Make advance payment | Make payment into an account |
| ☐ | 8 | Complete Paypoint form | Complete a paypoint form |
| ☐ | 9 | Check install orders | Check if orders have been installed |
| ☐ | 10 | Check payment is on the account | Check if a payment is showing on an account |
| ☐ | 11 | Check if active at address | Check if there is an active customer at the address |
| ☐ | 12 | Credit Check | Credit Check account either on CCI or Transact (Stand alone Credit Check) |
| ☐ | 13 | Credit Check Amendment | Amend address details on a completed Credit Check |
| ☐ | 14 | Misdirected Calls | Customers call in with complaints / order requests. |
| ☐ | 15 | General Enquiries | Reps call in to enquire about prices /packages/costs. |
| ☐ | 16 | Call drops | Call drops |

Total Records: 16 - Page: 1 of 1

[Save Selected] [Cancel]

Prev. << <[1]> >> Next

Kana Case Report

Home > Operations > Kana Case Flow > Reports > Kana Case Report

Date From: 09/25/2007 (dd/MM/yyyy)
Date To: 10/05/2007 (dd/MM/yyyy)
LOB: Icoms
Transaction Type: Select Transaction Type

[Preview Report]

Results per page: 10

| CaseID | Created By | Case No | LOB | Transaction Type | Account No | OutComes | Pending since |
|---|---|---|---|---|---|---|---|
| KAN0026691 | Amit | 324242 | Icoms | New Order | 2342342 | | 00:00:00 |
| KAN0023348 | Amit | 56456456 | Icoms | Existing Order | 54645645 | Order - Completed | 19:03:08 |

Total Records: 2 - Page: 1 of 1

Prev. << <[1]> >> Next

Figure 105

SOE Call Type Report

Home > Operations > Maple SOE > SOE Call Type Report > Report

Search Employee: [ ]  [Search]  [Clear Search]

From Date: 10/05/2007  To Date: 10/05/2007   Results per page: 15 ▾

| Employee Code | Employee Name | Sales Type | System Type | Call Type | Created On |
|---|---|---|---|---|---|
| 10332529 | Bindiya | DirectSales | ICOMS | Load order | 10/05/2007 |
| 10286209 | Kaushik | DirectSales | ICOMS | Credit Check | 10/05/2007 |
| 10286209 | Kaushik | DirectSales | ICOMS | Load order | 10/05/2007 |
| 10314991 | Vandana | DirectSales | ICOMS | Credit Check | 10/05/2007 |
| 10314991 | Vandana | DirectSales | ICOMS | Load order | 10/05/2007 |
| 10314991 | Vandana | DirectSales | ICOMS | Credit Check | 10/05/2007 |
| 10314991 | Vandana | DirectSales | ICOMS | Load order | 10/05/2007 |
| 10286209 | Kaushik | DirectSales | ICOMS | Load order | 10/05/2007 |
| 10327848 | Anand | Concessions | ICOMS | Credit Check | 10/05/2007 |
| 10327848 | Anand | Concessions | ICOMS | Load order | 10/05/2007 |
| 10332529 | Bindiya | DirectSales | ICOMS | Service Check | 10/05/2007 |
| 10332529 | Bindiya | DirectSales | ICOMS | Call drops | 10/05/2007 |
| 10327848 | Anand | Concessions | ICOMS | Service Check | 10/05/2007 |
| 10332522 | Sampath | DirectSales | ICOMS | Load order | 10/05/2007 |

Total Records: 162 - Page: 1 of 11

Prev. << <[1 2 3 4 5 6 7 8 9 10]> >> Next

[Cancel]

Manage Employee IDs

*Please Enter the Employee code & click on button to search employee.

Employee Code: [ 10363874 ] [→]

| | |
|---|---|
| Employee Code: 10363874 | Employee Name: Namratha |
| Process Name: ACCS.India Felix | Team Name: Sweaty |
| Supervisor Name: Sweaty | Skip Level: Vinay |
| Designation: CSR | Level: H-III |
| Location: Bangalore | Company Tenure: 6 months |
| HR Representative: Mini | Date of Joining: 03/05/2007 |

Process Name::- [Select Process ∨]

Results per page: [10 ∨]

Sort By: [Business Id Name ∨] [Ascending ∨]

| ☐ Business Id Name | Value | Password | Id Status | Created By | Created On |
|---|---|---|---|---|---|
| ☐ Avaya Id | 73063 | | | Amit | 07/13/2007 |
| ☐ Citrix | S2701279 | | | Amit | 07/13/2007 |
| ☐ CTUK Login ID | ShettigarN | | | Amit | 07/13/2007 |
| ☐ Enterprise ID | namratha | | | Amit | 07/13/2007 |
| ☐ Gateway | S2701279 | | | Amit | 07/13/2007 |
| ☐ GDNINDIA NT ID | | | | Not Created Yet | Not Created Yet |
| ☐ Network Id | namratha | | | Amit | 07/13/2007 |
| ☐ Oneline | S2701279 | | | Amit | 07/13/2007 |
| ☐ Onyx | sabs/shettn | | | Amit | 07/13/2007 |
| ☐ Repcode | 10667 | | | Amit | 07/13/2007 |

Total Records: 13 - Page: 1 of 2

[Save Selected] [Cancel]

Prev. << <[1 2]> >> Next

Manage Team Member's Movement

Movement Type :- ⦿ Movement In   ○ Movement Out   ○ Movement With in Process

Select Your Criteria:

| | From: | To: | Comments: |
|---|---|---|---|
| Function: | ACCS-India | ACCS-India | Team Movement |
| Process: | ACCS.Popcorn.India DIAL | ACCS.India.LEO | |
| Team: | Asif | Pranav | |
| Reason: | Team Shuffling | | |
| Request To: | Sunandita | | |
| Schedule On: | 09/17/2007 | | |

11402 — [Get Team Hierarchy]

| ☐ Team Member Name | Designation | Tenure (Month) | Movement Status |
|---|---|---|---|
| ☒ Bijech | SME | 43 | Not Scheduled |
| ☐ Chaya | CSR | 22 | Not Scheduled |
| ☐ Errica | CSR | 4 | Not Scheduled |
| ☐ John | CSR | 28 | Not Scheduled |
| ☒ Lokshmi | CSR | 14 | Not Scheduled |
| ☐ Lalitha | CSR | 8 | Not Scheduled |
| ☐ Puja | CSR | 7 | Not Scheduled |
| ☐ Rahul | CSR | 7 | Not Scheduled |
| ☐ Rajdeep | CSR | 21 | Not Scheduled |
| ☐ Saikanth | CSR | 7 | Not Scheduled |
| ☐ Sangita | CSR | 14 | Not Scheduled |
| ☐ Sumesh | CSR | 26 | Not Scheduled |
| ☐ Sylvia | CSR | 4 | Not Scheduled |
| ☐ Vijay | CSR | 42 | Not Scheduled |
| ☐ Vijayashri | CSR | 24 | Not Scheduled |

11404 — [Schedule Movement]   [Close]

Figure 114

Approve Team Member/s Movement

Home > HRIS > Manage > Approve Movement

Results per page: 10

| Movement On | Ticket No | Current Status | Requested By | Requested On |
|---|---|---|---|---|
| 15 Oct 2007 | MOV0000402 | Movement Schedule Requested | Manoj | 08 Oct 2007 |
| 15 Oct 2007 | MOV0000400 | Movement Schedule Requested | Sweaty | 08 Oct 2007 |
| 01 Oct 2007 | MOV0000336 | Movement Schedule Requested | Sharah | 22 Sep 2007 |
| 24 Sep 2007 | MOV0000300 | Movement Schedule Requested | Vinay | 12 Sep 2007 |
| 06 Aug 2007 | MOV0000197 | Movement Schedule Requested | Sridhara | 05 Aug 2007 |
| 12 Jul 2007 | MOV0000117 | Movement Schedule Requested | Sunandita | 12 Jul 2007 |
| 10 Jul 2007 | MOV0000113 | Movement Schedule Requested | Amit | 10 Jul 2007 |
| 09 Jul 2007 | MOV0000109 | Movement Schedule Requested | Sashi | 03 Jul 2007 |
| 09 Jul 2007 | MOV0000108 | Movement Schedule Requested | Sashi | 03 Jul 2007 |
| 09 Jul 2007 | MOV0000107 | Movement Schedule Requested | Sashi | 03 Jul 2007 |

Total Records: 34 - Page: 1 of 4    Prev. << (1 2 3 4) >> Next

[Cancel]

CALL CENTER APPLICATION DATA AND INTEROPERATION ARCHITECTURE FOR A TELECOMMUNICATION SERVICE CENTER

CROSS REFERENCE TO RELATED APPLICATIONS

This application claims the benefit of priority under 35 U.S.C. §119 to Indian Patent Application No. 73/MUM/2008, filed Jan. 9, 2008, in India.

BACKGROUND

1. Technical Field

This application relates to data processing systems, and in particular, to a call center system architecture.

2. Related Art

The rapid growth of information technology has led to increasingly complex and sophisticated products and services. In an effort to provide meaningful assistance to customers, companies have made significant investments in call centers. The primary goals of a call center include working with customers to resolve issues, answering questions, and providing ongoing support for products and services.

Despite the general level of sophistication of a modern call center, challenges still remain. In particular, many areas are still prone to error, and suffer from the need to perform repetitive manual labor to carry out tasks. Furthermore, call center data was often managed in a chaotic manner, leading to data redundancy and data loss. At the same time, data manipulation was hectic and required a high level of skill for even routine maintenance. These drawbacks limited the ability of the call center to provide timely, accurate, and automated reports; to secure data; and to provide real-time data tracking.

A need exists for an improved call center application architecture.

SUMMARY

A call center application data and interoperation architecture ("architecture") provides a centralized design for managing the many applications that cooperate to provide call center functionality. The architecture coordinates information flow through a master application data repository and provides tailored support for applications that handle all aspects of call center functionality. The architecture adeptly handles information flow for all call center applications and for the employees who use the applications, including managers, supervisors, and call handlers.

The applications implement functionality applicable across the complete span of the employment cycle from hiring to termination, and well as other support functions. The applications may implement functionality including human resources functions, employee attendance tracking, and employee attrition management. Other examples of application functionality include employee leave management, employee commitment logging, and identification management. The applications are not limited to voice specific applications (e.g., teleconference based problem resolution), but may also encompass non-voice processes (e.g., email or Internet based order processing).

The architecture may be implemented in a network-based tool that provides significant improvements with respect to the labor intensive processes and data integrity challenges described above. The network may include local and remote networks, or interconnections of networks, whether private and internal, or publicly accessible. The network may include Internet based connectivity for local or remote access to the applications and the data stored in the master application data repository. Furthermore, the architecture provides both visibility and collaboration across the call center and its applications.

The dynamic environment of a call center means that resources, such as employees or call center equipment, are moved across processes very often. A process may be any instance of call center functionality, such as fielding technical inquiries from callers about specific products, activating products or services, or placing and confirming orders for products or services. The wide variety of processes and frequent resource movement across processes gives rise to a need to track the resources in a systematic manner. In this regard, the architecture facilitates, for example, tracking the processes for which any call handler or supervisor has worked during his or her tenure with the call center. The architecture may also track other relevant details, such as the call handler's duration in each process, subsequent supervisors and performance data, and other details.

Furthermore, the architecture tracks information about each employee within the system. The architecture may track information about each employee at every defined level of hierarchy. The hierarchy may reflect relative position or rank, such as manager->supervisor->call handler, with the architecture maintaining information on each employee at each level in the hierarchy. The architecture also supports, at every defined level in the hierarchy, specific individual access rights for all employees. The access rights may be set depending upon employee level in the hierarchy, the process the employee belongs to, and other factors.

As noted above, the architecture includes a master application data repository. In one implementation, the master application data repository adheres to a master data organization schema. The master data organization schema is unified across multiple call center application dataset requirements in that the master data schema handles all of the information flow generated by the call center applications. The master data organization schema is partitioned along a schema subdivision that defines multiple individual application data schemas that are specific to individual application dataset requirements for different call center applications.

A communication interface receives call center application data requests from the call center applications. A processor and supporting software (e.g., database management software) process the call center application data requests. In particular, the processor performs data manipulation responsive to the call center application data requests, while working with the specific application data schema in the master application data repository. Data manipulation may include adding, deleting, or changing data fields on a per-application basis, such as adding employee attendance records on a daily basis, changing the processes to which an employee is assigned, or deleting completed commitments from a commitment requirements list, when the employee has met the commitment. The architecture thereby relieves the call center applications from local database and processing overhead.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 shows a Case Management application data schema.

FIGS. 14-34 show examples of graphical user interfaces (GUIs) and reports that a human resources application may implement.

FIGS. 35-48 show examples of GUIs and reports that the attrition application may implement.

FIGS. 49-56 show examples of GUIs and reports that the commitment log application may implement.

FIGS. 57-65 show examples of GUIs and reports that the leave application may implement.

FIGS. 66-71 show examples of GUIs and reports that the attendance application may implement.

FIGS. 72-87 show examples of GUIs and reports that the My OneView application may implement.

FIGS. 88-95 show examples of GUIs and reports that the transportation application may implement.

FIGS. 96-109 show examples of GUIs and reports that a case management application may implement.

FIGS. 110-112 show examples of GUIs and reports that the ID management application may implement.

FIGS. 113-117 show examples of GUIs and reports that the movement application may implement.

DETAILED DESCRIPTION

Figure 1:
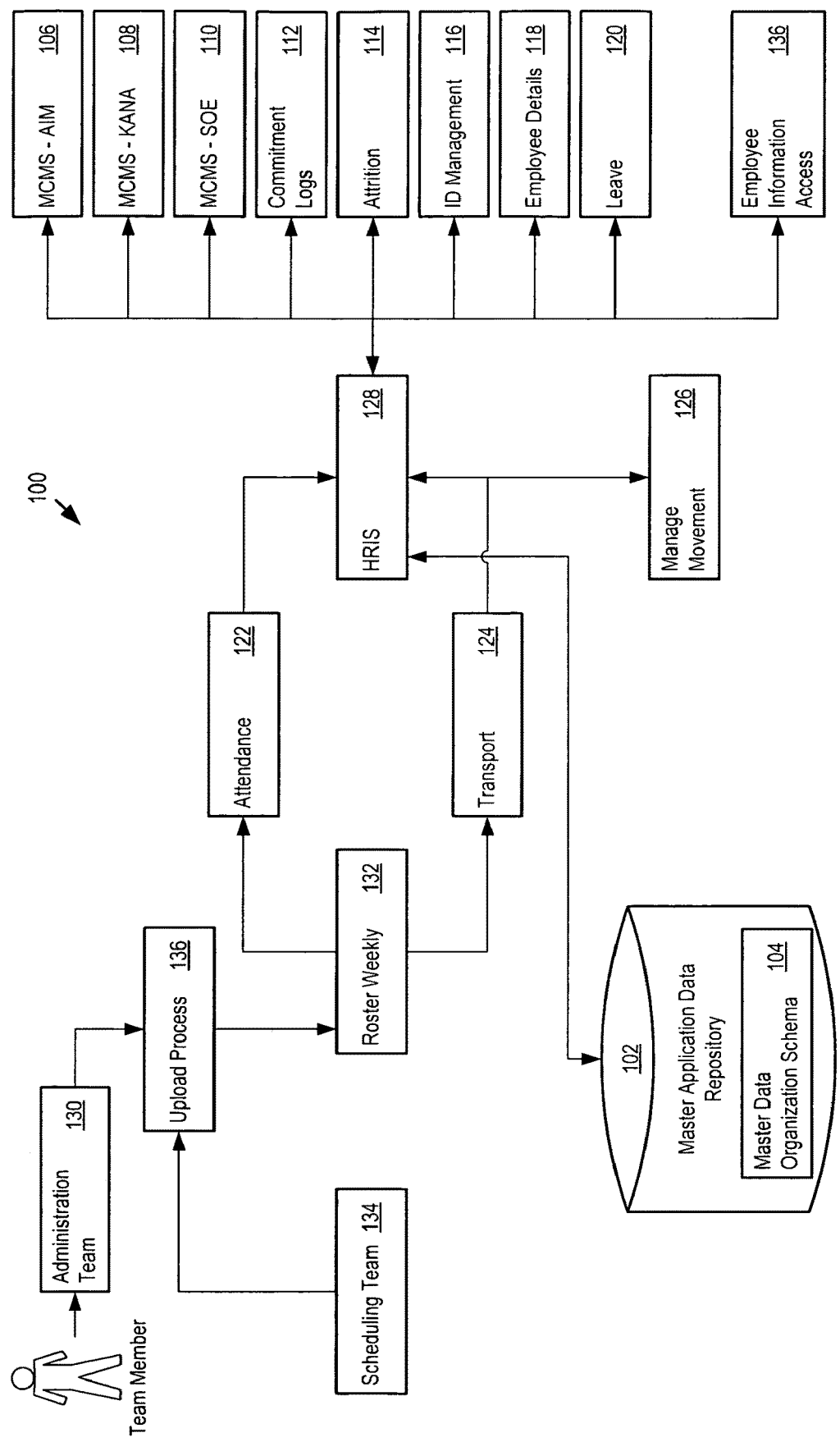
FIG. 1 shows a call center application data and interoperation architecture.

FIG. 1 shows a call center application and interoperation architecture 100 ("architecture 100"). The architecture 100 provides a consistent and timely view of key records and improves the individual performance by empowering agents with their own information. The architecture 100 also provides the ability to drill from dashboards into analytical and detailed reports, both historical and real-time, for root cause analysis. A central repository of all the events in the organization provides accurate, timely, and secure data storage.

In particular, the central repository may be implemented as a master application data repository 102. In the master application data repository 102, data is organized according to a master data organization schema 104. The master data organization schema 104 will be described in more detail below.

The architecture 100 coordinates the processing of multiple call center applications and their interactions with the master application data repository 102. Examples of applications shown in FIG. 1 include a Case Management application, have three logical parts: an Accounts Integrity Management ("AIM") application 106, an online order processing ("KANA") application 108, and a Sales Order Entry (SOE) application 110. The AIM application 106 may, for example, provide a GUI and processing logic that allow users to correct account errors or otherwise maintain the integrity of any account. The KANA application 108 may provide a GUI and processing logic for processing online web orders. The SOE application 110 may provide a GUI and processing logic for processing telephone orders. Thus, once a customer subscribes over the phone, the SOE team loads the order into the system through the SOE application 110.

Other examples of applications include the Commitment Log application 112, the Attrition application 114, the Identification Management application 116, the Employee Details application 118, and the Leave application 120. Additional examples of applications include the Attendance application 122, the Transport application 124, the Movement Management application 126, and the human resources (HRIS) application 128.

The architecture 100 implements a hub and spoke design. The applications 106-120 exchange data with the master application data repository 102, which relieves each individual application of local database overhead and processing requirements. Additional, different, or fewer applications may be running in the architecture 100.

FIG. 1 also shows that the architecture 100 provides administrative access for the administration team 130. The administration team 130 may interact with the architecture 100 through a user interface through which authorized users may update personnel data maintained by the weekly roster module 132, or may make other changes to data stored in the master application data repository 102. In addition, a scheduling team 134 may provide input into the weekly roster module 132. Accordingly, the weekly roster application 132 maintains an up-to-date view of the employees and their schedules assigned to any particular process for a particular week. Furthermore, an upload process 136 may be established to manually or automatically upload attendance data into the attendance application 122.

Call centers work on shifts, and any employee can be scheduled to work in any shift. The schedule includes their working days and weekly offs (their time off). The scheduling team 134 prepares rosters of employees in shifts based on many different parameters. The architecture 100 makes the roster available every week (e.g., in an Excel™ spreadsheet format). The administration team 130 or scheduling team 134 enters weekly employee rosters into the architecture 100 (e.g., into the attendance module) through the upload process 136.

The processing in the architecture 100 may be hosted on an Internet Information Web Server (IIS). The processing may be implemented, as examples, in C# and using ASP.NET, with the data stored in a SQL 2000 database. For example, the databases and data schemas described above may be implemented with Microsoft® SQL Server 2000, Microsoft SQL Server version 7.0, or other database server technology. The relational database engine can return data as Extensible Markup Language (XML) documents. Additionally, XML can also be used to insert, update, and delete values in the database.

Furthermore, the architecture may run multiple instances of the relational database engine on the same or different machine. Each instance may have its own set of system and user databases. Applications can connect to each instance on a single machine similar to the way they connect to instances running on different machines.

Other technology that may be used to implement the architecture includes Asynchronous JavaScript and XML (AJAX) to create interactive Web applications, XHTML, for stricter, cleaner rendering of HTML into XML, Cascading Style Sheets (CSS) for marking up and adding styles, Javascript Document Object Model (DOM) for providing content, structure and style of a document to be dynamically accessed and updated, and an XMLHttpRequest object which exchanges data asynchronously with the Web server and reduces the need to continually fetch resources from the server.

Since data can be sent and retrieved without requiring the user to reload an entire Web page, small amounts of data can be transferred as and when required. Moreover, page elements can be dynamically refreshed at any level of granularity to reflect this. Unchanged information need not be sent across the network. The implementation may be standardized around the W3C 'Document Object Model (DOM) Level 3 Load and Save Specification' or other specification.

In addition to the applications described above, the architecture 100 may provide additional functionality. For example, the architecture 100 may provide an employee information access application 136 ("My OneView"). The My OneView application 136 may be accessed by any employee to review leave balance, schedules, holiday lists, and other aspects of employment associated with the employee. Additional examples are described in more detail below.

Figure 2:
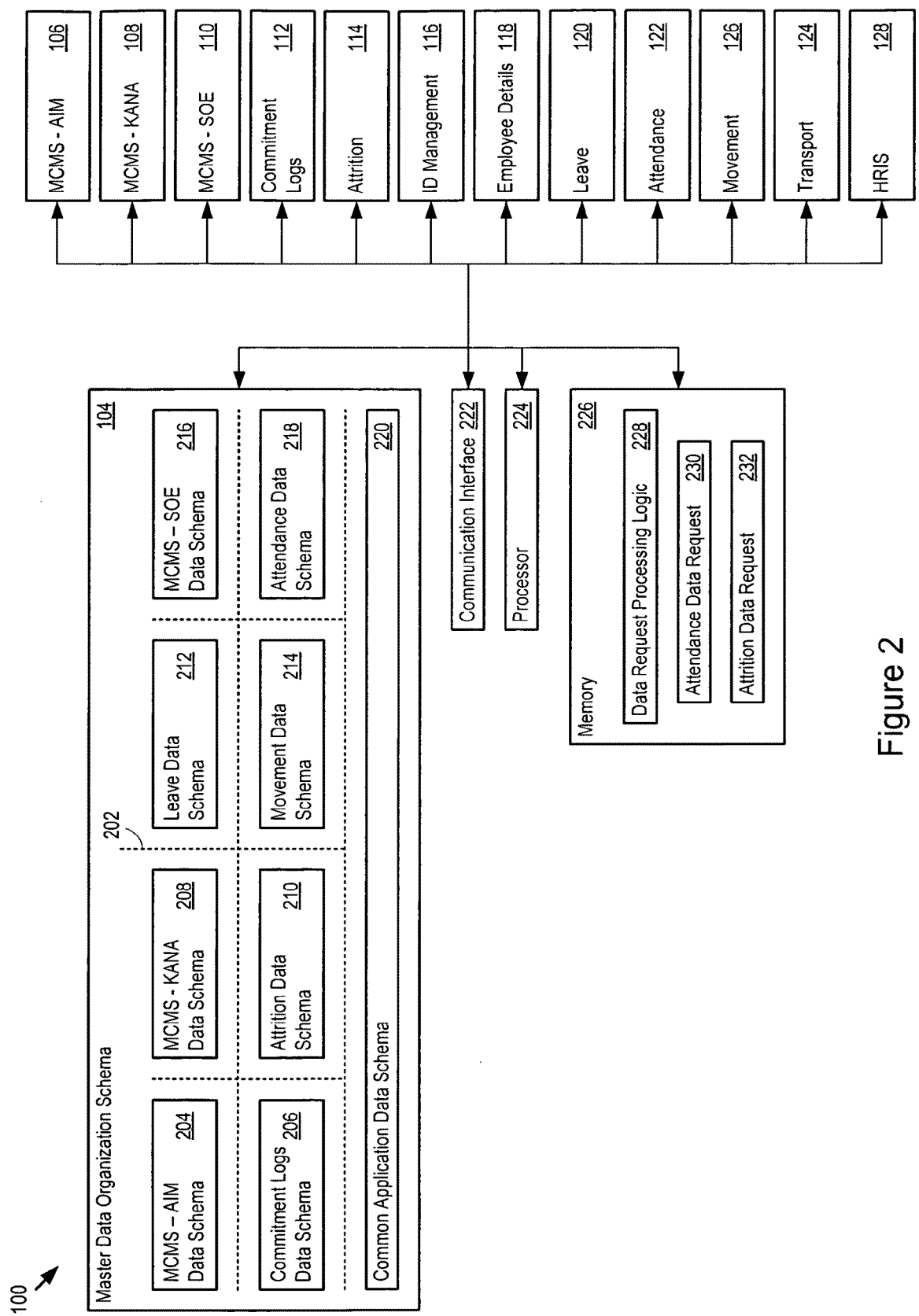
FIG. 2 shows a call center application data and interoperation architecture including a schema subdivision defining multiple individual application data schemas for specific applications.

FIG. 2 shows another view of the call center application data and interoperation architecture 100 including a schema subdivision 202 defining multiple individual application data schemas 204-218 for specific applications. The schema subdivision 202 may be a logical or physical partitioning of database tables, fields, and other structures into sets of tables, fields, and other information specific to individual call center applications. In addition, the master data organization schema 104 defines a common application data schema 220. The common application data schema 220 may include fields, tables or other structures that multiple applications use to share data or have common access to in order to support their processing roles.

examples of individual application data schemas in FIG. 2 include: a Case Management AIM data schema 204, a Commitment Log data schema 206, a Case Management KANA data schema 208, and an Attrition data schema 210. Additional examples include: a leave a data schema 212, a movement data schema 214, a Case Management SOE data schema 216, and an attendance data schema 218. The data schemas 204-218 maintain the data specific to a particular application. More specifically, each data schema 204-218 supports a specific application data set requirement. For example, the Attrition data schema 210 includes tables and fields for maintaining any data that the Attrition application 114 manipulates, sends, receives, displays, or otherwise processes in performing its attrition management, tracking, and reporting role. The subdivision 202 ensures a clean separation between the data set requirements for each call center applications, rather than smearing all of the data set requirements across a set of tables and fields common to multiple applications.

The individual applications may communicate with the rest of the architecture 100 over one or more local or remote networks or interconnection of such networks. The individual applications may submit data requests, and receive data responses from the architecture 100 as they perform their processing. To that end, the architecture 100 implements a communication interface 222, and includes a processor 224 that may receive the data requests, process the data requests, and return data responses to the individual applications. More specifically, a memory 226 may store data request processing logic 228, such as a database management application. The data request processing logic 228 receives data requests (such as the attendance data request 230 and the attrition data requests 232). In, response, the data request processing logic 228 process the data requests by performing data manipulation (e.g., database queries, or database reads, writes, or updates) responsive to the data requests. The data request processing logic 228 adheres to the application data schemas in the master application data repository 102 so that specific application data schemas support specific call center application. One result is that the architecture 100 relieves the call center applications 106-128 from local database processing overhead, and provides centralized storage and control over the call center data across multiple applications.

Specific examples of call center application data schemas are given in the tables below.

The following Tables 1-4 show a transport application data schema that may support the Transportation application 124.

TABLE 1

ADHOC_tbl_RequestAction
This table stores information about adhoc transportation requests.

| Data field | Data Type | Constraints | Description |
| --- | --- | --- | --- |
| inActionId | Integer | Primary Key | Unique identifier to identify the possible actions that can be taken for adhoc transport requests. |
| vcActionName | string | Not Null | Describe whether adhoc is approved/denied/forwarded. |
| vcActionDescription | string | Not Null | |
| vcNextPossibleAction | string | Null | Describe adhoc approved/denied/forwarded. |
| inActionType | integer | Not Null | 1. Logged 2. Forwarded/Approved 3. Closed |
| inSquenceOrder | Integer | Not Null | Order in which to display the actions |
| lsbolActive | bit | Not Null | Whether the current action can be executed (Active)or not (Inactive). |

TABLE 1-continued

ADHOC_tbl_RequestAction
This table stores information about adhoc transportation requests.

| Data field | Data Type | Constraints | Description |
| --- | --- | --- | --- |
| dtCreatedOn | date | Not Null | Date on which the action was entered into the database. |
| inCreatedBy | numeric | Not Null | The action was created by which user |

TABLE 2

ADHOC_tbl_RequestDetails
This table describes the action taken on the adhoc transportation requests.

| Data field | Data Type | Constraints | Description |
| --- | --- | --- | --- |
| inDetailId | numeric | Primary Key | Unique identifier to identify the possible actions that can be taken for adhoc transport requests. |
| inAdhocId | numeric | Null | Reference from (Foreign Key) Adhoc_tbl_RequestMst. |
| inHeadID | numeric | Null | Reference from (Foreign Key) Adhoc_tbl_RequestHead |
| inStatus | integer | Null | 1. Adhoc requested. 2. Forwarded. 3. Approved. 4. Denied. 5. Sent to transport. |
| inRequestedBy | numeric | Null | Employee who is requesting. |
| dtRequestedOn | date | Null | Date on which Adhoc is requested. |
| inClosedBy | numeric | Null | Supervisor who took action. |
| dtClosedOn | date | Null | Date on which Adhoc request is closed. |
| vcComments | string | Null | Wether approved/denied. |

TABLE 3

ADHOC_tbl_RequestHead
The table stores the information when adhoc transportation is required by the employee and when it is approved.

| Data field | Data Type | Constraints | Description |
| --- | --- | --- | --- |
| inHeadId | numeric | Primary Key | Unique identifier to identify the possible actions that can be taken for adhoc transport requests. |
| inAdhocId | numeric | Not Null | Reference from (Foreign Key) Adhoc_tbl_RequestMst. |
| inDetailId | numeric | Null | Reference from (Foreign Key) Adhoc_tbl_RequestDetails. |
| inRequestedBy | numeric | Not Null | Employee who is requesting for the transport. |
| dtRequestedOn | date | Not Null | Date on which the Adhoc has been requested. |
| inApprovedBy | numeric | Null | Supervisor who is approving. |
| dtApprovedOn | date | Null | Date on which it has been approved. |
| bolIsClosed | bit | Not Null | Approved/Denied |

TABLE 4

ADHOC_tbl_RequestMst
The table contains the ticket number and other related information about the employee.

| Data field | Data Type | Constraints | Description |
| --- | --- | --- | --- |
| inAdhocId | numeric | Primary Key | Unique identifier to identify the possible actions that can be taken for adhoc transport requests. |
| vcTicketNo | string | Null | New ticket is raised for each new request. |
| dtAdhocdate | date | Not Null | Date for which Adhoc is requested. |
| inTeamId | integer | Not Null | Team Leader Name. |
| inProcessId | integer | Not Null | Process which employee belongs. |
| inUserId | numeric | Not Null | Employee ID. |
| inSupervisorId | numeric | Not Null | Supervisor ID. |
| dtAdhocTime | date | Not Null | Time at which adhoc is required. |
| dtStarttime | date | Not Null | Shift start time. |
| dtEndtime | date | Not Null | Shift end time. |
| inAdhocType | integer | Not Null | 1. Pick 2. Drop |
| inReason | integer | Not Null | Team Meeting/Official Official. |
| vcComments | string | Not Null | Reason for Adhoc request. |
| dtCreatedOn | date | Not Null | Date on which adhoc is raised. |
| inCreatedBy | numeric | Not Null | Employee ID. |

Figure 5:
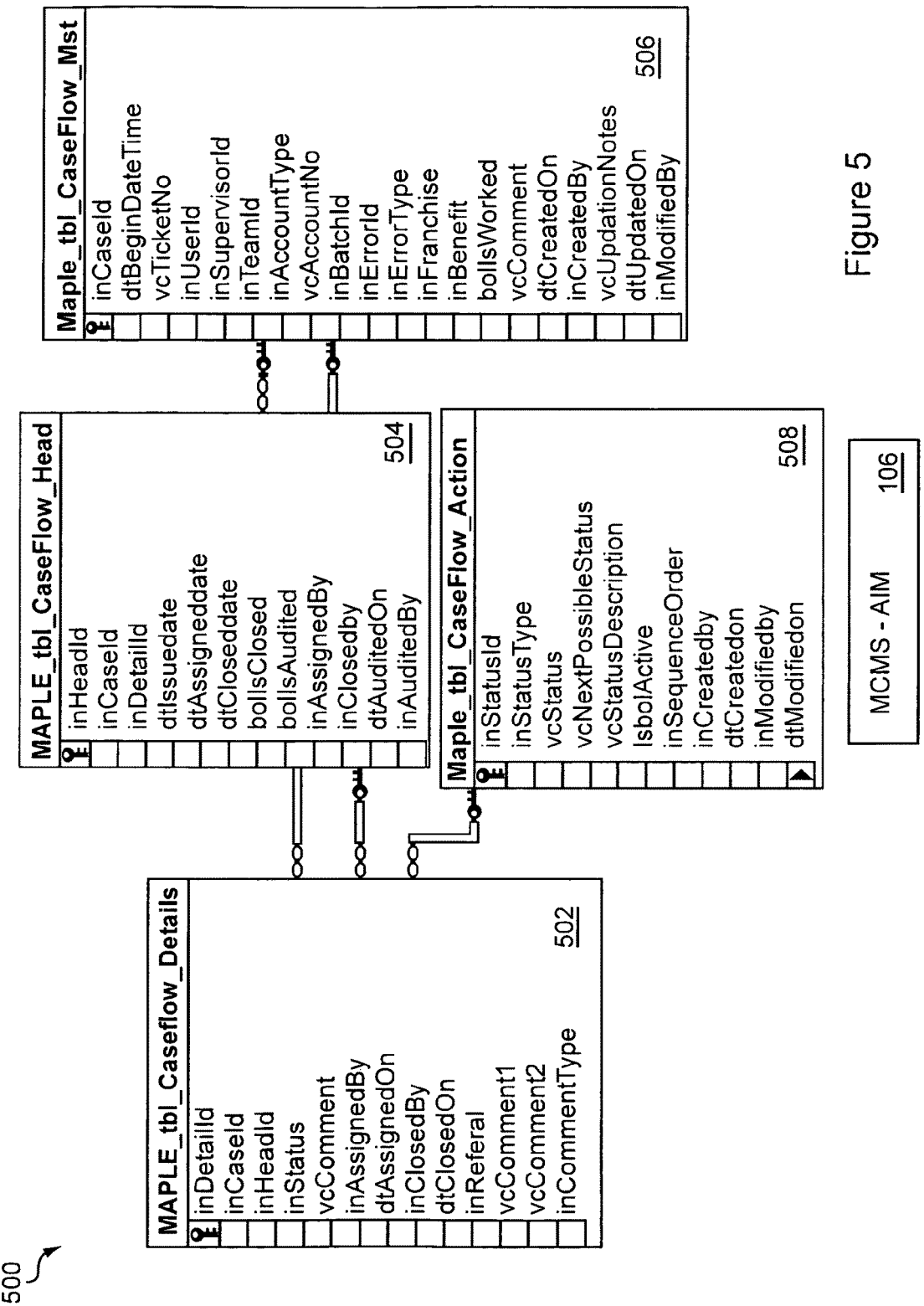
FIG. 5 shows a Case Management application data schema.

The following Tables 5-11 show a Commitment Logs data schema 206 that may support the Commitment Logs application 112. FIG. 5 provides additional detail. The career/organizational levels in may be defined from A to H, with A being the top level. For example, people in Level E may be team leaders, F may be Subject Matter Experts and G & H may be team member/Customer Support Representatives having similar work profiles and commitments.

TABLE 5

AGM_tbl_CommitmentLogMst (Table 1002)
The table describes the commitment the Team Leader ("TL") and the Deputy Manager ("DM") has to perform.

| Data field | Data Type | Constraints | Description |
| --- | --- | --- | --- |
| inLogId | integer | Primary Key | Unique identifier to identify the possible Log Activity. |
| inLogType | integer | Not Null | 1. TL Activity. 2. DM Activity. |
| vcLogName | string | Not Null | 1. Side by side monitoring. 2. Remote monitoring. 3. Team huddle Etc. |
| vcDescription | string | Null | 1. 2 Per agent per month. 3. per agent per month. 3. Daily. Etc. |
| vcOrganizationLevel | string | Null | |
| inCommitmentType | integer | Null | 1. F, G + H Level. 2. G + H Level. |
| bolIsActive | bit | Not Null | Status is Active/de-active. |
| inCreatedBy | numeric | Not Null | Employee ID. |
| dtCreatedOn | date | Not Null | Date on which Created. |
| inModifiedBy | numeric | Null | Employee ID. |
| dtModifiedOn | date | Null | Date on which it is modified. |

TABLE 6

AGM_tbl_CommitmentLogTarget (Table 1006)
Target to be achieved by the supervisor.

| Data field | Data Type | Constraints | Description |
| --- | --- | --- | --- |
| inTargetId | integer | Primary Key | Unique identifier to identify the possible Log Activity Target. |
| inLogId | integer | Not Null | Reference from (Foreign Key) AGM_tbl_CommitmentLogMst. |
| inProcessId | integer | Not Null | Process for which commitment are taken. |
| inOrganizationLevel | integer | Null | 1. E 2. F 3. G + H |
| inLogType | integer | Null | 1. TL Activity. 2. DM Activity. |
| inCommitmentType | integer | Null | 1. Team Commitment. 2. Individual Commitment. |
| inTarget | integer | Null | Target Achieved. |
| inCreatedBy | numeric | Null | Employee ID. |
| dtCreatedOn | date | Null | Date on which created. |

TABLE 7

AGM_tbl_CommitmentLogTarget_History (Table 1008)
The table describes the history of commitment targets that have been done.

| Data field | Data Type | Constraints | Description |
| --- | --- | --- | --- |
| inTargetId | integer | Primary Key | Unique identifier to identify the possible Log Activity Target. |
| inLogId | integer | Not Null | Reference from (Foreign Key) AGM_tbl_CommitmentLogMst. |
| inProcessId | integer | Not Null | Process for which commitment are taken. |
| inLogType | integer | Not Null | 1. TL Activity. 2. DM Activity. |
| inCommitmentType | integer | Not Null | 1. Team Commitment. 2. Individual Commitment. |
| inOrganizationLevel | integer | Null | 1. E 2. F 3. G + H |

TABLE 7-continued

AGM_tbl_CommitmentLogTarget_History (Table 1008)
The table describes the history of commitment targets that have been done.

| Data field | Data Type | Constraints | Description |
|---|---|---|---|
| inTarget | integer | Not Null | Target Achieved. |
| inCreatedBy | numeric | Not Null | Employee ID. |
| dtCreatedOn | date | Not Null | Date on which created. |
| inModifiedBy | numeric | Not Null | Employee ID. |
| dtModifiedOn | date | Not Null | Date on which modified. |

TABLE 8

AGM_CommitmentLogType (Table 1010)
The table describes the commitment of TL and DM.

| Data field | Data Type | Constraints | Description |
|---|---|---|---|
| inLogType | integer | Primary Key | Unique identifier to identify the possible Log Activity Target. |
| vcLogType | string | Null | 1. TL Activity. 2. DM Activity. |
| vcLevels | string | Null | 1. Senior Manager 2. Manager 3. Deputy Manager |
| bolIsActive | bit | Null | Active/de-active. |
| inCreatedBy | numeric | Null | Employee ID. |
| dtCreatedOn | date | Null | Date on which created. |
| inModifiedBy | numeric | Null | Employee ID. |
| dtModifiedOn | date | Null | Date on which modified. |

TABLE 9

AGM_UserCommitment_Achieved (Table 1004)
This table describes commitments achieved.

| Data field | Data Type | Constraints | Description |
|---|---|---|---|
| inAchievedId | numeric | Primary Key | Unique identifier to identify the possible Log Activity Target. |
| dtAchievedOn | date | Null | Date on which target achieved, |
| inCommitmentTo | numeric | Null | Employee ID. |
| inLogId | integer | Not Null | Reference from (Foreign Key) AGM_tbl_CommitmentLogMst. |
| inCommitmentBy | numeric | Not Null | Employee ID. |
| inLogType | integer | Not Null | 1. TL Activity. 2. DM Activity. |
| inCommitmentType | integer | Not Null | 1. TL Activity. 2. DM Activity. |
| inLevelId | integer | Null | G + H |
| inTargetAchieved | integer | Not Null | Targets that are achieved. |
| inProcessId | integer | Null | Process. |
| vcComments | string | Null | One on One. |
| inMonth | integer | Null | How many completed. |
| inYear | integer | Null | Which year. |

TABLE 10

AGM_tbl_UserCommitment_Schedule (Table 1014)
The table describes the commitments that are scheduled for the week.

| Data field | Data Type | Constraints | Description |
|---|---|---|---|
| inScheduleId | numeric | Primary Key | Unique identifier to identify the possible Activity Scheduled. |
| inUserId | numeric | Null | Employee ID. |
| inProcessId | integer | Null | Process Name. |
| dtCommitmentdate | date | Null | Date on which committed. |
| dtFromtimeStamp | date | Null | Starting date. |
| dtTotimeStamp | date | Null | End date. |
| inLogId | integer | Null | Reference from (Foreign Key) AGM_tbl_CommitmentLogMst. |
| inLogType | integer | Null | 1. TL Activity. 2. DM Activity. |
| inCommitmentType | integer | Null | 1. Individual Commitment. 2. Team Commitment. |
| inScheduledTarget | integer | Null | Target to be achieved. |
| vcComments | string | Null | Reason. |
| inMonth | integer | Null | How many completed. |

TABLE 10-continued

AGM_tbl_UserCommitment_Schedule (Table 1014)
The table describes the commitments that are scheduled for the week.

| Data field | Data Type | Constraints | Description |
|---|---|---|---|
| inYear | integer | Null | How many in one year. |
| inCreatedBy | numeric | Null | Employee ID. |
| dtCreatedOn | date | Null | Date on which created. |
| inModifiedBy | numeric | Null | Employee ID. |
| dtModifiedOn | date | Null | Date on which modified. |

TABLE 11

AGM_tbl_UserCommitment_Target (Table 1012)
The table describes the target that are to be achieved.

| Data field | Data Type | Constraints | Description |
|---|---|---|---|
| inTargetId | numeric | Primary Key | Unique identifier to identify the possible Target. |
| inCommitmentBy | numeric | Not Null | Employee ID. |
| inCommitmentTo | numeric | Not Null | 1. TL<br>2. DM. |
| inLogId | integer | Not Null | Reference from (Foreign Key) AGM_tbl_CommitmentLogMst. |
| inLogType | integer | Not Null | 1. TL Activity.<br>2. DM Activity. |
| inCommitmentType | integer | Not Null | 1. Individual Commitment.<br>2. Team Commitment. |
| inLevelId | integer | Null | G + H. |
| inTargetAssigned | integer | Not Null | Total target assigned. |
| inTargetAchieved | integer | Not Null | Target achieved. |
| inProcessId | integer | Null | Process Name. |
| inMonth | integer | Null | Achieved each month. |
| inYear | integer | Null | Achieved in year. |

The following Table 12 shows a human resources IS (HRIS) data schema that may support the HRIS application 128 roster functionality.

TABLE 12

HRIS_RPT_ViewRoster
This table describes the user who has viewed the data.

| Data field | Data Type | Constraints | Description |
|---|---|---|---|
| inViewUser | numeric | Not Null | Employee ID. |
| dttimeStamp | date | Not Null | Date on which viewed. |
| inUserId | numeric | Not Null | Employee ID. |
| inLocationId | integer | Null | 1. Mumbai<br>2. Bangalore. |
| vcLocation | string | Null | Bangalore/Mumbai. |
| vcEmployeeCode | string | Null | Employee ID. |
| vcEmployeeName | string | Null | Employee Name. |
| inProcessId | integer | Null | 1. Dial<br>2. Dsl<br>3. Felix |
| vcProcessName | string | Null | Felix/Dsl/Dial. |
| inTeamId | integer | Null | Supervisor ID. |
| vcTeamName | string | Null | Supervisor Name. |
| vcShiftStart | string | Null | Start Time. |
| vcShiftEnd | string | Null | End Time. |
| vcStatus | string | Null | 1. Scheduled.<br>2. Weekly Off |

Figure 11:
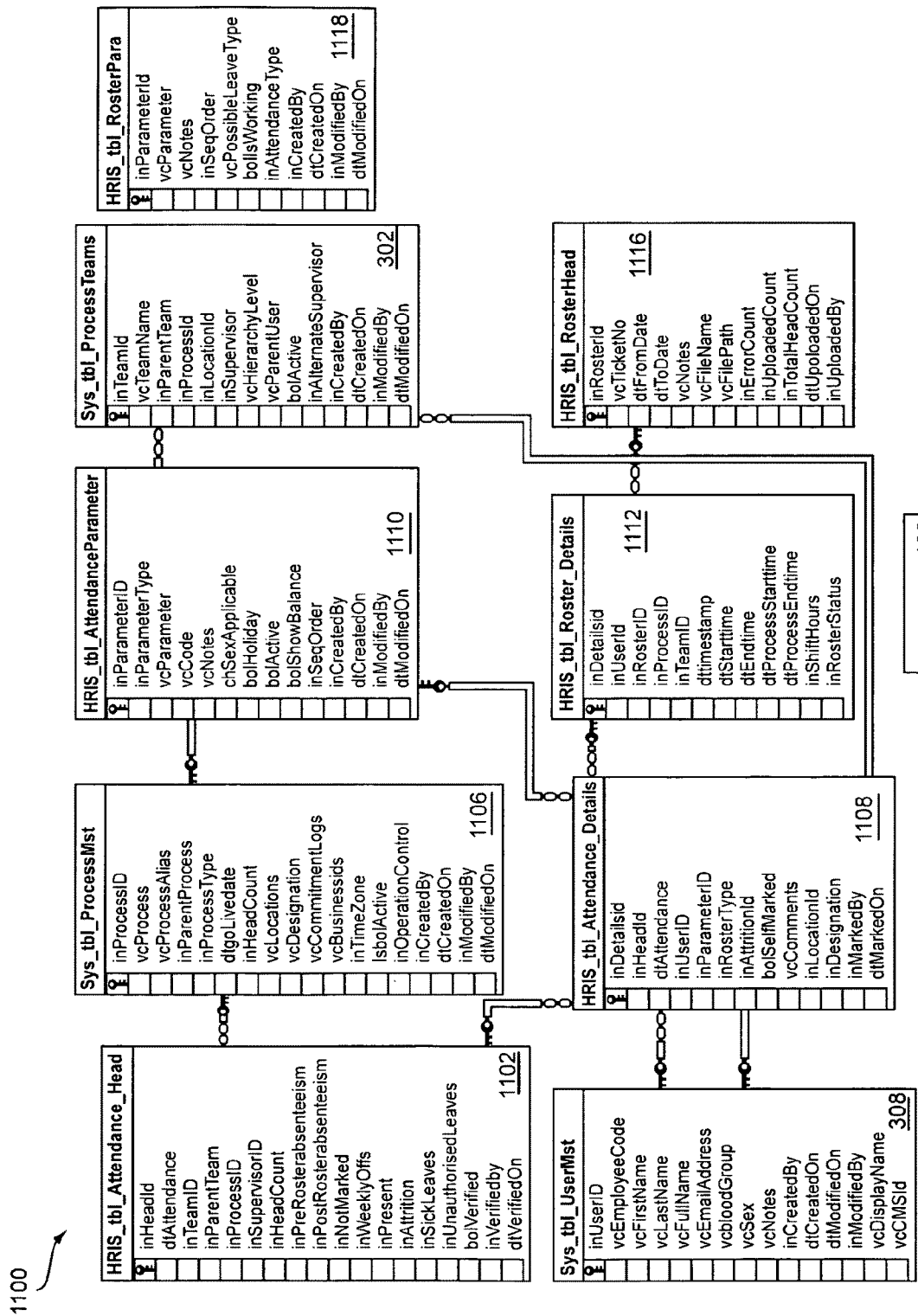
FIG. 11 shows an Attendance application data schema.

The following Tables 13-16 show an Attendance data schema 218 that may support the attendance application 122. FIG. 11 provides additional detail.

TABLE 13

HRIS_tbl_Attendance_Details (Table 1108)
This table saves the information about the attendance of the employee.

| Data field | Data Type | Constraints | Description |
|---|---|---|---|
| inDetailsid | numeric | Primary key | Unique identifier to identify the details. |
| inHeadId | numeric | Not Null | Reference from(Foreign Key) ADHOC_tbl_RequestHead |
| dtAttendance | date | Not Null | Present day. |
| inUserID | numeric | Not Null | Employee ID. |
| inParameterID | integer | Not Null | Reference from(Foreign Key) HRIS_tbl_AttendanceParameter |
| inRosterId | numeric | Null | Reference from(Foreign Key) HRIS_tbl_RosterHead. |
| inRosterType | integer | Null | |

TABLE 13-continued

HRIS_tbl_Attendance_Details (Table 1108)
This table saves the information about the attendance of the employee.

| Data field | Data Type | Constraints | Description |
|---|---|---|---|
| inAttritionId | numeric | Not Null | Reference from(Foreign Key) HRIS_tbl_Attrition_Mst. |
| bolSelfMarked | bit | Not Null | 1. Self Marked. 2. Supervisor Marked. |
| vcComments | string | Null | 1. Attendance Marked. 2. Attendance not Marked. |
| inLocationId | integer | Null | 1. Mumbai 2. Bangalore |
| inDesignation | integer | Null | 1. Analyst 2. Agent |
| inMarkedBy | numeric | Null | Employee ID. |
| dtMarkedOn | date | Null | Date on which attendance is marked. |

TABLE 14

HRIS_tbl_Attendance_Head (Table 1102)
This table has the information about the Employee Status.

| Data field | Data Type | Constraints | Description |
|---|---|---|---|
| inHeadId | numeric | Primary Key | Unique identifier to identify the details. |
| dtAttendance | date | Not Null | Attendance date. |
| inTeamID | integer | Not Null | Reference from(Foreign Key) Sys_tbl_ProcessTeams. |
| inParentTeam | integer | Null | Reference from(Foreign Key) Sys_tbl_ProcessTeams. |
| inProcessID | integer | Not Null | 1. Dsl 2. Dial 3. Felix |
| inSupervisorID | numeric | Not Null | Supervisor ID. |
| inHeadCount | integer | Null | Total Strength. |
| inPreRosterabsenteeism | integer | Null | Employee who is rostered but not present. |
| inPostRosterabsenteeism | integer | Null | Employee who has informed before the roster. |
| inNotMarked | integer | Null | Total attendance not marked. |
| inWeeklyOffs | integer | Null | Total weekly Off. |
| inPresent | integer | Not Null | Total Present. |
| inAttrition | integer | Null | Total Attrition. |
| inSickLeaves | integer | Null | Total Sick Leave. |
| inUnauthorisedLeaves | integer | Not Null | Not approved leaves |
| bolVerified | bit | Not Null | If verified. |
| inVerifiedby | numeric | Null | Employee ID. |
| dtVerifiedOn | date | Null | Date on which verified. |

TABLE 15

HRIS_tbl_Attendance_History
This table contains the history of the employee attendance.

| Data field | Data Type | Constraints | Description |
|---|---|---|---|
| inDetailsid | numeric | Not Null | Unique identifier to identify the details. |
| inHeadId | numeric | Not Null | Reference from(Foreign Key) HRIS_tbl_Attendance_Head |
| dtAttendance | date | Not Null | Attendance Date. |
| inUserID | numeric | Not Null | Employee ID. |
| inParameterID | integer | Not Null | 1. Sick Leave 2. Present 3. Planned Leave |
| inOldParameterID | integer | Not Null | |
| inRosterId | numeric | Null | Reference from(Foreign Key) HRIS_tbl_RosterHead |
| inRosterType | integer | Null | |
| inAttritionId | numeric | Not Null | Reference from(Foreign Key) HRIS_tbl_Attrition_Mst |
| bolSelfMarked | bit | Not Null | If attendance is self marked. |
| vcComments | string | Null | Remarks. |
| inMarkedBy | numeric | Null | Employee ID. |
| dtMarkedOn | date | Null | Date on which marked. |
| inModifiedBy | numeric | Null | Employee ID. |
| dtModifiedOn | date | Null | Date on which modified. |

TABLE 16

HRIS_tbl_AttendanceParameter (Table 1110)
This table contains the parameter about the status of employee like present, leave.

| Data field | Data Type | Constraints | Description |
|---|---|---|---|
| inParameterID | integer | Primary Key | Unique identifier to identify the details. |
| inParameterType | integer | Not Null | |
| vcParameter | string | Not Null | 1. Present<br>2. Sick Leave<br>3. Planned Leave |
| vcCode | string | Not Null | 1. P<br>2. SL<br>3. PL |
| vcNotes | string | Null | 1. Present<br>2. Paid Leave<br>3. Sick Leave |
| chSexApplicable | string | Not Null | Null |

TABLE 16-continued

HRIS_tbl_AttendanceParameter (Table 1110)
This table contains the parameter about the status of employee like present, leave.

| Data field | Data Type | Constraints | Description |
|---|---|---|---|
| bolHoliday | bit | Not Null | 1. Present<br>2. Weekly Off |
| bolActive | bit | Not Null | Active. |
| bolShowBalance | bit | Not Null | Balance. |
| inSeqOrder | integer | Not Null | Sequence. |
| inCreatedBy | numeric | Not Null | Employee ID. |
| dtCreatedOn | date | Not Null | Date of Creation. |
| inModifiedBy | numeric | Null | Employee ID. |
| dtModifiedOn | date | Null | Date of Modification. |

Figure 13:
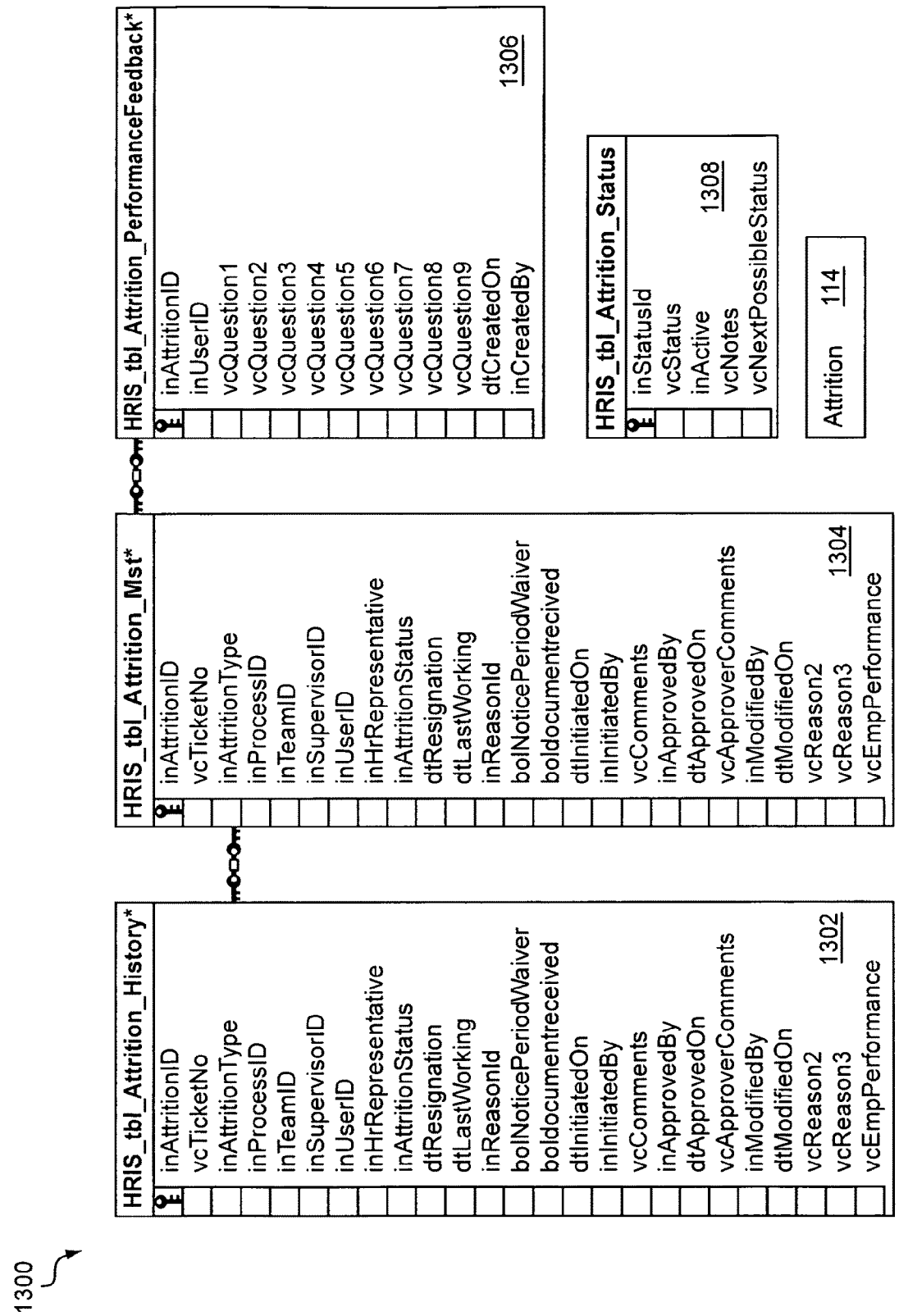
FIG. 13 shows an Attrition application data schema.
Figure 17:
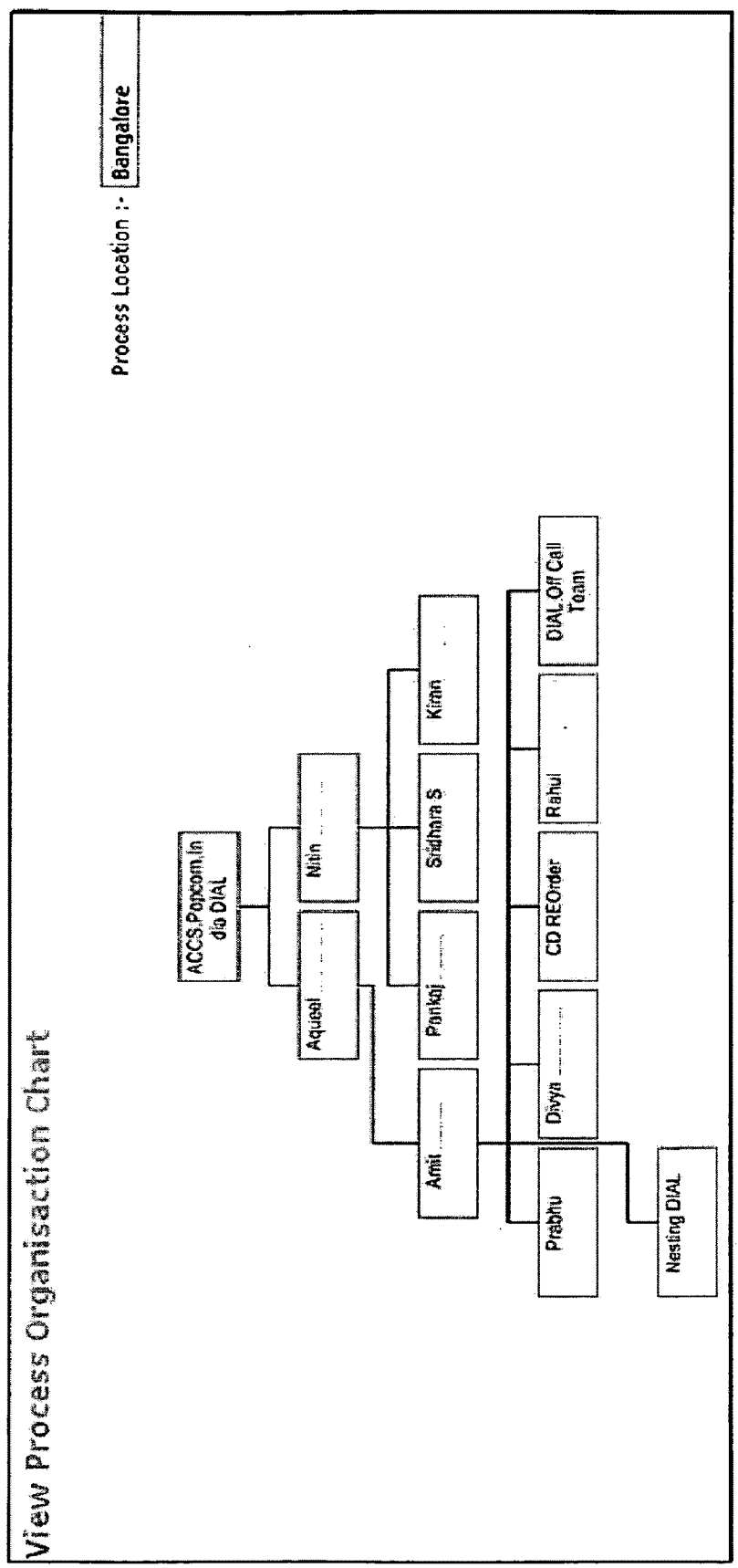
Figure 18:

The following Tables 17-20 show an Attrition data schema 210 that may support the Attrition application 114. FIG. 13 provides additional detail.

TABLE 17

HRIS_tbl_Attrition_History (Table 1302)
The table contains the history of attritioned employees.

| Data field | Data Type | Constraints | Description |
|---|---|---|---|
| inAttritionID | numeric | Primary Key | Unique identifier to identify the details. |
| vcTicketNo | string | Null | Ticket for each attrition. |
| inAttritionType | integer | Not Null | 1. Approval Pending<br>2. Approved<br>3. Released |
| inProcessID | integer | Not Null | 1. Dial<br>2. Dsl<br>3. Felix |
| inTeamID | integer | Not Null | Reference from(Foreign Key) Sys_tbl_ProcessTeams |
| inSupervisorID | integer | Not Null | Supervisor ID. |
| inUserID | integer | Not Null | Employee ID. |
| inHrRepresntative | decimal | Not Null | HR ID. |
| inAttritionStatus | integer | Not Null | 1. Approval Pending<br>2. Approved<br>3. Released |
| dtResignation | date | Not Null | Date of resignation. |
| dtLastWorking | date | Null | Last working day. |
| inReasonId | integer | Not Null | Reason ID. |
| bolNoticePeriodWaiver | bit | Not Null | Notice period. |
| Boldocumentrecived | bit | Not Null | Document received. |
| dtInitiatedOn | date | Not Null | Date on which resigned. |
| inInitiatedBy | decimal | Not Null | Employee ID. |
| vcComments | string | Null | 1. Resigned<br>2. Absconding<br>3. Approved |
| inApprovedBy | numeric | Null | Employee ID |
| dtApprovedOn | date | Null | Date on which approved. |
| vcApproverComments | string | Null | Employee ID. |
| inModifiedBy | numeric | Null | Employee ID. |
| dtModifiedOn | date | Null | Date of modification. |
| vcReason2 | string | Null | Reason for resigning. |
| vcReason3 | string | Null | Reason for resigning. |
| vcEmpPerformance | string | Null | Grade |

TABLE 18

HRIS_tbl_Attrition_Mst (Table 1304)
The table contains the status of Attrition e.g., released.

| Data field | Data Type | Constraints | Description |
|---|---|---|---|
| inAttritionID | numeric | Primary Key | Unique identifier to identify the details. |
| vcTicketNo | string | Null | Ticket for each attrition. |
| inAttritionType | int | Not Null | 1. Approval Pending<br>2. Approved<br>3. Released |

TABLE 18-continued

HRIS_tbl_Attrition_Mst (Table 1304)
The table contains the status of Attrition e.g., released.

| Data field | Data Type | Constraints | Description |
|---|---|---|---|
| inProcessID | int | Not Null | 1. Dial<br>2. Dsl<br>3. Felix |
| inTeamID | int | Not Null | Reference from(Foreign Key) Sys_tbl_ProcessTeams |
| inSupervisorID | int | Not Null | Supervisor ID. |
| inUserID | int | Not Null | Employee ID. |
| inHrRepresntative | decimal | Not Null | HR ID. |
| inAttritionStatus | int | Not Null | 1. Approval Pending<br>2. Approved<br>3. Released |
| dtResignation | date | Not Null | Date of resignation. |
| dtLastWorking | date | Null | Last working day. |
| inReasonId | integer | Not Null | Reason for leaving. |
| bolNoticePeriodWaiver | bit | Not Null | Notice period completed. |
| Boldocumentrecived | bit | Not Null | Document received. |
| dtInitiatedOn | date | Not Null | Date on which resigned. |
| inInitiatedBy | decimal | Not Null | Employee ID. |
| vcComments | string | Null | 1. Resigned<br>2. Absconding<br>3. Approved |
| inApprovedBy | numeric | Null | Employee ID |
| dtApprovedOn | date | Null | Date on which approved. |
| vcApproverComments | string | Null | Employee ID. |
| inModifiedBy | numeric | Null | Employee ID. |
| dtModifiedOn | date | Null | Date of modification. |
| vcReason2 | string | Null | Reason for resigning. |
| vcReason3 | string | Null | Reason for resigning. |
| vcEmpPerformance | string | Null | Grade |

TABLE 19

HRIS_tbl_Attrition_PerformanceFeedback (Table 1306)
This table describes about the feedback of employee during his/her tenure.

| Data field | Data Type | Constraints | Description |
|---|---|---|---|
| inAttritionID | numeric | Primary Key | Unique identifier to identify the details. |
| inUserID | integer | Not Null | Employee ID. |
| vcQuestion1 | string | Null | Performance |
| vcQuestion2 | string | Null | Regular |
| vcQuestion3 | string | Null | Other queries. |
| vcQuestion4 | string | Null | Other queries |
| vcQuestion5 | string | Null | Other queries |
| vcQuestion6 | string | Null | Other queries |
| vcQuestion7 | string | Null | Other queries |
| vcQuestion8 | string | Null | Other queries |
| vcQuestion9 | string | Null | Other queries |
| dtCreatedOn | date | Null | Date on which created. |
| inCreatedBy | numeric | Null | Employee ID. |

TABLE 20

HRIS_tbl_Attrition_Staus (Table 1308)
This table has the status of attrition (Approved/Released).

| Data field | Data Type | Constraints | Description |
|---|---|---|---|
| inStatusId | integer | Primary Key | Unique identifier to identify the details. |
| vcStatus | String | Null | 1. Approval Pending<br>2. Approved<br>3. Released back |
| Inactive | bit | Not Null | Active/de-active |
| vcNotes | string | Null | 1. Approval Pending<br>2. Approved<br>3. Released back |
| vcNextPossibleStatus | string | Null | 1. Approved<br>2. Released back |

The following Tables 21-22 show additional tables for the HRIS data schema.

TABLE 21

HRIS_tbl_CompensatoryOff
This table has the information of employee Compensatory Off time.

| Data field | Data Type | Constraints | Description |
|---|---|---|---|
| inUserid | numeric | Primary Key | Unique Employee ID. |
| dtCompensatoryOff | date | Primary Key | Unique Date. |
| vcReason | string | Null | Reason for Comp Off |
| inCreatedOn | date | Not Null | Date on which created. |
| inAppliedBy | numeric | Null | Employee ID. |
| dtAppliedOn | date | Null | Date on which applied. |

TABLE 22

HRIS_tbl_dayInterval
This table is used to manage the intervals in a day for retrieving certain reports.

| Data field | Data Type | Constraints | Description |
|---|---|---|---|
| inActionID | integer | Primary Key | Unique identifier to identify the details. |
| vcParameter | string | Null | Range of selection. |
| vcValue | string | Null | 1. 1-30<br>2. 31-60<br>3. All |
| dtCreatedOn | date | Null | Date on which created |
| inCreatedBy | numeric | Null | Employee ID. |

Figure 12:
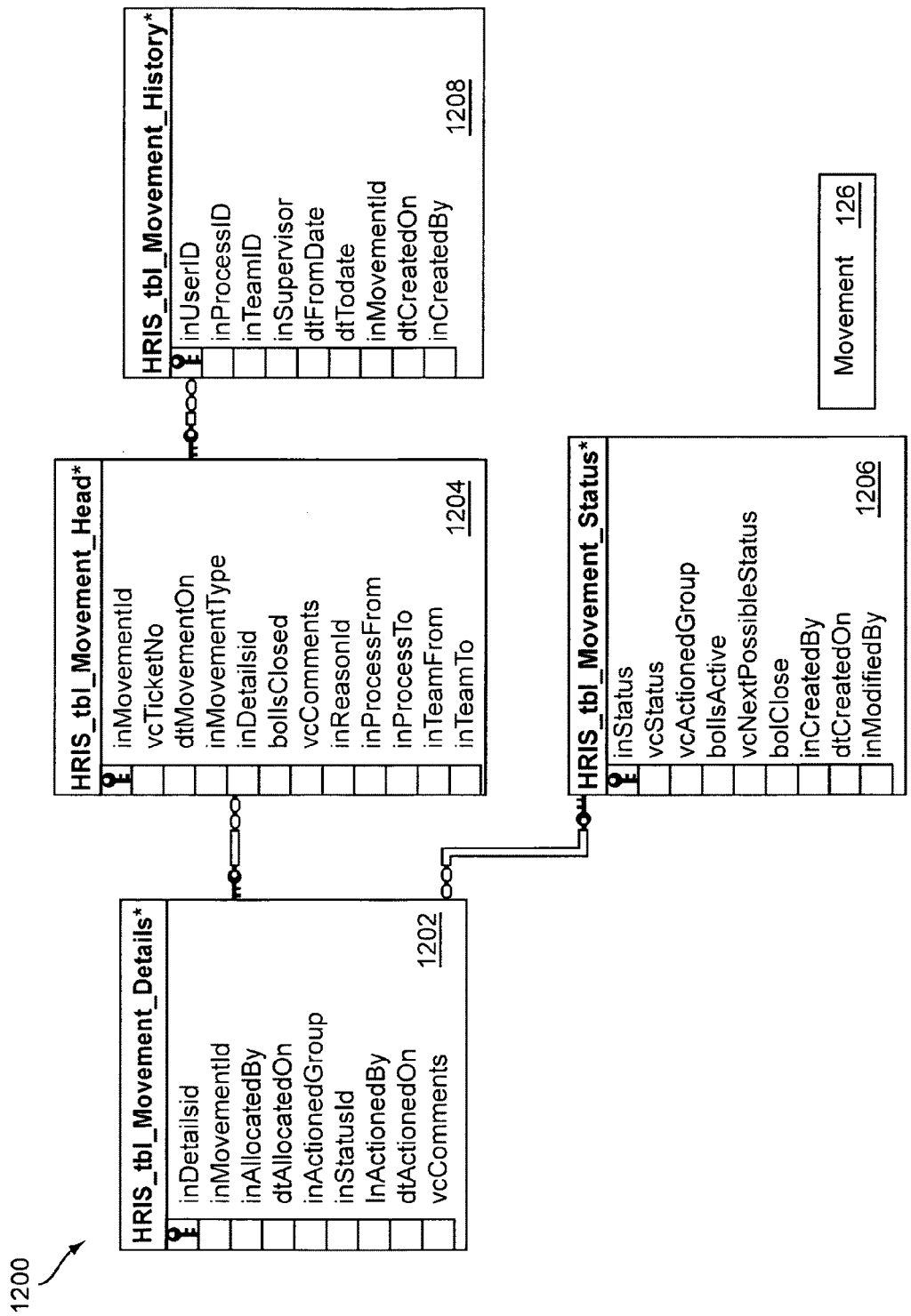
FIG. 12 shows a Movement application data schema.

The following Tables 23-26 show tables for the movement data schema 214 that supports the Movement application 126. FIG. 12 provides additional detail.

TABLE 23

HRIS_tbl_Movement_Details (Table 1202)
The table describe about the movement of the Employee from one process to another.

| Data field | Data Type | Constraints | Description |
|---|---|---|---|
| inDetailsid | numeric | Primary Key | Unique identifier to identify the details. |
| inMovementId | numeric | Not Null | |
| inAllocatedBy | numeric | Null | Employee ID. |
| dtAllocatedOn | date | Null | Date on which allocated. |
| inActionedGroup | integer | Null | |
| inStatusId | integer | Null | |
| inActionedBy | numeric | Null | Employee ID. |
| dtActionedOn | date | Null | Date on which Movement is to be done. |
| vcComments | string | Null | Reason for movement. |

TABLE 24

HRIS_tbl_Movement_Head (Table 1204)
This table describes the movement of an employee from process to process.

| Data field | Data Type | Constraints | Description |
|---|---|---|---|
| inMovementId | numeric | Primary Key | Unique identifier to identify the details. |
| vcTicketNo | string | Null | For every movement there is a new ticket. |
| dtMovementOn | date | Not Null | Date on which movement is done. |
| inMovementType | integer | Not Null | 1. Movement In Movement Out 3. Movement with in the process |
| inDetailsid | numeric | Null | Reference from(Foreign Key) HRIS_tbl_Movement_Details |
| bolIsClosed | bit | Not Null | Active/de-active |
| vcComments | string | Null | Reason for movement |
| inReasonId | integer | Not Null | |
| inProcessFrom | integer | Not Null | Process from which movement is done. |
| inProcessTo | integer | Not Null | Process to which moving. |
| inTeamFrom | integer | Not Null | Team Name |
| inTeamTo | integer | Not Null | Team Name |
| inSupervisorFrom | numeric | Not Null | Supervisor Name |
| inSupervisorTo | numeric | Not Null | Supervisor Name |
| vcMovementUsers | string | Null | Selected Employees. |
| bolImplemented | bit | Null | Yes/No |
| inCreatedBy | integer | Not Null | Employee ID. |
| dtCreatedOn | date | Not Null | Date On which created. |
| dtModifiedOn | date | Null | Date on which Modified. |
| inModifiedBy | integer | Null | Employee ID. |

TABLE 25

HRIS_tbl_Movement_History (Table 1208)
This table contains information about movements.

| Data field | Data Type | Constraints | Description |
|---|---|---|---|
| inUserID | Numeric | Primary Key | Unique Employee ID. |
| inProcessId | Integer | Not Null | 1. Dsl 2. Dial 3. Felix |
| inTeamId | Integer | Not Null | Reference from(Foreign Key) Sys_tbl_ProcessTeams |
| inSupervisor | Numeric | Not Null | Supervisor ID. |
| dtFromDate | Date | Primary Key | Unique Date. |
| dtTodate | Date | Null | Upto which Date. |
| inMovementId | Numeric | Null | Reference from(Foreign Key) HRIS_tbl_Movement_Head |
| dtCreatedOn | Date | Not Null | Date on which Created. |
| inCreatedBy | Integer | Not Null | Employee ID. |

TABLE 26

HRIS_tbl_Movement_Status (Table 1206)
The table states the movement status of the ticket.

| Data field | Data Type | Constraints | Description |
|---|---|---|---|
| inStatus | Integer | Primary Key | Unique identifier to identify the details. |
| vcStatus | String | Null | 1. Requested. 2. Forwarded. 3. Approved. 4. Canceled. |
| vcActionedGroup | String | Null | Active/de-active |
| bolIsActive | Bit | Not Null | Active/de-active |
| vcNextPossible Status | string | Null | 1. Requested. 2. Forwarded. 3. Approved. 4. Canceled. |
| bolClose | bit | Not Null | Active/de-active |

TABLE 26-continued

HRIS_tbl_Movement_Status (Table 1206)
The table states the movement status of the ticket.

| Data field | Data Type | Constraints | Description |
|---|---|---|---|
| inCreatedBy | numeric | Null | Employee ID. |
| dtCreatedOn | date | Null | Date on which created. |
| inModifiedBy | numeric | Null | Employee ID. |
| dtModifiedOn | date | Null | Date on which modified. |

The following Tables 27-33 show additional tables the HRIS data schema that support the HRIS application 128 roster functionality. Alternatively, the roster functionality may be implemented in a separate application and the roster tables may be organized into a separate roster application data schema that supports roster data set requirements.

TABLE 27

HRIS_tbl_Roster_Details (Table 1112)
This table contains the start and end time of the employee shift.

| Data field | Data Type | Constraints | Description |
| --- | --- | --- | --- |
| inDetailsid | numeric | Primary Key | Unique identifier to identify the details. |
| inUserId | numeric | Not Null | Employee ID. |
| inRosterID | numeric | Not Null | |
| inProcessID | integer | Not Null | 1. Dsl<br>2. Dial<br>3. Felix |
| inTeamID | integer | Not Null | Reference from(Foreign Key) Sys_tbl_ProcessTeams |
| dttimestamp | date | Not Null | Date on which Uploaded. |
| dtStarttime | date | Not Null | Start Time |
| dtEndtime | date | Not Null | End Time |
| dtProcessStarttime | date | Null | Process Start Time |
| dtProcessEndtime | date | Null | Process Start Time |
| inShiftHours | integer | Null | Total Hours. |
| inRosterStatus | integer | Not Null | Status of roster |

TABLE 28

HRIS_tbl_RosterHead (Table 1116)
This table contains the ticket number of each Roster that is uploaded.

| Data field | Data Type | Constraints | Description |
| --- | --- | --- | --- |
| inRosterId | numeric | Primary Key | Unique identifier to identify the details. |
| vcTicketNo | string | Null | New ticket will be raised for each roster. |
| dtFromDate | date | Null | Start date |
| dtToDate | date | Null | End date |
| vcNotes | string | Null | Date from which to which the roster is uploaded. |
| vcFileName | string | Null | Roster Template. |
| vcFilePath | string | Null | File from where Uploaded. |
| inErrorCount | integer | Null | Total Error Count. |
| inUploadedCount | integer | Null | Total Uploaded. |
| inTotalHeadCount | date | Null | Total Strength. |
| dtUpoloadedOn | date | Null | Date on which uploaded. |
| inUploadedBy | numeric | Null | Employee ID. |

TABLE 29

HRIS_tbl_RosterParameter (Table 1118)
This table contains scheduled/leave parameters.

| Data field | Data Type | Constraints | Description |
| --- | --- | --- | --- |
| inParameterId | integer | Primary Key | Unique identifier to identify the details. |
| vcParameter | string | Not Null | 1. Scheduled<br>2. Leave Scheduled<br>3. Compensatory Leave |
| vcNotes | string | Null | 1. Scheduled<br>2. Leave Scheduled<br>3. Compensatory Leave |
| inSeqOrder | integer | Null | 1. Scheduled<br>2. Leave Scheduled<br>3. Compensatory Leave |
| vcPossibleLeave Type | string | Null | Null |
| bolIsWorking | bit | Null | Active/de-active. |
| inAttendanceType | integer | Null | 1. Planned Leave<br>2. Present<br>3. Sick Leave |
| inCreatedBy | numeric | Null | Employee ID. |

TABLE 29-continued

HRIS_tbl_RosterParameter (Table 1118)
This table contains scheduled/leave parameters.

| Data field | Data Type | Constraints | Description |
| --- | --- | --- | --- |
| dtCreatedOn | date | Null | Date on which created. |
| inModifiedBy | numeric | Null | Employee ID. |
| dtModifiedOn | date | Null | Date on which modified. |

TABLE 30

HRIS_tbl_RosterSheet
This table contains the status that has been uploaded.

| Data field | Data Type | Constraints | Description |
| --- | --- | --- | --- |
| inSheetID | numeric | Primary Key | Unique identifier to identify the details. |
| inRosterID | numeric | Not Null | Reference from(Foreign Key) HRIS_tbl_RosterHead |
| inUserId | numeric | Not Null | Employee ID. |
| dtRosterStartdate | date | Not Null | Start Date. |
| dtRosterEnddate | date | Not Null | End Date. |
| inRowIndex | integer | Not Null | Row Count. |
| inProcessID | integer | Null | 1. Dsl<br>2. Dial<br>3. Felix |
| inTeamID | integer | Null | Reference from(Foreign Key) Sys_tbl_ProcessTeams |
| inEmployeeCode | numeric | Null | Employee ID. |
| vcStartTime | string | Null | Start Time. |
| vcEndTime | string | Null | End Time. |
| dtfirstWeekoff | date | Null | Weekly Off |
| dtsecondWeekoff | date | Null | Weekly Off |

TABLE 31

HRIS_tbl_RosterSheet_Error
This table tracks the error that occurs while uploading.

| Data field | Data Type | Constraints | Description |
| --- | --- | --- | --- |
| inRosterId | numeric | Primary Key | Unique identifier to identify the details. |
| inEmployeeCode | numeric | Primary Key | Unique Employee ID. |
| inExcelRowIndex | integer | Not Null | Total Excel Row index |
| dttimeStamp | date | Primary Key | Date on which error occur. |
| dtShiftStarttime | date | Null | Shift Start Time. |
| dtShiftEndtime | date | Null | Shift End Time. |
| bolValid | bit | Null | Null |
| vcError | string | Null | Errors occur while uploading. |

TABLE 32

HRIS_tbl_RosterSheet_Legends
The legends are defined in this table related to Weekly Off, Leave.

| Data field | Data Type | Constraints | Description |
| --- | --- | --- | --- |
| inAttendanceParameter | integer | Primary Key | Unique identifier to identify the details. |
| inRosterParameter | integer | Null | 1. Weekly Off<br>2. Leave<br>3. Attrition |
| dtExceldata | date | Not Null | 1. 1/1/1900<br>2. 1/3/1900<br>(legend to manage roster parameter) |

TABLE 33

HRIS_tbl_RosterSheet_Temp
This table is a temp table that stores values before uploading them in a final table.

| Data field | Data Type | Constraints | Description |
|---|---|---|---|
| inUploadedBy | numeric | Not Null | Employee ID. |
| dtUploadedOn | date | Null | Date on which uploaded. |
| Dttimestamp | date | Not Null | Date |
| inRowIndex | integer | Null | |
| inUserId | numeric | Null | Employee ID. |
| inProcessID | integer | Null | 1. Dsl<br>2. Dial<br>3. Felix |
| inTeamID | integer | Null | Reference from(Foreign Key) Sys_tbl_ProcessTeams |
| inEmployeeCode | numeric | Not Null | Employee ID. |
| inRosterSchedule | integer | Null | |
| dtShiftStarttime | date | Null | Shift start Time. |
| dtShiftEndtime | date | Null | Shift end Time. |
| inTimeZoneDiff | integer | Null | Null |
| bolValid | bit | Null | Active/de-active. |
| bolError | string | Null | 1. Active<br>2. De-active |
| vcError | string | Null | Date Already Exist. |

The following Tables 34-37 show additional tables for the HRIS data schema.

TABLE 34

HRIS_tbl_RptHeadCount
This table contains the head count of the Employees.

| Data field | Data Type | Constraints | Description |
|---|---|---|---|
| inViewUser | numeric | Not Null | Employee ID. |
| Dttimestamp | date | Not Null | Date. |
| vcEmployeeCode | string | Not Null | Employee ID. |
| inUserid | numeric | Not Null | Employee ID. |
| inLocation | integer | Null | 1. Mumbai<br>2. Bangalore. |
| vcLocation | string | Null | 1. Mumbai<br>2. Bangalore. |
| vcUserName | string | Null | Employee Name. |
| inProcessId | integer | Not Null | 1. Dsl<br>2. Dial<br>3. Felix |
| inTeamId | integer | Null | Reference from(Foreign Key) Sys_tbl_ProcessTeams |
| vcTeamName | string | Null | Team Name. |
| inParentTeam | integer | Null | Supervisor ID. |
| vcParentTeam | string | Null | Supervisor Name. |
| vcdayStatus | string | Null | 1. Scheduled<br>2. Leave without Pay |

TABLE 35

HRIS_UploadUserInfo_Temp
This table contains the user information while they are uploaded to a final table.

| Data field | Data Type | Constraints | Description |
|---|---|---|---|
| inEmployeeCode | string | Primary Key | Unique Employee ID. |
| inRowIndex | integer | Not Null | Total record inserted. |
| inUserId | numeric | Null | Unique Employee ID. |
| vcFirstName | string | Not Null | Employee First name. |
| vcLastName | string | Not Null | Employee Last name. |
| vcEnterpriseID | string | Not Null | Employee Enterprise ID. |
| vcNetworkID | string | Null | Employees NT ID. |
| inProcessId | integer | Null | 1. Dial<br>2. Dsl<br>3. Felix |
| vcGender | string | Not Null | 1. Male<br>2. Female |
| vcTeamName | string | Null | Team Name. |
| inTeamID | integer | Null | Reference from(Foreign Key) Sys_tbl_ProcessTeams |
| inSupervisorID | numeric | Null | Supervisor ID. |
| vcLevel | string | Null | 1. G<br>2. H<br>3. F |
| inLevelID | integer | Null | Reference from(Foreign Key) Sys_tbl_Levels |
| inDesignation | integer | Null | Designation ID. |
| vcDesignation | string | Null | 1. Analyst<br>2. Software Developer<br>3. Manager |
| dtCompanyDOJ | date | Null | Date on which company joined. |
| dtDOB | date | Null | Date of birth of Employee. |
| inLocation | integer | Null | 1. Mumbai<br>2. Bangalore |
| bolError | bit | Not Null | 1. Active |
| vcError | string | Null | 1. Team does not exist |
| dtUploadedOn | date | Not Null | Date on which uploaded. |
| inUploadedBy | numeric | Not Null | Employee ID. |
| inHrRepresntative | numeric | Null | Null |

TABLE 36

HRIS_UserInfo_Sheet
This table contains the information of employee that has been uploaded.

| Data field | Data Type | Constraints | Description |
|---|---|---|---|
| inUniqueID | numeric | Primary Key | Unique identifier to identify the details. |
| inSheetId | numeric | Null | Sheet Number. |
| inRowIndex | integer | Null | Total Uploaded. |
| inEmployeeCode | numeric | Null | Unique Employee ID. |
| vcFirstName | string | Null | Employee First name. |
| vcLastName | string | Null | Employee Last name. |
| vcEnterpriseID | string | Null | Employee Enterprise ID. |
| vcNetworkID | string | Null | Employees NT ID. |
| inProcessId | integer | Null | 1. Dial<br>2. Dsl<br>3. Felix |
| vcGender | string | Null | 1. Male<br>2. Female |

TABLE 36-continued

HRIS_UserInfo_Sheet
This table contains the information of employee that has been uploaded.

| Data field | Data Type | Constraints | Description |
|---|---|---|---|
| inTeamID | integer | Null | Reference from(Foreign Key) Sys_tbl_ProcessTeams |
| inSupervisorID | numeric | Null | Supervisor ID. |
| inLevelID | integer | Null | Reference from(Foreign Key) Sys_tbl_Levels |
| inDesignation | integer | Null | Designation ID. |
| dtCompanyDOJ | date | Null | Date on which company joined. |
| dtDOB | date | Null | Date of birth of Employee. |
| inLocation | integer | Null | 1. Mumbai 2. Bangalore |
| dtCreatedOn | date | Null | Date on which created. |
| inCreatedBy | numeric | Null | Employee ID. |

TABLE 37

HRIS_UserInfoSheet_Detail
This table contains the file path from where it has been uploaded.

| Data field | Data Type | Constraints | Description |
|---|---|---|---|
| inSheetId | numeric | Primary Key | Unique identifier to identify the details. |
| vcFileName | string | Null | Path from where the file is uploaded. |
| vcNote | string | Null | About user info and process. |
| inTotalCount | integer | Null | Total Uploaded. |
| inUploadedCount | integer | Null | Total Upload Count. |
| inErrorCount | integer | Null | Error occurs while uploading. |
| dtUploadedOn | date | Null | Date on which uploaded. |
| inUploadedBy | numeric | Null | Employee ID. |

The following Tables 38-44 show tables for the ID management data schema that supports the ID management application 116.

TABLE 38

IDM_tbl_Businessids_Mst
This is a master table and used to save types of business ids.

| Data field | Data Type | Constraints | Description |
|---|---|---|---|
| inUniqueId | int | Primary Key | Auto-generated unique identifier of the table |
| vcIDName | varchar | Null | Name of the Id |
| vcDescription | varchar | Null | Description/Reason due to which the id is created |
| inTAT | int | Null | Turn around time taken for the creation of the id |
| bolIsActive | bit | Null | Denotes status (Active/Deactivated) of the ID |
| bolCompanyIds | bit | Null | Denotes whether the id is company or client provided |
| vcRequesttype | varchar | Null | Following requests can be raised for the business ids a) Creation b) Reactivation c) Deactivation d) Reset Password e) Recycling f) Deletion |
| dtCreatedOn | datetime | Null | Date on which the id was created |
| inCreatedBy | numeric | Null | User id of the id creator is saved n this field |
| dtModifiedOn | datetime | Null | Timestamp is captured for any modification made |
| unmodified | numeric | Null | User Id of the user who made latest modifications |

TABLE 39

IDM_tbl_BusinessIds_User
In this table users' different business ids are saved.

| Data field | Data Type | Constraints | Description |
|---|---|---|---|
| inTransactionId | numeric | Primary Key | Auto-generated unique identifier of the table |
| inUserId | numeric | Not Null | User Id of the user whose business id details |
| inBusinessId | int | Not Null | User's Business id, referred from IDM_tbl_Businessids_Mst table |
| inProcessId | int | Not Null | Process id of the process to which the user belongs to |
| vcValue | varchar | Null | Value of the user's actual business id |
| vcPassword | varchar | Null | Password of the corresponding business id saved in encrypted mode |
| inStatus | int | Not Null | Status (active or deactivated) of the id |
| inCreatedBy | numeric | Not Null | User id of the creator of the id |
| dtCreatedOn | Datetime | Not Null | Id creation's timestamp |

TABLE 40

IDM_tbl_BusinessIds_UserHistory
This table is used to trace or maintain history of any changes made in the IDM_tbl_BusinessIds_User table. So this table's structure/design is replica of the IDM_tbl_BusinessIds_User table.

| Data field | Data Type | Constraints | Description |
|---|---|---|---|
| inUserId | numeric | Not Null | Auto-generated unique identifier of the table |
| inBusinessId | int | Not Null | User Id of the user whose business id details |
| inProcessId | int | Not Null | User's Business id, referred from IDM_tbl_Businessids_Mst table |
| vcValue | varchar | Null | Process id of the process to which the user belongs to |
| vcPassword | varchar | Null | Value of the user's actual business id |
| inCreatedBy | numeric | Not Null | User id of the creator of the id |
| dtCreatedOn | datetime | Not Null | Id creation's timestamp |
| inModifiedBy | numeric | Not Null | User id of the modifier of the id |
| dtModifiedOn | datetime | Not Null | Timestamp when the id was modified |

TABLE 41

IDM_tbl_WorkFlow_Status
This is a master table where status of the work flows maintained for the id management process is saved.

| Data field | Data Type | Constraints | Description |
|---|---|---|---|
| inStatusId | int | Primary Key | Auto-generated unique identifier of the table |
| vcStatus | varchar | Null | Status description |
| vcNextPossibleStatus | varchar | Null | Next possible status |
| vcMailingGroups | varchar | Null | Mailing group id who needs to be informed about the work flow status change |
| bolClose | bit | Null | Boolean fields which denotes whether the status is close |
| inCreatedBy | numeric | Null | User Id of the creator |
| dtCreatedOn | datetime | Null | Timestamp of id creation |
| inModifiedBy | numeric | Null | User id of the modifier |
| dtModifiedOn | datetime | Null | Timestamp on which record was modified |

TABLE 42

IDM_UploadedSheets
Details of the id upload process is captured in this table.

| Data field | Data Type | Constraints | Description |
|---|---|---|---|
| inSheetId | numeric | Primary Key | Auto-generated unique identifier of the table |
| inProcessId | int | Not Null | Process id of the process for which ids are uploaded |
| vcSheetName | varchar | Not Null | Path at which the source sheet is saved |
| inTotalRecords | int | Not Null | Total no. of records to be uploaded |
| inUploadedCount | int | Not Null | Total no. of records uploaded successfully |
| inErrorCount | int | Not Null | To no. of records which did not get uploaded |

TABLE 42-continued

IDM_UploadedSheets
Details of the id upload process is captured in this table.

| Data field | Data Type | Constraints | Description |
|---|---|---|---|
| bolOverwrittenIds | bit | Not Null | Whether record is overwritten |
| inValueType | int | Not Null | Whether the record is for id or password |
| inUploadedBy | numeric | Not Null | User id of the user who uploaded the record |
| dtUploadedOn | datetime | Not Null | Timestamp on which the sheet was uploaded |

TABLE 43

IDM_UploadedSheets_Details
This is a child or details table of IDM_UploadedSheets table.

| Data field | Data Type | Constraints | Description |
|---|---|---|---|
| inSheetId | int | Not Null | Reference key to IDM_UploadedSheets table |
| inUserId | numeric | Not Null | User id of the user whose id is uploaded |
| inBusinessId | int | Not Null | Reference Key to IDM_tbl_BusinessIds_User table denoting business id of the user |
| inProcessId | int | Not Null | Process Id of the user's process |
| vcValue | varchar | Not Null | value of user's actual business id |

TABLE 44

IDM_UploadedSheets_Errors
While uploading ids if any error occurs, details each error record is saved.

| Data field | Data Type | Constraints | Description |
|---|---|---|---|
| inSheetId | numeric | Not Null | Auto-generated unique identifier of the table |
| inUserId | numeric | Null | User id of the user whose id was being uploaded |
| inBusinessId | int | Null | Business Id, reference key from IDM_tbl_BusinessIds_User table |
| inProcessId | int | Not Null | Process id of the process to which the business id belonged |
| vcValue | varchar | Null | Actual value of the user's business id |
| vcError | varchar | Null | Reason for which the error occurred |

Figure 6:
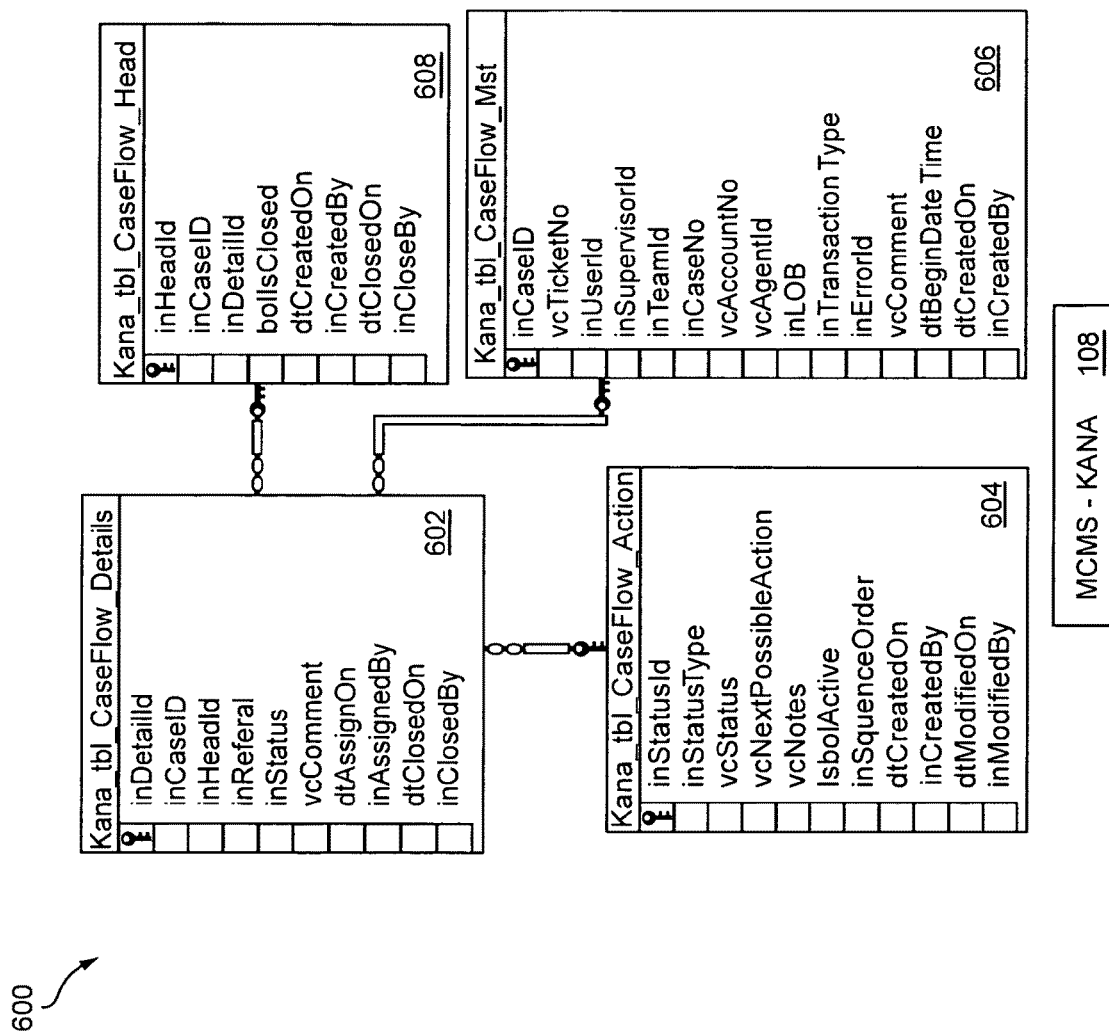
FIG. 6 shows a Case Management application data schema.

The following Tables 45-49 show tables for the Case Management KANA data schema 208 that supports the Case Management KANA application 108. FIG. 6 provides additional detail.

TABLE 45

Kana_tbl_AgentIdDetails
Used to map the Kana Agent Id to User Id.

| Data field | Data Type | Constraints | Description |
|---|---|---|---|
| inAgentId | numeric | Primary Key | This is unique Agent ID for each case |
| inUserId | numeric | Not Null | This field represents the unique Id (w.r.t employee Code) of the employee who has raised the case |
| vcAgentName | string | Not Null | This field denotes Kana Agent Name |
| vcComments | string | Null | This field denotes description |
| bolActive | bit | Not Null | This field denotes the sequence order of action status |
| dtReceivedOn | date | Not Null | This field denotes Agent ID received date |
| dtCreatedOn | date | Not Null | This field denotes the Date/Time When Agent ID is created. |
| inCreatedBy | numeric | Not Null | This field denotes who has created Agent Id |
| inModifiedBy | date | Null | This field denotes who has modified Agent ID |
| dtModifiedOn | numeric | Null | This field denotes the Date/Time When Agent ID is modified. |

TABLE 46

Kana_tbl_CaseFlow_Action (Table 604)
All possible actions that can be taken in a particular case

| Data field | Data Type | Constraints | Description |
| --- | --- | --- | --- |
| inStatusId | integer | Primary Key | This is unique Status ID for each case |
| inStatusType | integer | Not Null | This field denotes the case Status Type |
| vcStatus | string | Not Null | This field denotes the possible status on cases Order Process, Referal, Rejected, Outstanding Balance |
| vcNextPossibleAction | string | Null | This field denotes the next possible status as per status type. |
| vcNotes | string | Null | This field denotes the status description |
| IsbolActive | bit | Not Null | This field denotes whether action status is active/de-active |
| inSquenceOrder | integer | Not Null | This field denotes the sequence order of action status |
| dtCreatedOn | date | Not Null | This field denotes who has created action status. |
| inCreatedBy | numeric | Not Null | This field denotes the Date/Time When action status is created. |
| dtModifiedon | date | Null | This field denotes who has modified action status. |
| inModifiedBy | numeric | Null | This field denotes the Date/Time When action status is modified. |

TABLE 47

Kana_tbl_CaseFlow_Details (Table 602)
Detailed history of a case is stored here and the actions that were taken in the case

| Data field | Data Type | Constraints | Description |
| --- | --- | --- | --- |
| inDetailId | numeric | Primary Key | This is unique Detail ID for each case |
| inCaseID | numenc | Not Null | This is Foreign Key with reference to 'Kana_tbl_CaseFlow_Mst' |
| inHeadId | numeric | Not Null | This is Foreign Key with reference to 'Kana_tbl_CaseFlow_Head' |
| inReferal | numeric | Null | This field denotes the Referral detail in case particular case referred to concern person. |
| inStatus | integer | Null | This field denotes the Status of particular logged case. |
| vcComment | string | Null | This field denotes the case description/comment |
| dtAssignOn | date | Null | This field denotes the Date/Time When case is assigned to user. |
| inAssignedBy | numeric | Null | This field denotes the Date/Time When case is assigned to user. |
| dtClosedOn | date | Null | This field captured the Date/Time for the possible action performed on particular cases. |
| inClosedBy | numeric | Null | This field denotes the User who has performed the action on case. |

TABLE 48

Kana_tbl_CaseFlow_Head (Table 608)
This table maintains the final status of a case. Will tell whether a case is closed or not.

| Data field | Data Type | Constraints | Description |
| --- | --- | --- | --- |
| inHeadId | Numeric | Primary Key | |
| inCaseID | Numeric | Not Null | This is Foreign Key with reference to 'Kana_tbl_CaseFlow_Mst' |
| inDetailId | Numeric | Null | This is Foreign Key with reference to 'Kana_tbl_CaseFlow_Details' |
| bolIsClosed | Bit | Null | This field denotes the Status whether case is closed or not. |
| dtCreatedOn | Date | Null | This field denotes the Date/Time When case is created by user. |
| inCreatedBy | Numeric | Null | This field denotes the user who has created the case. |
| dtClosedOn | Date | Null | This field denotes the Date/Time When case is Closed by user. |
| inClosedBy | Numeric | Null | This field denotes the user who has closed the case. |

TABLE 49

Kana_tbl_CaseFlow_Mst (Table 606)
Case information is stored in this table

| Data field | Data Type | Constraints | Description |
|---|---|---|---|
| inCaseID | numeric | Primary Key | This is unique ID for each case |
| vcTicketNo | string | Null | This field represents the ticket number that gets generated against a case |
| inUserId | numeric | Not Null | This field represents the unique Id (w.r.t employee Code) of the employee who has raised the case |
| inSupervisorId | numeric | Not Null | This field denotes the ID of the supervisor under whom this employee works. |
| inTeamId | integer | Not Null | This field denotes the team in which the user works in |
| inCaseNo | numeric | Not Null | This field denotes the case number of the Case. |
| vcAccountNo | string | Not Null | This field denotes the account details of the Case. |
| vcAgentId | string | Not Null | This field denotes the unique kana agent id |
| inErrorId | integer | Not Null | This field denotes error details of logged case. |
| vcComment | string | Not Null | This field denotes case problem description |
| dtBeginDateTime | date | Not Null | This field denotes the Time when user click on 'Add new Case' option |
| dtCreatedOn | date | Not Null | This field denotes the Date/Time when the case is logged. |
| inCreatedBy | numeric | Not Null | This field denotes the user, who logged the case. |

Figure 8:
FIG. 8 shows a Leave application data schema.
Figure 9:
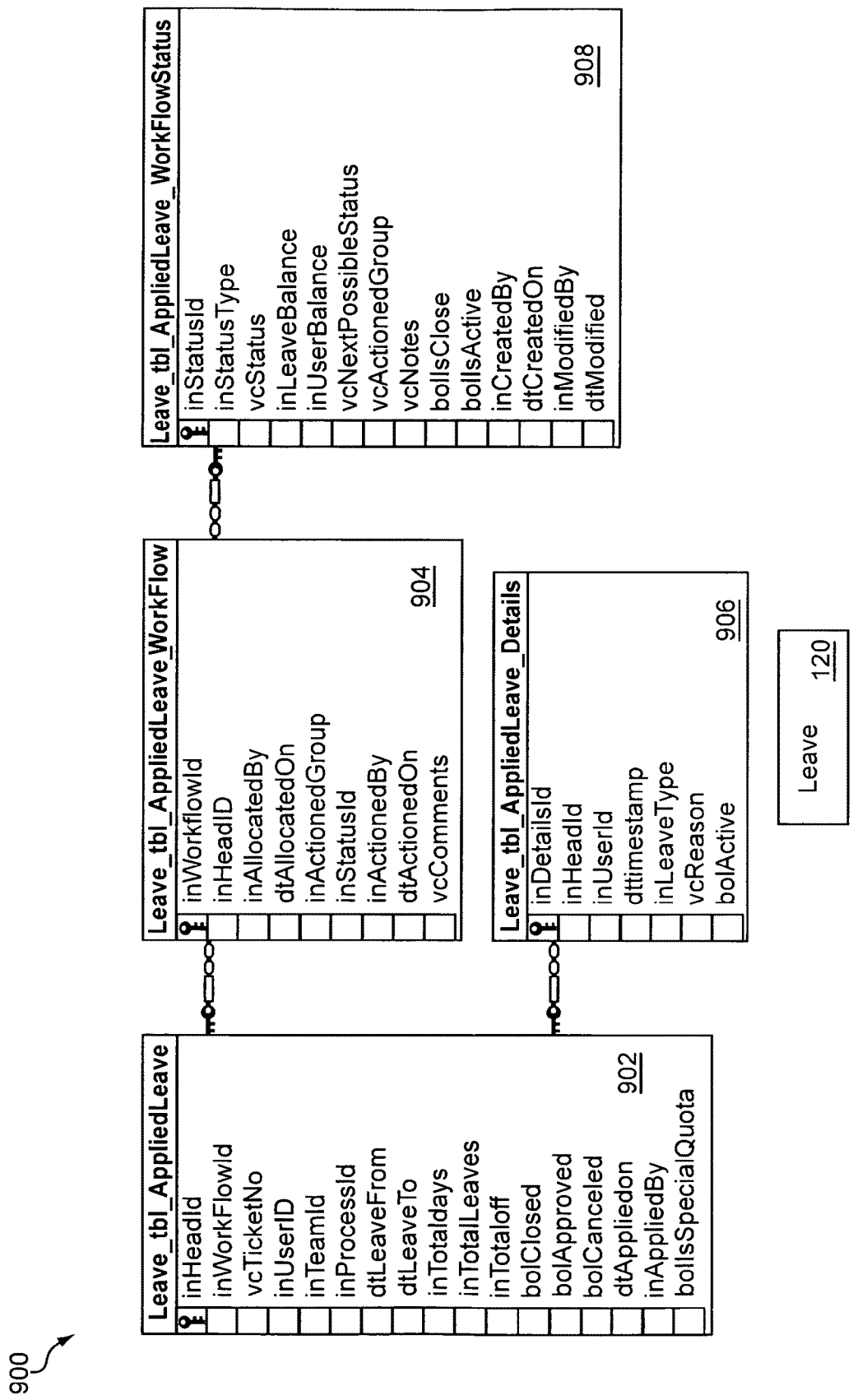
FIG. 9 shows a Leave application data schema.
Figure 10:
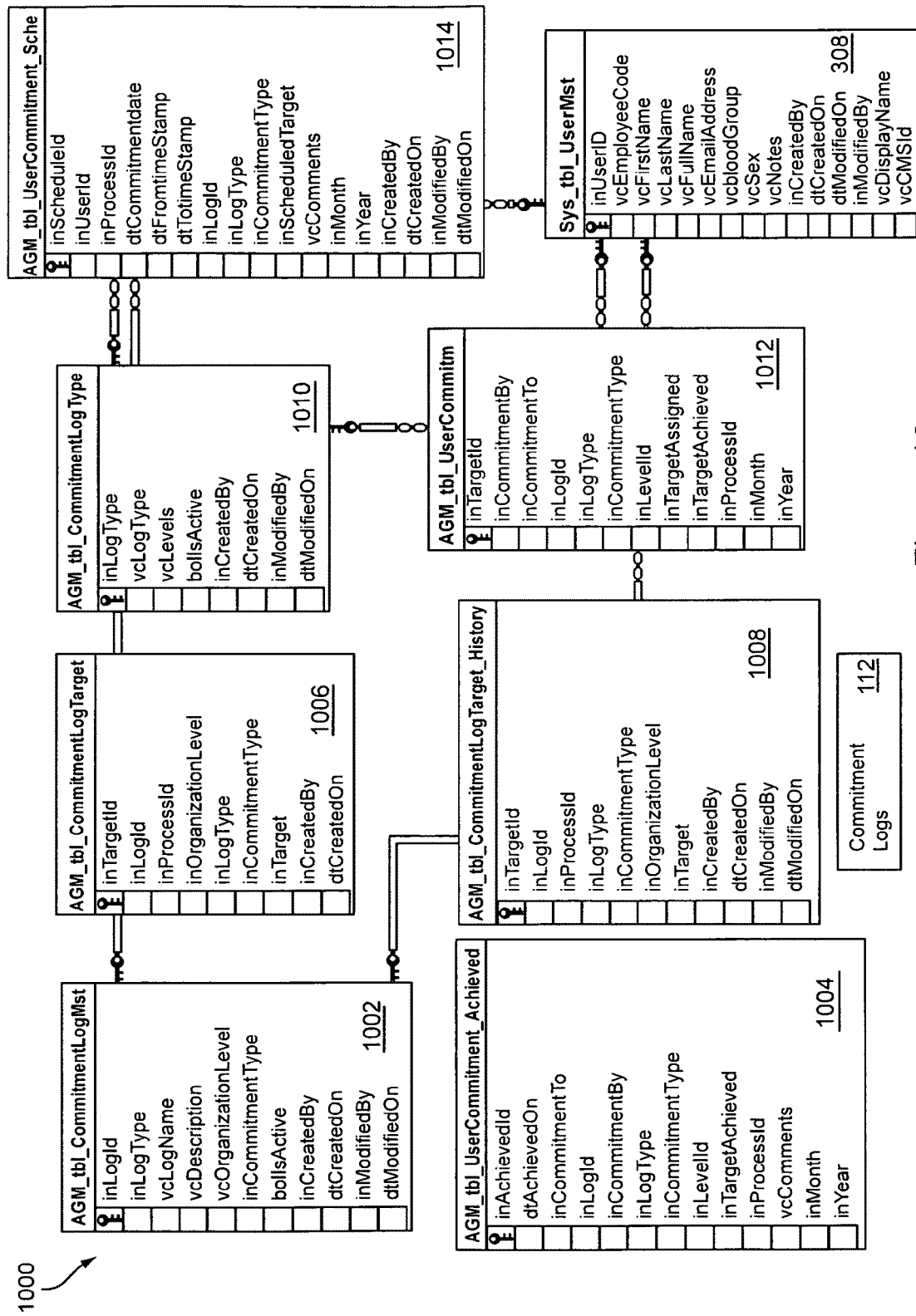
FIG. 10 shows a Commitment Log application data schema.

The following Tables 50-58 show tables for the Leave data schema 212 that supports the Leave application 120. FIGS. 8 and 9 provide additional detail.

TABLE 50

Leave_tbl_Allocation (Table 802)
This the master table used for leave allocation process/location wise.

| Data field | Data Type | Constraints | Description |
|---|---|---|---|
| inAllocationId | numeric | Primary Key | Auto-generated unique identifier of the table |
| dttimestamp | datetime | Not Null | Date for which leave is allotted |
| inProcessID | int | Not Null | Process or line of business for which leave is being allotted |
| inLocationid | int | Not Null | Location/Center of the process for which leave is being allotted |
| inLevelId | int | Not Null | Level/Designation for which leave is being allocated |
| inEstimatedheadcount | int | Not Null | Estimated head count of the process and the center for the day |
| inallottedPercentage | decimal | Not Null | Percentage of leave allocated for the date |
| inLeaveallotted | int | Not Null | No. of leave allotted for the date |
| inLeaveApplied | int | Not Null | Count of leaves applied for the date |
| inLeaveApproved | int | Not Null | Count of leaves approved for the date |
| inLeavesCanceled | int | Not Null | Count of leaves cancelled for the date |
| inBalanceLeave | int | Null | Count of leave balance available for the date |
| vcComments | varchar | Null | Comments |
| inCreatedBy | numeric | Not Null | User id of the record created by |
| dtCreatedOn | datetime | Not Null | Timestamp of the record created on |
| inModifiedBy | numeric | Null | User id of the record modified by |
| dtModifiedOn | datetime | Null | Timestamp of the record modified on |
| inAllotedLeaveException | int | Null | Used in case extra leave needs to be allocated above the normal allocation for the date. Gets added to available leave balance for the date |

TABLE 51

Leave_tbl_Allocation_History (Table 806)
Table structure of this table is almost replica of Leave_tbl_Allocation table and used to save historical data of the mother table in case of any modification.

| Data field | Data Type | Constraints | Description |
|---|---|---|---|
| inAllocationId | numeric | Null | Auto-generated unique identifier of the table |
| Dttimestamp | datetime | Not Null | Date for which leave is allotted |
| inProcessID | int | Not Null | Process or line of business for which leave is being allotted |
| inLocationid | int | Not Null | Location/Center of the process for which leave is being allotted |

TABLE 51-continued

Leave_tbl_Allocation_History (Table 806)
Table structure of this table is almost replica of Leave_tbl_Allocation table and used to save historical data of the mother table in case of any modification.

| Data field | Data Type | Constraints | Description |
| --- | --- | --- | --- |
| inLevelId | int | Not Null | Level/Designation for which leave is being allocated |
| inEstimatedheadcount | int | Not Null | Estimated head count of the process and the center for the day |
| inallottedPercentage | decimal | Not Null | Percentage of leave allocated for the date |
| inLeaveallotted | int | Not Null | No. of leave allotted for the date |
| inLeaveApplied | int | Not Null | Count of leaves applied for the date |
| inLeaveApproved | int | Not Null | Count of leaves approved for the date |
| inLeavesCanceled | int | Not Null | Count of leaves cancelled for the date |
| inBalanceLeave | int | Null | Count of leave balance available for the date |
| vcComments | varchar | Null | Comments |
| inCreatedBy | numeric | Not Null | User id of the record created by |
| dtCreatedOn | datetime | Not Null | Timestamp of the record created on |
| inModifiedBy | numeric | Null | User id of the record modified by |
| dtModifiedOn | datetime | Null | Timestamp of the record modified on |

TABLE 52

Leave_tbl_AppliedLeave (Table 902)
The head leave details are saved in this table.

| Data field | Data Type | Constraints | Description |
| --- | --- | --- | --- |
| inHeadId | numeric | Primary Key | Auto-generated unique identifier of the table |
| inWorkFlowId | numeric | Null | Corresponding key to Leave_tbl_AppliedLeave_WorkFlow table |
| vcTicketNo | varchar | Null | Unique ticket no. based on inHeadId used for display purpose |
| inUserID | numeric | Not Null | User Id of the user who applied leave |
| inTeamId | int | Null | Team id of the team to which the user belongs to |
| inProcessId | int | Null | Process id of the process to which the user belongs to |
| dtLeaveFrom | datetime | Not Null | From date of the range the user applied leave |
| dtLeaveTo | datetime | Not Null | To date of the range the user applied leave |
| inTotaldays | int | Not Null | Count of days for which the user has applied leave |
| inTotalLeaves | int | Not Null | Count of days for which the user has applied leave |
| inTotaloff | int | Not Null | Count of work offs in the date range for which the user has applied leave |
| bolClosed | bit | Not Null | Boolean field which determines whether the transaction is closed |
| bolApproved | bit | Not Null | Boolean field which determines whether leave ticket has been approved |
| bolCanceled | bit | Not Null | Boolean field which determines whether leave ticket has been cancelled |
| dtAppliedon | datetime | Not Null | Timestamp on which the user applied leave |
| inAppliedBy | numeric | Not Null | User id of the user who applied leave |
| bolIsSpecialQuota | bit | Null | Boolean field determining whether the leave has been applied by special or normal quota |

TABLE 53

Leave_tbl_AppliedLeave_Details (Table 904)
This is a child or details table of Leave_tbl_AppliedLeave table.

| Data field | Data Type | Constraints | Description |
| --- | --- | --- | --- |
| inDetailsId | numeric | Primary Key | Auto-generated unique identifier of the table |
| inHeadId | numeric | Not Null | Corresponding key to Leave_tbl_AppliedLeave table |
| inUserId | numeric | Null | User Id of the user who applied leave |
| dttimestamp | datetime | Null | Date for which the leave is applied |
| inLeaveType | int | Null | Type of leave applied. This can be of the following types:<br>1. Vacation<br>2. Compensatory Off<br>3. Fixed holiday<br>4. Optional holiday |

TABLE 53-continued

Leave_tbl_AppliedLeave_Details (Table 904)
This is a child or details table of Leave_tbl_AppliedLeave table.

| Data field | Data Type | Constraints | Description |
| --- | --- | --- | --- |
| vcReason | varchar | Null | Reason for which leave is applied |
| bolActive | bit | Not Null | Boolean value determining the status of the leave record |

TABLE 54

Leave_tbl_AppliedLeave_WorkFlow (Table 904)
Work flow of the leave application process is maintained and captured in this table.

| Data field | Data Type | Constraints | Description |
| --- | --- | --- | --- |
| inWorkflowId | numeric | Primary Key | Auto-generated unique identifier of the table |
| inHeadID | numeric | Not Null | Corresponding key to Leave_tbl_AppliedLeave table |
| inAllocatedBy | numeric | Null | User id of the user who applied leave |
| dtAllocatedOn | datetime | Null | Corresponding key to Leave_tbl_AppliedLeave_WorkFlowStatus table determining the action performed |
| inStatusId | int | Null | Leave Status or workflow status |
| inActionedBy | numeric | Null | User Id of the user who performed the action |
| dtActionedOn | datetime | Null | Timestamp on which action was performed |
| vcComments | varchar | Null | Comments |

TABLE 55

Leave_tbl_AppliedLeave_WorkFlowStatus (Table 908)
This is a master table which saves the type of leave workflow statuses.

| Data field | Data Type | Constraints | Description |
| --- | --- | --- | --- |
| inStatusId | int | Primary Key | Auto-generated unique identifier of the table |
| vcStatus | varchar | Not Null | Actual value of the work flow status |
| vcNotes | varchar | Null | Notes/Comments |
| bolIsActive | bit | Not Null | Boolean value determining the status of the record |
| inCreatedBy | numeric | Null | User id of the creator of the record |
| dtCreatedOn | datetime | Null | Timestamp on which the record was created |
| inModifiedBy | numeric | Null | User id of the user who last modified the record |
| dtModifiedOn | datetime | Null | Timestamp on which data was last modified |

TABLE 56

Leave_tbl_BalanceLeave (Table 804)
This table is used for maintaining users' different types of leaves.

| Data field | Data Type | Constraints | Description |
| --- | --- | --- | --- |
| inUserID | numeric | Primary Key | User id of the user whose leave balance the record contains |
| inLeaveType | int | Primary Key | Key to HRIS_tbl_AttendanceParameter table, determines user's leave type |
| dtbalanceasOn | datetime | Not Null | Date till which balance is maintained |
| inOpeningBalance | float | Not Null | User opening leave balance from previous year |
| inFinancialYear | int | Not Null | Financial year for which user's leave balance is maintained |
| inLeaveCredited | float | Not Null | Leave hours credited to the user in the record's financial year |
| inLeaveDebited | float | Not Null | Leave hours debited from user's leave balance in the record's financial year |
| inAppliedLeave | float | Not Null | Hours of leave applied by the user |
| inLeaveBalance | float | Null | Leave balance of the user |
| inCreatedBy | int | Not Null | User id of the creator of the record |
| dtCreatedOn | datetime | Not Null | Timestamp on which the record was created |
| inModifiedBy | int | Null | User id of the last modifier of the record |
| dtModifiedOn | datetime | Null | Latest timestamp on which record was last modified |

TABLE 57

Leave_tbl_BalanceLeave_History
In this table leave balance history of the users are saved. When ever any leave balance record is updated, the previous history of the same record is saved in this table.

| Data field | Data Type | Constraints | Description |
| --- | --- | --- | --- |
| inUserID | Numeric | Primary Key | User id of the user whose leave balance the record contains |
| inLeaveType | Int | Primary Key | Key to HRIS_tbl_AttendanceParameter table, determines user's leave type |
| dtbalanceasOn | Datetime | Primary Key | Date till which balance is maintained |
| inOpeningBalance | Float | Not Null | User opening leave balance from previous year |
| inFinancialYear | int | Not Null | Financial year for which user's leave balance is maintained |
| inLeaveCredited | float | Not Null | Leave hours credited to the user in the record's financial year |
| inLeaveDebited | float | Not Null | Leave hours debited from user's leave balance in the record's financial year |
| inAppliedLeave | float | Not Null | Hours of leave applied by the user |
| inLeaveBalance | float | Null | Leave balance of the user |
| inCreatedBy | int | Not Null | User id of the creator of the record |
| dtCreatedOn | datetime | Not Null | Timestamp on which the record was created |
| inModifiedBy | int | Null | User id of the last modifier of the record |
| dtModifiedOn | datetime | Null | Latest timestamp on which record was last modified |

TABLE 58

Leave_tbl_Special_Quota
This table is used in case users need to be allotted leave above the normal quota.

| Data field | Data Type | Constraints | Description |
| --- | --- | --- | --- |
| inAllocationId | Numeric | Primary Key | Reference key to Leave_tbl_Allocation table |
| inallottedPercentage | Decimal | Null | Percentage of special quota leave allocated for the date |
| inLeaveallotted | Decimal | Null | No. of leave allotted for the date |
| inLeaveApplied | Int | Null | Count of leaves applied for the date |
| inLeaveApproved | Int | Null | Count of leaves approved for the date |
| inLeavesCanceled | int | Null | Count of leaves cancelled for the date |
| inBalanceLeave | int | Null | Count of leave balance available for the date |
| vcComments | varchar | Null | Comments |
| inCreatedBy | numeric | Null | User id of the record created by |
| dtCreatedOn | datetime | Null | Timestamp of the record created on |
| inModifiedBy | numeric | Null | User id of the record modified by |
| dtModifiedOn | datetime | Null | Timestamp of the record modified on |

The following Tables 59-66 show tables for the Case Management data schema AIM 204 that supports the Case Management AIM application 106. FIGS. 4 and 5 provide additional detail.

TABLE 59

Maple_tbl_CaseFlow_Mst (Table 506)
Case information is stored in this table.

| Data field | Data Type | Constraints | Description |
| --- | --- | --- | --- |
| inCaseId | Numeric | Primary Key | This is unique ID for each case |
| vcTicketNo | String | Null | This field represents the ticket number that gets generated against a case |
| inUserId | Numeric | Not Null | This field represents the unique Id (with respect to employee Code) of the employee who has raised the case |
| inSupervisorId | Numeric | Not Null | This field denotes the ID of the supervisor under whom this employee works. |
| inTeamId | Integer | Not Null | This field denotes the team in which the user works in |
| inAccountType | Integer | Not Null | This field denotes the type of the account in which user works in. |
| vcAccountNo | string | Not Null | This field denotes the account details of the Case. |
| inBatchId | integer | Not Null | This field denotes the batch number in which user works in. |
| inErrorId | integer | Not Null | This field denotes the Error details. |

TABLE 59-continued

Maple_tbl_CaseFlow_Mst (Table 506)
Case information is stored in this table.

| Data field | Data Type | Constraints | Description |
| --- | --- | --- | --- |
| inErrorType | integer | Not Null | This field denotes the Error Type that's shows the respective Line of business. |
| inFranchise | integer | Not Null | This field denotes the Franchise details |
| inBenefit | integer | Not Null | This field denotes the Benefit details for that case. |
| bolIsWorked | bit | Not Null | This field denotes whether employee has worked on particular case or not. |
| vcComment | string | Not Null | This field denotes the problem summary of the case. |
| dtCreatedOn | date | Not Null | This field denotes the Date/Time when the case is logged. |
| dtBeginDateTime | date | Null | This field denotes the Time when user click on 'Add new Case' option |
| inCreatedBy | numeric | Not Null | This field denotes the user, who logged the case. |
| vcUpdationNotes | string | Not Null | This field denotes the updated comments in case of any updation done particular case. |
| dtUpdatedOn | date | Null | This field denotes the updated Date/Time. |
| inModifiedBy | numeric | Null | This field denotes the details of person who's ever updated the case details. |

TABLE 60

MAPLE_tbl_CaseFlow_Details (Table 502)
This table is used to capture the possible actions performed on the particular cases.

| Data field | Data Type | Constraints | Description |
| --- | --- | --- | --- |
| inDetailId | Numeric | Primary Key | This is unique ID for each case |
| inCaseId | Numeric | Not Null | This is Foreign Key with reference to 'Maple_tbl_CaseFlow_Mst' |
| inHeadId | Numeric | Not Null | This is Foreign Key with reference to 'Maple_tbl_CaseFlow_Head' |
| inStatus | Integer | Not Null | This field denotes the Status of particular logged case. |
| inAssignedBy | Numeric | Not Null | This field denotes the user to whom case is Assigned. |
| dtAssignedOn | Date | Not Null | This field denotes the Date/Time When case is assigned to user. |
| inClosedBy | Numeric | Not Null | This field denotes the User who has performed the action on case. |
| dtClosedOn | Date | Not Null | This field captured the Date/Time for the possible action performed on particular cases. |
| inReferal | Numeric | Null | This field denotes the Referral detail in case particular case referred to concern person. |
| vcComment1 | Integer | Not Null | This field denotes the standard comment-1 for case. |
| vcComment2 | Integer | Not Null | This field denotes the standard comment-2 for case. |
| inCommentType | Integer | Not Null | This field denotes the Type of comments. |

TABLE 61

MAPLE_tbl_CaseFlow_Head (Table 504)
The current status of a case is stored here.

| Data field | Data Type | Constraints | Description |
| --- | --- | --- | --- |
| inHeadId | Numeric | Primary Key | This is unique ID for each case |
| inCaseId | Numeric | Null | This is Foreign Key with reference to 'Maple_tbl_CaseFlow_Mst' |
| inDetailId | Numeric | Null | This is Foreign Key with reference to 'Maple_tbl_CaseFlow_Detail' |
| dtIssuedate | Date | Null | This field denotes the Date/Time When case is logged by user. |
| dtAssigneddate | Date | Null | This field denotes the Date/Time When case is assigned to user. |
| inAssignedBy | Numeric | Null | This field denotes the Date/Time When case is assigned to user. This field denotes the user to whom case is Assigned. |
| dtCloseddate | Date | Null | This field denotes the Date/Time When case is Closed by user. |
| inClosedBy | numeric | Null | This field denotes the user who has closed the case. |
| bolIsClosed | bit | Null | This field denotes the Status whether case is closed or not. |

TABLE 61-continued

MAPLE_tbl_CaseFlow_Head (Table 504)
The current status of a case is stored here.

| Data field | Data Type | Constraints | Description |
|---|---|---|---|
| bolIsAudited | bit | Null | This field denotes the case audit status. |
| dtAuditedOn | date | Null | This field denotes the Date/Time When case is Audited by Auditor. |
| inAuditedBy | numeric | Null | This field denotes the user who has Audited the case. |

TABLE 62

Maple_tbl_CaseFlow_Action (Table 508)
Used to manage possible action performed on cases logged.

| Data field | Data Type | Constraints | Description |
|---|---|---|---|
| inStatusId | integer | Primary Key | This is unique Status ID for each case |
| inStatusType | integer | Not Null | This field denotes the case Status Type |
| vcStatus | string | Not Null | This field denotes the possible status on cases Yes, No, Stuck, Refer |
| vcNextPossibleStatus | string | Null | This field denotes the next possible status as per status type. |
| vcStatusDescribtion | string | Not Null | This field denotes the status description |
| IsbolActive | bit | Not Null | This field denotes whether action status is active/de-active |
| inSequenceOrder | integer | Not Null | This field denotes the sequence order of action status |
| inCreatedby | integer | Not Null | This field denotes who has created action status. |
| dtCreatedOn | date | Not Null | This field denotes the Date/Time When action status is created. |
| inModifiedBy | numeric | Null | This field denotes who has modified action status. |
| dtModifiedon | date | Null | This field denotes the Date/Time When action status is modified. |

TABLE 63

Maple_tbl_CaseFlowError (Table 406)
Used to manage errors for case.

| Data field | Data Type | Constraints | Description |
|---|---|---|---|
| inErrorId | integer | Primary Key | This is unique Error ID for each case |
| vcErrorDescription | string | Not Null | This field denotes the error Detail. |
| inErrorType | integer | Not Null | This field denotes the error Type i.e. (Line of business). |
| vcComment | string | Null | This field denotes the description |
| bolActive | bit | Null | This field denotes the active status |
| dtCreatedOn | date | Null | This field denotes the Date/Time When Error is created. |
| inCreatedBy | numeric | Null | This field denotes who has created Error. |
| inModifiedBy | numeric | Null | This field denotes who has modified Error detail. |
| dtModifiedon | date | Null | This field denotes the Date/Time When Error is modified. |

TABLE 64

Maple_CaseFlow_Franchise (Table 402)
This table is used to manage Franchise for case

| Data field | Data Type | Constraints | Description |
|---|---|---|---|
| inFranchiseId | integer | Primary Key | This is unique Franchise ID |
| vcFranchise | string | Not Null | This field denotes franchise details. |
| inSiteId | integer | Null | This field denotes franchise site ID |
| vcComment | string | Null | This field denotes the description |
| bolActive | bit | Null | This field denotes the active status |
| dtCreatedOn | date | Null | This field denotes the Date/Time When Franchise is created. |
| inCreatedBy | numeric | Null | This field denotes who has created Franchise. |
| inModifiedBy | numeric | Null | This field denotes who has modified Franchise detail. |
| dtModifiedon | date | Null | This field denotes the Date/Time When Franchise is modified. |

TABLE 65

Maple_tbl_BatchMst (Table 404)
This table is used to manage Batch details

| Data field | Data Type | Constraints | Description |
| --- | --- | --- | --- |
| inBatchId | integer | Primary Key | This is unique Batch ID |
| vcBatchNo | string | Null | This field denotes Batch Number. |
| vcBatchDetails | string | Not Null | This field denotes batch description |
| inBatchType | integer | Null | This field denotes batch type |
| bolActive | bit | Not Null | This field denotes the active status |
| inCaseCount | integer | Null | This field denotes the case count for particular batch |
| inLOB | integer | Null | This field denotes the Line of business to which particular batch belong |
| inErrorID | integer | Null | This field denotes the error related to particular batch |
| dtReceivedOn | date | Null | This field denotes batch received date |
| dtCompletedOn | date | Null | This field denotes batch completion date |
| vcRevenueStream | string | Null | This field denotes revenue stream w.r.t each batch |
| inCreatedBy | numeric | Null | This field denotes who has created Batch. |
| dtCreatedOn | date | Null | This field denotes the Date/Time When batch is created. |
| inModifiedBy | numeric | Null | This field denotes who has modified batch detail. |
| dtModifiedon | date | Null | This field denotes the Date/Time When Batch is modified. |

TABLE 66

Maple_tbl_CommentMst (Table 408)
Standard comments are managed using this table

| Data field | Data Type | Constraints | Description |
| --- | --- | --- | --- |
| inCommentId | Numeric | Primary Key | This is unique Comment ID for each case |
| inStatusId | Integer | Not Null | This field denotes respective comment category w.r.t action status. |
| vcComment1 | String | Not Null | This field denotes comment-1 |
| vcComment2 | String | Not Null | This field denotes comment-2 |
| inCommentType | Integer | Null | This field denotes the type of comment |
| bolActive | Bit | Not Null | This field denotes the active status |
| BolPendingChanges | Bit | Null | This field denotes the pending change status w.r.t batch number. |
| vcNotes | String | Null | This field denotes the description. |
| dtCreatedOn | Date | Not Null | This field denotes the Date/Time When Comment is created. |
| inCreatedBy | Numeric | Not Null | This field denotes who has created comment. |
| dtModifiedon | Date | Null | This field denotes the Date/Time When Comment is modified. |
| inModifiedBy | Numeric | Null | This field denotes who has modified comment detail. |

Figure 7:
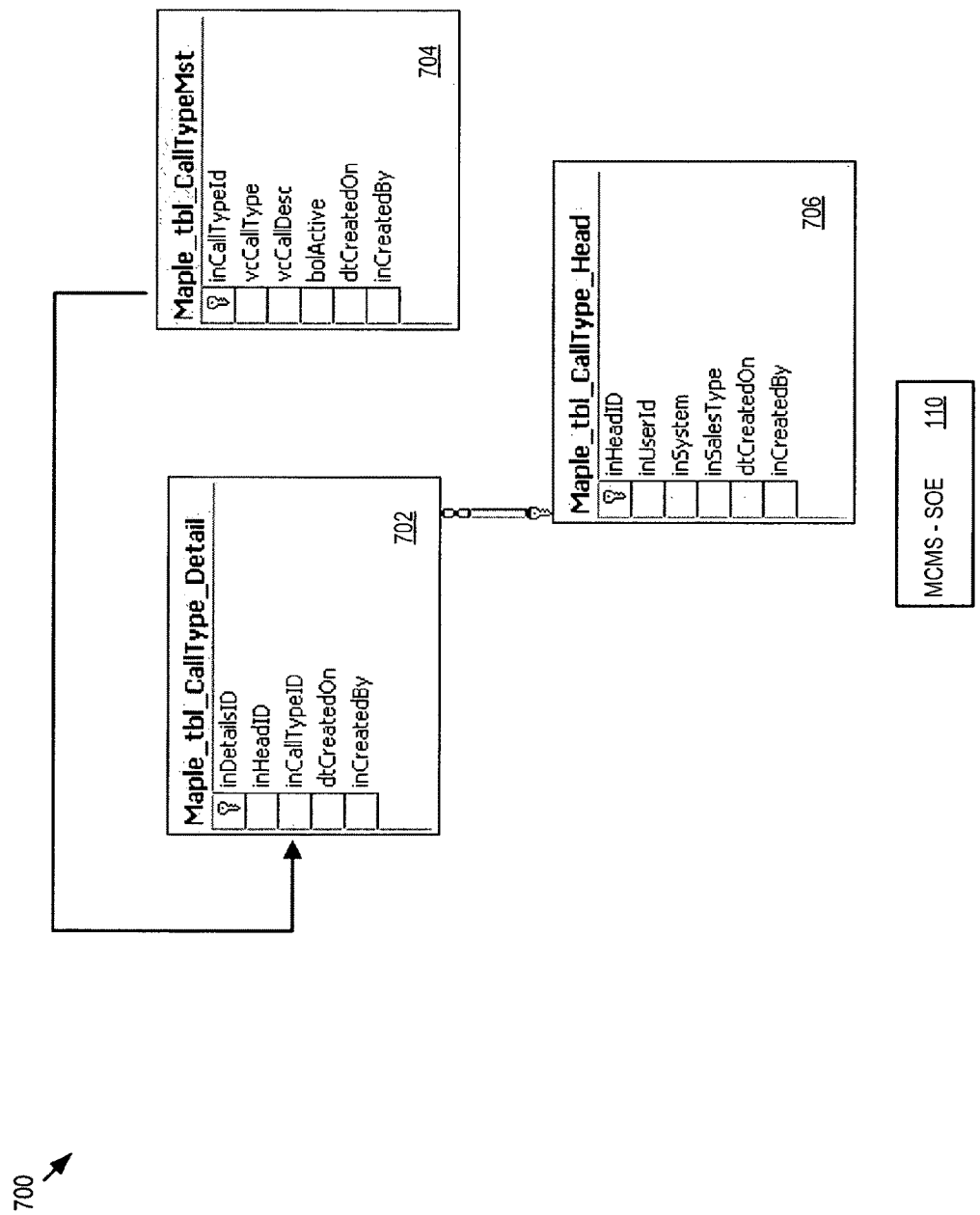
FIG. 7 shows a Case Management application data schema.

The following Tables 67-69 show tables for the Case Management data schema SOE 216 that supports the Case Management SOE application 110. FIG. 7 provides additional detail.

TABLE 67

Maple_tbl_CallTypeMst (Table 704)
This table stores call details with respect call type.

| Data field | Data Type | Constraints | Description |
| --- | --- | --- | --- |
| inCallTypeId | Numeric | Primary Key | This is unique ID for each call type logged |
| vcCallType | String | Not Null | This field denotes the call type. |
| vcCallDesc | String | Null | This field denotes the call type description |
| bolActive | Bit | Not Null | This field denotes the active status |
| dtCreatedOn | Date | Null | This field denotes the Date/Time When Call type detail is logged. |
| inCreatedBy | Numeric | Null | This field denotes user who has enter call type detail. |

TABLE 68

Maple_tbl_CallType_Detail (Table 702)
This store the details of a call logged.

| Data field | Data Type | Constraints | Description |
|---|---|---|---|
| inDetailsID | numeric | Primary Key | This is unique Detail ID for each call type logged |
| inHeadID | numeric | Null | This is Foreign Key with reference to 'Maple_tbl_CallType_Head' |
| inCallTypeID | integer | Null | This is Foreign Key with reference to 'Maple_tbl_CallTypeMst' |
| dtCreatedOn | date | Null | This field denotes the Date/Time When Call type detail is logged. |
| inCreatedBy | numeric | Null | This field denotes user who has enter call type detail. |

TABLE 69

Maple_tbl_CallType_Head (Table 706)
The Call detail with respect to user is stored here.

| Data field | Data Type | Constraints | Description |
|---|---|---|---|
| inHeadID | numeric | Primary Key | This is unique ID for each call type logged |
| inUserId | numeric | Not Null | This field denotes user id of employee who works in. |
| inSystem | integer | Not Null | This field denotes in System Id |
| inSalesType | integer | Not Null | This field denotes in Sales Id |
| dtCreatedOn | date | Not Null | This field denotes the Date/Time When Call type detail is logged. |
| inCreatedBy | numeric | Not Null | This field denotes user who has enter call type detail. |

The following Table 70 shows an employee data template.

TABLE 70

Employee Upload Template
The table contains the information of a new employee that is to be uploaded.

| Data field | Data Type | Constraints | Description |
|---|---|---|---|
| Employee Code | float | Allow Nulls | Employee Code unique for every employee. |
| First Name | nvarchar | Allow Nulls | First Name of the employee |
| Last Name | nvarchar | Allow Nulls | Last Name of the employee. |
| Network Id | nvarchar | Allow Nulls | Network ID of the employee |
| Enterprise Id | nvarchar | Allow Nulls | Enterprise ID of the employee |
| Supervisor Employee Code | float | Allow Nulls | Employee Code of the immediate supervisor |
| Supervisor Name | nvarchar | Allow Nulls | Name of the supervisor |
| Date of birth | smalldatetime | Allow Nulls | Date of birth |
| Date of Joining | smalldatetime | Allow Nulls | Date of joining |
| Organization Level | nvarchar | Allow Nulls | Hierarchy Level. |

Figure 3:
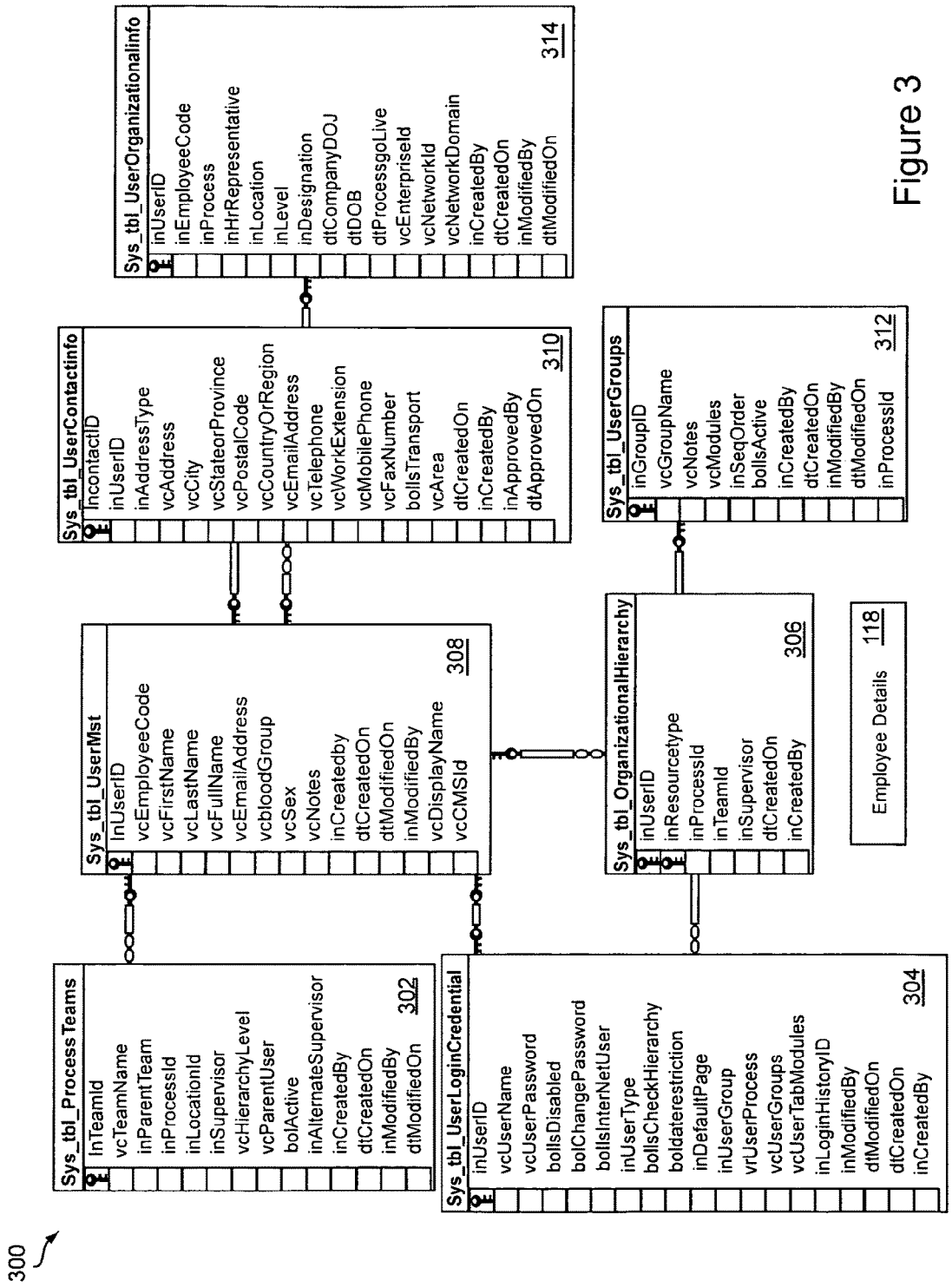
FIG. 3 shows a portion of a common application data schema that implements a shared data set requirement common to multiple call center applications.

The following Tables 71-109 show general purpose system tables for the architecture 100. Tables 71-109 may be implemented in the common application data schema 220 to provide, as one example, employee general information such as first name, last name, and email address. FIG. 3 provides additional detail.

TABLE 71

Sys_AppSettingCategories
Information related to application categories.

| Data field | Data Type | Constraints | Description |
|---|---|---|---|
| inID | int | Primary Key | Unique ID for the system settings. |
| vcName | nvarchar | Not Null | Name of the system settings. |

TABLE 72

Sys_AppSettings
The table contains the parameter related to weekly off/Leave/Scheduled/Attrition/Adhoc transport.

| Data field | Data Type | Constraints | Description |
|---|---|---|---|
| inID | int | Not Null | Unique ID for the system application settings. |
| inCategoryID | int | Not Null | Category ID to identify various system categories |
| vcName | nvarchar | Not Null | System Application Name |
| vcDescription | nvarchar | Not Null | Description when the application will be performed |
| vcValue | nvarchar | Not Null | |
| inDataType | int | Not Null | |
| vcOptions | nvarchar | Not Null | |

TABLE 73

Sys_tbl_Announcements
This table stores information related to the announcements to be made.

| Data field | Data Type | Constraints | Description |
|---|---|---|---|
| inAnnouncementsID | numeric | Unique, Not Null | Unique Identifier for announcements |
| vcTitle | nvarchar | Allow Null | Description about the announcements |
| vcMoreLink | nvarchar | Allow Null | Web address for the announcements |
| dtExpireDate | datetime | Not Null | When the information will be expired |
| vcDescription | varchar | Allow Null | Description about the announcements |
| inProcess | int | Allow Null | Process ID |
| dtModifiedOn | smalldatetime | Allow Null | Date when the announcement was modified |
| dtCreatedOn | smalldatetime | Allow Null | Date when the information was created |
| inCreatedBy | int | Allow Null | information was created by which user. |
| inModifiedBy | int | Allow Null | Information was modified by which user |

TABLE 74

Sys_tbl_ApplicationIssue
The table contains the information related to system issues.

| Data field | Data Type | Constraints | Description |
|---|---|---|---|
| InIssueID | numeric | Not Null | Unique Issue ID Description |
| vcTicketNo | nvarchar | Allow Null | Unique Ticket Number |
| InFileID | numeric | Not Null | |
| inUserId | numeric | Not Null | User ID who raised the issue. |
| vcRequesterName | varchar | Not Null | Name of user who raised the issue. |
| vcRequesterLANID | varchar | Not Null | Network ID for user who raised the issue. |
| vcRequesterEmpCode | numeric | Not Null | Employee Code of the User |
| inSupervisorEmpCode | numeric | Allow Null | Requestor's Supervisor's employee code |
| vcRequesterEmail | varchar | Not Null | Requestor's email address |
| inRequestelocationID | int | Not Null | Location where the requestor belongs to. |
| inProblemSummary | int | Not Null | Identifier to define the problem summary defined in Sys_tbl_EnumerationValue |
| vcIssueDescription | varchar | Allow Null | Description of the Issue |
| bolRepeatCall | bit | Allow Null | Describes if the call is repeated |
| vcRefTicketNo | nvarchar | Allow Null | Reference Ticket Number if it is repeated call |
| inCreatedBy | numeric | Not Null | Issue was created by which user |
| dtCreatedOn | datetime | Not Null | Date when the issue was created |

TABLE 75

Sys_tbl_ApplicationIssue_Details
The table contains the brief description about the OneView
issue when it is closed to whom it is assigned and the solution.

| Data field | Data Type | Constraints | Description |
| --- | --- | --- | --- |
| indetailsid | numeric | Not Null | Unique ID |
| inIssueID | numeric | Not Null | Unique Issue ID Description |
| inHeadID | numeric | Not Null | Reference ID from Sys_tbl_ApplicationIssue_Head |
| inStatus | int | Allow Null | Status of the Issue from Sys_tbl_EnumerationValue |
| inAssignedBy | numeric | Allow Null | User ID of the person to whom Issue is assigned |
| dtAssigndate | datetime | Allow Null | Date when the issue was assigned |
| inClosedBy | numeric | Allow Null | User id of the person who closed the issue. |
| dtCloseddate | datetime | Allow Null | Date when the issue was closed |
| vcNotes | varchar | Allow Null | Note written to user when issue was closed |

TABLE 76

Sys_tbl_ApplicationIssue_Head
The table contains the date on which issue is locked and on
which date it has been closed.

| Data field | Data Type | Constraints | Description |
| --- | --- | --- | --- |
| inHeadID | numeric | Not Null | Unique ID to represent Issue |
| inIssueID | numeric | Not Null | Unique Issue ID Description |
| indetailsid | numeric | Allow Null | Reference ID for Sys_tbl_ApplicationIssue_Details |
| dtIssuedate | datetime | Not Null | Date when the issue was raised |
| dtAssigndate | datetime | Allow Null | Date when the issue was assigned |
| dtCloseddate | datetime | Allow Null | Date when the issue was closed |
| bolIsClosed | bit | Allow Null | To check if the issue is closed or still |
| inIssueGrade | int | Allow Null | |
| inClosedBy | numeric | Allow Null | User who closed the issue |
| inAssignBy | numeric | Allow Null | User who assigned the issue. |

TABLE 78

Sys_tbl_Documents
This table contains information about the documents.

| Data field | Data Type | Constraints | Description |
| --- | --- | --- | --- |
| inFileID | int | Not Null | Unique identifier for the file |
| vcFileName | nvarchar | Not Null | Name of the file |
| ImContent | image | Not Null | |
| vcContentType | nvarchar | Not Null | Describes the content type |
| vcContentSize | int | Not Null | Size of the content |
| inCreatedBy | int | Allow Null | Document was created by which user |
| dtCreated | datetime | Not Null | Date when the document was created |

TABLE 77

Sys_tbl_ApplicationIssuesStatus
The table describes about the status of issue whether it is closed/On hold.

| Data field | Data Type | Constraints | Description |
| --- | --- | --- | --- |
| inStatusId | tinyint | Not Null | Unique Identifier to get the status of the issue |
| inStatusType | tinyint | Not Null | Status Type for the transactions |
| vcStatus | nvarchar | Not Null | Status definition |
| vcStatusDesc | nvarchar | Not Null | Status Description |
| vcNextPossibleStatus | nvarchar | Not Null | Different possible path to follow to resolve issue |
| IsbolActive | bit | Not Null | |
| InSquenceOrder | int | Not Null | |
| inCreatedBy | numeric | Not Null | Issue was created by which user |
| dtCreatedOn | smalldatetime | Not Null | Date when the issue was created |
| inModifiedBy | numeric | Allow Null | Issue was modified by which user |
| dtModifiedOn | smalldatetime | Allow Null | Date when the issue was modified |

TABLE 79

Sys_tbl_EnumerationMst
The table contains all the enumerations made.

| Data field | Data Type | Constraints | Description |
|---|---|---|---|
| inEnumID | int | Not Null | Unique identifiers for the enumerations |
| vcEnumeration | varchar | Not Null | Enumerations name unique |
| vcEnumerationName | varchar | Not Null | enumerations name |
| vcNotes | varchar | Allow Null | Description for enumerations |
| inSeqOrder | int | Not Null | |
| bolActive | bit | Not Null | To check if the enumeration is active |
| inCreatedBy | numeric | Allow Null | Enumerations was created by which user |
| dtCreatedOn | smalldatetime | Allow Null | Date when the enumerations was created |
| inModifiedBy | numeric | Allow Null | Enumerations was modified by which user |
| dtModifiedOn | datetime | Allow Null | Date when the enumerations was modified |

TABLE 80

Sys_tbl_EnumerationValue
The table contains the detail information about all the enumerations.

| Data field | Data Type | Constraints | Description |
|---|---|---|---|
| inEnumID | int | Not Null | Unique Identifier for the enumerations |
| inSubEnumID | int | Not Null | Identifiers for the various values of the enumerations |
| vcValue | varchar | Allow Null | Value of the enumerations |
| vcNotes | varchar | Allow Null | Notes for the enumerations |
| vcEnumCode | varchar | Allow Null | Abbreviation value of the enumeration values |
| inSeqOrder | int | Allow Null | |
| bolActive | bit | Allow Null | To check if the enumeration is active |
| inCreatedBy | int | Allow Null | Enumerations was created by which user |
| dtCreatedOn | datetime | Allow Null | Date when the enumerations was created |
| inModifiedBy | int | Allow Null | Enumerations was modified by which user |
| dtModifiedOn | datetime | Allow Null | Date when the enumerations was modified |

TABLE 81

Sys_tbl_Favourates_Links
The table contains the information about employee's favorite links.

| Data field | Data Type | Constraints | Description |
|---|---|---|---|
| inLinkId | numeric | Not Null | Unique Identifier for the favorite links |
| inUserID | numeric | Not Null | User ID who has made the favorite links |
| vcLinkTitle | nvarchar | Not Null | Favorite links identifier name. |
| vcUrlpath | nvarchar | Not Null | URL Path for the favorite link |
| vcComments | nvarchar | Allow Null | Comments stored for the favorite links |
| dtCreatedOn | smalldatetime | Not Null | Favorite links was created by which user |
| inCreatedBy | numeric | Not Null | Date when the favorite links was created |
| inModifiedBy | numeric | Allow Null | Favorite links was modified by which user |
| dtModifiedOn | smalldatetime | Allow Null | Date when the favorite links was modified |

TABLE 82

Sys_tbl_Franchise_List
This table contains the information about the Accenture's franchise.

| Data field | Data Type | Constraints | Description |
|---|---|---|---|
| inFranchiseId | numeric | Not Null | Unique identifiers for the franchise of Accenture |
| vcFranchiseName | varchar | Allow Null | Name of the city where franchise belongs to. |
| inSiteIds | numeric | Allow Null | Different site identifiers. |

TABLE 83

Sys_tbl_GeographicDetails
The table contains the geographical location details with their name.

| Data field | Data Type | Constraints | Description |
|---|---|---|---|
| ID | Numeric | Not Null | Unique ID to get the geographical locations |
| vcValue | nvarchar | Allow Null | Name of the geographical locations |
| VcType | Numeric | Allow Null | Geographical type based on Sys_tbl_EnumerationValue |

TABLE 84

Sys_tbl_HolidayMst
The table contains the optional and fixed holidays details.

| Data field | Data Type | Constraints | Description |
| --- | --- | --- | --- |
| inHolidayID | int | Not Null | Unique ID for the holiday |
| inFinancialYear | varchar | Not Null | Financial Year |
| vcLocationId | varchar | Allow Null | Identifier for the location |
| inHolidayType | tinyint | Not Null | Type of the holiday from Sys_tbl_EnumerationValue |
| dtHolidaydate | datetime | Allow Null | Date of the holiday |
| vcHolidayName | varchar | Allow Null | Name of the holiday |
| vcNotes | varchar | Allow Null | Notes for the holiday. |
| bolIsActive | bit | Not Null | To check if the holiday is active |
| inCreatedBy | int | Not Null | Holiday list was created by which user |
| dtCreatedOn | datetime | Not Null | Date when the Holiday list was created |
| inModifiedBy | int | Allow Null | Holiday list was modified by which user |
| dtModifiedOn | datetime | Allow Null | Date when the holiday list was modified |

TABLE 85

Sys_tbl_Levels
The table contains the information related to level of employees.

| Data field | Data Type | Constraints | Description |
| --- | --- | --- | --- |
| inLevelId | tinyint | Not Null | Unique Identifier for the Level |
| inParentLevel | tinyint | Allow Null | Identifier for the Parent Level |
| vcLevelName | varchar | Allow Null | Name of the Level |
| bolActive | bit | Allow Null | Is the level active |
| inSquenceOrder | smallint | Not Null | |
| inCreatedBy | numeric | Not Null | Levels was created by which user |
| dtCreatedOn | smalldatetime | Not Null | Date when the levels was created |
| inModifiedBy | numeric | Allow Null | Levels was modified by which user |
| dtModifiedOn | smalldatetime | Allow Null | Date when the levels was modified |

TABLE 86

Sys_tbl_MailFormat
The table contains the mail format i.e. subject the content and other details.

| Data field | Data Type | Constraints | Description |
| --- | --- | --- | --- |
| inMailFormatid | int | Not Null | Unique Identifier for the mail format |
| vcName | varchar | Not Null | Name for the mail formats |
| vcMailFormat | text | Not Null | Mail format decription |
| vcSubject | varchar | Not Null | Subject for the mail format |
| vcKeys | varchar | Allow Null | Keys in the mail which will be replaced. |
| bolIsActive | bit | Not Null | Is mail format Active or not |
| inCreatedBy | numeric | Allow Null | Mail format was created by which user |
| dtCreatedOn | smalldatetime | Allow Null | Date when the mail format was created |
| inModifiedBy | numeric | Allow Null | Mail format was modified by which user |
| dtModifiedOn | datetime | Allow Null | Date when the mail format was modified |

TABLE 87

Sys_tbl_MailFormatMap
This table contains information related to the mail mapping.

| Data field | Data Type | Constraints | Description |
| --- | --- | --- | --- |
| inMAPId | numeric | Not Null | Unique identifier for the mail format mapping |
| inMailFormatId | numeric | Allow Null | Identifier for the mail format |
| inModuleId | int | Allow Null | Identifier for the module in which the mail format is used. |
| inProcessId | int | Allow Null | Identifier for the process in which mail format is used |
| vcLocations | varchar | Allow Null | Location of the process |
| vcFrom | varchar | Allow Null | Mail is sent from which mail address |
| vcMailto | varchar | Allow Null | To which mail address the mail is sent |
| vcMailBCC | varchar | Allow Null | BCC of the mail is sent to which mail address |
| vcMailReply | varchar | Allow Null | Mail is replied from which mail address |
| vcMailCC | varchar | Allow Null | CC of the mail is sent to which mail address |

TABLE 88

Sys_tbl_MailingGroup
This table contains details related to the mailing group.

| Data field | Data Type | Constraints | Description |
|---|---|---|---|
| inMailingGroupId | int | Not Null | Unique identifier of the mail group |
| vcMailingGroup | varchar | Not Null | Name of the mailing group |
| vcMailingaddress | varchar | Not Null | Mailing address which belongs to the mailing group |
| vcuserIds | varchar | Allow Null | User IDs of all the user in the mailing group |
| bolIsActive | bit | Not Null | Is the mailing group active or not |
| inCreatedBy | int | Not Null | Mail group was created by which user |
| dtCreatedOn | smalldatetime | Not Null | Date when the mail group was created |
| dtModifiedOn | smalldatetime | Allow Null | Mail group was modified by which user |
| inModifiedBy | int | Allow Null | Date when the mail group was modified |

TABLE 89

Sys_tbl_ModuleCatalog
This contains detailed information about all the modules.

| Data field | Data Type | Constraints | Description |
|---|---|---|---|
| inModuleID | Int | Not Null | Unique Identifier for the module. |
| inModuleType | tinyint | Not Null | Defines the module type |
| vcModuleText | varchar | Not Null | Defines the module |
| inTabId | numeric | Not Null | Module is added at which tab |
| inParentModuleID | numeric | Not Null | Defines the parent module in which the module is added |
| vcTooltip | varchar | Allow Null | Tool tips for the module |
| vcPageURL | varchar | Not Null | URL of the module page |
| vcSubPageURL | varchar | Not Null | URL of the sub module page |
| vcPageTitle | varchar | Allow Null | Title of the page |
| vcApplicationTitle | varchar | Allow Null | Title of the application |
| inSeqOrder | smallint | Allow Null | |
| bolIsActive | Bit | Allow Null | Is the module active |
| bolIsParent | Bit | Allow Null | Is the module parent module |
| vcParentLevel | varchar | Allow Null | Defines the parent level |
| inMailFormat | Int | Not Null | Identifier of the Mail format used |
| inCreatedBy | Int | Allow Null | Module catalog was created by which user |
| dtCreatedOn | datetime | Allow Null | Date when the module group was created |
| inModifiedBy | Int | Allow Null | Module catalog was modified by which user |
| dtModifiedOn | datetime | Allow Null | Date when the module catalog was modified |

TABLE 90

Sys_tbl_ModuleMst
This contains information about the modules whether it is Leave, Adhoc or Attendance.

| Data field | Data Type | Constraints | Description |
|---|---|---|---|
| InModuleId | int | Not Null | Unique identifier of the module |
| vcModuleName | nvarchar | Not Null | Name of the module |
| vcNotes | nvarchar | Not Null | Notes about the module |
| IsbolActive | bit | Not Null | Is the module active |
| InParentModuleId | int | Not Null | Identifier of the parent module |
| inSquenceOrder | smallint | Not Null | |
| inCreatedBy | numeric | Not Null | Module was created by which user |
| dtCreatedOn | smalldatetime | Not Null | Date when the module was created |
| inModifiedBy | numeric | Allow Null | Module was modified by which user |
| dtModifiedOn | smalldatetime | Allow Null | Date when the module was modified |

TABLE 91

Sys_tbl_OrganizationalHierarchy
The table contains the hierarchy of the employees.

| Data field | Data Type | Constraints | Description |
|---|---|---|---|
| inUserID | numeric | Not Null | Unique Identifier for the User. |
| inResourcetype | tinyint | Not Null | Defines the resource type whether the user is permanent, contract or temporary. |

TABLE 91-continued

Sys_tbl_OrganizationalHierarchy
The table contains the hierarchy of the employees.

| Data field | Data Type | Constraints | Description |
| --- | --- | --- | --- |
| inProcessId | int | Not Null | Identifier for the Process |
| inTeamId | int | Not Null | Identifier for the team to which user belongs |
| inSupervisor | numeric | Not Null | Defines the supervisor of the team |
| dtCreatedOn | smalldatetime | Not Null | Date when the module was created |
| inCreatedBy | int | Not Null | Module was created by which user |

TABLE 92

Sys_tbl_OrganizationalHierarchy_History
This table contains the organizational hierarchy history.

| Data field | Data Type | Constraints | Description |
| --- | --- | --- | --- |
| inHistoryId | numeric | Not Null | Unique identifier for the Organization Hierarchy |
| dttimeStamp | smalldatetime | Not Null | Date when the history was created |
| inTeamID | int | Not Null | Identifier for the team |
| inParentTeam | int | Allow Null | Identifier for the parent team |
| inSupervisorID | int | Not Null | User ID for the Supervisor of the team |
| inAlternateSupervisor | int | Not Null | User ID for the alternate supervisor of the team. |
| inProcessID | int | Not Null | Identifier for the process |
| vcTeams | varchar | Not Null | Process ID |
| vcdirectTMs | varchar | Not Null | Direct team detail |
| vcSharedTMs | varchar | Not Null | Share team detail |
| inSharedCount | int | Not Null | Share team count |
| inDedicatedCount | int | Not Null | Direct team count |
| inPeerCount | int | Allow Null | Peer count detail |
| inMonth | int | Allow Null | Defines the month |
| inYear | int | Allow Null | Defines the year |
| inQuarter | int | Allow Null | Defines the qaurter |
| inWeek | int | Allow Null | Defines the week |

TABLE 93

Sys_tbl_ProcessMst (Table 1106)
The table contains the name of all the processes.

| Data field | Data Type | Constraints | Description |
| --- | --- | --- | --- |
| inProcessID | int | Not Null | Unique Identifier for the process |
| vcProcess | varchar | Not Null | Name of the process |
| vcProcessAlias | varchar | Not Null | Process Alias |
| inParentProcess | int | Not Null | Identifer of the Parent Process |
| inProcessType | varchar | Not Null | Identifier for the Process from Sys_tbl_EnumerationValue |
| dtgoLivedate | datetime | Allow Null | Date the process go live date |
| inHeadCount | int | Not Null | Head count for the process |
| vcLocations | varchar | Allow Null | Location where the process is running |
| vcDesignation | varchar | Allow Null | Designations in the process |
| vcCommitmentLogs | varchar | Allow Null | Commitments available for the process |
| vcBusinessids | varchar | Allow Null | Business Ids available in the process |
| inTimeZone | smallint | Allow Null | Time Zone of the process |
| IsbolActive | bit | Not Null | Is the process Active |
| inoperationControl | int | Allow Null | |
| inCreatedBy | int | Allow Null | Module was created by which user |
| dtCreatedOn | smalldatetime | Allow Null | Date when the module was created |
| inModifiedBy | int | Allow Null | Module was modified by which user |
| dtModifiedOn | smalldatetime | Allow Null | Date when the module was modified |

TABLE 94

Sys_tbl_ProcessTeams (Table 302)
The table contains the Information of Team Name.

| Data field | Data Type | Constraints | Description |
| --- | --- | --- | --- |
| inTeamId | int | Not Null | Unique identifier for the team |
| vcTeamName | varchar | Not Null | Name of the team |
| inParentTeam | int | Not Null | Parent team Identifier for the new team |
| inProcessId | int | Not Null | Identifier for the process the team belongs to |
| inLocationId | smallint | Not Null | Location Identifier of the process |

TABLE 94-continued

Sys_tbl_ProcessTeams (Table 302)
The table contains the Information of Team Name.

| Data field | Data Type | Constraints | Description |
| --- | --- | --- | --- |
| inSupervisor | numeric | Not Null | Supervisor of the team |
| vcHierarchyLevel | varchar | Allow Null | Hierarchy for the team |
| vcParentUser | varchar | Allow Null | Identifier of the User ID for the parent process |
| bolActive | bit | Not Null | Is team Active or not |
| inAlternateSupervisor | int | Allow Null | Alternate supervisor of the team |
| inCreatedBy | int | Not Null | Module was created by which user |
| dtCreatedOn | smalldatetime | Not Null | Date when the module was created |
| inModifiedBy | int | Allow Null | Module was modified by which user |
| dtModifiedOn | smalldatetime | Allow Null | Date when the module was modified |

TABLE 95

Sys_tbl_ReasonsMst
This is the master table for all the reasons related to adhoc, movement, exit and extra hours.

| Data field | Data Type | Constraints | Description |
| --- | --- | --- | --- |
| inReasonId | numeric | Not Null | Unique Identifier for the reasons |
| vcReason | varchar | Allow Null | Description of the reason |
| inReasonType | smallint | Not Null | Identifier for reasons from Sys_tbl_EnumerationValue |
| vcNotes | varchar | Not Null | Notes for the reason |
| bolActive | bit | Not Null | Is the reason active |
| inCreatedBy | int | Allow Null | Module was created by which user |
| dtCreatedOn | smalldatetime | Allow Null | Date when the module was created |
| inModifiedBy | int | Allow Null | Module was modified by which user |
| dtModifiedOn | smalldatetime | Allow Null | Date when the module was modified |

TABLE 96

Sys_tbl_User_Notes
This table contains information stores user notes.

| Data field | Data Type | Constraints | Description |
| --- | --- | --- | --- |
| inNoteId | numeric | Not Null | Unique identifier for the Notes |
| inUserID | numeric | Allow Null | Identifier for the User |
| vcTitle | nvarchar | Allow Null | Title for the notes |
| vcNotes | varchar | Allow Null | Description of the notes |
| dtCreatedOn | smalldatetime | Allow Null | Date when the module was created |
| inCreatedBy | numeric | Allow Null | Module was created by which user |

TABLE 97

Sys_tbl_UserContactInfo (Table 310)
The table contains the address (Permanent/Correspondence) details of employees

| Data field | Data Type | Constraints | Description |
| --- | --- | --- | --- |
| inContactID | numeric | Not Null | Unique Identifier for the contact |
| inUserID | numeric | Not Null | Identifier for the User |
| inAddressType | tinyint | Not Null | Address type correspondence or permanent |
| vcAddress | nvarchar | Allow Null | Address of the user |
| vcCity | nvarchar | Allow Null | City the user belongs to |
| vcStateOrProvince | nvarchar | Allow Null | State user belongs to |
| vcPostalCode | nvarchar | Allow Null | Postal Code |
| vcCountryOrRegion | nvarchar | Allow Null | Country |
| vcEmailAddress | nvarchar | Not Null | Email address of the user |
| vcTelephone | nvarchar | Allow Null | Telephone number |
| vcWorkExtension | nvarchar | Allow Null | Extension Number |
| vcMobilePhone | nvarchar | Allow Null | Mobile Number |
| vcFaxNumber | nvarchar | Allow Null | Fax Number |
| BolIsTransport | bit | Allow Null | Is transport required or not |
| vcArea | nvarchar | Allow Null | Area description for landmark |
| dtCreatedOn | smalldatetime | Allow Null | Date when the module was created |
| inCreatedBy | numeric | Allow Null | Module was created by which user |
| inApprovedBy | numeric | Allow Null | Address approved by which user |
| dtApprovedOn | smalldatetime | Allow Null | Date address was approved |

TABLE 98

Sys_tbl_UserContactInfo_History
This contains history of user's contact info.

| Data field | Data Type | Constraints | Description |
| --- | --- | --- | --- |
| inHistoryId | numeric | Not Null | Unique Identifier to retrieve user's contact info histrory |
| inContactID | numeric | Not Null | Identifier for the contact |
| inUserID | numeric | Not Null | Identifier for the User |
| inAddressType | tinyint | Not Null | Address type correspondence or permanent |
| vcAddress | nvarchar | Allow Null | Address of the user |
| vcCity | nvarchar | Allow Null | City the user belongs to |
| vcStateOrProvince | nvarchar | Allow Null | State user belongs to |
| vcPostalCode | nvarchar | Allow Null | Postal Code |
| vcCountryOrRegion | nvarchar | Allow Null | Country |
| vcEmailAddress | nvarchar | Not Null | Email address of the user |
| vcTelephone | nvarchar | Allow Null | Telephone number |
| vcWorkExtension | nvarchar | Allow Null | Extension Number |
| vcMobilePhone | nvarchar | Allow Null | Mobile Number |
| vcFaxNumber | nvarchar | Allow Null | Fax Number |
| BoIsTransport | bit | Allow Null | Is transport required or not |
| vcArea | nvarchar | Allow Null | Area description for landmark |
| dtCreatedOn | smalldatetime | Allow Null | Date when the module was created |
| inCreatedBy | numeric | Allow Null | Module was created by which user |
| inApprovedBy | numeric | Allow Null | Address approved by which user |
| dtApprovedOn | smalldatetime | Allow Null | Date address was approved |

TABLE 99

Sys_tbl_UserContactInfo_Transaction
The table contains the address (Permanent/Correspondence) details of employees

| Data field | Data Type | Constraints | Description |
| --- | --- | --- | --- |
| inContactID | numeric | Not Null | Unique Identifier for the contact |
| inUserID | numeric | Not Null | Identifier for the User |
| inAddressType | tinyint | Not Null | Address type correspondence or permanent |
| vcAddress | nvarchar | Allow Null | Address of the user |
| vcCity | nvarchar | Allow Null | City the user belongs to |
| vcStateOrProvince | nvarchar | Allow Null | State user belongs to |
| vcPostalCode | nvarchar | Allow Null | Postal Code |
| vcCountryOrRegion | nvarchar | Allow Null | Country |
| vcEmailAddress | nvarchar | Not Null | Email address of the user |
| vcTelephone | nvarchar | Allow Null | Telephone number |
| vcWorkExtension | nvarchar | Allow Null | Extension Number |
| vcMobilePhone | nvarchar | Allow Null | Mobile Number |
| vcFaxNumber | nvarchar | Allow Null | Fax Number |
| BoIsTransport | bit | Allow Null | Is transport required or not |
| vcArea | nvarchar | Allow Null | Area description for landmark |
| dtCreatedOn | smalldatetime | Allow Null | Date when the module was created |
| inCreatedBy | numeric | Allow Null | Module was created by which user |

TABLE 100

Sys_tbl_UserContactInformationHistory
This contains users contact info history for employees who require the transport

| Data field | Data Type | Constraints | Description |
| --- | --- | --- | --- |
| inContactID | numeric | Not Null | Unique Identifier for the contact |
| inUserID | numeric | Not Null | Identifier for the User |
| inAddressType | tinyint | Not Null | Address type correspondence or permanent |
| vcAddress | nvarchar | Allow Null | Address of the user |
| vcCity | nvarchar | Allow Null | City the user belongs to |
| vcStateOrProvince | nvarchar | Allow Null | State user belongs to |
| vcPostalCode | nvarchar | Allow Null | Postal Code |
| vcCountryOrRegion | nvarchar | Allow Null | Country |
| vcEmailAddress | nvarchar | Not Null | Email address of the user |
| vcTelephone | nvarchar | Allow Null | Telephone number |
| vcWorkExtension | nvarchar | Allow Null | Extension Number |
| vcMobilePhone | nvarchar | Allow Null | Mobile Number |
| vcFaxNumber | nvarchar | Allow Null | Fax Number |
| BoIsTransport | bit | Allow Null | Is transport required or not |

TABLE 100-continued

Sys_tbl_UserContactInformationHistory
This contains users contact info history for employees who require the transport

| Data field | Data Type | Constraints | Description |
|---|---|---|---|
| vcArea | nvarchar | Allow Null | Area description for landmark |
| dtCreatedOn | smalldatetime | Allow Null | Date when the module was created |
| inCreatedBy | numeric | Allow Null | Module was created by which user |
| inApprovedBy | numeric | Allow Null | Address approved by which user |
| dtApprovedOn | smalldatetime | Allow Null | Date address was approved |

TABLE 101

Sys_tbl_UserGroups (Table 312)
The table contains the user group rights which are given to the employee depending upon their Processes.

| Data field | Data Type | Constraints | Description |
|---|---|---|---|
| inGroupID | int | Not Null | Unique identifier for the user group |
| vcGroupName | varchar | Not Null | Name of the user group |
| vcNotes | varchar | Allow Null | Notes defined for the user group |
| vcModules | varchar | Allow Null | Defines the string for all modules user group have rights |
| inSeqOrder | int | Not Null | |
| BolIsActive | bit | Not Null | Is the user group active |
| inCreatedBy | int | Not Null | Module was created by which user |
| dtCreatedOn | datetime | Not Null | Date when the module was created |
| inModifiedBy | int | Allow Null | Module was modified by which user |
| dtModifiedOn | datetime | Allow Null | Date when the module was modified |
| inProcessId | int | Allow Null | Identifier for the process |

TABLE 102

Sys_tbl_UserLoginCredential (Table 304)
The table contains the detail information of the user login credentials.

| Data field | Data Type | Constraints | Description |
|---|---|---|---|
| inUserID | numeric | Not Null | Unique Identifier for the User |
| vcUserName | nvarchar | Not Null | Network Id of the user |
| vcUserPassword | nvarchar | Allow Null | Default password of the user. |
| bolIsDisabled | Bit | Not Null | Is user login credentials disabled |
| bolChagePassword | Bit | Not Null | Can user change the password |
| bolIsInterNetUser | Bit | Not Null | Has the user access to Internet |
| inUserType | tinyint | Not Null | Identifier for user type whether permanent, contract or temporary. |
| bolIsCheckHierarchy | Bit | Not Null | |
| boldaterestriction | Bit | Not Null | |
| inDefaultPage | Int | Allow Null | Default page for the User |
| inUserGroup | Int | Allow Null | User Group user belongs to |
| vcUserProcess | varchar | Not Null | Process the user belongs to |
| vcUserGroups | varchar | Allow Null | User Group user belongs to |
| vcUserTabModules | varchar | Not Null | Modules user belong to |
| inLoginHistoryID | numeric | Allow Null | Identifier for the User login history relates to Sys_tbl_UserLoginHistroy |
| inModifiedBy | numeric | Allow Null | Module was modified by which user |
| dtModifiedOn | smalldatetime | Allow Null | Date when the module was modified |
| dtCreatedOn | smalldatetime | Allow Null | Date when the module was created |
| inCreatedBy | numeric | Allow Null | Module was created by which user |

TABLE 103

Sys_tbl_UserLoginHistory
This table contains user login history details.

| Data field | Data Type | Constraints | Description |
|---|---|---|---|
| inLoginHistoryID | numeric | Not Null | Unique Identifier for the User login history |
| inUserId | numeric | Not Null | Identifier for the user |
| vcSessionID | varchar | Not Null | Identifier for the user's session |
| dtLogindate | smalldatetime | Allow Null | Login date for the user |
| vcMachineName | varchar | Allow Null | Machine Name user has logged into |

TABLE 103-continued

Sys_tbl_UserLoginHistory
This table contains user login history details.

| Data field | Data Type | Constraints | Description |
| --- | --- | --- | --- |
| vcLastAccessedIP | varchar | Allow Null | Last accessed IP Address |
| dtLogOutdate | smalldatetime | Allow Null | Logout date for the user |
| bolStatus | bit | Allow Null | |

TABLE 104

Sys_tbl_UserMst (Table 308)
The table contains the employee general Information.

| Data field | Data Type | Constraints | Description |
| --- | --- | --- | --- |
| inUserID | numeric | Not Null | Unique Identifier for the user |
| vcEmployeeCode | varchar | Allow Null | Employee Code |
| vcFirstName | nvarchar | Not Null | First name |
| vcLastName | nvarchar | Not Null | Last Name |
| vcFullName | nvarchar | Not Null | Full Name |
| vcEmailAddress | nvarchar | Not Null | Email Address for the user |
| vcbloodGroup | varchar | Allow Null | Blood group |
| vcSex | varchar | Not Null | User defined Male or Female |
| vcNotes | nvarchar | Allow Null | Notes for the User |
| inCreatedBy | int | Not Null | Module was created by which user |
| dtCreatedOn | smalldatetime | Not Null | Date when the module was created |
| dtModifiedOn | smalldatetime | Allow Null | Date when the module was modified |
| inModifiedBy | int | Allow Null | Module was modified by which user |
| vcDisplayName | nvarchar | Allow Null | Display Name of the user |
| vcCMSId | varchar | Allow Null | CMS ID of the user |

TABLE 105

Sys_tbl_UserOrganizationalHierarchy (Table 306)
This contains information about user's organization hierarchy.

| Data field | Data Type | Constraints | Description |
| --- | --- | --- | --- |
| Dttimestamp | datetime | Not Null | Date when the hierarchy was created |
| InResourceType | tinyint | Not Null | Resource type permanent, contract or temporary |
| InUserId | numeric | Not Null | Identifier for the user |
| InLocationId | int | Allow Null | Identifier for the Location |
| InLevelId | int | Allow Null | Identifier for the level of the user |
| inDesignationId | int | Allow Null | Designation of the user |
| inProcessId | int | Allow Null | Identifier of the user |
| inTeamId | int | Allow Null | Identifier for the team Name |
| inSupervisorId | numeric | Allow Null | Supervisor's User ID |
| inParentTeamId | int | Allow Null | Parent Team ID |
| inAlternateSupervisor | numeric | Allow Null | Alternate supervisor of the team |
| vcTeamHeriachy | varchar | Allow Null | Defines the team hierarchy |
| vcUserHierachy | varchar | Allow Null | Defines the user hierarchy |
| intimeStamp | int | Allow Null | Time when the hierarchy was created |
| inWeek | int | Allow Null | Week |
| inMonth | int | Allow Null | Month |
| inYear | int | Allow Null | Year |
| inQuarter | int | Allow Null | Quarter |

TABLE 106

Sys_tbl_UserOrganizationalInfo (Table 314)
The table contains the employee's organization information details.

| Data field | Data Type | Constraints | Description |
| --- | --- | --- | --- |
| inUserID | numeric | Not Null | Unique Identifier of the User |
| inEmployeeCode | int | Not Null | Employee Code |
| inProcess | int | Not Null | Identifier for the process |
| inHrRepresntative | numeric | Not Null | HR representative for the user |
| inLocation | smallint | Not Null | Location the user belongs to |
| inLevel | smallint | Not Null | Level the user belongs to |
| inDesignation | smallint | Allow Null | Designation of the user |
| dtCompanyDOJ | smalldatetime | Allow Null | Date of joining the company |

TABLE 106-continued

Sys_tbl_UserOrganizationalInfo (Table 314)
The table contains the employee's organization information details.

| Data field | Data Type | Constraints | Description |
| --- | --- | --- | --- |
| dtDOB | smalldatetime | Allow Null | Date of Birth |
| dtProcessgoLive | smalldatetime | Allow Null | Date the process go live |
| vcEnterpriseId | varchar | Allow Null | Email address of the user |
| vcNetworkId | varchar | Allow Null | Network ID of the user |
| vcNetworkDomain | varchar | Allow Null | Domain User belongs to |
| inCreatedBy | numeric | Not Null | Module was created by which user |
| dtCreatedOn | smalldatetime | Not Null | Date when the module was created |
| inModifiedBy | numeric | Allow Null | Date when the module was modified |
| dtModifiedOn | smalldatetime | Allow Null | Module was modified by which user |

TABLE 107

Sys_tbl_UserSpecialCredential
This table stores information about user's special login credentials.

| Data field | Data Type | Constraints | Description |
| --- | --- | --- | --- |
| inUserId | numeric | Not Null | Unique identifier for the User |
| inModuleType | int | Allow Null | Module Type User belongs to |
| inCredentialType | int | Allow Null | Identifier for the credential |
| vcValue | varchar | Allow Null | |
| dtCreatedOn | datetime | Allow Null | Date when the module was created |
| inCreatedBy | numeric | Allow Null | Module was created by which user |
| dtModifiedOn | datetime | Allow Null | Date when the module was modified |
| inModifiedBy | numeric | Allow Null | Module was modified by which user |

TABLE 108

Sys_User_tbl_ContactLocality
This table contains the information about the locality.

| Data field | Data Type | Constraints | Description |
| --- | --- | --- | --- |
| inLocality | numeric | Not Null | Unique identifier for the locality |
| vcLocality | nvarchar | Allow Null | Defines the location |
| inLocation | numeric | Allow Null | Identifier for the location |

The HRIS application 128 facilitates management of organizational information by an administrator. The HRIS application 128 also manages various processes, issues, user details, mailing details and manages a bulletin board. The HRIS application 128 may include a process management module that implements creation, activation and deactivation of processes. The module also may implement process chart and process team management and process information editing for all the processes in the organization.

The process management module may manage process charts and report information about the various management levels in the process. The process management module may also manage process teams and report the information of the various teams of the process and their hierarchy. The process management module may further edit process information to provide editing for functions of a process. FIGS. 14-20 show examples of graphical user interface (GUI) screens, reporting, and processing that the HRIS application 128 may implement for the process management module.

In particular, FIG. 14 shows a graphical user interface 1402 that displays a display portion 1404 and various controls 1408-1414 for controlling the graphical user interface 1402.

The graphical user interface 1402 may also include a display title 1420 that displays a title associated with the graphical user interface 1402.

The controls 1408-1414 of the graphical user interface may 1402 may be various and numerous. In one implementation, the controls of the graphical user interface 1402 include a drop-down menu control 1406, a check-box control 1408, a selectable display item control 1410, a button control 1412, a print control 1414, and export control 1416 and a display portion control 1418.

The drop-down menu control 1406 is operative to display drop-down menu items from a drop-down menu when the drop-down menu control 1406 is activated.

The check-box control 1408 is operative to select a display item associated with the check-box control 1408. The graphical user interface 1402 may include multiple check-box controls and any check-box control may be activated independently of the other check-box controls.

The selectable display item control 1410 is operative to transfer the user to another graphical user interface associated with the display item of the selectable display item control 1410. For example, the selectable display item control 1410 may be a hyperlink that displays a new window to the user when the display item control 1410 is activated.

The button control 1412 is operative to transmit an action message when activated. For example, the button control 1412 may transmit an action message associated with creating a new process or deactivating previously selected processes. The button control 1412 may also be associated with the check-box controls.

The print control 1414 is operative to transmit an instruction to print the displayed graphical user interface 1402.

The export control 1416 is operative to export the displayed items of the display portion 1404 to another application, such as a spreadsheet application.

The display portion control 1418 is operative to control the display of the display items in the display portion 1404. For example, activating the display portion control 1418 may transmit an instruction that additional display items should be displayed in the display portion 1418. The graphical user interface 1402 may implement the display portion control 1418 as a hyperlink or other graphical control.

The controls 1406-1418 and the display portion 1404 are merely representative and not exhaustive. For example, the graphical user interface 1402 may implement fewer or additional controls. Other types of controls, such as scroll bars, input fields, radio buttons, are also possible.

FIG. 15 shows one example of a graphical user interface 1502 with an alternative arrangement of a display title 1420, a display portion 1404, and graphical user interface controls 1406, 1408, 1412, and 1414. The graphical user interface

1502 also implements additional controls 1504 and 1506. The control 1504 is an example of a text field input control. The text field input control 1504 is operative to receive an input from a user in the form of alphanumeric characters. The control 1506 is an example of a calendar date input control. The calendar date input control 1506 is operative to receive a selection of a calendar date from a user.

Figure 117:
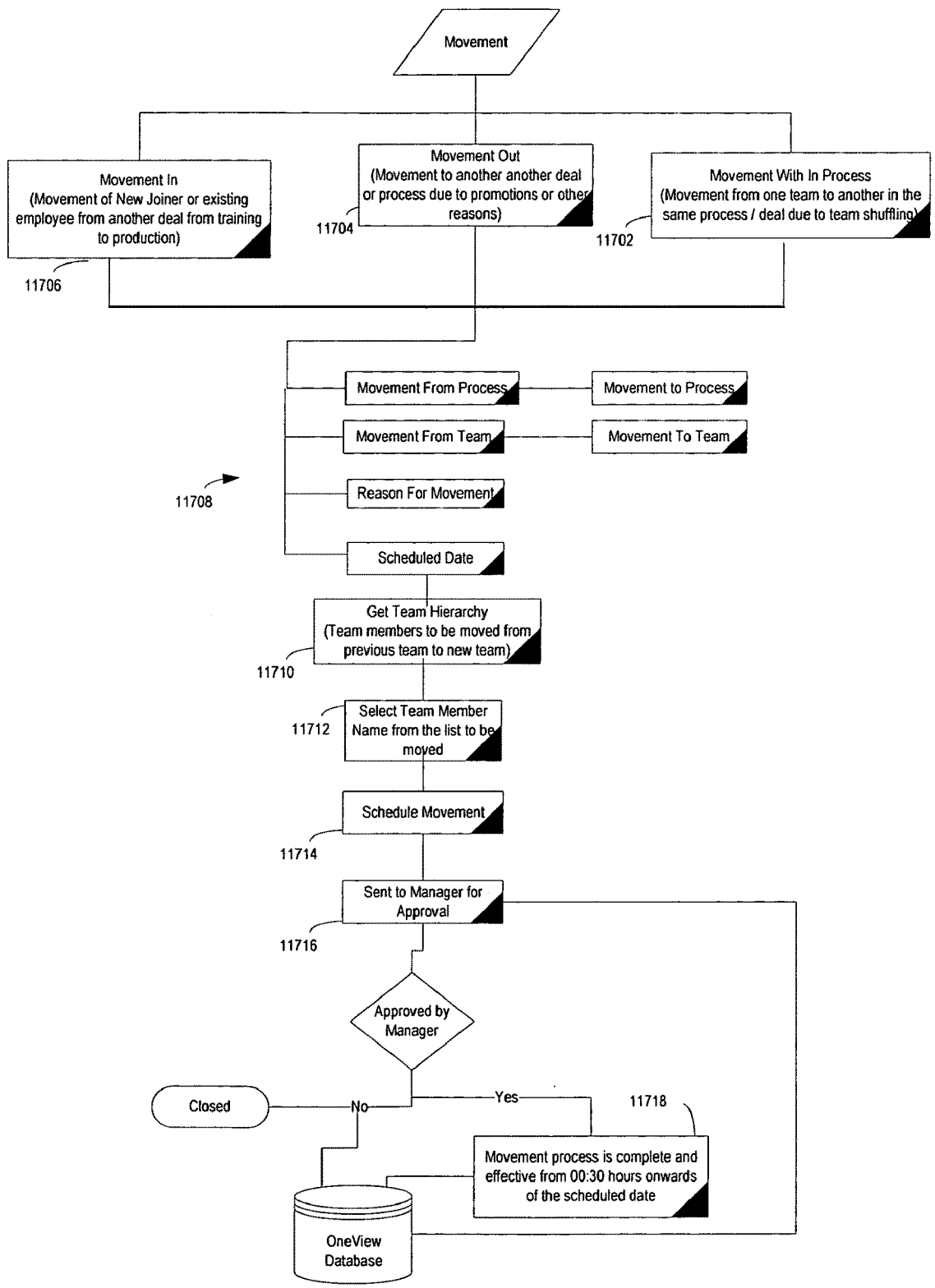

FIGS. 14 and 15 show various graphical user interface controls. FIGS. 16-117 also show graphical user interfaces having graphical user interface controls. However, the graphical user interfaces shown in FIGS. 16-117 may implement more or less than the controls shown in FIGS. 14 and 15. In addition, FIGS. 16-117 may implement various types of graphical user interface controls. Hence, many different arrangements of graphical user interfaces are possible.

Figure 22:
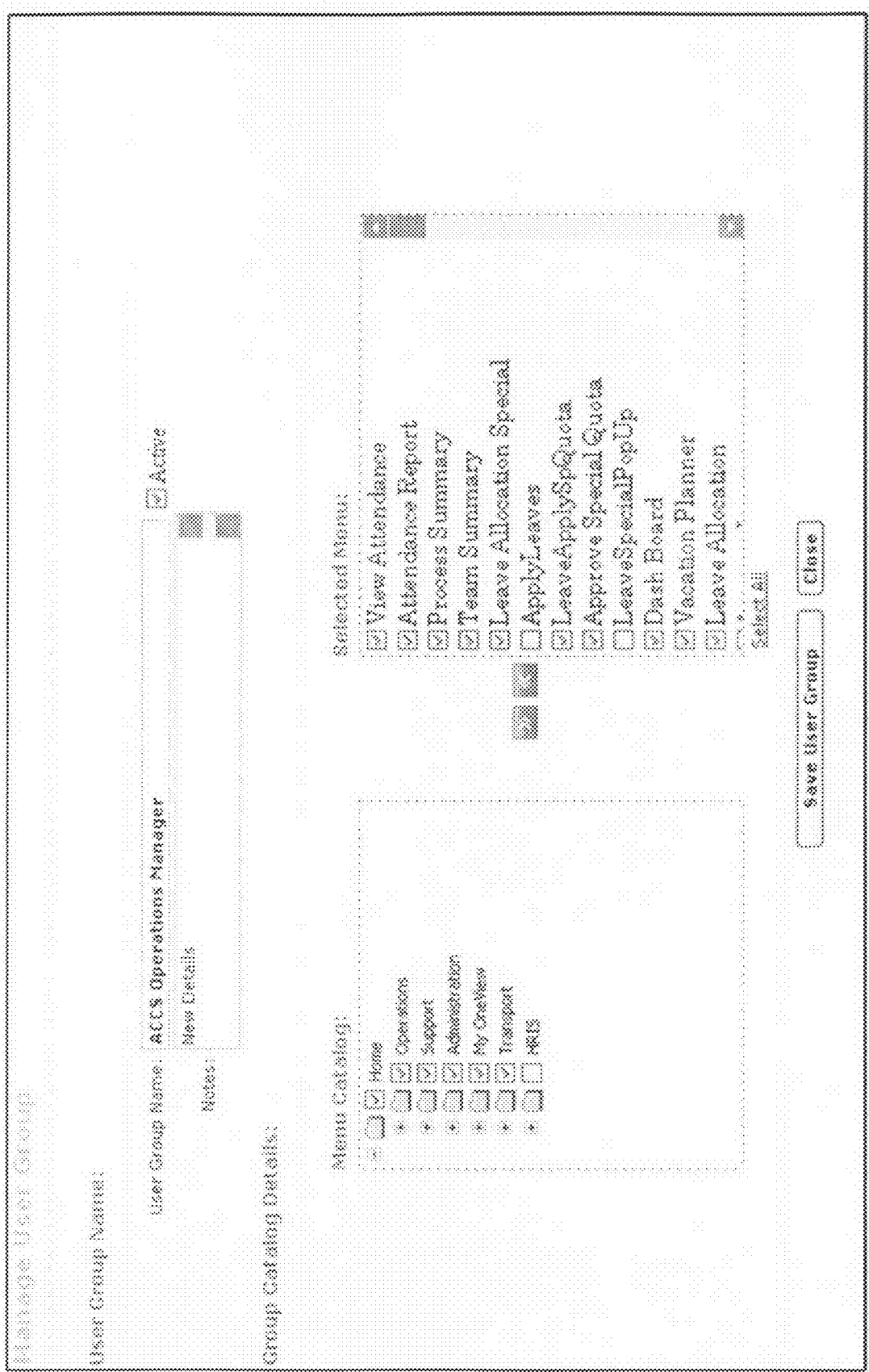
Figure 23:
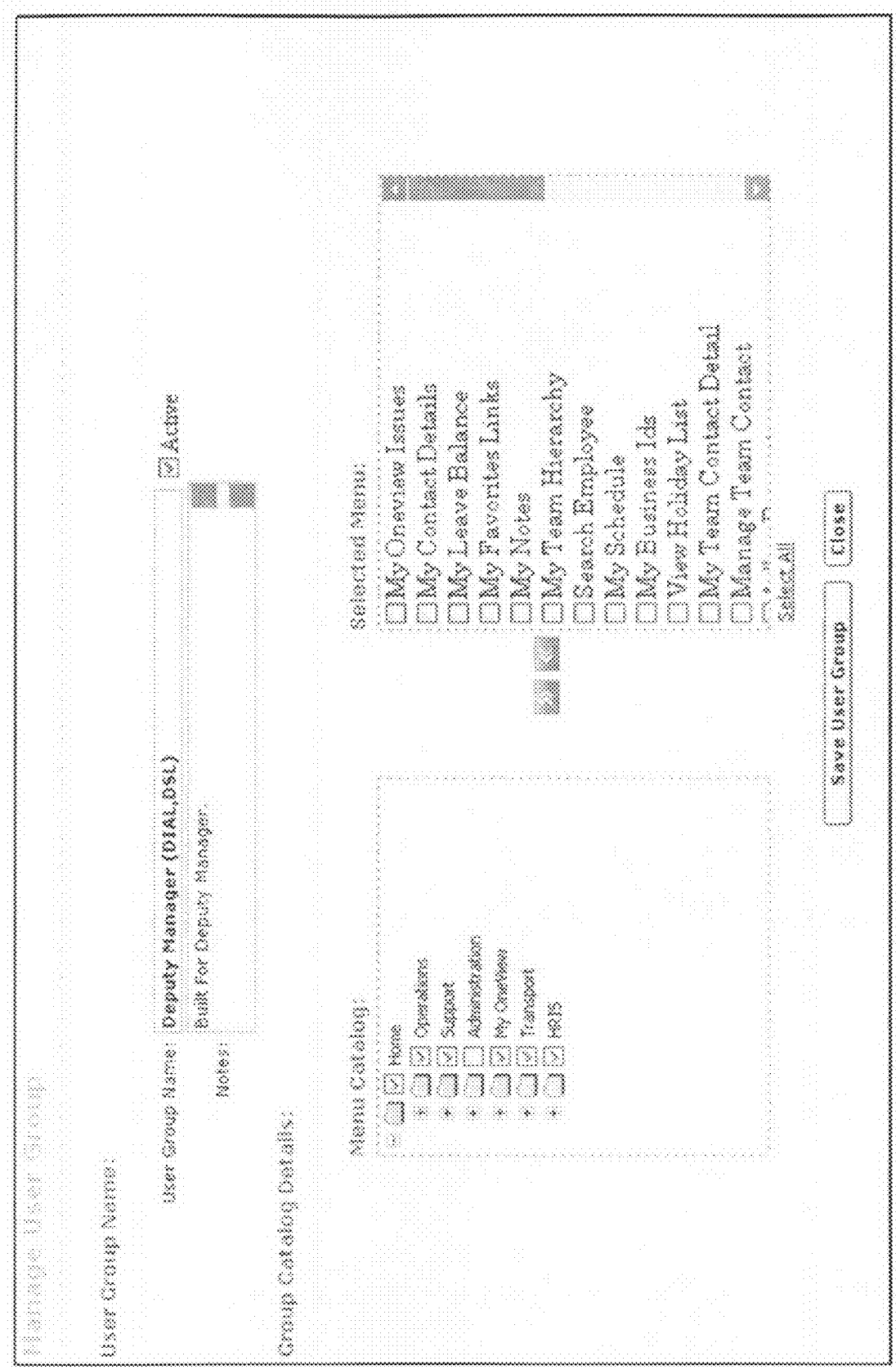

The HRIS application 128 may also include a user group management module. The user group management module may manage the user groups, and facilitate assigning, viewing, and otherwise managing user access rights. FIGS. 21-23 show examples of GUI screens, reporting, and processing that the user group management module may implement.

The HRIS application 128 may also include a holiday management module. The holiday management module may manage employee holidays and provide holiday list editing. The holidays may be of multiple types, such as Fixed or Optional. Holidays may be updated at the beginning of each calendar year, and may vary by location as well. FIG. 24 shows an example of a GUI screen, reporting, and processing that the holiday management module may implement. In any of the GUI screens for any of the applications, data may be exported by clicking on the spreadsheet icon.

Figure 25:
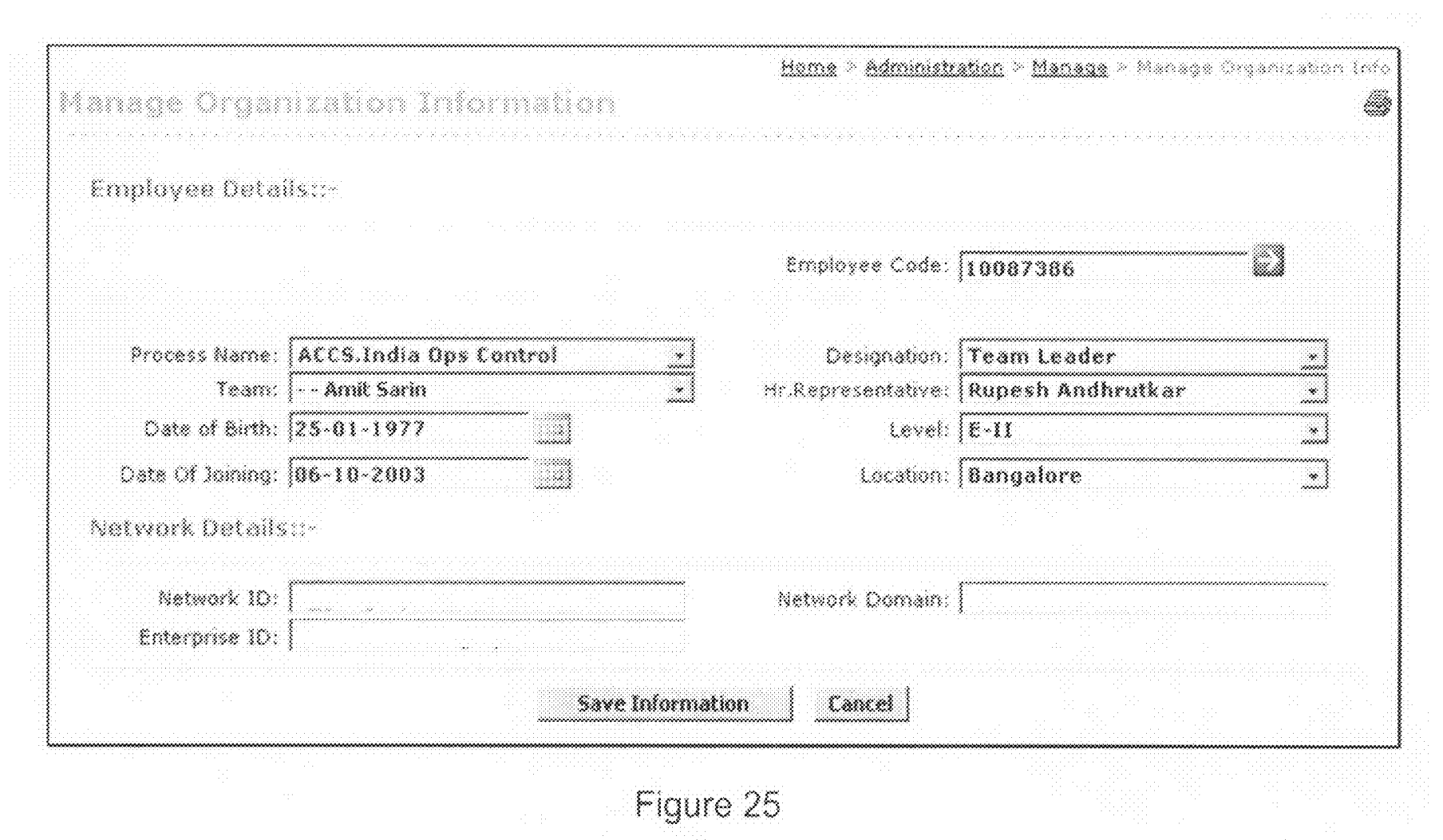

The HRIS application 128 may also include an organizational information management module that facilitates entry and management of user organization information. Multiple types of information may be saved, including employee details such as team name, HR representative name, date of birth, DOJ, level, and location. Other information that may be managed includes identifiers such as network, domain, and enterprise identifiers. FIG. 25 shows an example of a GUI screen, reporting, and processing that the organizational information management module may implement.

Figure 26:
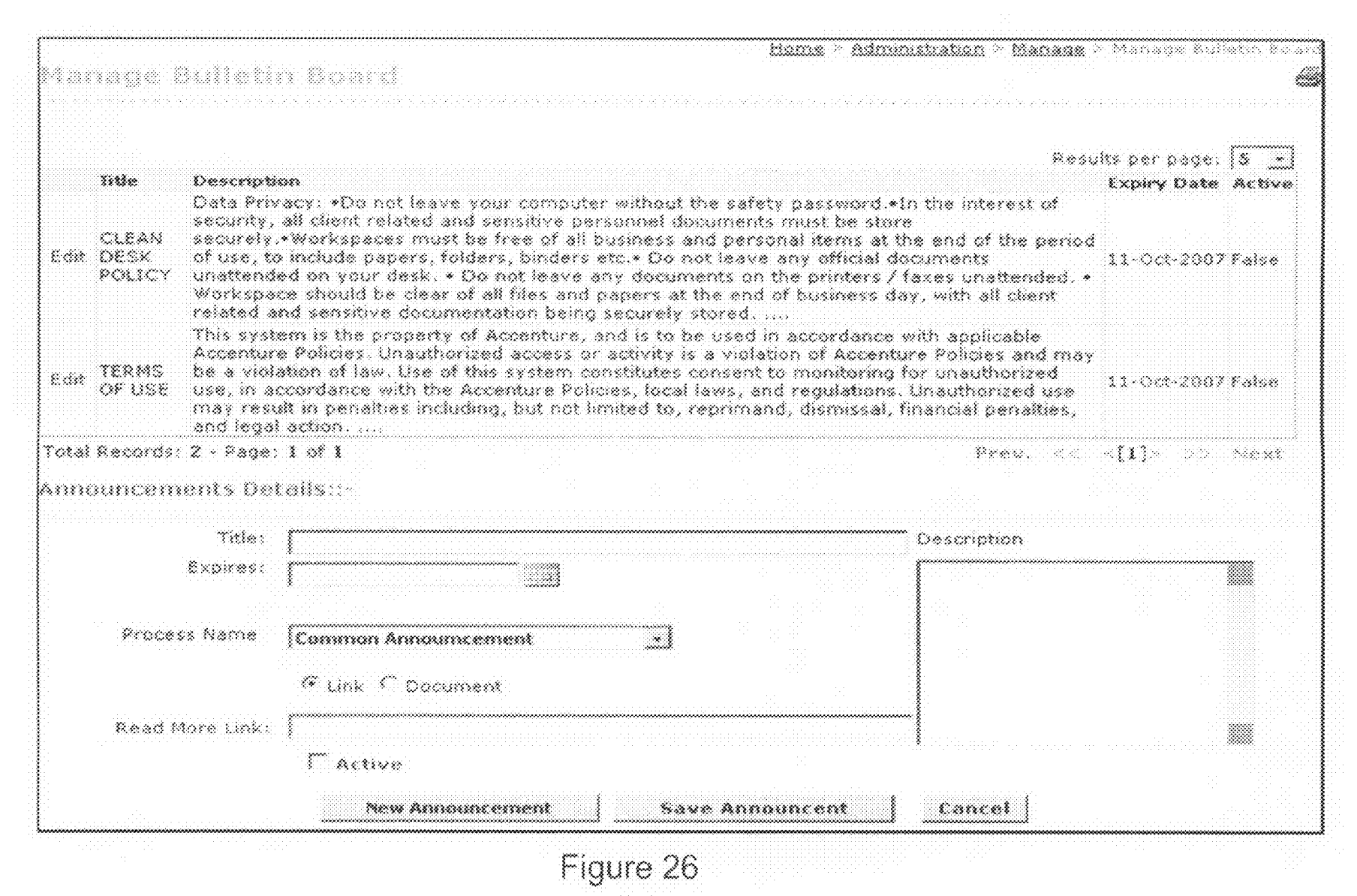
Figure 27:
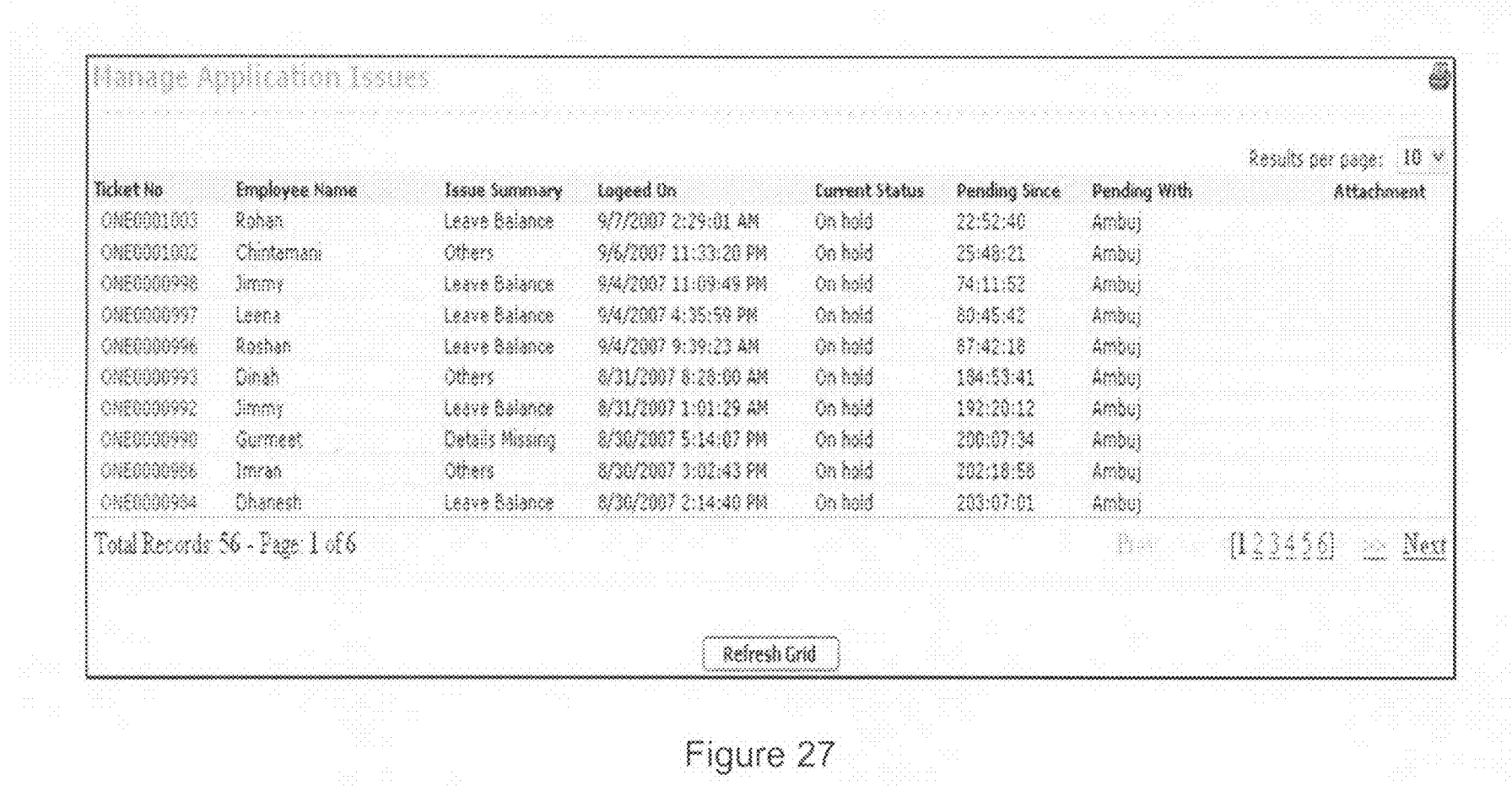
Figure 28:
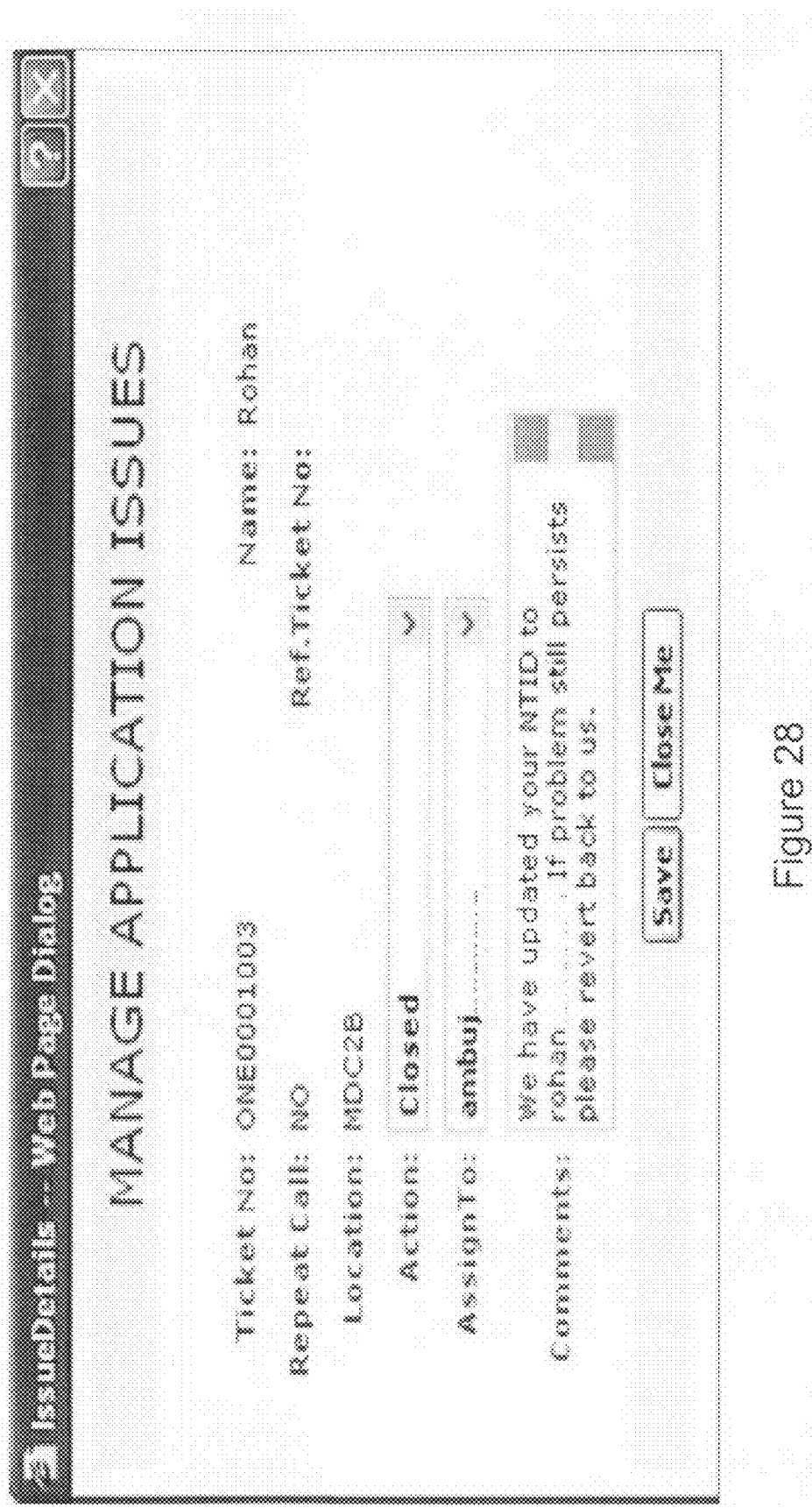

The HRIS application 128 may also include a bulletin board management module and an issue management module. The bulletin board management module provides interfaces for uploading bulletins or other messages that appear onscreen when a user logs in. The issue management module manages issues raised by users. FIGS. 26 and 27-28 show examples of GUI screens for bulletin board management and issue management, respectively.

Figure 30:
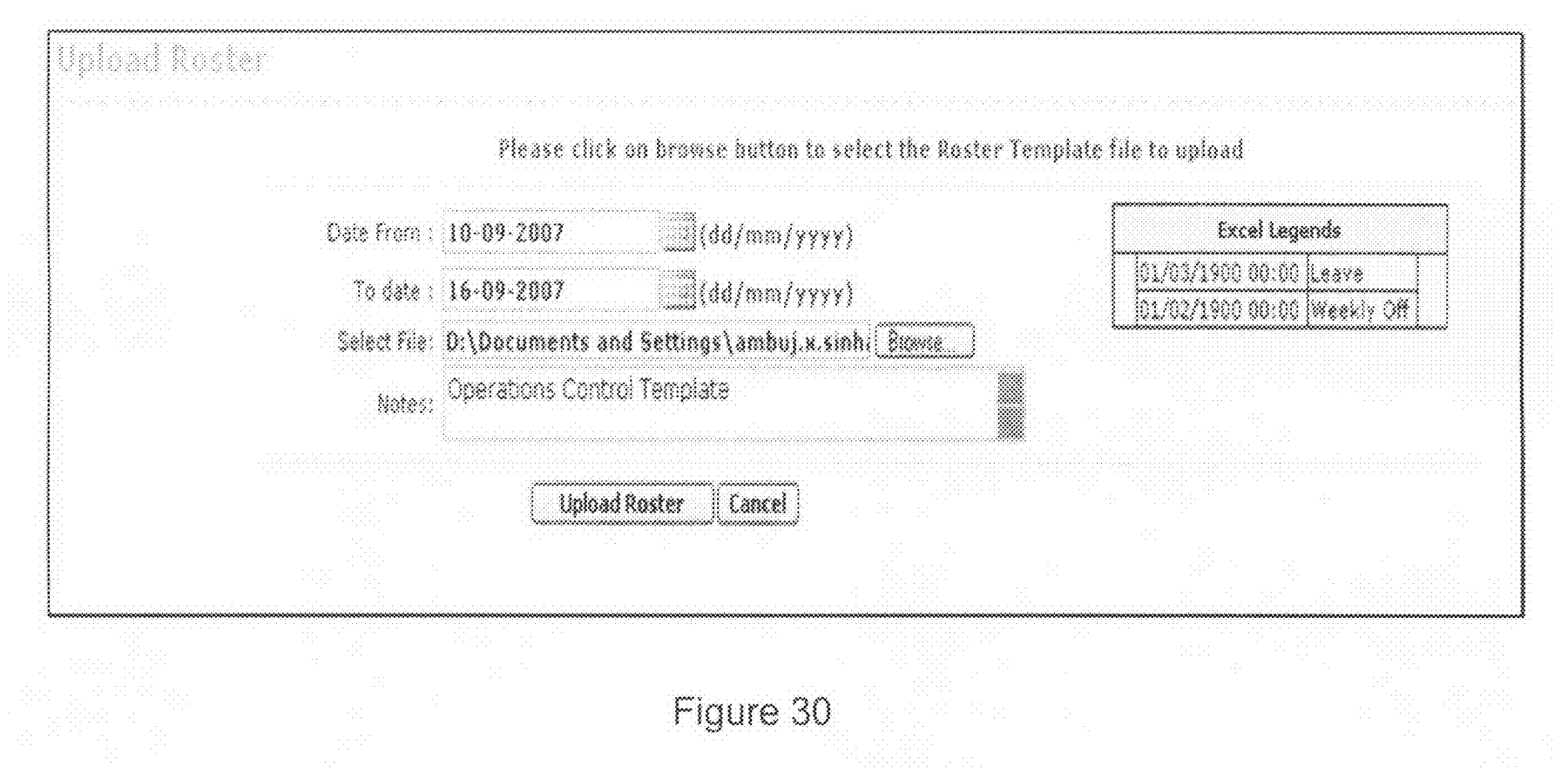

The HRIS application 128 may also include a roster management module. The roster management module provides interfaces for uploading and managing rosters. FIGS. 29 and 30 show examples of GUI screens for roster management. Note that a roster may start as a spreadsheet file for a particular process that is uploaded into the system, at a selected date range.

Figure 31:
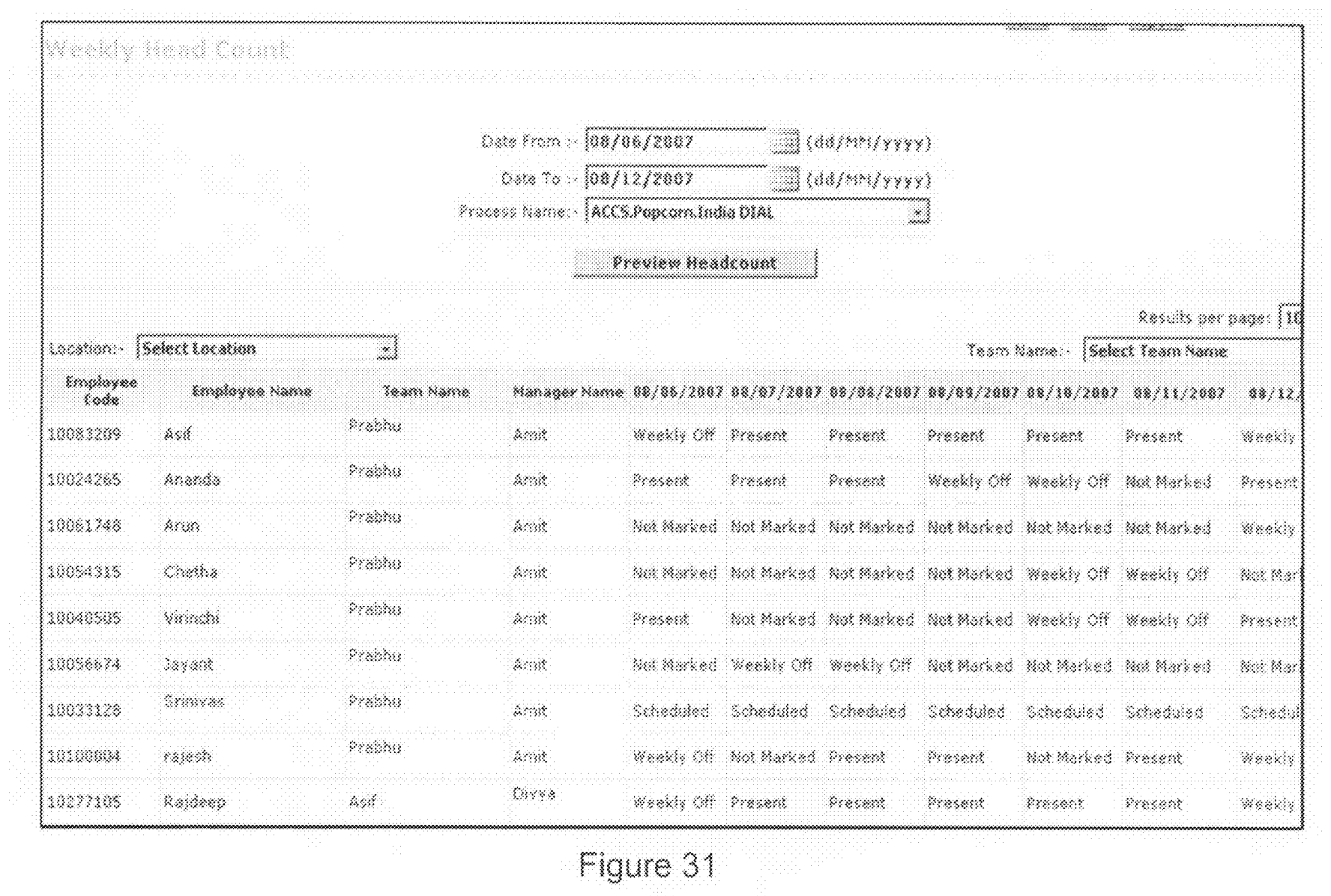

The HRIS application 128 may also include a head count report module. The head count report module provides interfaces for reporting head count as well as the movement details for a selected process and date range. The head count report module may provide a movement type filter. FIGS. 31 and 32 show examples of GUI screens for roster management.

Figure 33:
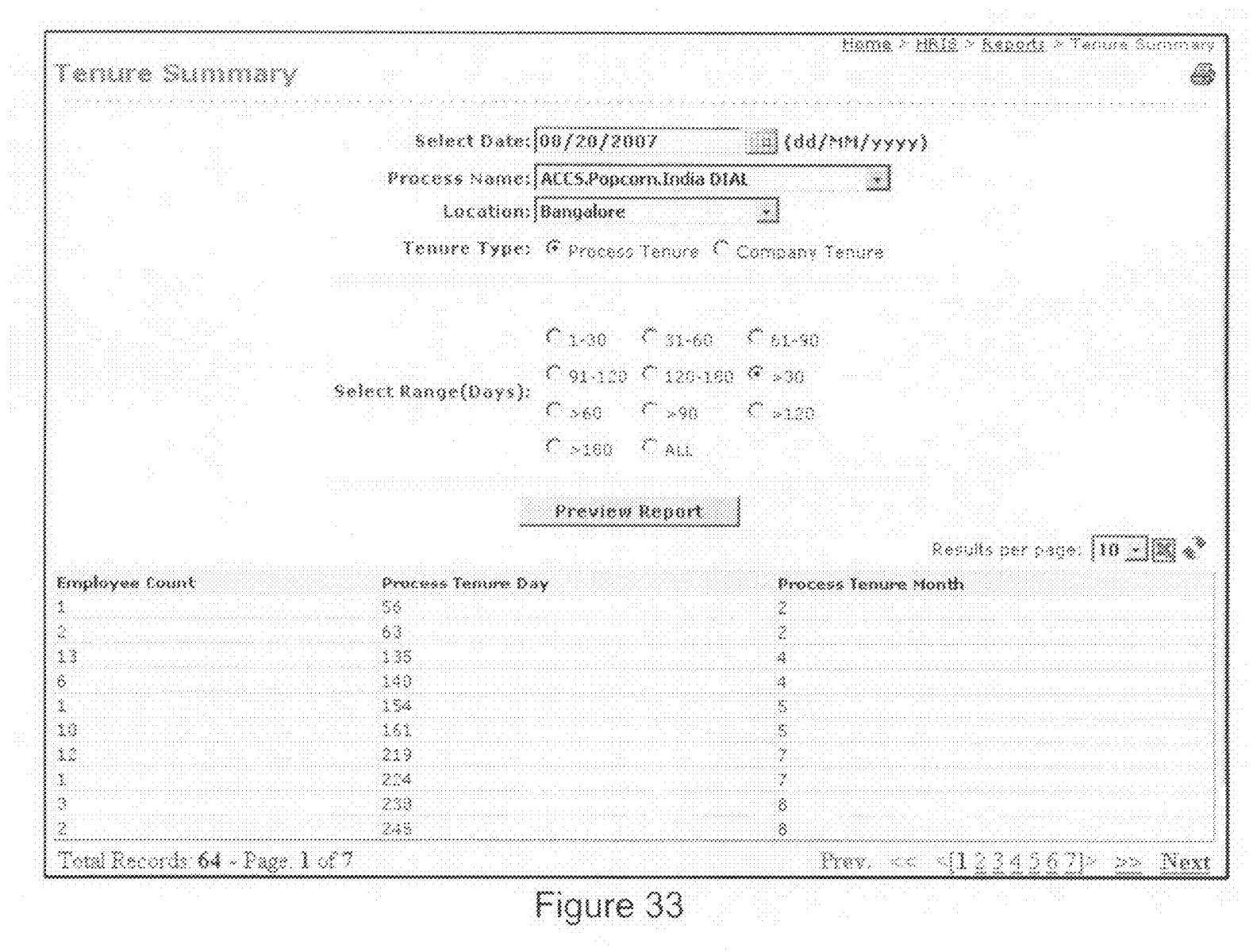
Figure 34:
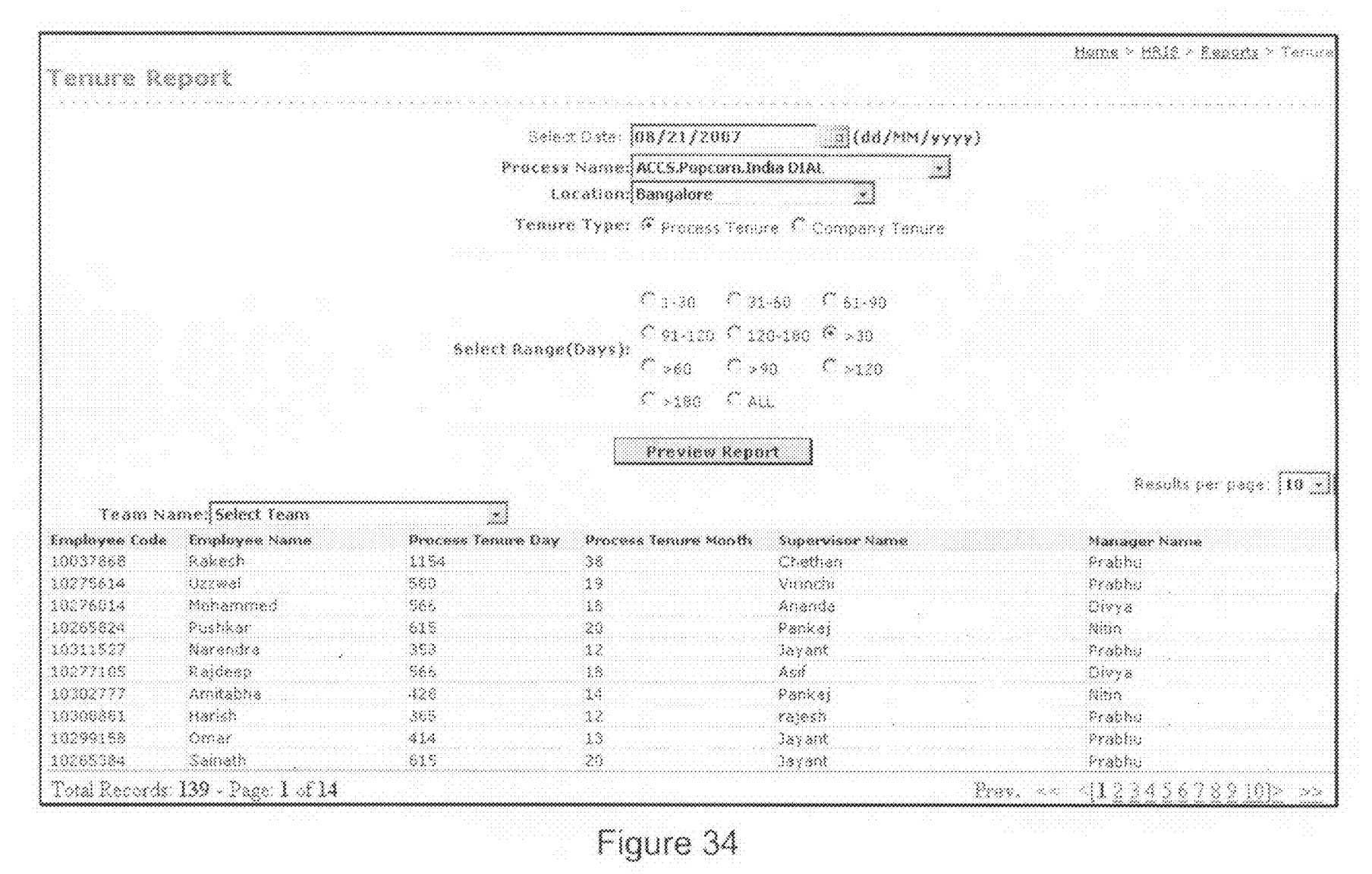

The HRIS application 128 may also include a tenure summary report module. The tenure summary report module provides interfaces for reporting employee count by tenure. The tenure summary report module may also provide filters on the following options: date range, process name, location, tenure type, and tenure range (by number of days). A tenure report module may provide details of employees on a selected tenure range. Data may be segregated by the following filters: date range, process name, location, location type, tenure type, and tenure range (number of days). FIGS. 33 and 34 show examples of GUI screens for tenure summary and reporting.

This attrition application 114 tracks attritions happening in the organization. This information is utilized by Human Resource people to view attritions in a particular process. Attritions may be of three types: managed, unmanaged and absconding. There can be various reasons for attritions, such as further studies or education, family issue, issue on growth prospects, interested in other fields, want to move out of contact center/BPO, facing the management issues, got better prospects, fraudulent certificate, health reasons, absconding, personal reasons, deceased and other reasons. FIGS. 35-38 show examples of GUI screens for attrition tracking and reporting. The attrition application module 114 may also provide attrition approval and denial interfaces and functionality, as shown in FIGS. 39 and 40.

Figure 41:
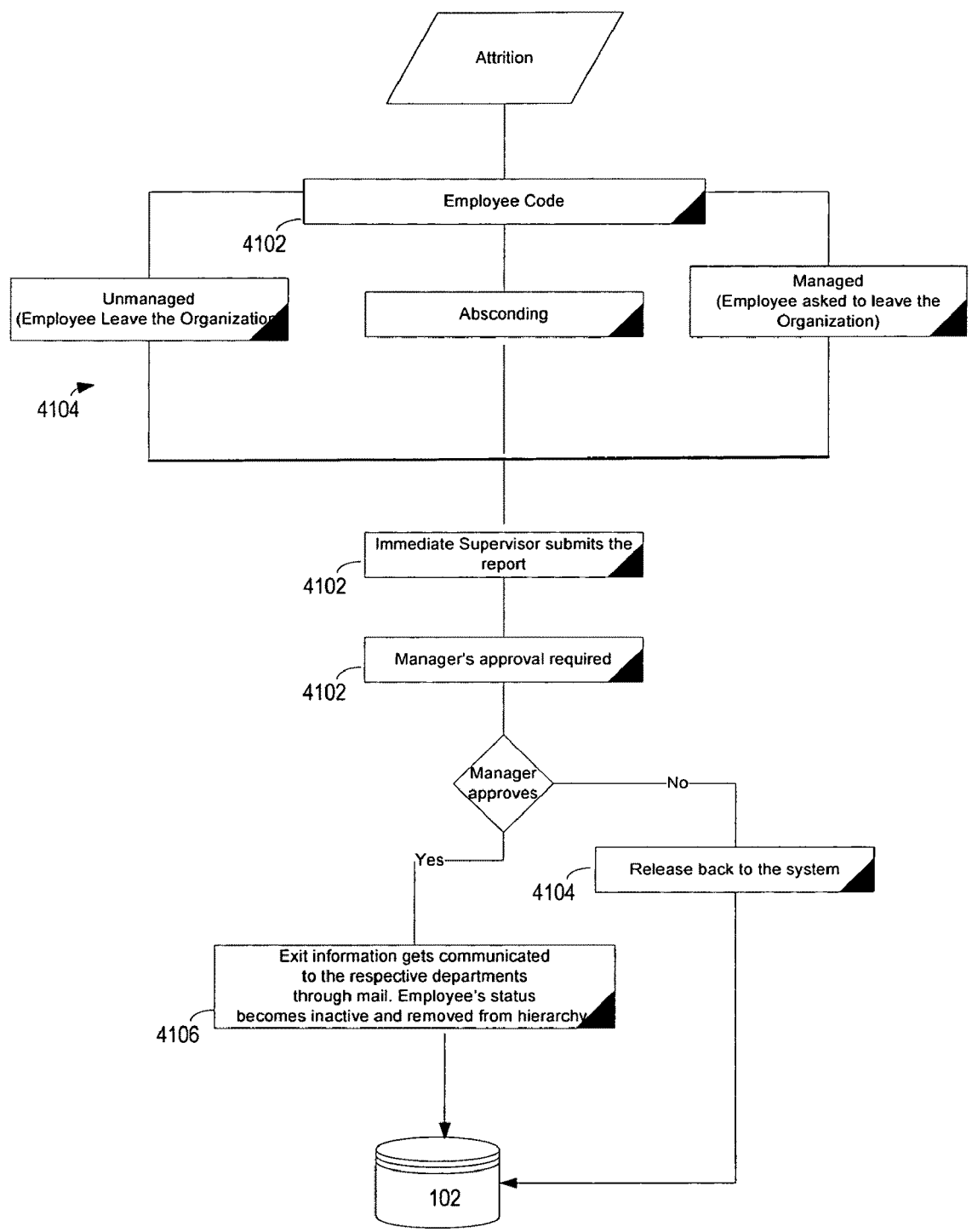
Figure 47:
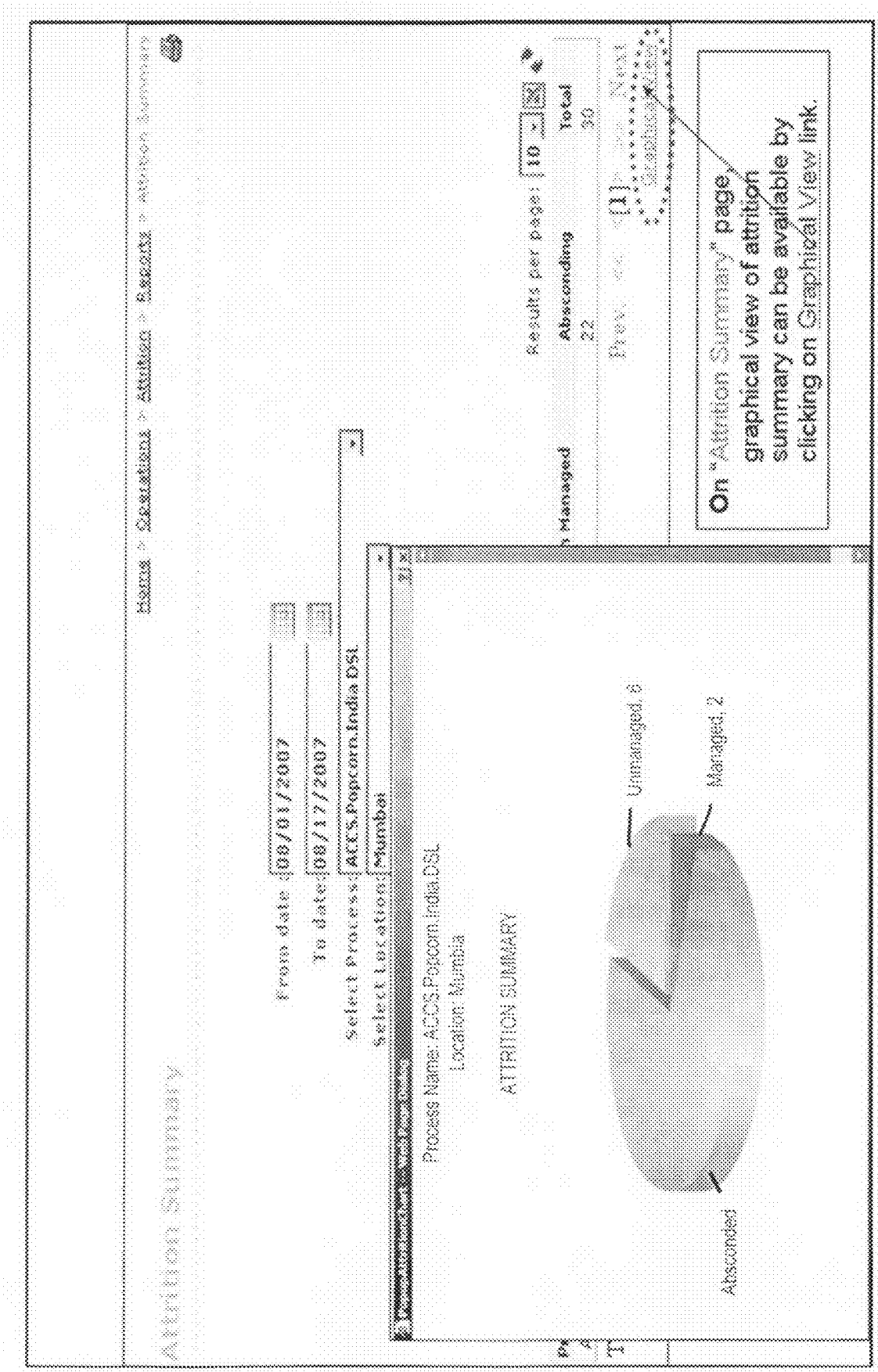

FIG. 41 shows a data flow diagram for the attrition application 114. Based on the employee code (4102), an attrition type is assigned (4104). An immediate supervisor submits the report (4104) and manager approval is obtained (4106). If the manager does not approve, the attrition record is released back into the system (4108), otherwise the exit information is communicated to the organizational departments, the employee status becomes inactive, and the employee is removed from the employee hierarchy (4106). The master application data repository 102 stores the result of the attrition action.

The attrition application 114 may also include an attrition report module that provides an interface through which attrition details may be obtained. The attrition report module may provide filters on: employee code, date rage, process name, location, and team name. FIG. 42 shows an example GUI for the attrition report module.

Figure 48:
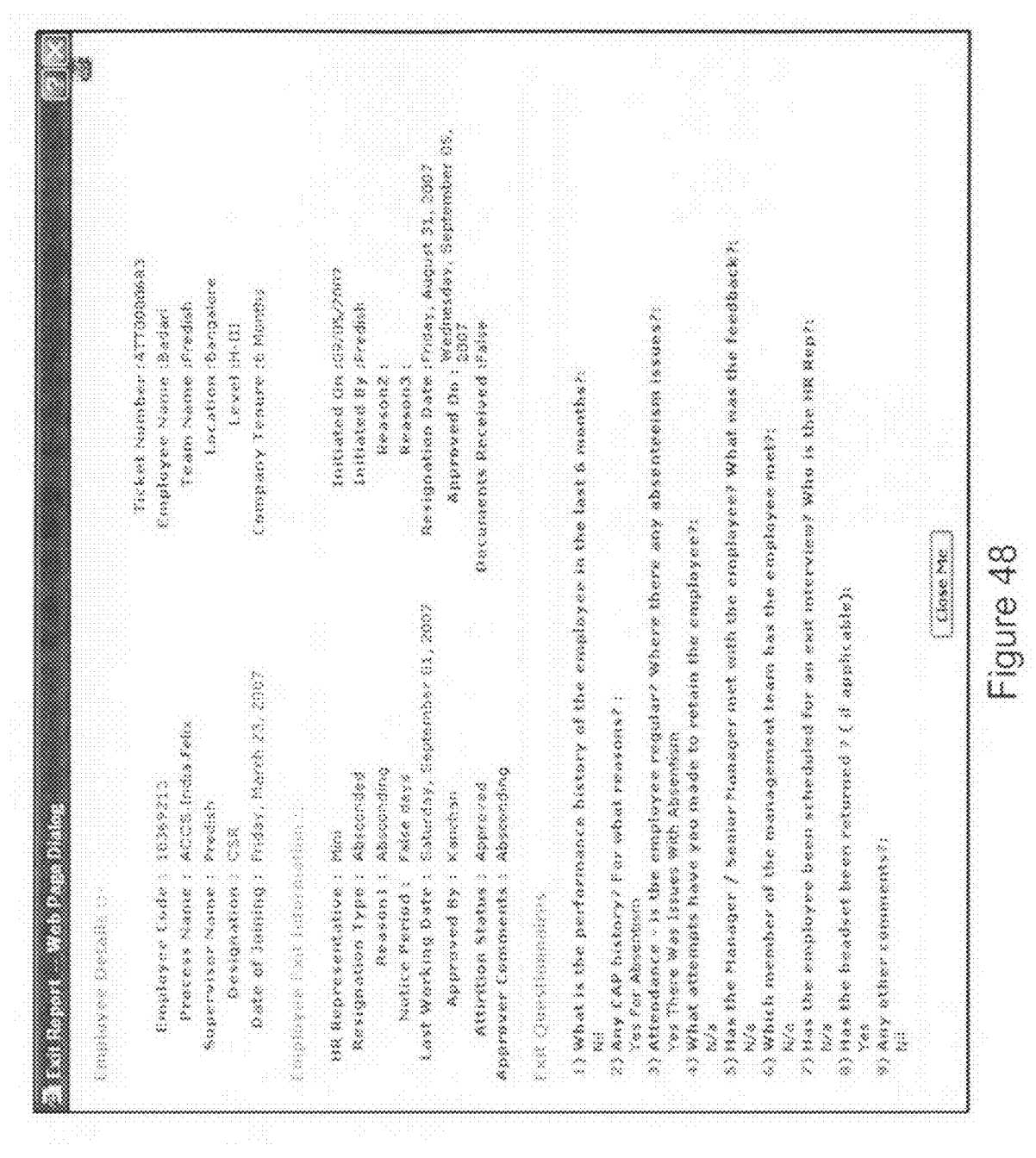

The attrition application 114 may also include an attrition summary module. The attrition summary module may provide an attrition summary report as an interactive report. Attrition counts from process level to agent level may be viewed and a graphical representation of attrition count and attrition summary may be obtained by clicking on a graphical view link. FIGS. 43-47 provide examples of GUI screens for reporting and processing attrition summary data. FIG. 48 provides an example of an exit report that the attrition application 114 may generate.

Figure 49:
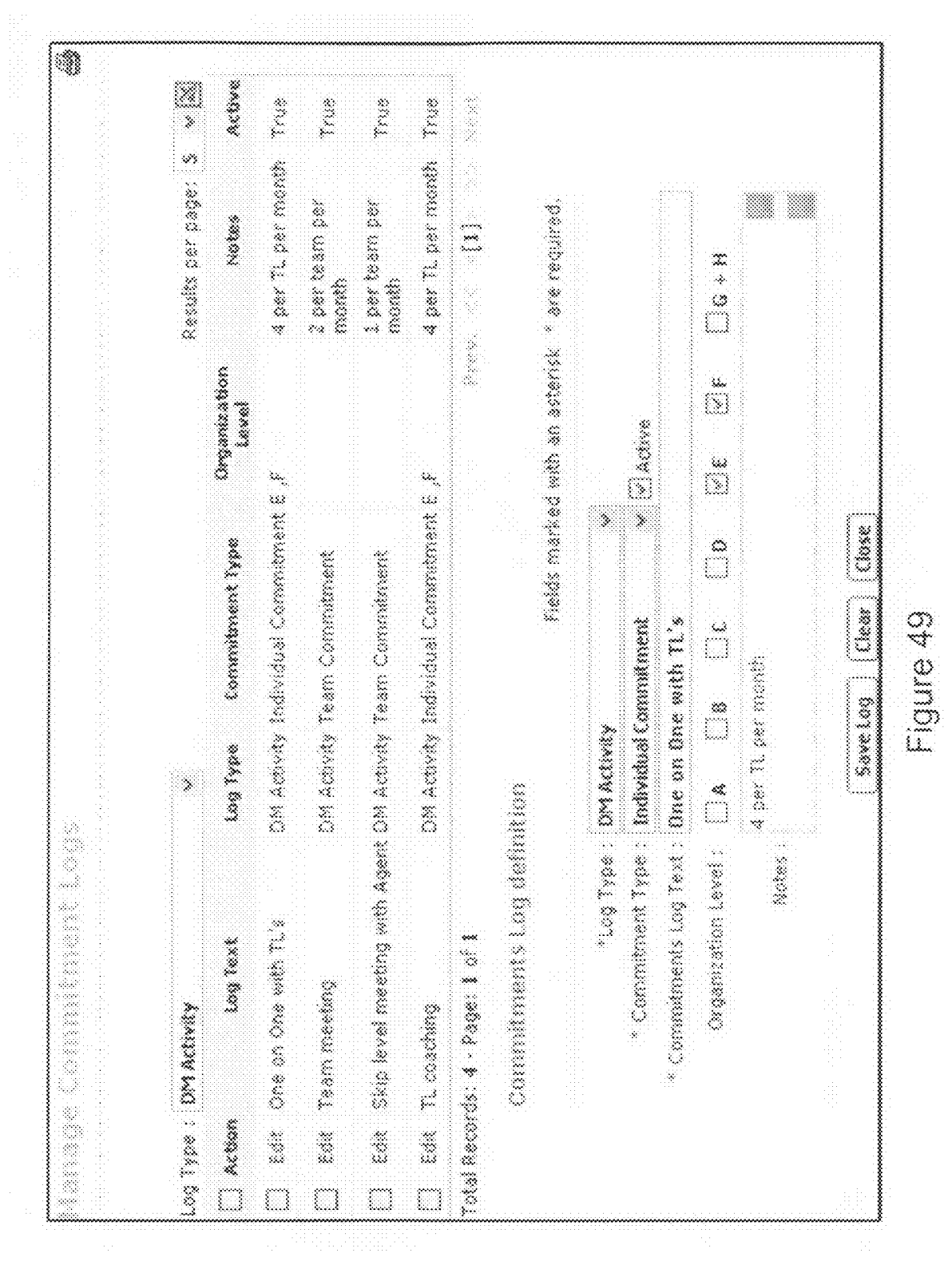

The commitment log application 112 tracks commitments that supervisors and managers set at the beginning of the month, and also tracks achievement of the same commitments. The commitment log application 112 may include a log management module that manages commitment logs according to the designations of TL (Team Leader) activity, DM (Deputy Manager) activity, OM (Operational Manager) activity, and other activity. Commitments may be set at combinations of criteria, such as designations and levels. FIG. 49 shows an example of a GUI screen for the log management module.

The commitment log application 112 may include a commitment target management module that facilitates the reporting and setting of commitment targets. FIG. 50 shows an example of a GUI screen for the log management module.

Figure 51:
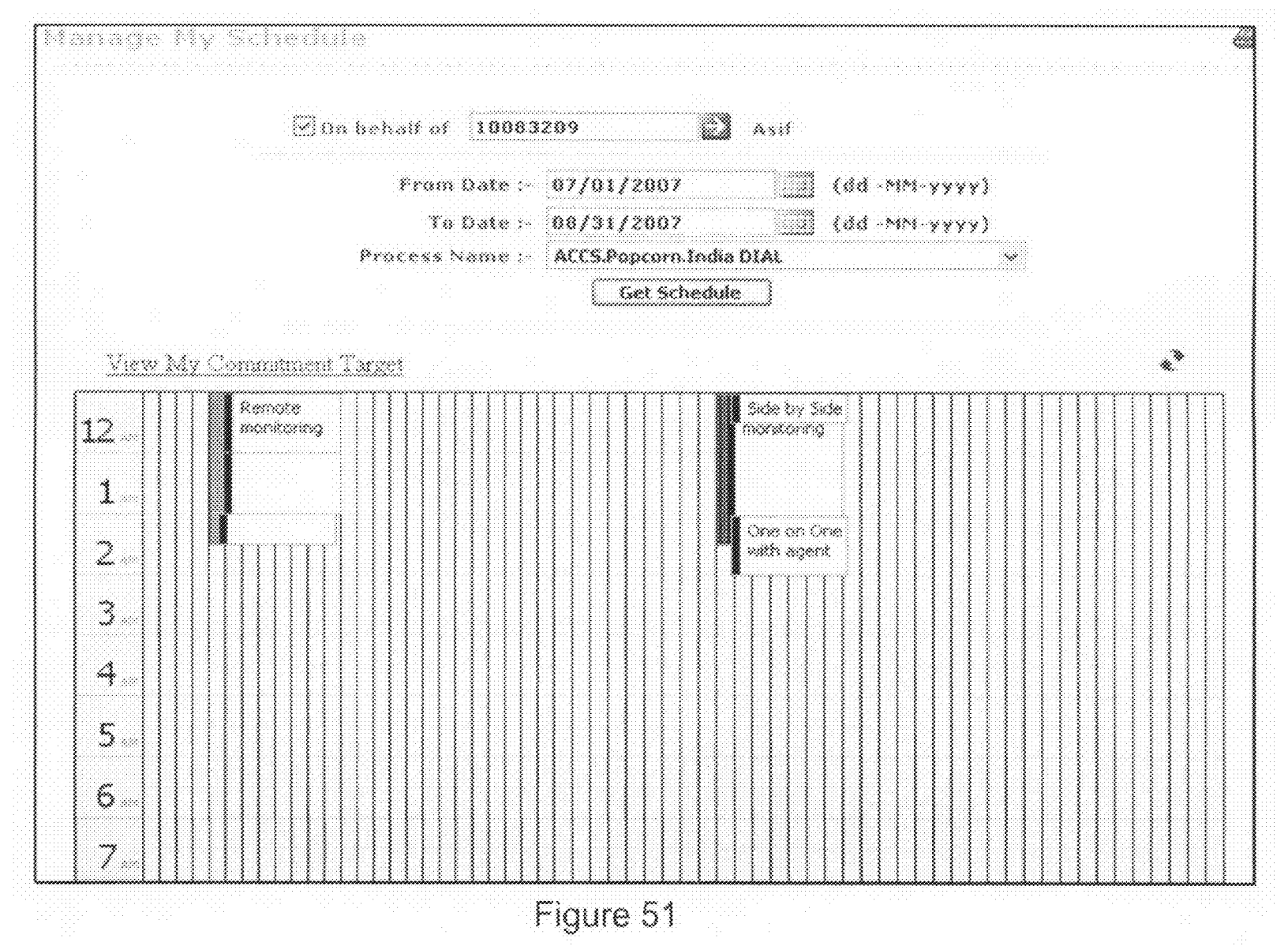
Figure 52:

The commitment log application 112 may include a schedule management module that is based on hierarchy for added flexibility. FIGS. 51 and 52 show examples of a GUI screen for the schedule management module. By clicking on the 'View My Commitment Target' link, users can view their individual commitment targets and targets achieved, such as in the report screen shown in FIG. 52.

Figure 53:
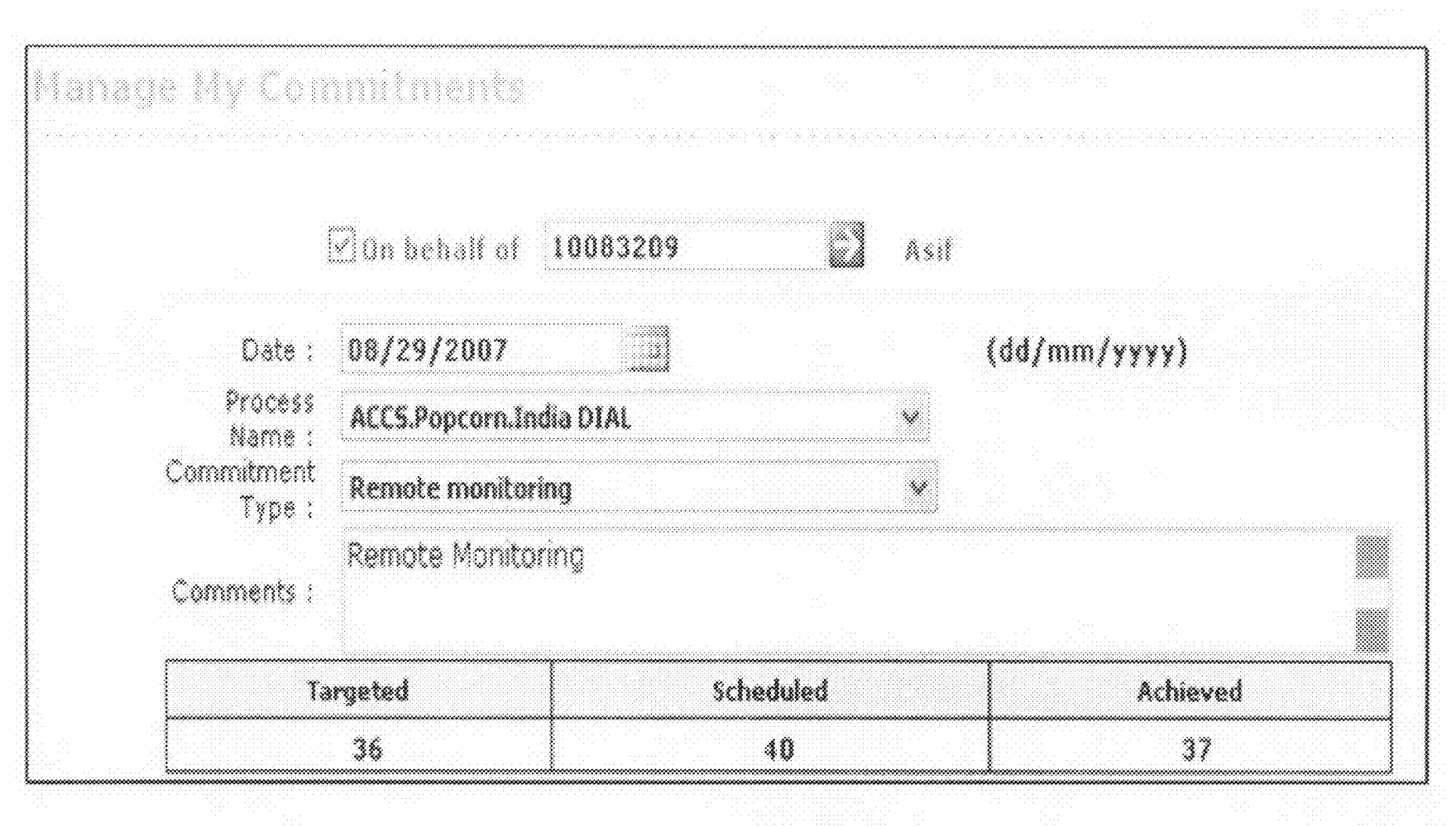

The commitment log application 112 may include a commitment management module for setting and managing commitment targets. FIGS. 53 and 54 show examples of GUI screens for the commitment management module.

Figure 55:
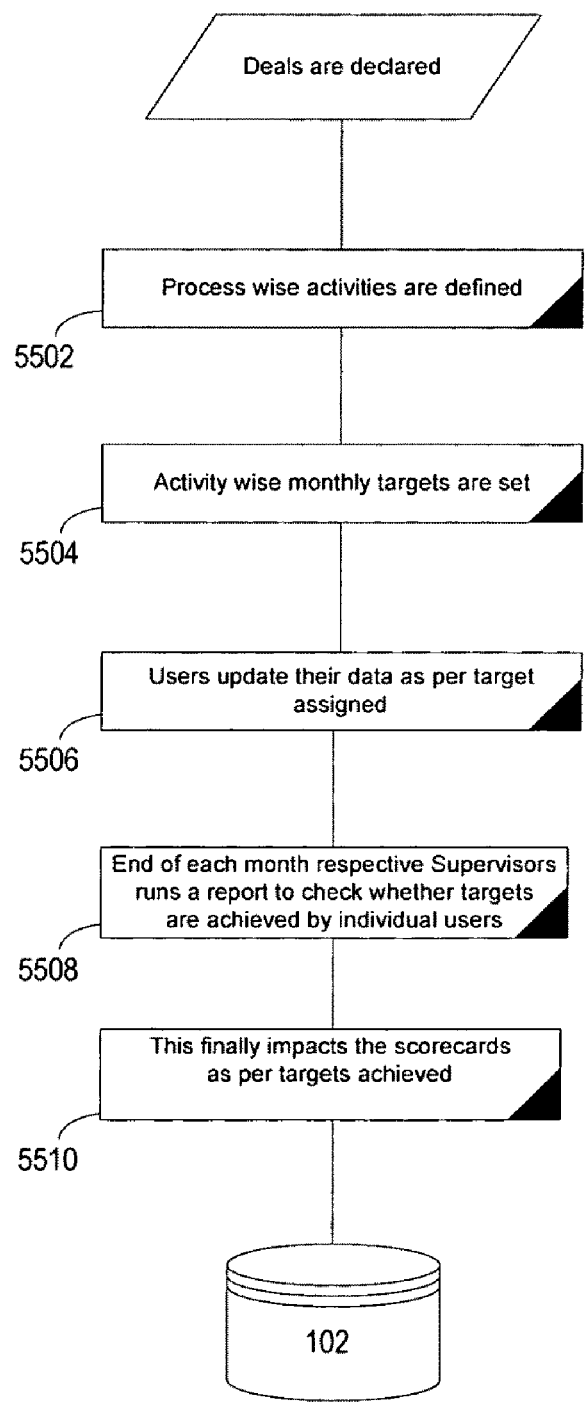

FIG. 55 shows the dataflow for the commitment log application 112. After call center activities for a deal are defined, process-wise activities are formally defined (5502). Then, activity commitment targets are set (5504), such as on a monthly basis. As employees meet commitments, the commitment target information is updated (5506). The supervisors may then run reports to check whether commitment targets are achieved by individual employees (5508). The commitment data drives scorecard reports, or other types of reports (5510). All of the commitment data, including targets and accomplishments may be saved in the master database 102, such as in the data schema specific to the commitment log application 112.

The commitment log application 112 may include a commitment summary module for reporting commitments achieved and set. FIG. 56 shows an example of a GUI screen for the commitment summary module.

The leave application 120 includes logic and interfaces that implements applying, approving, forwarding, and canceling leave requests. The leave application 120 may include a Vacation Planner module, a Leave Allocation module, an Approve Leaves module, a My Applied Leaves module, and a Leave Summary module. Each module is described below.

Vacation Planner

Employees may use the vacation planner to apply for leave by selecting a specific date range. FIG. 57 shows an example of the vacation planner GUI. Supervisors and above can also apply for leave on their team members' behalf by entering an employee code and clicking on the 'On behalf of' button 5802 shown in FIG. 58. While applying for leave on behalf of another user, the supervisor may to check whether the user name displayed in the employee field 5804 is correct for the person for whom the leave applies.

Figure 58:
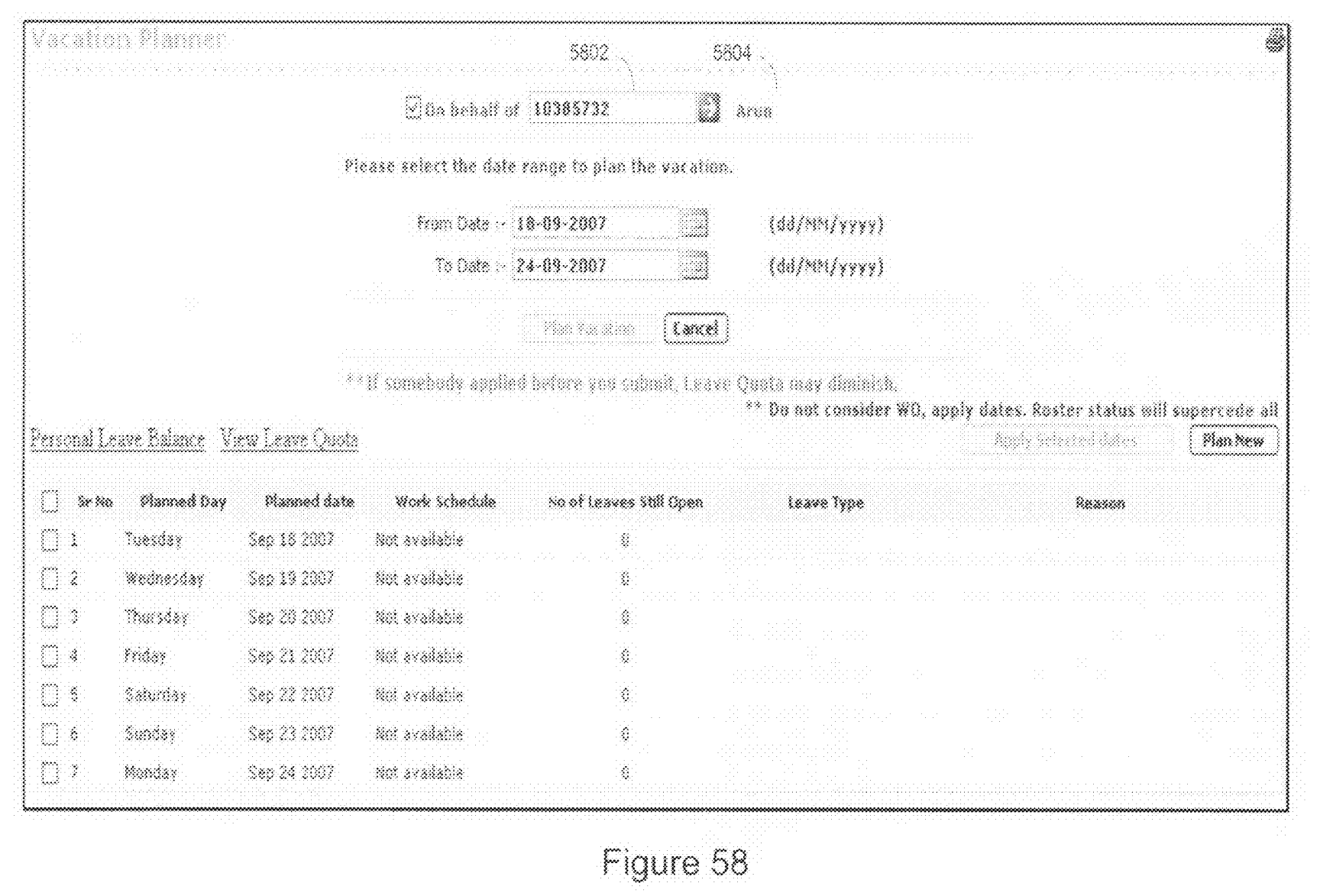

Once a date range is selected, the employee clicks on the 'Planned Leave' button 5702. The vacation planner may then display an interface as shown in FIG. 58, including a list of dates, and check this personal leave balance as well as quota available for the day. The employee may also set the type of leave and reason in the fields provided.

Leave Allocation

The leave allocation module may update process-wise head counts and leave allocation percentage for a specific date range. An example GUI is shown in FIG. 59. By clicking on the view allocation link 5902, the leave allocation module permits updates to level-wise leave quote for the specific process and date range, as shown in FIG. 60.

Approve Leaves

Figure 61:

The approve leaves module implements interfaces through which leave tickets can be approved by supervisors and above for their respective team members, as shown in FIG. 61. To approve leave, the supervisor clicks on the Ticket Number link 6102. Data can be filtered through search criteria such as employee code, process name and team name. On clicking the Action Selected Items button 6104, the next screen, Leave Details will appear as shown in FIG. 62. Supervisor may select any of the options from the drop down list of action to cancel leave, approve leave, forward the request to another for action, or other option.

My Applied Leaves

Figure 63:
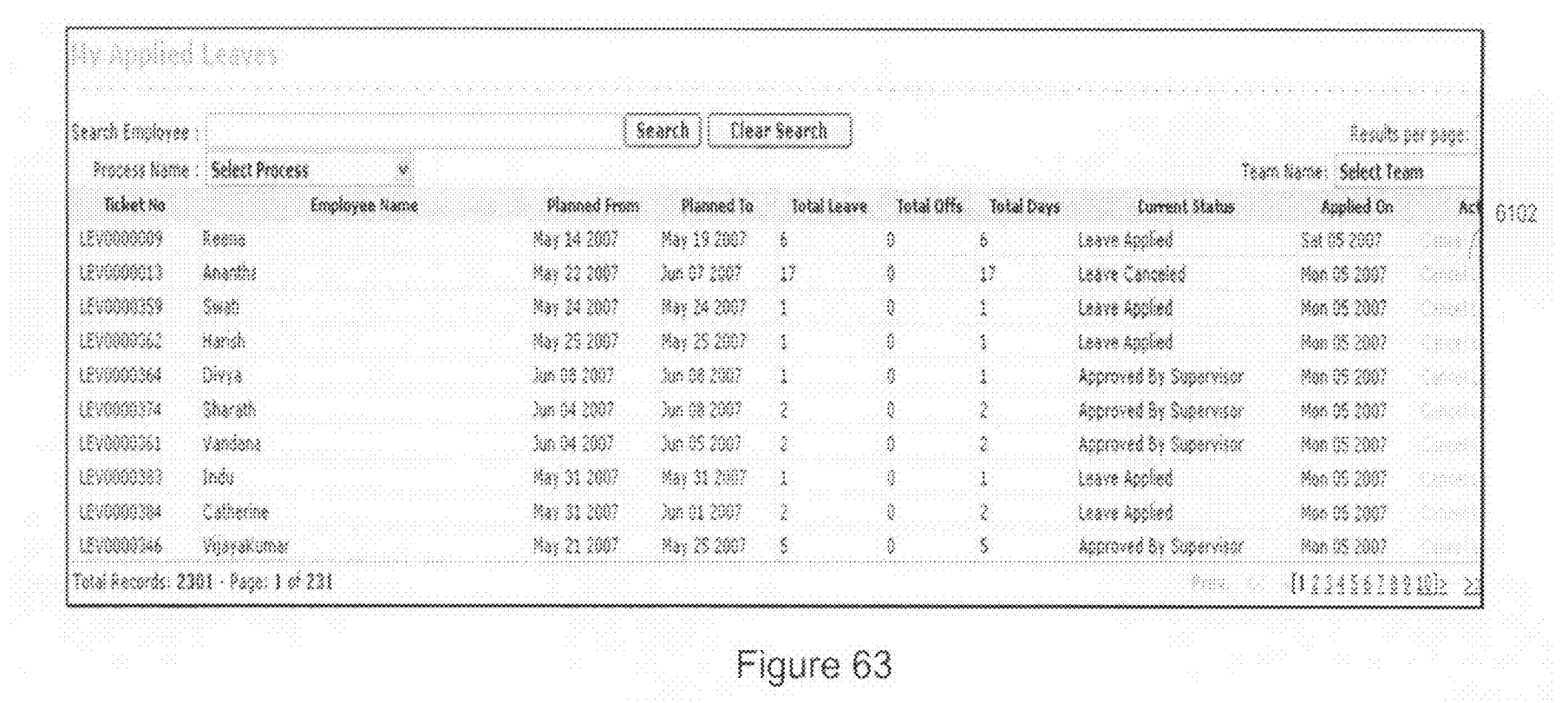

Employees may use the My Applied Leaves module to check the status of leave tickets they have submitted. An example GUI is shown in FIG. 63. By clicking on the Cancel Leave link 6302, the employee can cancel applied leave.

Leave Summary

Figure 64:
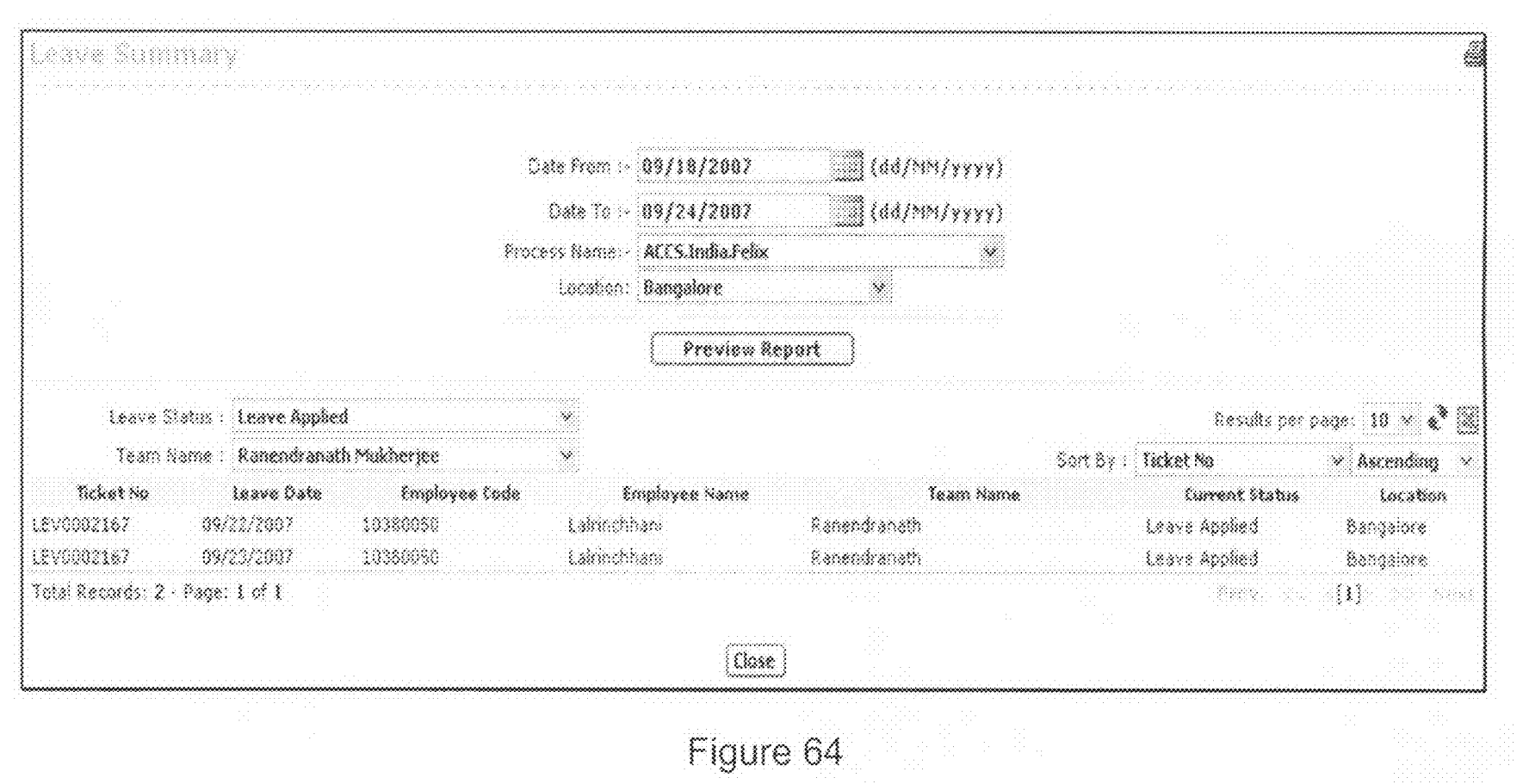

Leave application details are obtained from the leave summary module. The module may implement a GUI as shown in FIG. 64, including filters for date range, process name, location, or other characteristics.

Figure 65:
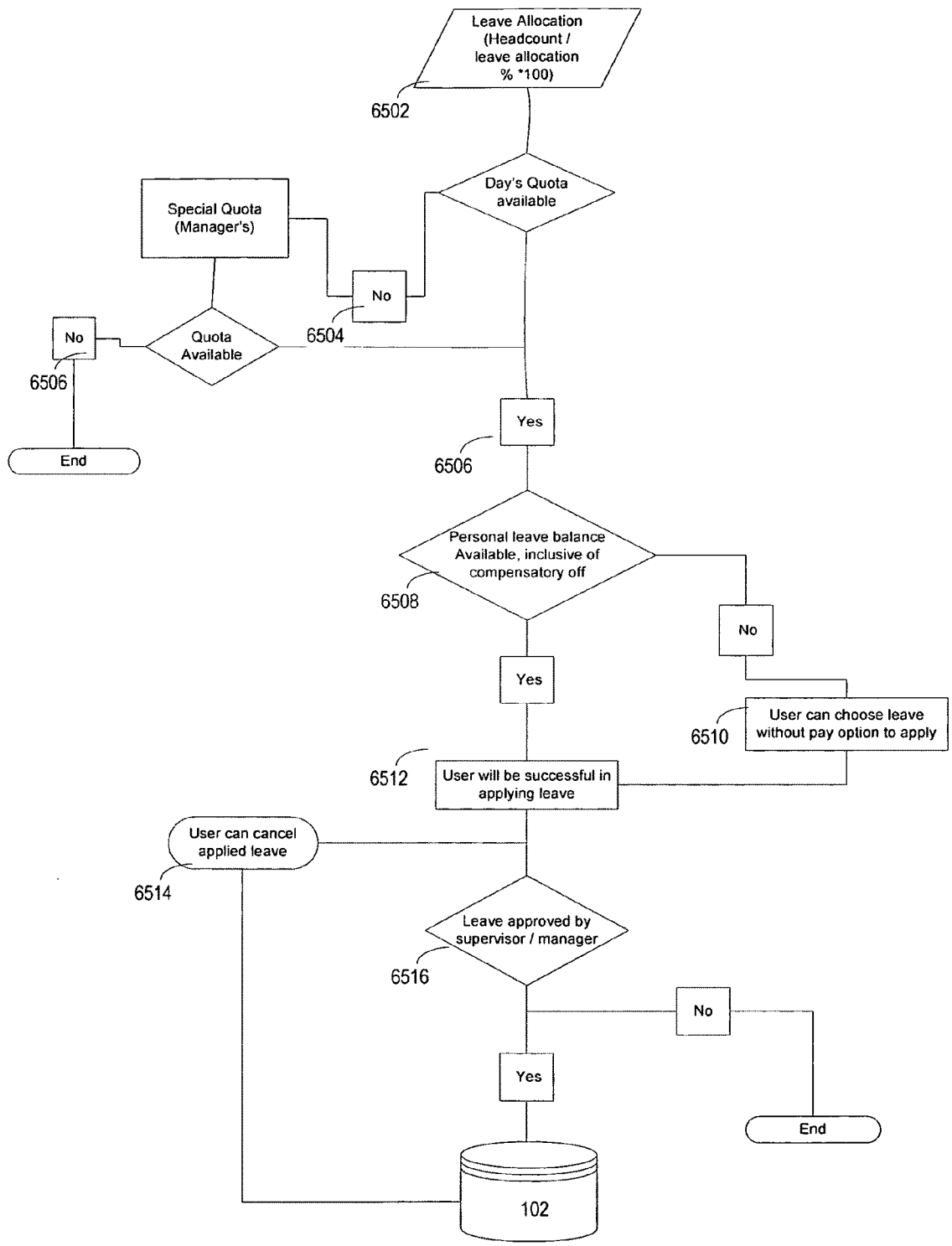

FIG. 65 shows a data flow diagram for the leave application 120. The leave application 120 may determine the current leave allocation (6502) and determine whether the to approve leave depending on quota available. For example if quota is not available for the day (6504) and the manager has no remaining special quota (6506), then leave is denied. Otherwise (6506) the leave application 120 may determine whether any personal leave balance is available (6508).

If leave is available, the leave application 120 may approve the leave (6512), otherwise the employee may select to try to have leave without pay approved (6510). The employee may cancel leave, as desired (6514). Otherwise, leave may be approved (6516). The related leave data stored in the data schema specific to the leave application 120.

Figure 66:
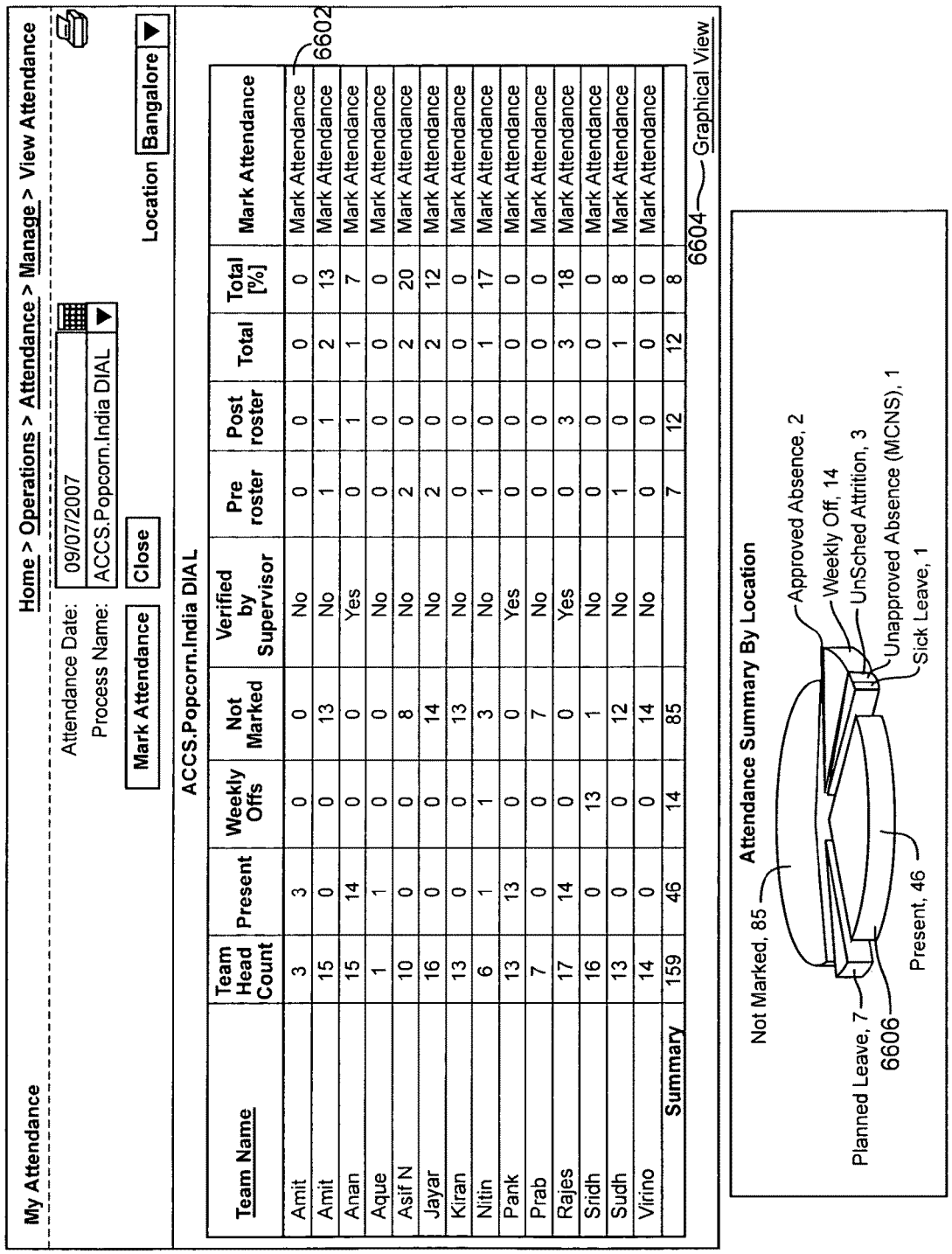

The Attendance application 122 implements logic and interfaces that manage attendance, verify attendance, and report attendance. For managing attendance, the interface shown in FIG. 66 shows the scheduled team names for the selected process and date. The supervisors can mark attendance by clicking on the link, Mark Attendance 6602. By clicking Graphical View link 6604, users can get graphical representation of the attendance status data for the selected date and process, e.g., as a 3D pie chart 6606. Data can be filtered by location.

For verifying attendance, the interface shown in FIG. 67 allows supervisors to mark attendance of their respective team members. The interface also provides for marking attendance in real time by team in the absence of the supervisor/alternate supervisor. In addition, personal, compensatory off, and sick leave balances of the users are adjusted through daily attendance.

Figure 68:
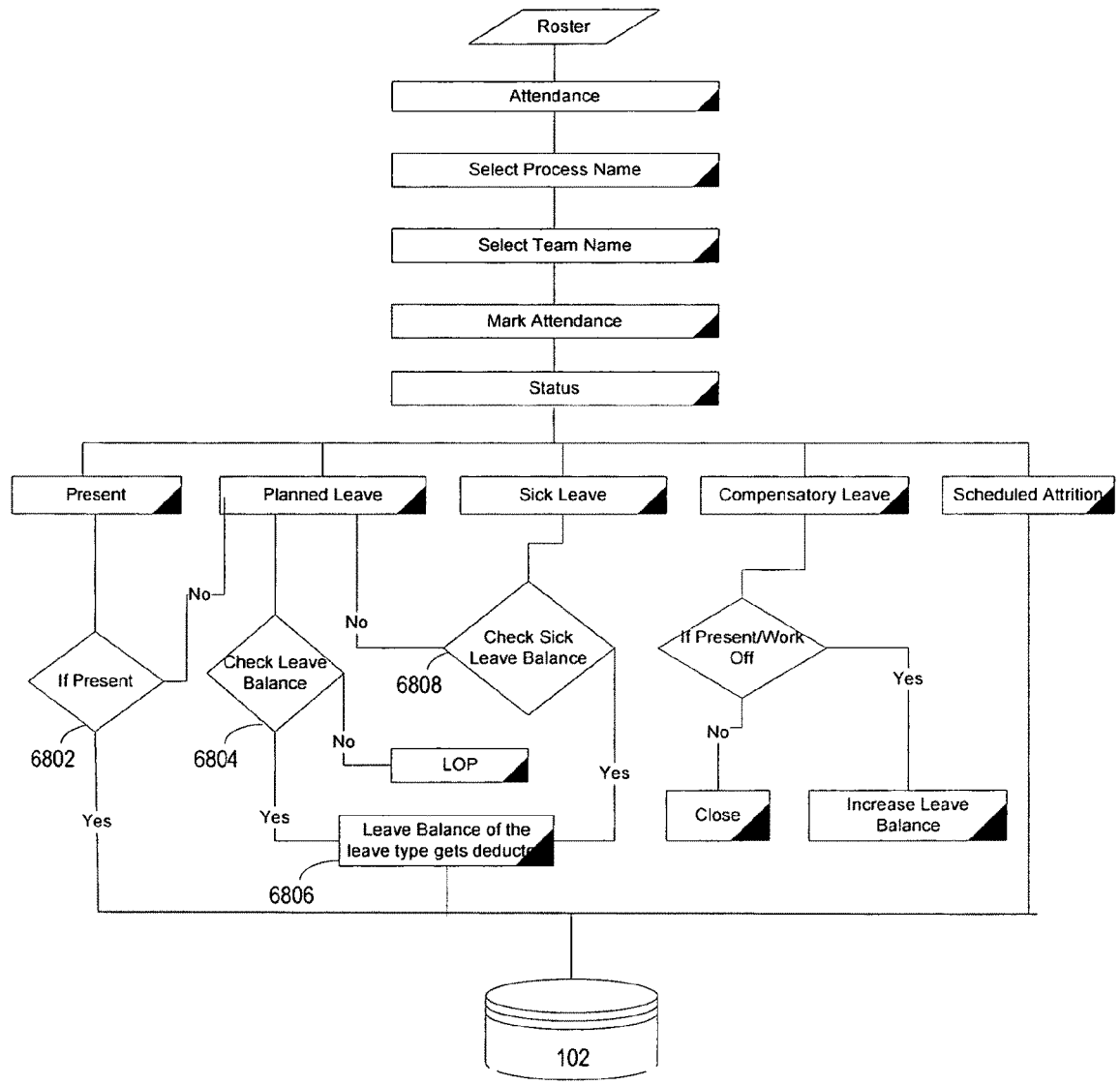

FIG. 68 shows data flow for the attendance application 122. In particular, attendance status of various types is tracked and stored in the data schema specific to the attendance application 122. For example, if the employee is present (6802), that status may be stored. If the employee is not present, then the attendance application 122 may determine whether the employee has planned leave. If so, and the employee has remaining leave balance (6804), then the planned leave balance is reduced accordingly (6806). If the employee is on sick leave, the remaining sick leave balance is reduced accordingly as well. If no sick leave remains (6808), then the attendance application 122 may deduct planned leave, if any is available. If an employee is absent, but no leave balance remains, a supervisor may be notified, or the matter may be escalated for review. On the other hand, if an employee is scheduled for compensatory leave, but is working, then leave balance may be increased accordingly (6810).

Figure 70:
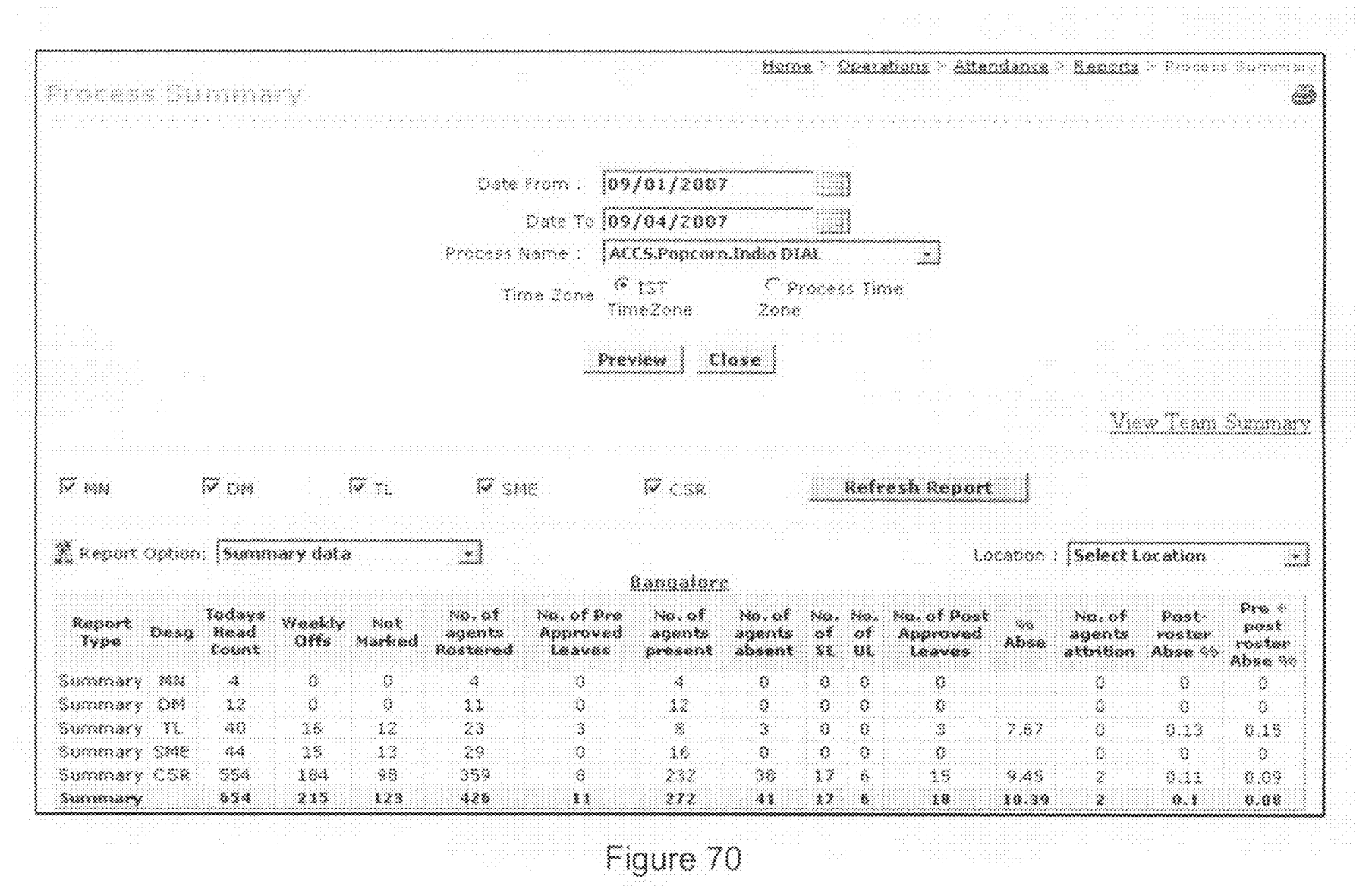
Figure 71:
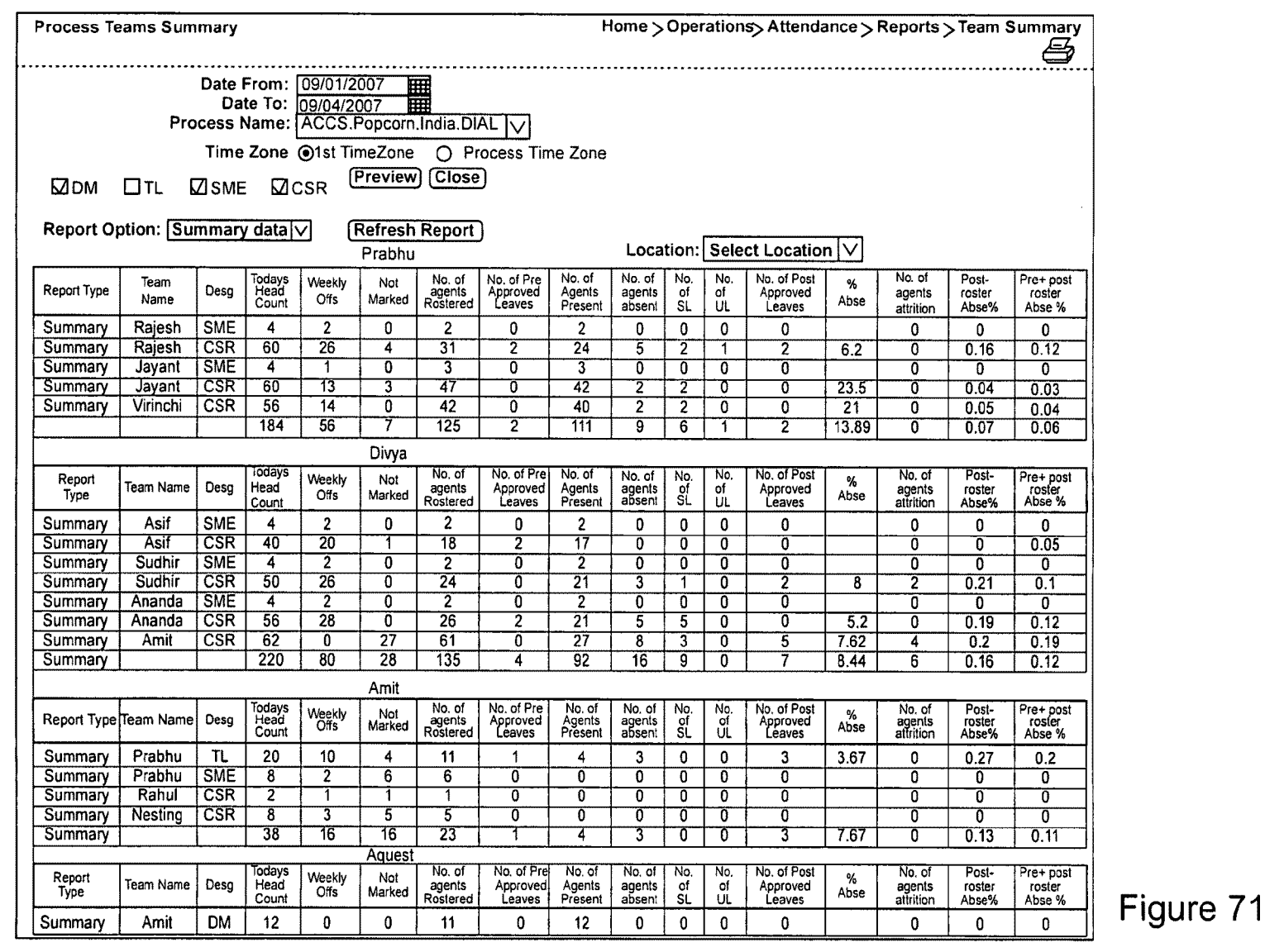

The attendance reporting module may implement interfaces that report process head count, with filters such as: date range, process name, time zone, and location. FIG. 69 shows an example GUI for attendance reporting. FIG. 70 shows a process summary GUI and FIG. 71 shows a team summary GUI.

My Oneview

The employee information access application 136 ("My OneView") is designed for employees of the organization. Each employee within the organization may have access to this application. In one implementation, My OneView includes the following modules: My Oneview Issues, My Contact Details, My Leave Balance, My Favorite Links, My Notes, My Attendance, Change Password, My Team Hierarchy, Search Employee, My Schedule, My Business Ids, View Holiday List, My Team Contact Detail, and Manage Team Contact. Additional, fewer, or different functional modules may be implemented.

The My Oneview Issues module logs issues that the employee has encountered using the system. FIG. 72 shows an example of a GUI for the module. When the employee himself is raising an issue, then his credentials are shown in the respective text boxes. The GUI provides for entry/selection of location, the problem summary and the detailed issue description.

The module also facilitates raising an issue on behalf of any other employee. When the check box 7202 ('on behalf of') is checked, then a textbox is displayed. In the text box, the employee may enter an employee Code of the employee on behalf of whom he is raising this issue. When the employee code is entered, the GUI shown in FIG. 72 updates to show the credentials of the employee on behalf of whom the issue has been raised, rather than the employee logged into the module.

The My Contact Details module permits an employee to keep and update contact details. The employee may select contact type, such as Correspondence address or Permanent address. The employee may enter his respective address in the textbox and then make selections for City, State, Country and Area. The employee may also enter a Postal Code and Landline Number, Mobile number, Fax number and whether he requires transport (e.g., to or from the workplace) or not. After completion the contact details are sent for supervisor approval and stored in the database 102. The transport application 124, HR department, or other area may process this information to determine, for example, car-pooling arrangements for employees. FIG. 73 shows an example of the GUI for entering contact details.

The My Leave Balance module displays a GUI (e.g., as shown in FIG. 74) that may be read-only and that describes the leave balance of the employee. The GUI may show Leave type (e.g., Compensatory, Optional and Fixed) and the leave balance for the particular leave type. The detailed employee information (e.g., name, process name, supervisor name, team name, and the like) is also displayed for which the leave balance is being shown.

Figure 75:
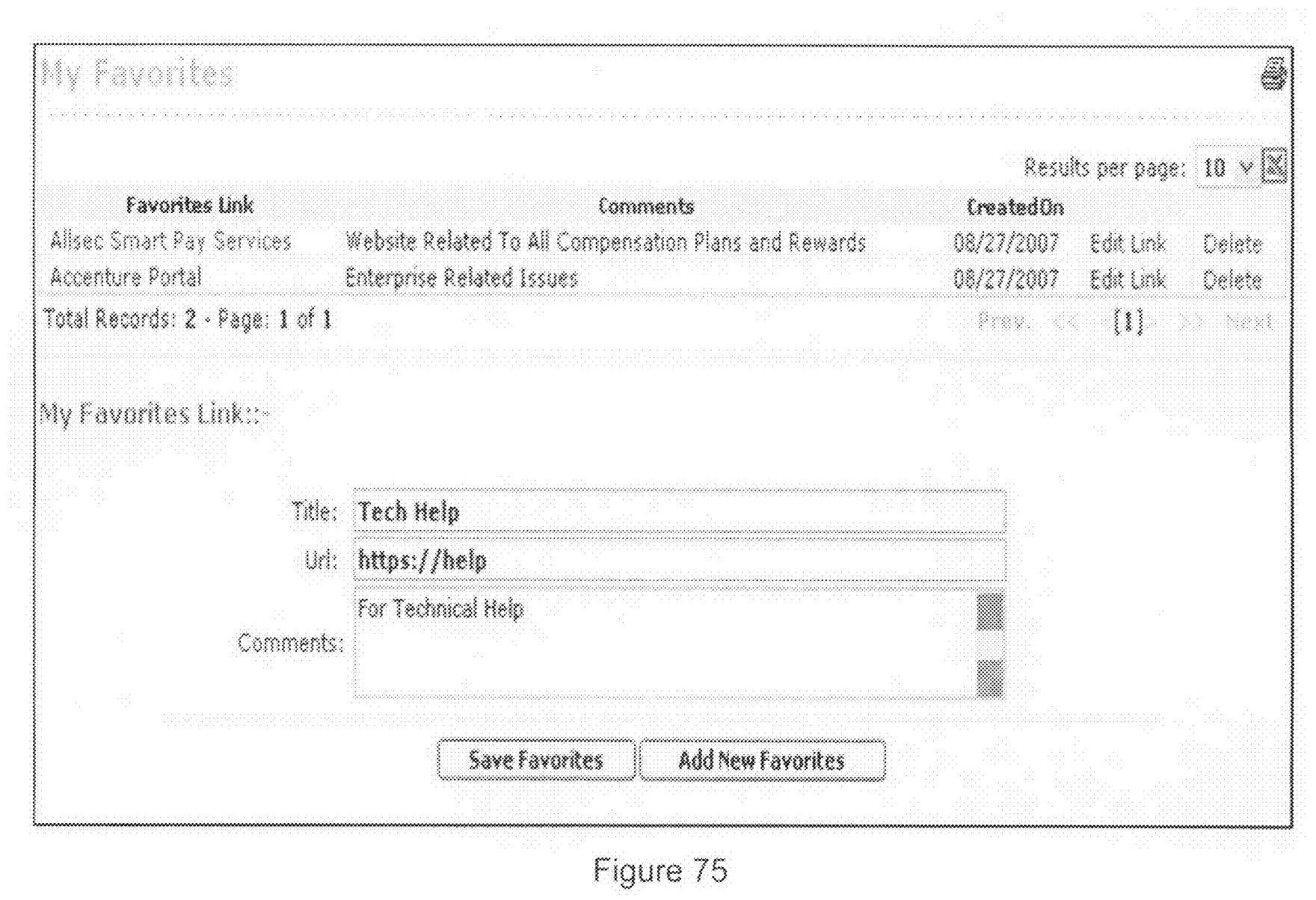

The My Favorite Links module tracks an employee's favorite links. The employee may enter the URL, title and comments for the links. The contents of the above mentioned fields can be edited or deleted from the Edit and Delete links respectively, as shown in the GUI in FIG. 75.

Figure 76:
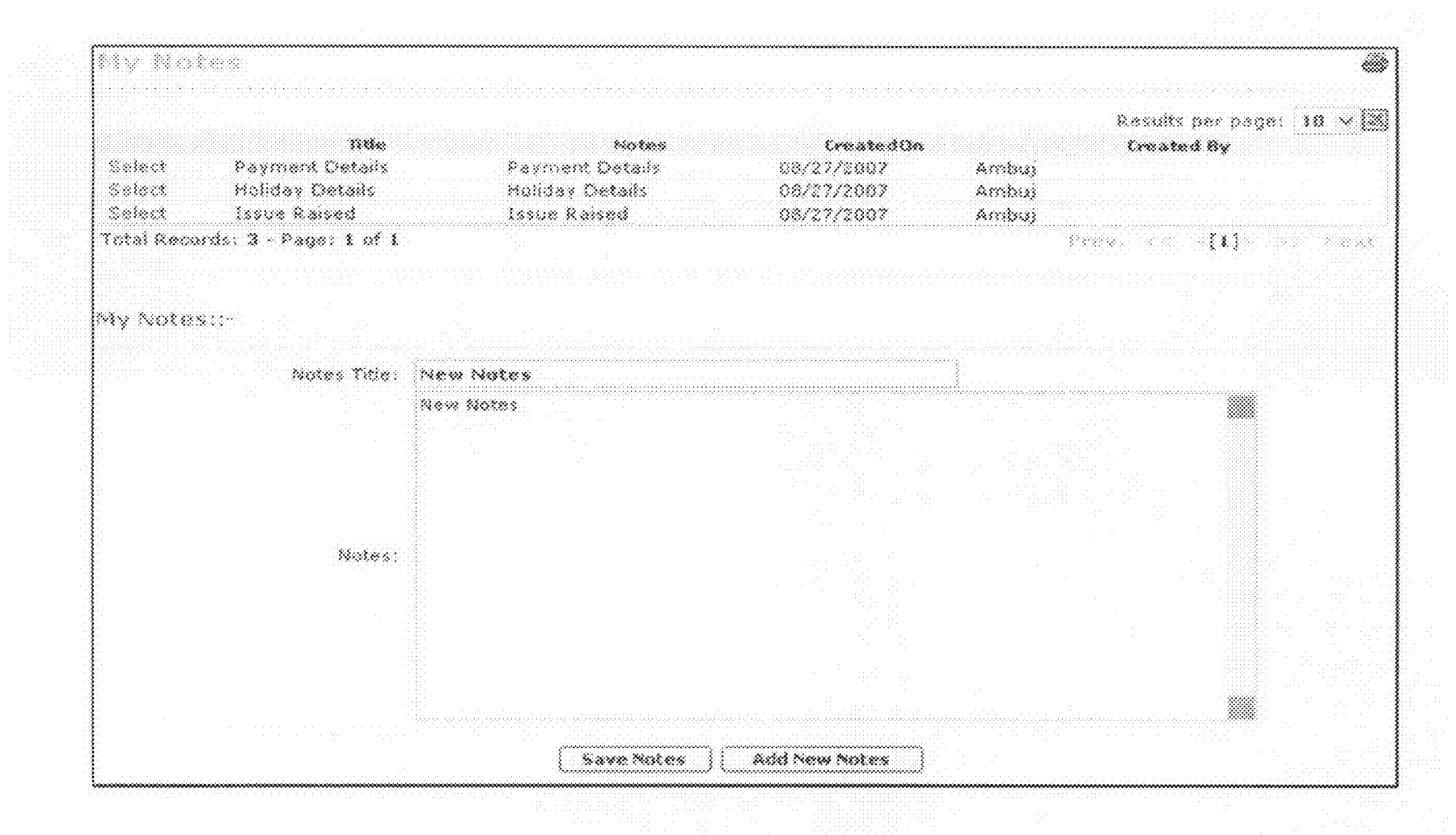

The My Notes module tracks an employee's notes. The employee may write the title of the note, and enter the detailed note itself. The GUI may provide for editing the note as well. An example GUI is shown in FIG. 76.

The My Attendance module accepts employee input to mark his or her attendance. The detailed employee information is also displayed along with the shift details. An example GUI is shown in FIG. 77.

The Change Password module facilitates changing the password of a guest user, such as a non-employee or a contract employee. An example GUI is shown in FIG. 78.

The My Team Hierarchy module generates a view of team hierarchy based on the Team Name. The module also sorts based on criteria, such as Location, Process name, and Team name. Other sort criteria include company tenure (e.g., in months) and arranging the records in ascending and descending order. Upon finding the team member detail, the module accepts a team member name selection and then retrieves the team member hierarchy and network details. FIG. 79 shows an example GUI.

The Search Employee module searches for an employee within the organization. The module may search based on employee code for the employee whose details are being searched. The module may then present the employee details, such as Hierarchy Details, Network Details and Version Information. The module may use a GUIs such as those shown in FIG. 80.

The My Schedule module displays views of attendance, weekly offs, and other schedule information of the employee based on the roster. The module will also display the detailed employee information for the schedule. FIG. 81 shows an example GUI for the module.

Figure 82:
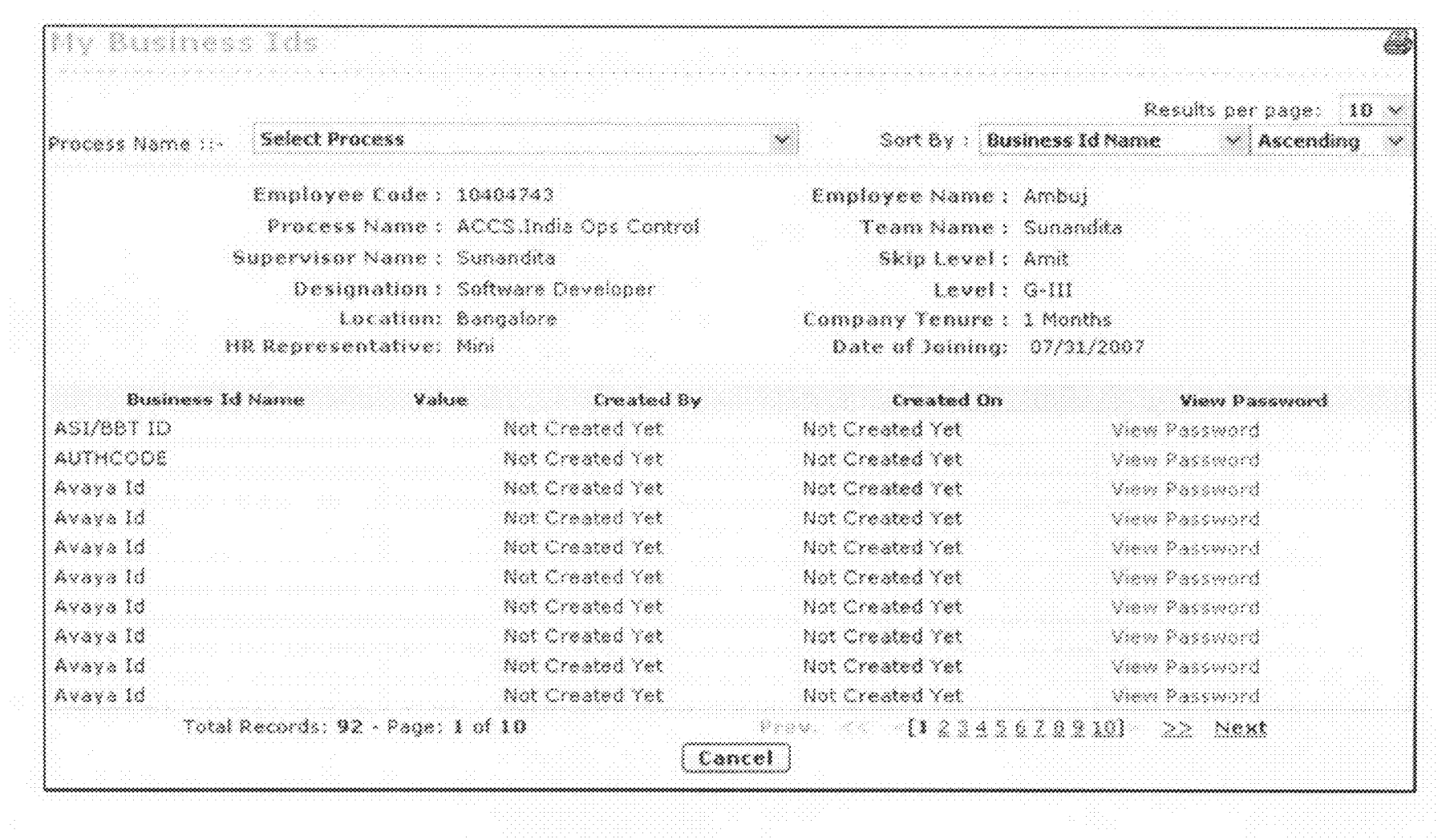

The My Business IDs module displays views of the employee's different Business IDs. The module sorts IDs on the basis of process name and also on the basis of business IDs, and in ascending and descending order. The module also displays the detailed employee information, as well as the password for various business IDs. FIG. 82 shows an example GUI for the module.

The View Holiday List module presents views of the list of holidays. The module sorts on the basis of holiday type, which may be either fixed or optional types. The module also sorts on the basis of location and calendar year. The module also shows the detailed information for the holiday, such as date, holiday name and holiday type. FIG. 83 shows an example GUI for the module.

Figure 84:
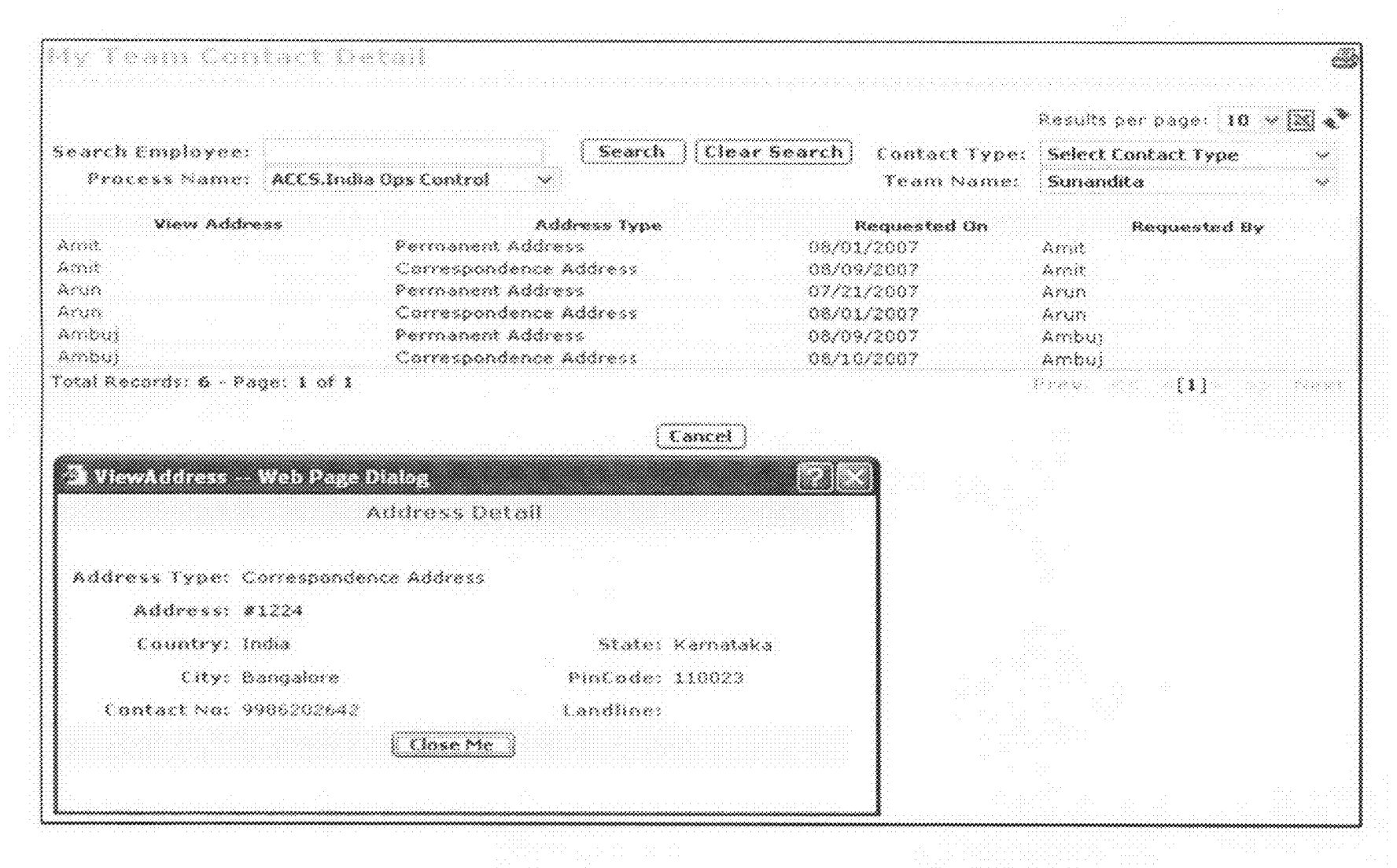

The My Team Contact Detail module displays the contact details of a team. The module may sort on the basis of process name and team name, or other criteria. The module may also sort based on the contact type which may be temporary correspondences or permanent contacts. The module responds to a click on the employee name with a window popup showing the contact address of the employee based on the sort criteria. FIG. 84 shows an example GUI for the module.

Figure 85:
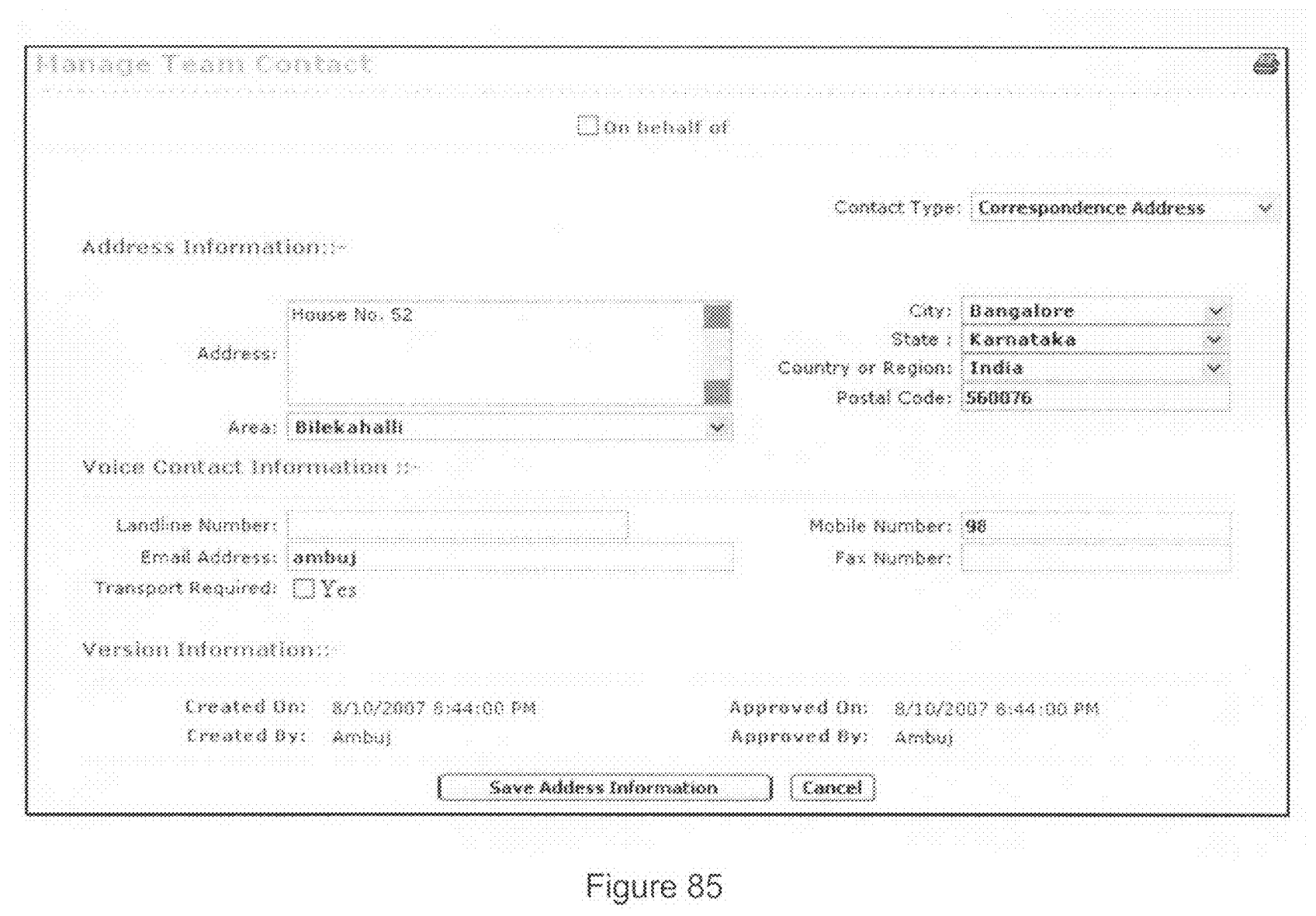

The Manage Team Contact module facilitates management of team contacts. In particular, a supervisor may employ the module to update contact information for members of his or her team. The module may accept a selection of contact type, such as Correspondence address or Permanent address. The supervisor may then enter the address information in the textbox and then make various selections for City, State, Country and Area. The supervisor may also enter the Postal Code, Landline Number, Mobile number, Fax number and whether the employee requires transportation or not. The completed information may be sent to the supervisor for approval, and may be used by the transportation application, or other applications for determining car-pooling schedules or other transportation decisions. FIG. 85 shows an example GUI for the module.

Figure 86:
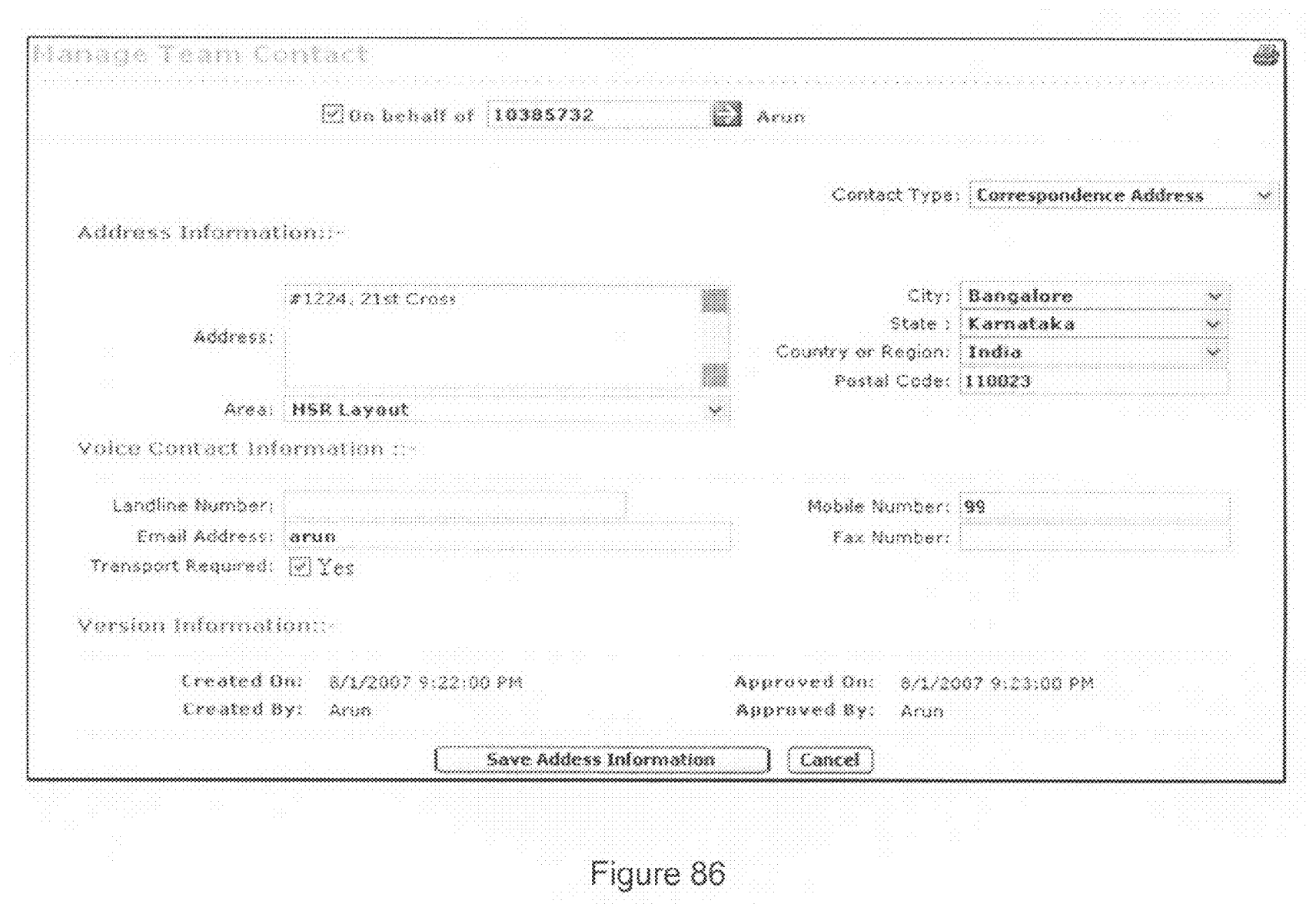

The module also permits management of a team contact on behalf of any other team member. When the check box ('on behalf of') is checked, the module may display a textbox that accepts an employee code. In response, the GUI shown in FIG. 86 may be presented, which shows contact details of the employee for editing.

Figure 87:
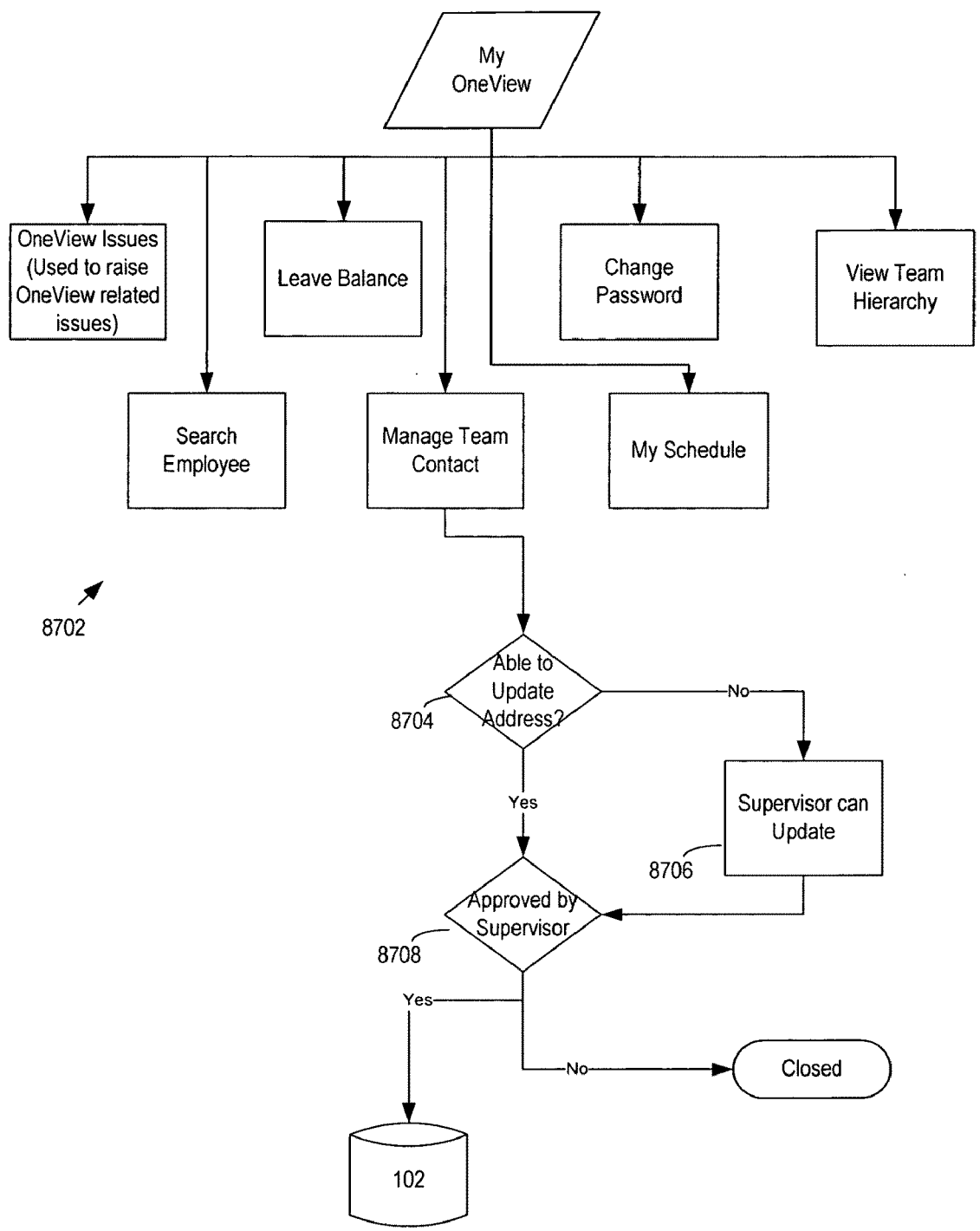

FIG. 87 shows a data flow diagram for My OneView. In particular, the employee may select any of the modules explained above (8702). The data flows back through the architecture 100 to the master database 102. As an example, when either the employee updates an address (8704) or an employer updates an address (8706), the update may be approved (8708), and stored in the master database 102.

The Transport application 124 manages and reports on transportation ("adhoc") related concerns for the employee.

The transportation application 124 may approve or deny adhoc requests, and may be divided into management tasks handled by an adhoc requests module, a bulk adhoc request module, and an approval/denial of adhoc request module; and reporting tasks handled by an adhoc reporting module, a transportation roster module, and a contact information rosters module.

Figure 88:
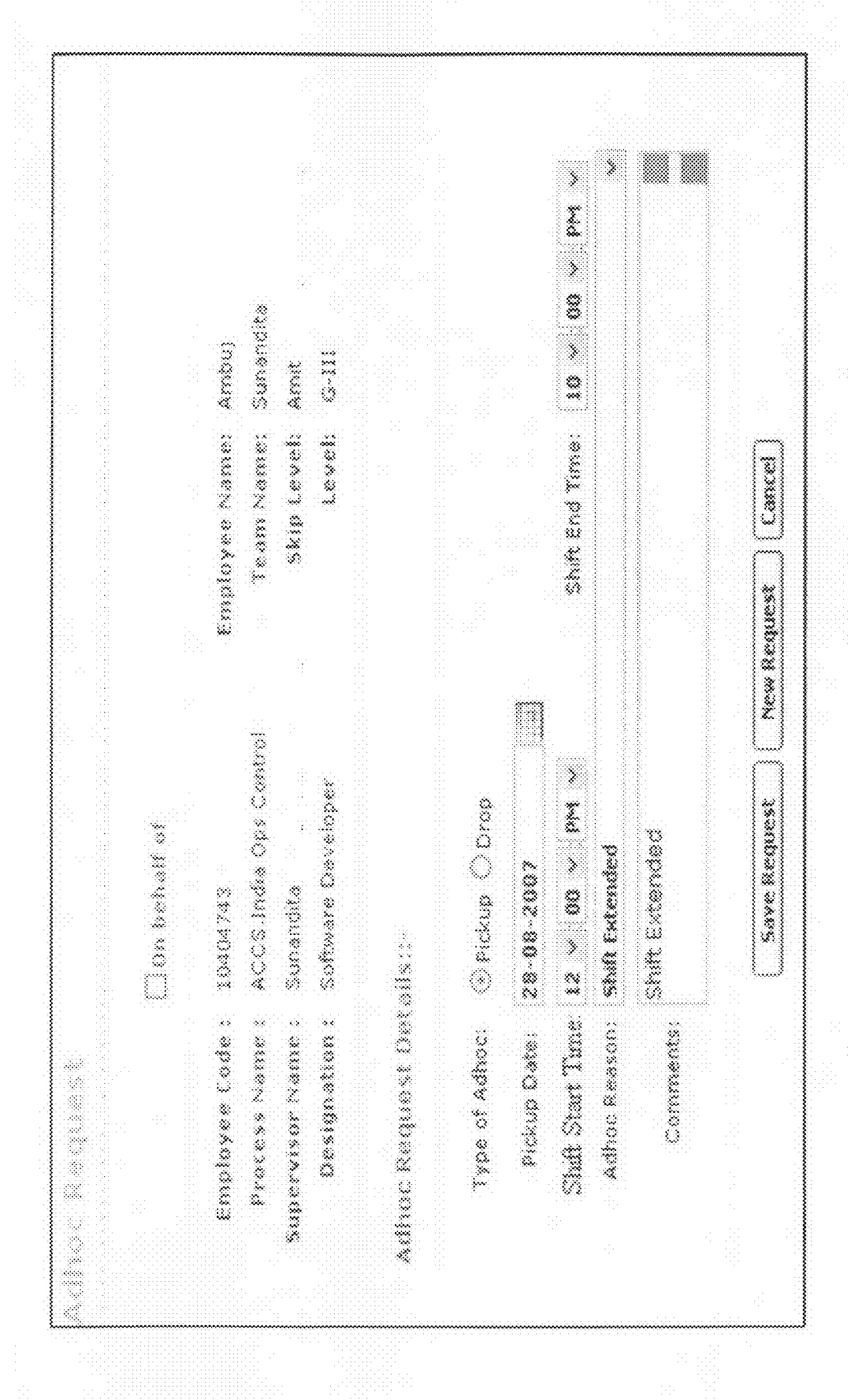

The Adhoc Request module submits an adhoc request. An employee may place an adhoc request for himself or place a request for another employee. The module populates employee details for the person whom the adhoc request is created. The module may accept adhoc parameters such as the type of adhoc, Pickup/Drop date, adhoc reason and Comments. The module may populate Shift start time and Shift end time from the roster maintained in the database 102. FIG. 88 shows an example of the module GUI. As with other modules described above, the GUI for this module may include an 'on behalf of' selector that permits an individual to make an adhoc request for another employee.

Figure 89:
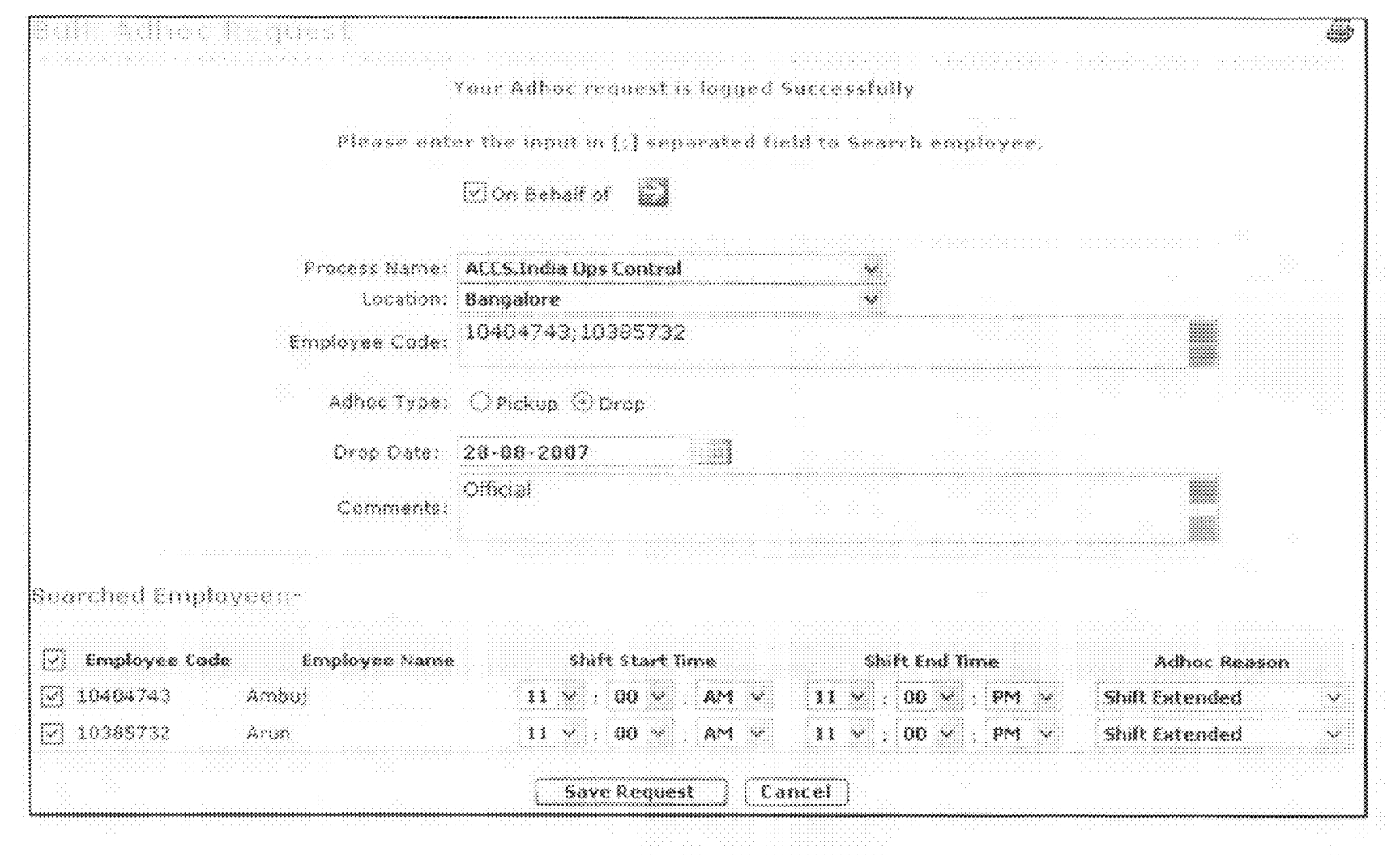

The Bulk Adhoc Request module raises bulk adhoc requests. A bulk adhoc requests may result from making requests for multiple employees. To that end, the module GUI, shown in FIG. 89, may accept a comma-separated list of employee codes, along with other information such as process name, adhoc type, reason, Shift start time and Shift end time.

Figure 90:
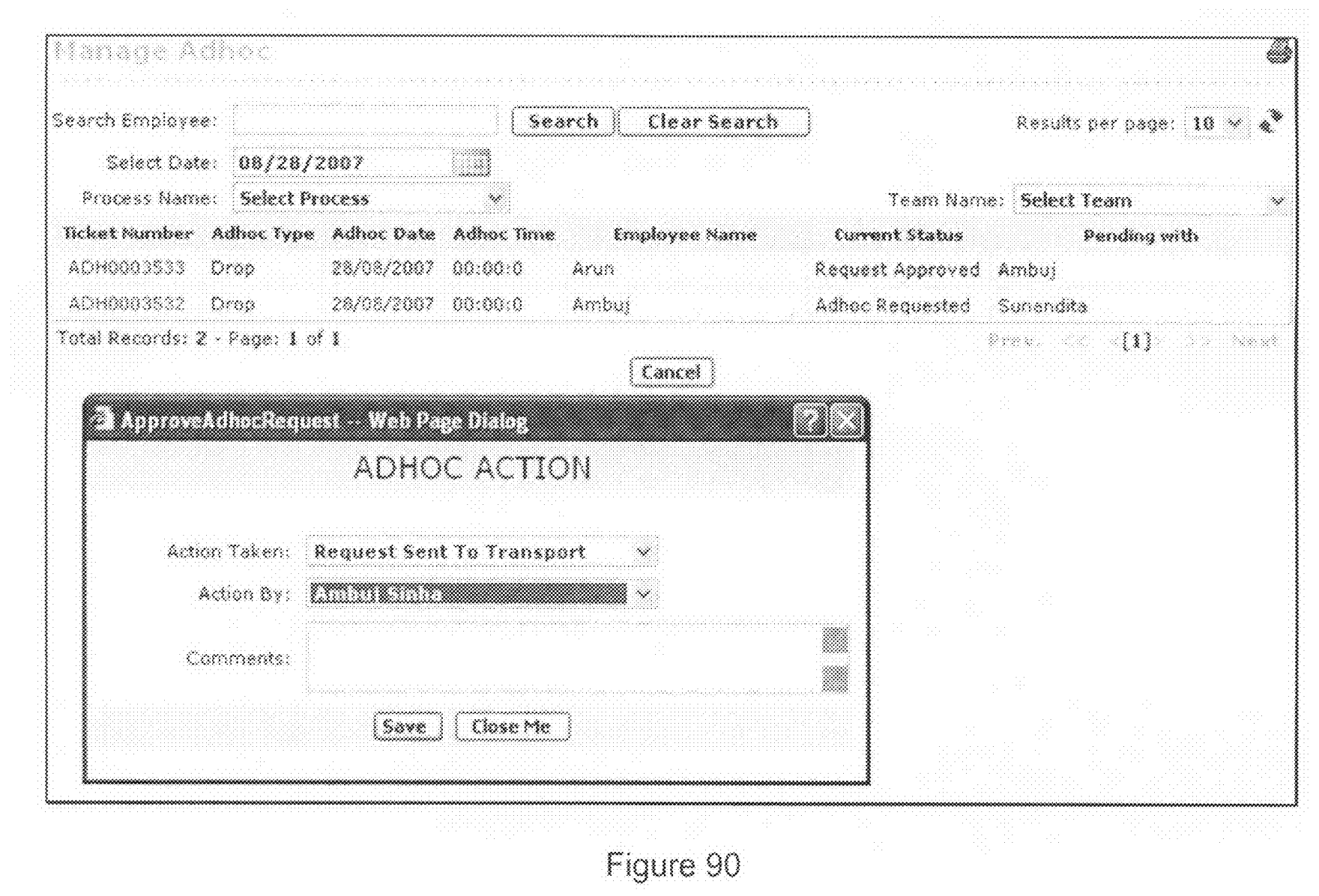
Figure 91:

The Approve/Deny Adhoc module facilitates supervisor approval and denial of an adhoc request generated by a team member. After the request is approved by the supervisor, the module may display a popup window that asks whether to send the request to the transport department, as well as a popup window showing adhoc details with an option to print the adhoc request. FIGS. 90 and 91 show examples of the module GUI.

Figure 92:
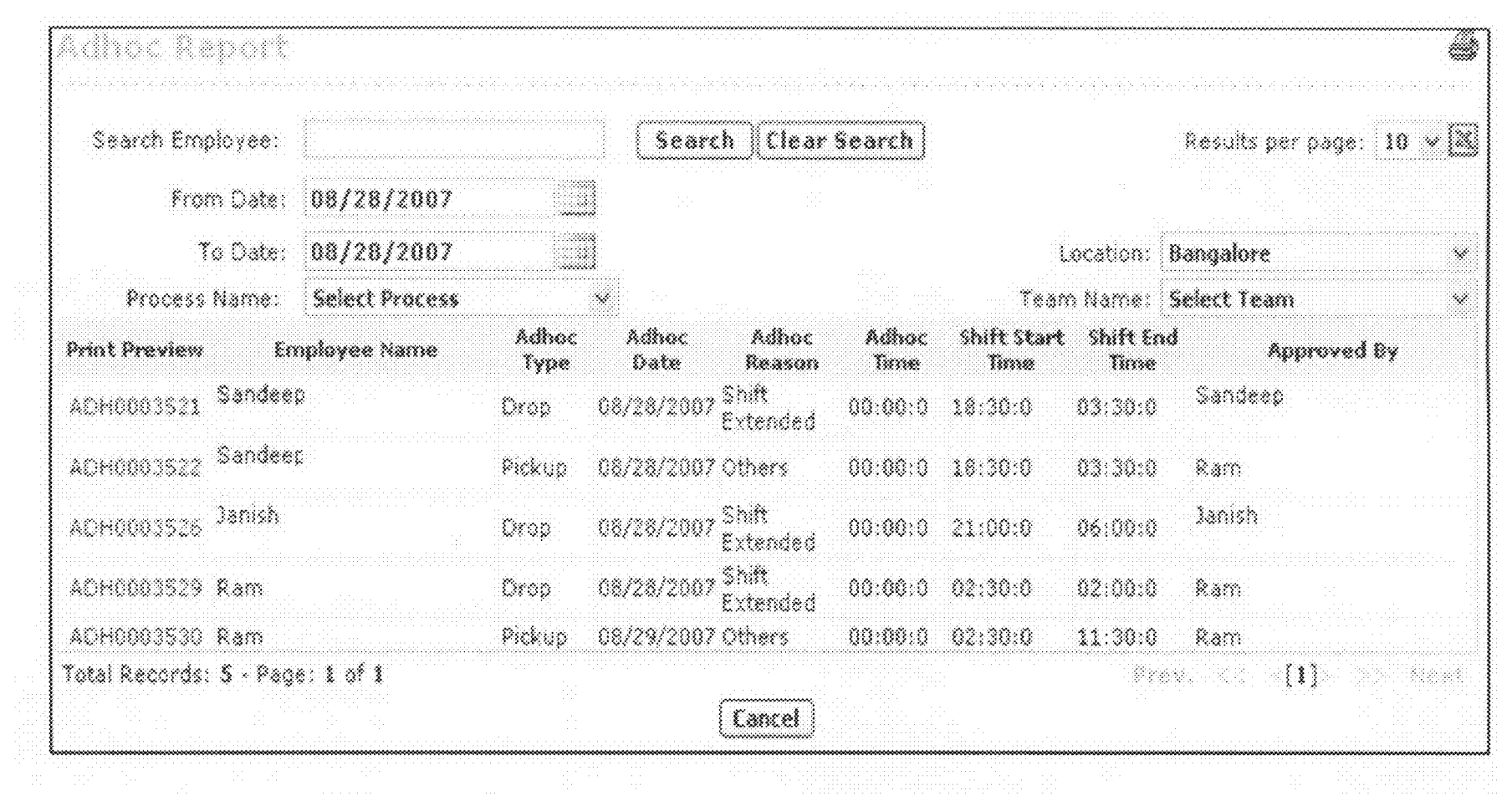

With regard to reporting, the Adhoc Report module tracks the adhoc request generated. The transportation department may use the tracked information to obtain the details of adhoc requests, such as employee name, adhoc type, date, reason, time, and approved-by data. An example of the adhoc reporting GUI is shown in FIG. 92, which permits searching and reporting by employee code, from date, to date, process name, location, team name, and other parameters.

Figure 93:
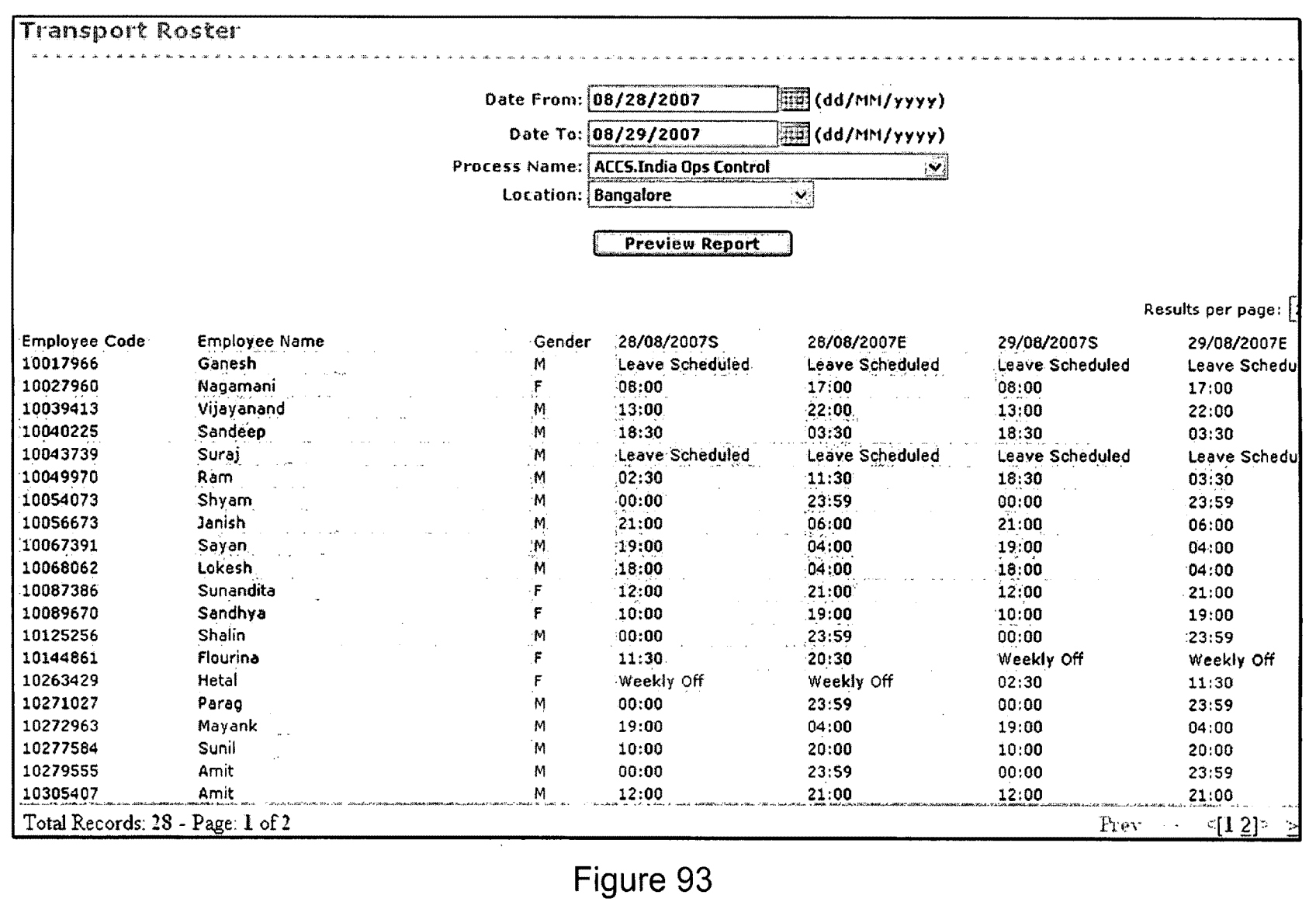

The Transport Roster module displays the transport roster for a particular date range sorted by process and location for the users who require transport. The Transport Roster module may be used by a Transport department to build a transport route plan for an upcoming week. FIG. 93 shows an example of the transport GUI.

Figure 94:
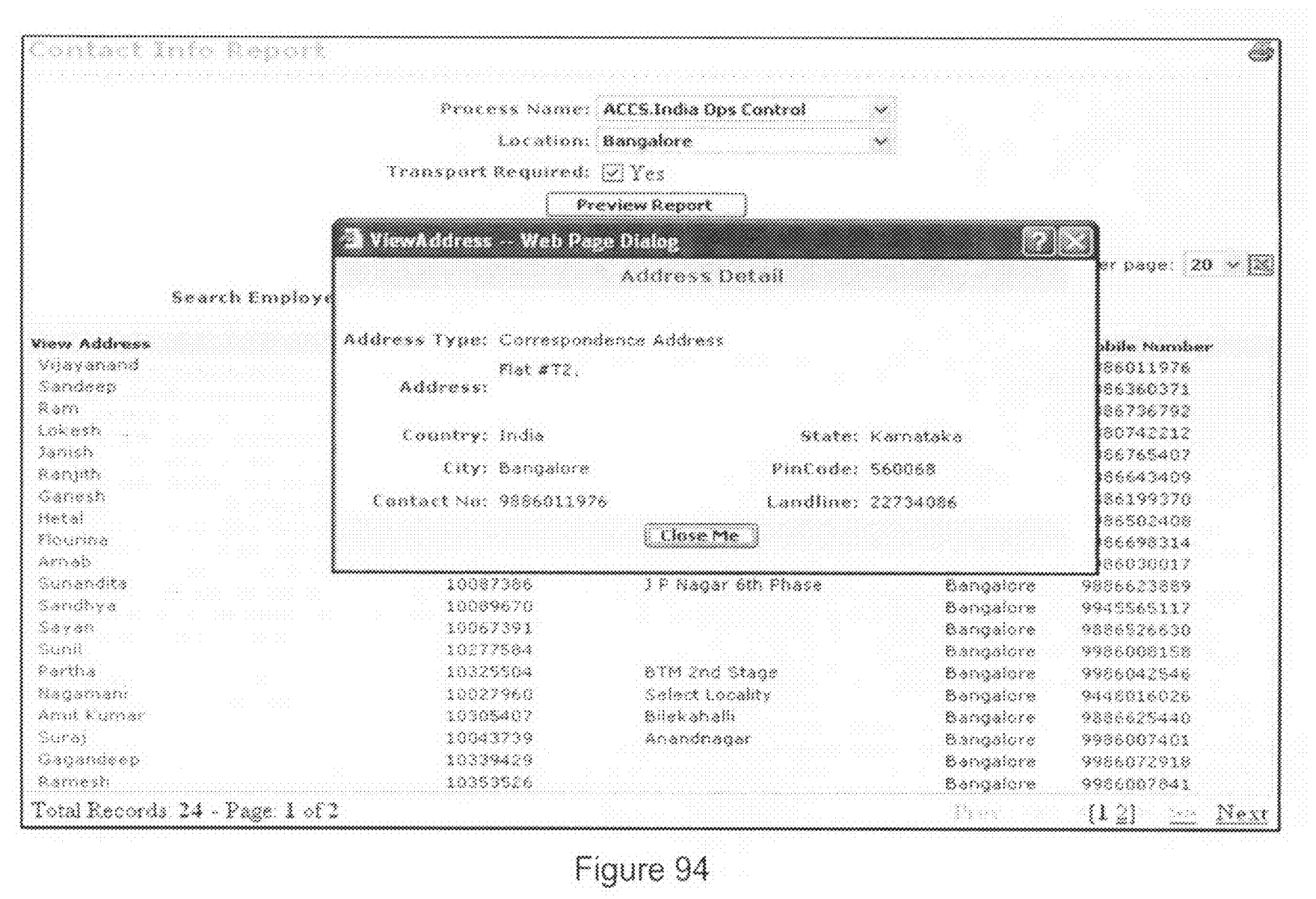

The Contact Info Report module retrieves and displays detailed contact information of an employee who requires transportation. This report may be generated by entering an employee code and selecting Search, and the report may be sorted on the basis of process and location. The module response to clicking on the employee name with a popup window that contains the detailed address of the employee. FIG. 94 shows an example of the module GUI.

Figure 95:
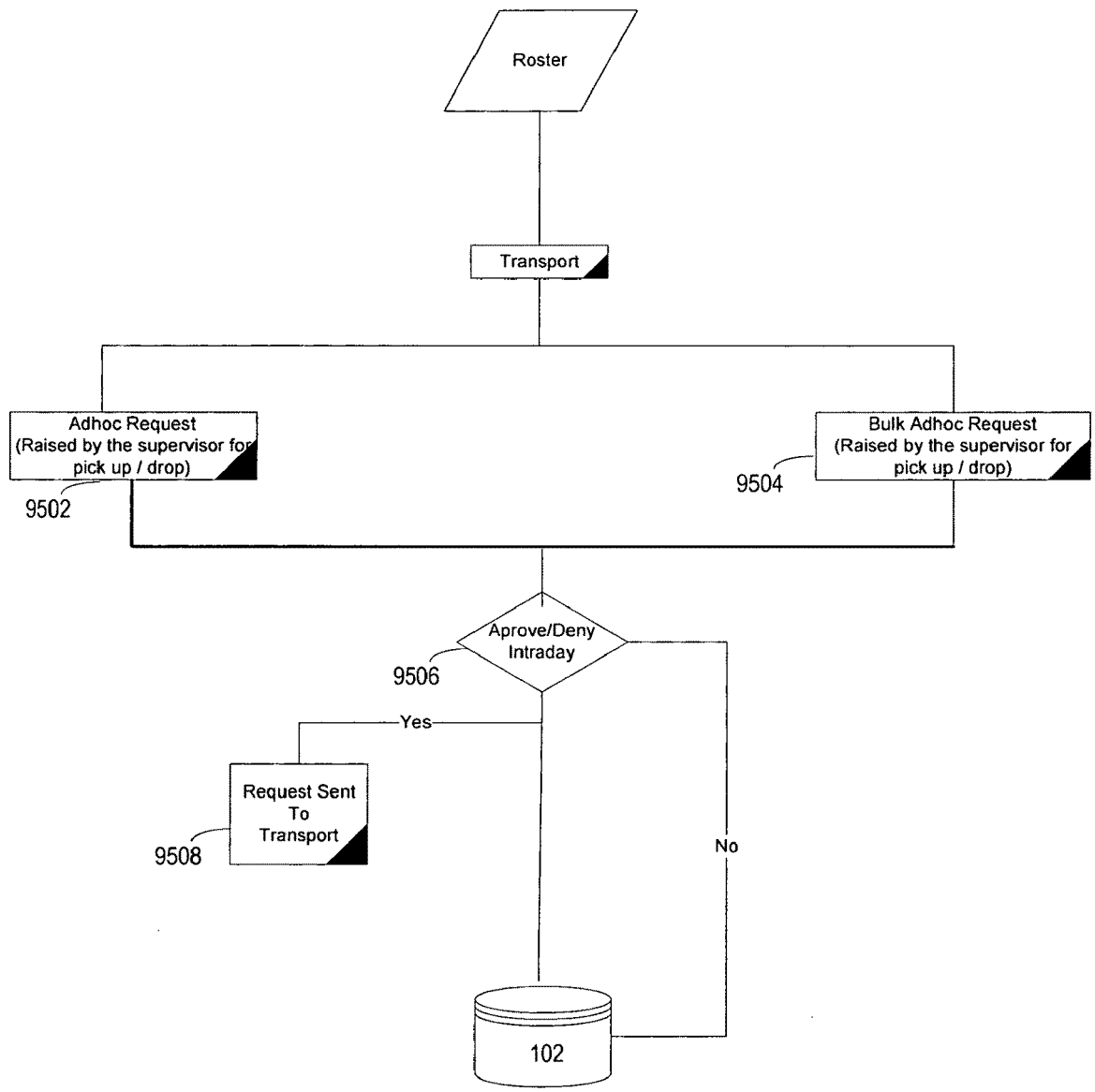

FIG. 95 shows a flow diagram for transportation processing. The transportation application 124 accepts either adhoc requests (9502) or bulk adhoc requests (9504). The requests are approved or denied (9506), and the requests are communicated to the transportation department (9508) and stored in the master database 102.

The architecture 100 includes a case management application that may have three logical parts: an Accounts Integrity Management ("AIM") application 106, an online order processing ("KANA") application 108, and a Sales Order Entry (SOE) application 110. As an overview, the case management application captures average handling time (AHT) in any non-voice process. The case management application may be logically or physically partitioned into the following interfaces: My cases, Manage cases, Manage Batch, Manage Error type, Manage Franchise, and Edit Account Information.

Figure 96:
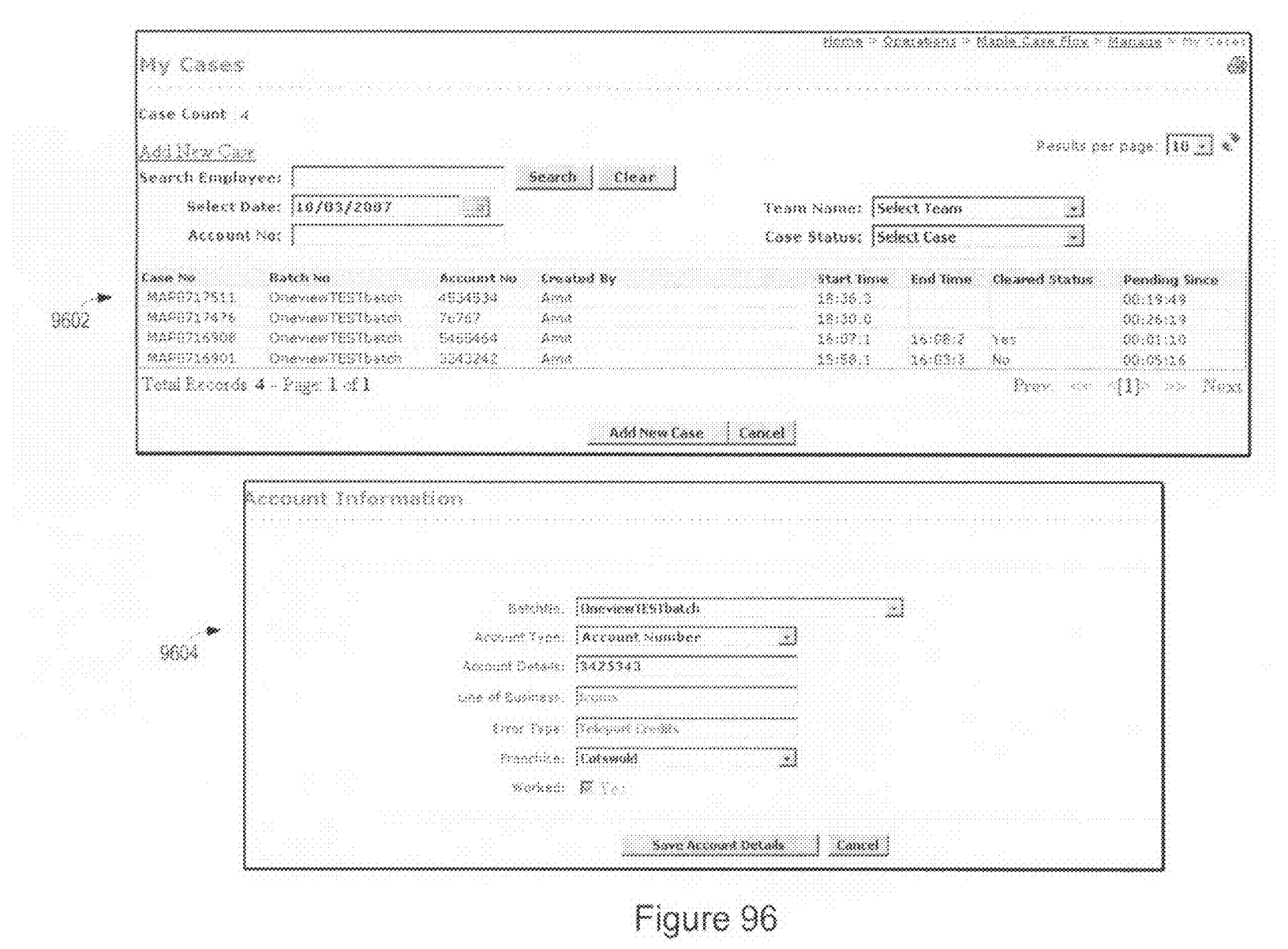

The My Cases interface supports the following tasks: Log new cases, Work on Logged cases, View cases based on dates selected, Search cases using different filters, and Perform the following actions on the cases: 'Yes', 'No', 'Stuck', and 'Refer'. FIG. 96 shows examples of the My Cases GUI 9602 and the supporting Account Information GUI interface 9604. A user may log a new case by clicking on 'Add New Case' button. Upon selection of batch number and account number, other details such as line of business, error type, and franchise will be retrieved from the master database 102 and populated in the interface.

The case management application supports AHT/ACW/Turn around time calculations. To that end, the case management application captures several timestamps as follows:

Begin Time:
When a user clicks on 'Add New Case' (either the link or button shown in FIG. 96, interface 9602), the application captures the current time as the "Begin Time".

Start Time:
When a user clicks on the 'Save Account Details' option on the Account information GUI 9604, the application captures the current time as the "Start Time".

Figure 97:
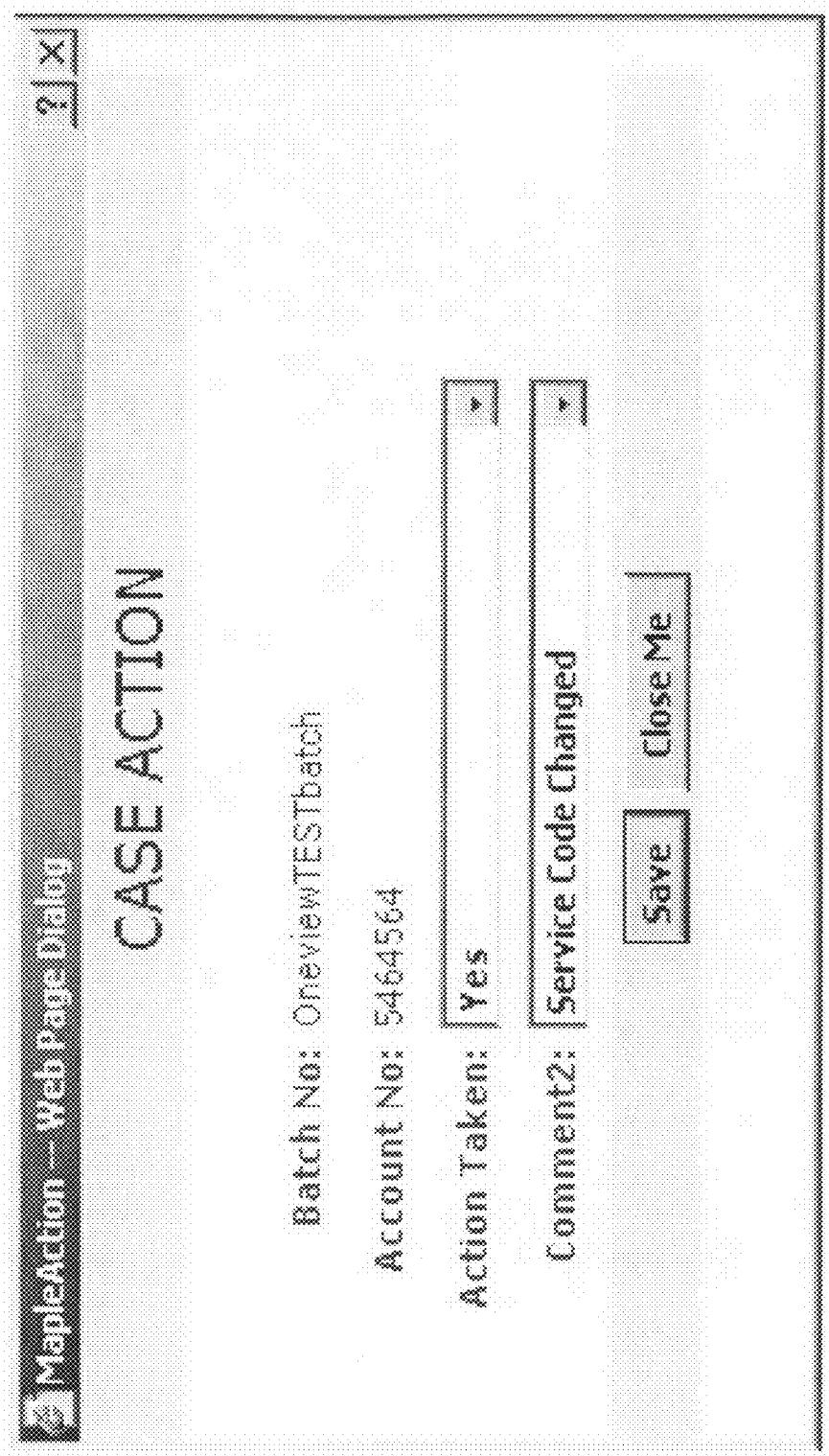

End Time:
When a user clicks on the 'Save' option on the Case Action interface (an example is shown in FIG. 97), the application captures the current time as the "End time". In other words, when an action has been taken in a case, the End Time is captured.

The case management application determines the following measures:

AHT (Average Handling Time)=(Begin Time—End Time);

ACW (After Call Work, or Wrap-up Time)=(Start Time—Begin Time). This is the time spent setting up the log.

TAT (Turn Around Time)=(End Time—Start Time).

Figure 98:
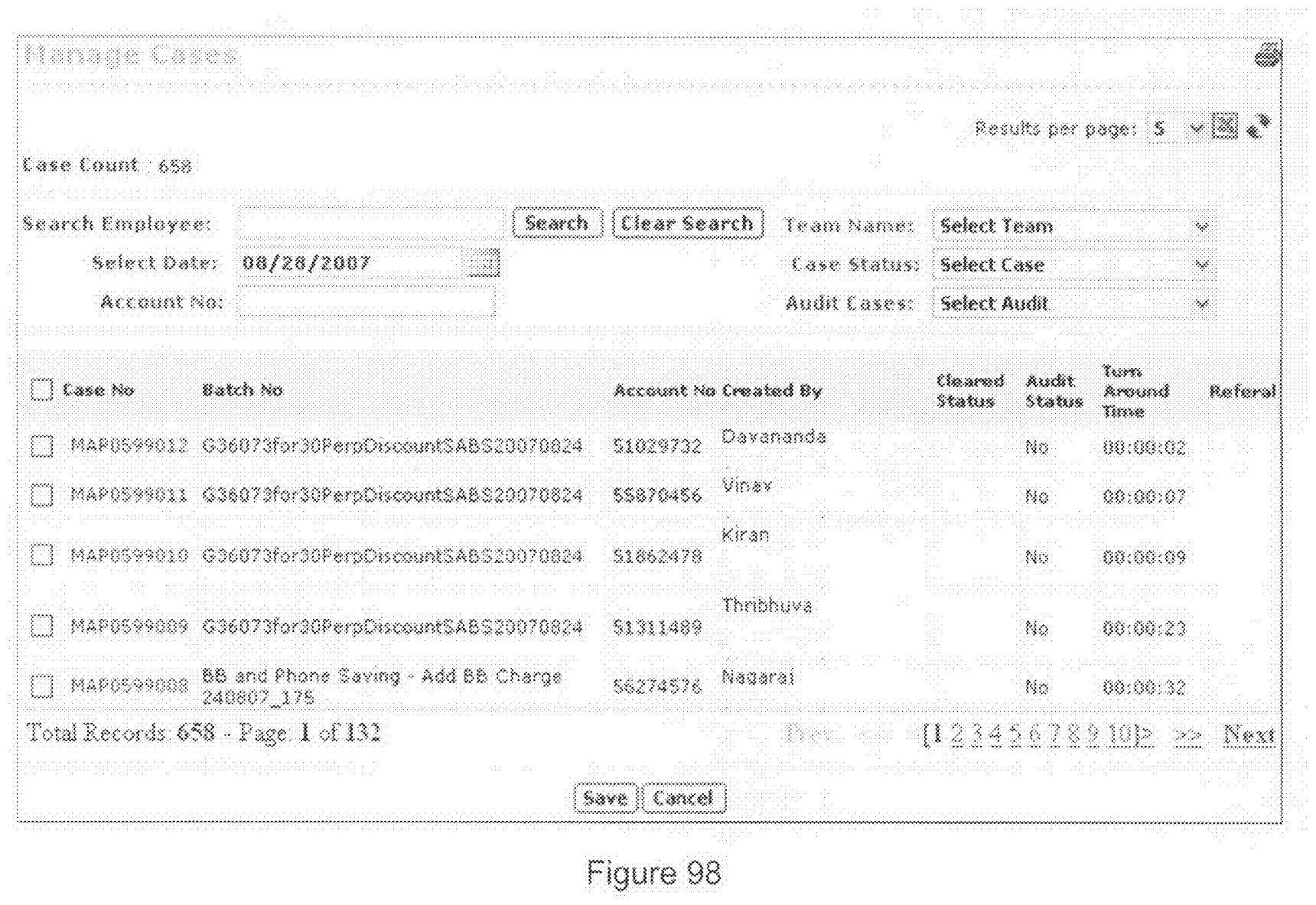

The Manage Cases interface displays, for supervisors/managers, the logged cases and worked on cases that have been referred to them by their respective team members. FIG. 98 shows an example of the Manage Cases interface. The interface may be a real-time display. The interface may support data filtering on the following criteria: Employee, Date, Account No., Team Name, Case Status, Audit Cases, or other criteria. The interface may show case information including a case number, batch number, account number, created-by name, cleared and audit status, turn around time, referral, or other information. The interface responds to links embedded in the case number by displaying account information of the individual selected case.

The Manage Batch interface may be used, for example by supervisors or managers, to add or edit batch details and make batch details active or inactive. Each batch may be mapped to its specific line of business and error type. FIG. 99 shows an example of the manage batch interface. The interface may filter based on batch type, and may display batch information such as batch number, batch type, number of cases in the batch, received-on date, created-by name, and active/inactive status.

The Manage Error Type interface may be used to add or edit error types, for example according to a specific line of business and to make an error type active/in-active. FIG. 100 shows an example of the manage error type interface.

The Manage Franchise interface may be used to add/edit franchise details and to make a particular franchise active or inactive. FIG. 101 shows an example of the manage franchise interface.

Figure 102:
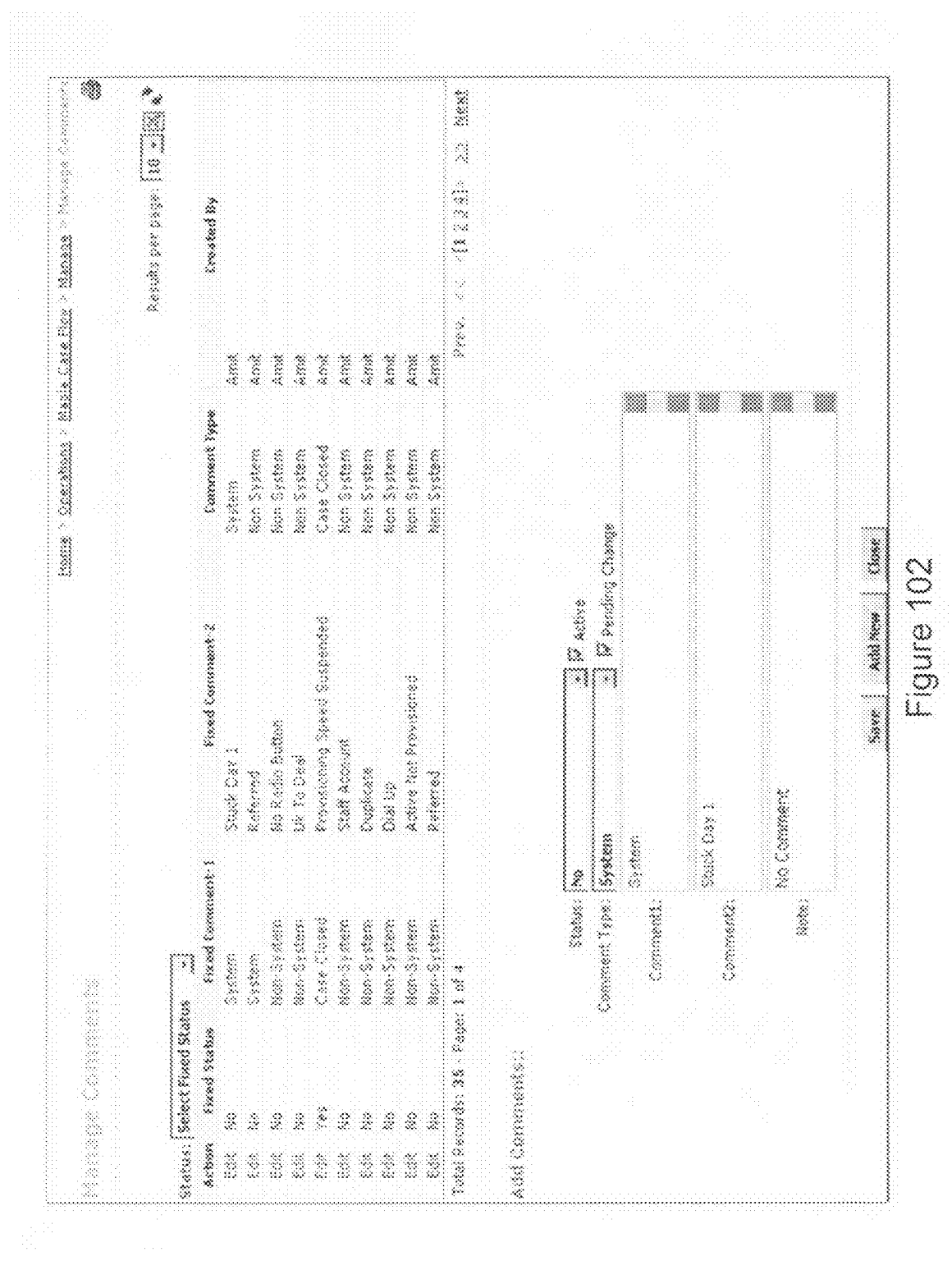

The Manage AIM Comments interface may be used to add or edit the AIM Comments details and to make particular comments active or inactive. FIG. 102 shows an example of the manage AIM comments interface.

The SOE Call Type Tracker interface tracks the type of calls received by the case management SOE agents. Sales type is also tracked by this interface. FIG. 103 shows an example of the SOE call type tracker interface. As shown in FIG. 103, multiple types may be assigned to any call (e.g., Service Check and Cancel Order).

Figure 104:
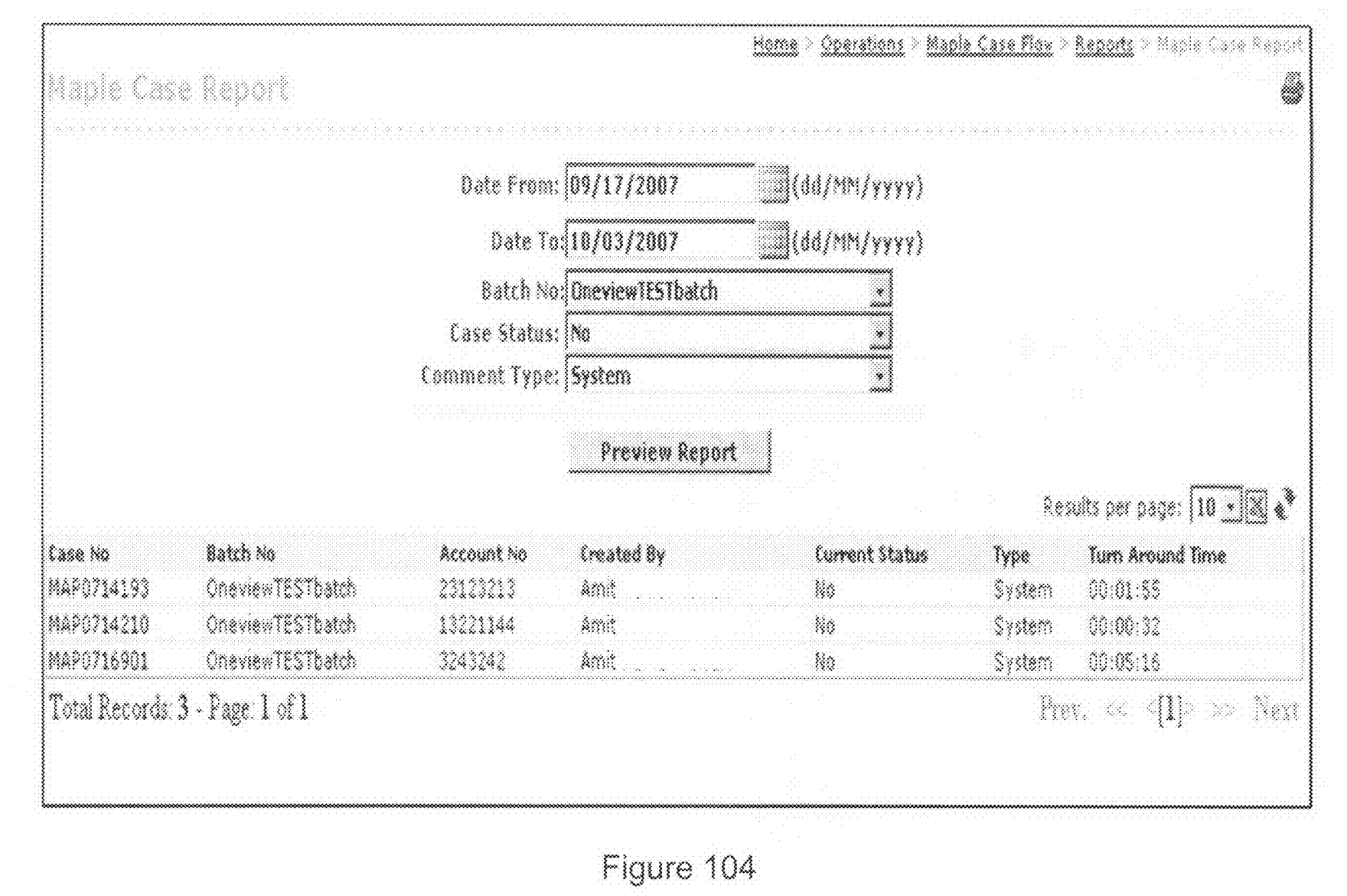

The AIM Case Report interface may accept search parameters and display matching cases. The interface may filter by from-date, to-date, batch number, case status, comment type, or other criteria. FIG. 104 shows an example of the AIM case report interface.

The online order processing application 108 may provide a SOE call type deail GUI, such as that shown in FIG. 105. The interface may filter data according to date range, employee code, or other criteria.

FIG. 106 shows an SOE Call Type Report GUI. The SOE Call Type Report GUI may display sales order entry information, such as employee code, employee name, sales type, system type, call type, and created-on date. The GUI may filter data by employee code, date range, or other criteria.

Figure 107:
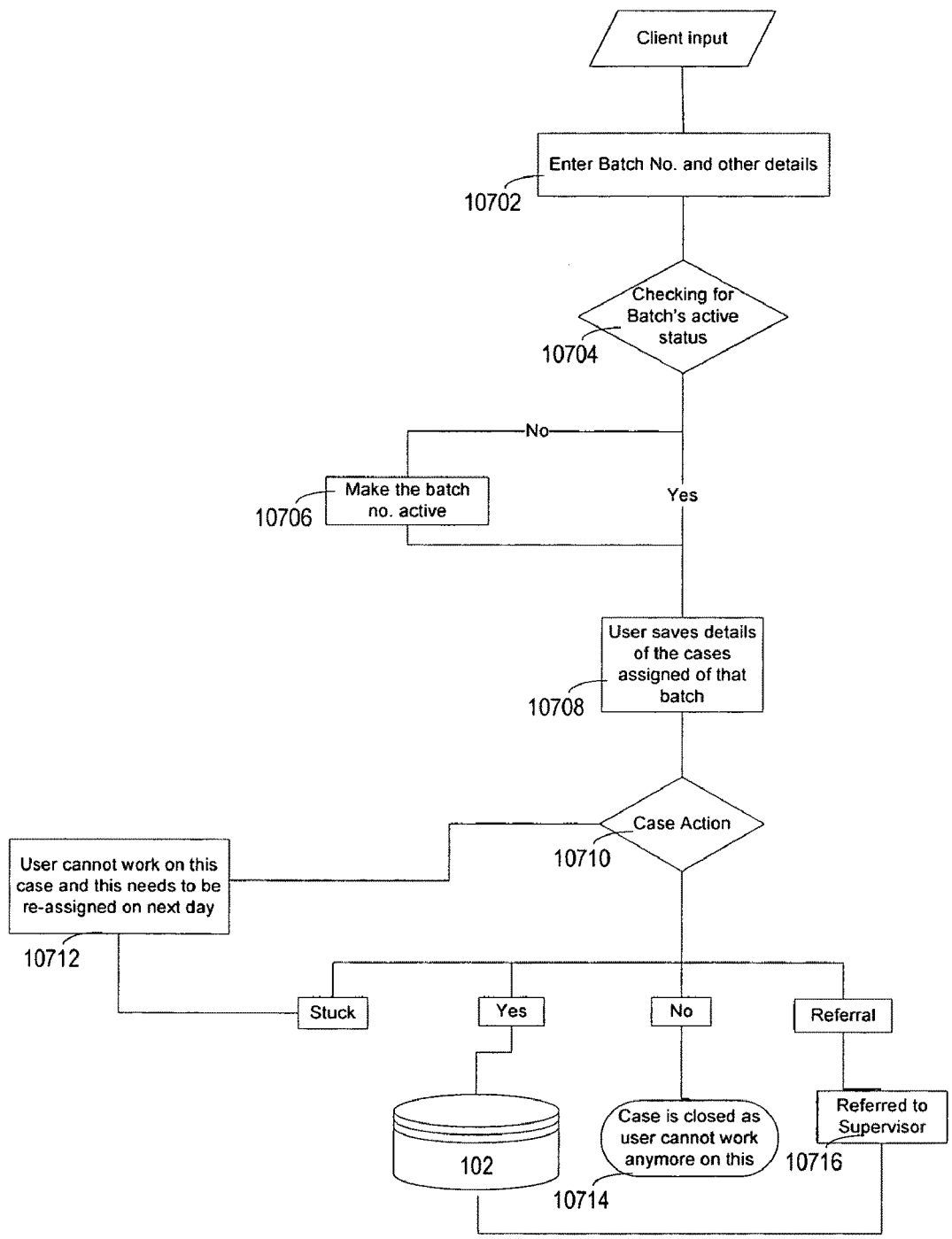

FIG. 107 shows a data flow diagram for tracking case handling. The employee enters the batch number (10702) and the case management application checks whether the batch is active (10704), and makes the batch active (10706) if it is not. The employee may then save details of cases assigned to that batch (10708). A decision may be made about cases on an individual basis (10710). If the case is difficult and is assigned the Stuck status, the employee may be re-assigned to another case (10712). If the case cannot be resolved, the case may be assigned the No status and the case may be closed (10714). A referred case may be transferred to a supervisor for handling (10716). A case that is resolved is assigned the 'Yes' status, and the related case data is stored in the master database 102.

Figure 108:
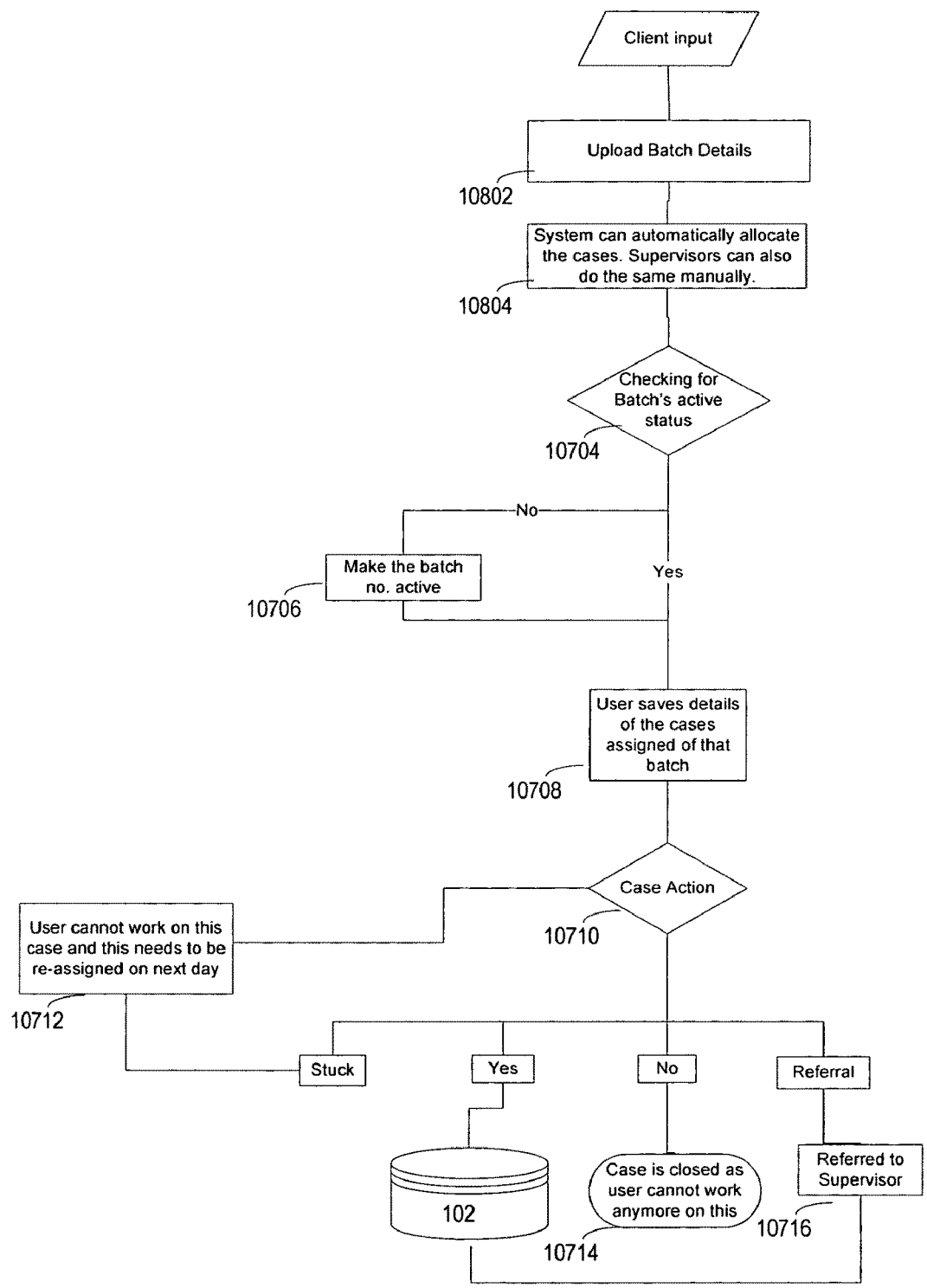

FIG. 108 shows a data flow diagram similar to that of FIG. 107. However, FIG. 108 shows that the case management application may work with batches of cases which are uploaded into the system (10802). The system may automatically allocate cases to individuals to resolve, or the system may accept manual input to direct the cases to particular employees (10804).

Figure 109:
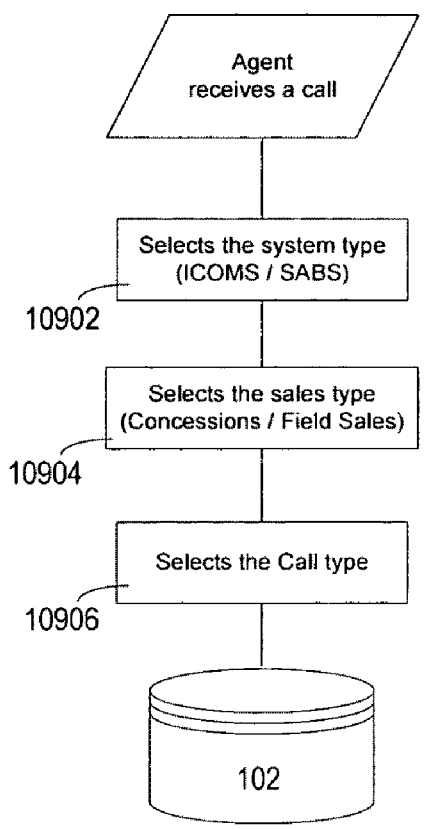

FIG. 109 shows a data flow diagram for SOE call tracking. The employee sets the system type (10902), the sales type (10904), the call type (10906), and any other data captured for the sales order. The case management application saves the data in the master database 102.

Figure 110:
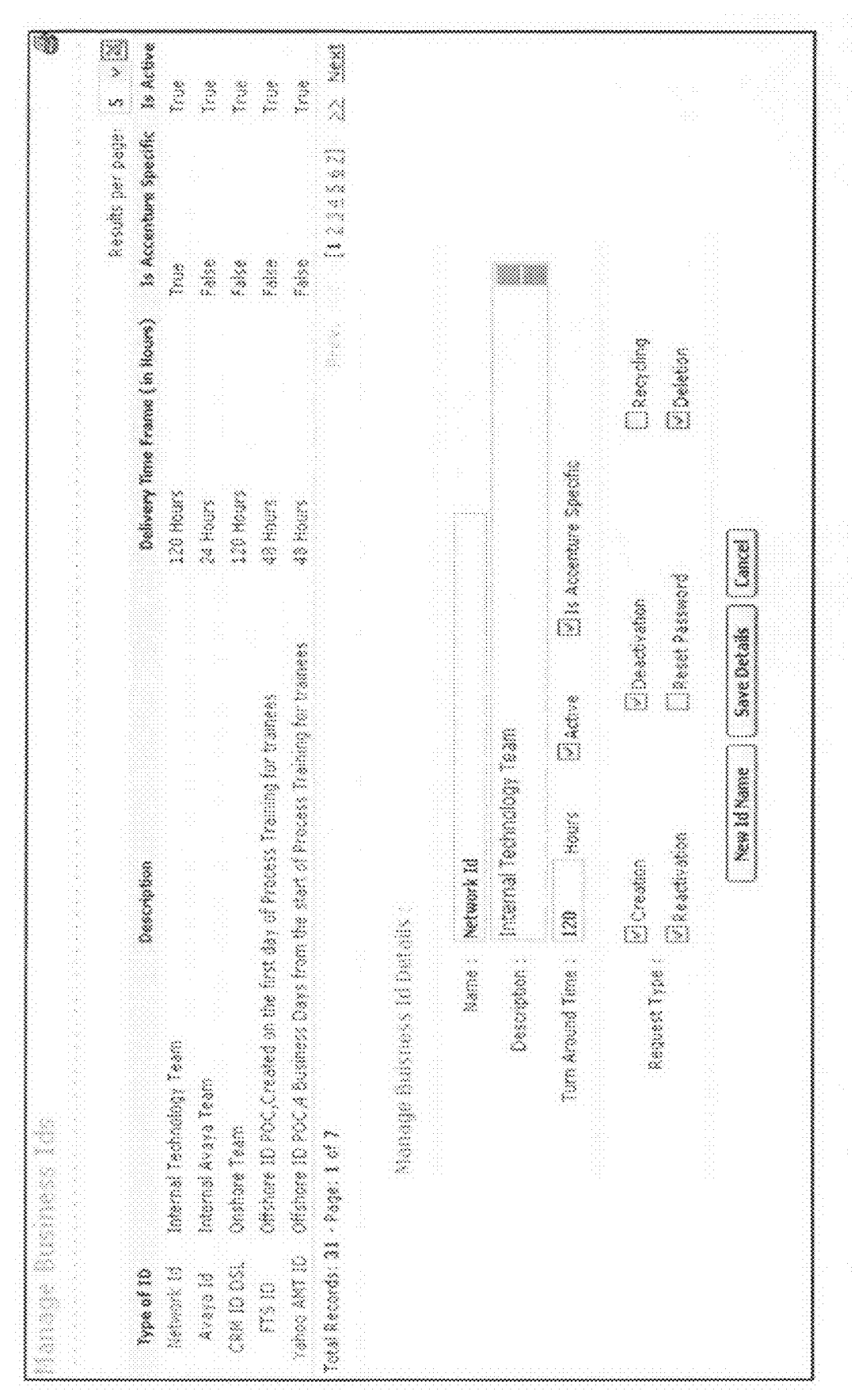

The ID Management application 116 creates, manages, and reports employee identification numbers. FIG. 110 shows an example GUI for ID creation for the ID management application 116. The GUI may capture the following information for creating an identification number: Name, Description, Turn Around Time for creation in Hours, Status, Organization Id/Client specified ID, Request Type, or any other relevant data.

FIG. 111 shows an example GUI for managing employee business IDs. The GUI facilitates creation and management of employee process and business related IDs. The GUI filters data according to: Employee Code, Process Name and sorts by Business ids and order, or other criteria.

Figure 112:
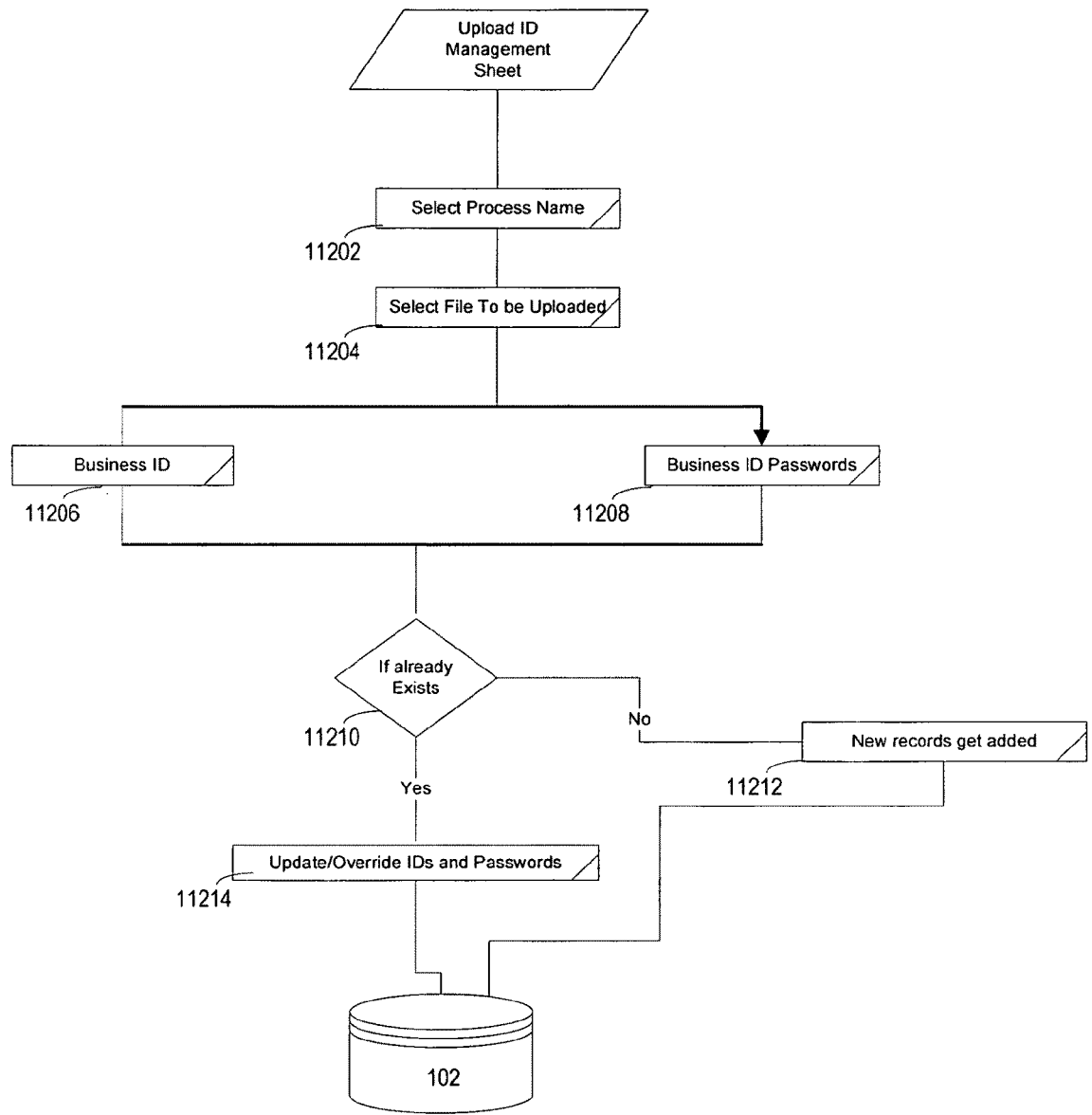

FIG. 112 shows a data flow diagram for ID management. The employee selects the process name (11202) and optionally selects a file to upload (11204), which may contain business IDs (11206) or business ID passwords (11208). The architecture 100 determines whether the IDs already exist (11210) and overwrites existing IDs and passwords (11214), or stores new IDs and passwords (11212). The ID data is stored in the master database 102.

Figure 113:
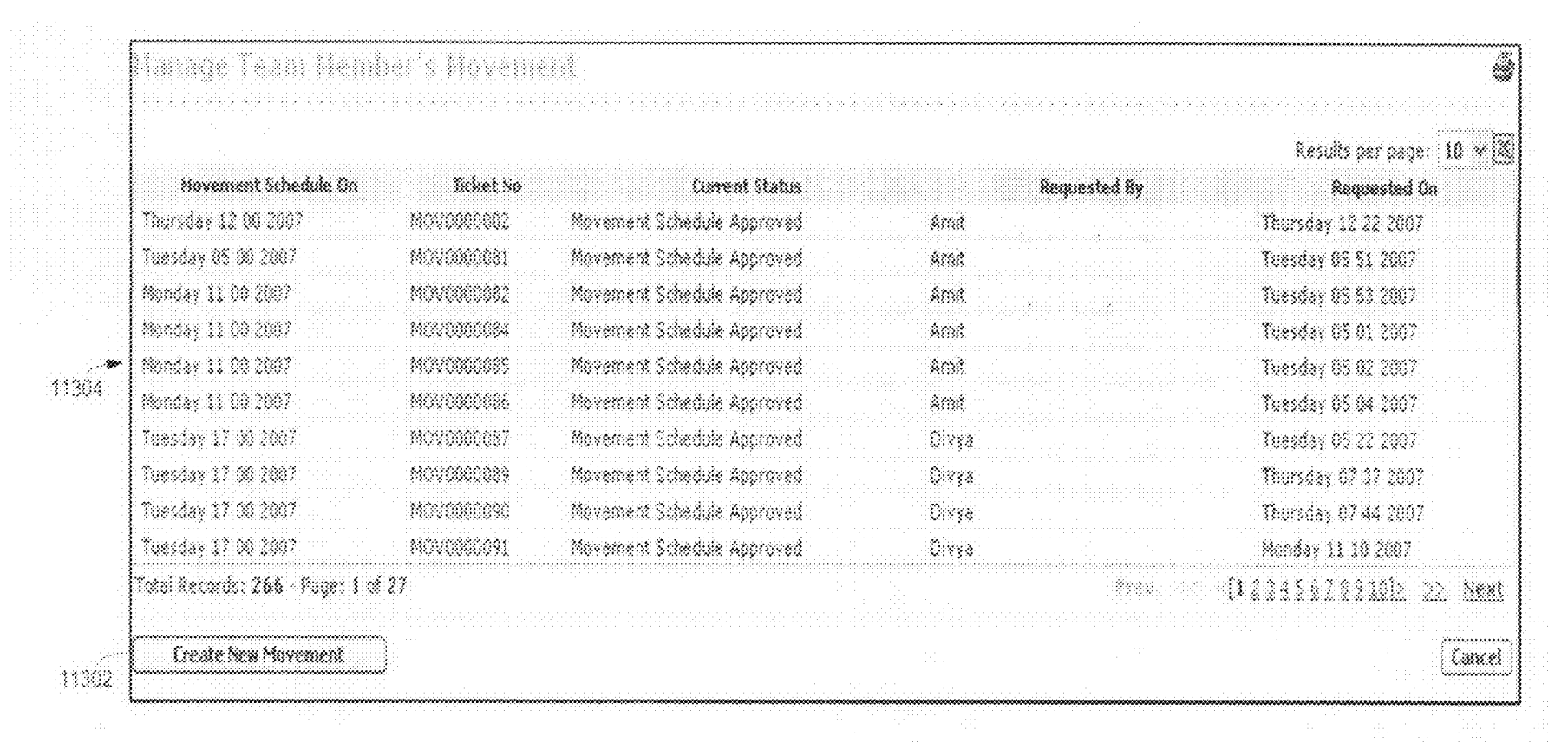

The Movement Management application 126 manages employee or team member movement between engagements or processes. Employee or team member movement may include movement in, movement out and movement within the process for an employee or team member. The movement management application 126 may include a manage module that facilitates team movement using, for example, the GUI shown in FIG. 113. A new movement can be scheduled by clicking on the 'create new movement' button 11302. Details of an existing movement ticket can be viewed by clicking on the links 11304 embedded in the date field in the GUI.

An example of the movement creation interface is shown in FIG. 114. The movement creation interface includes movement criteria entry fields for moving from and to: different functions, processes, and/teams, and accepts entry of a reason, schedule date, and request reviewer. Other movement options may be provided.

In one implementation, movement may be of 3 types:
Movement In (New employees move in to production)
Movement Out (Employees move out of current deal); and
Movement with in the process.

On clicking on Get Team Hierarchy button 11402, the interface retrieves a list of hierarchy/team member names to select, as shown in the interface under "Team Member Name". After the employees are selected, the user may select the "Schedule Movement" button 11404 to tell the system to proceed. The ID management application 126 may send a notification (e.g., an email message) to the employees, supervisors, or other individuals affected by the movement.

Figure 116:
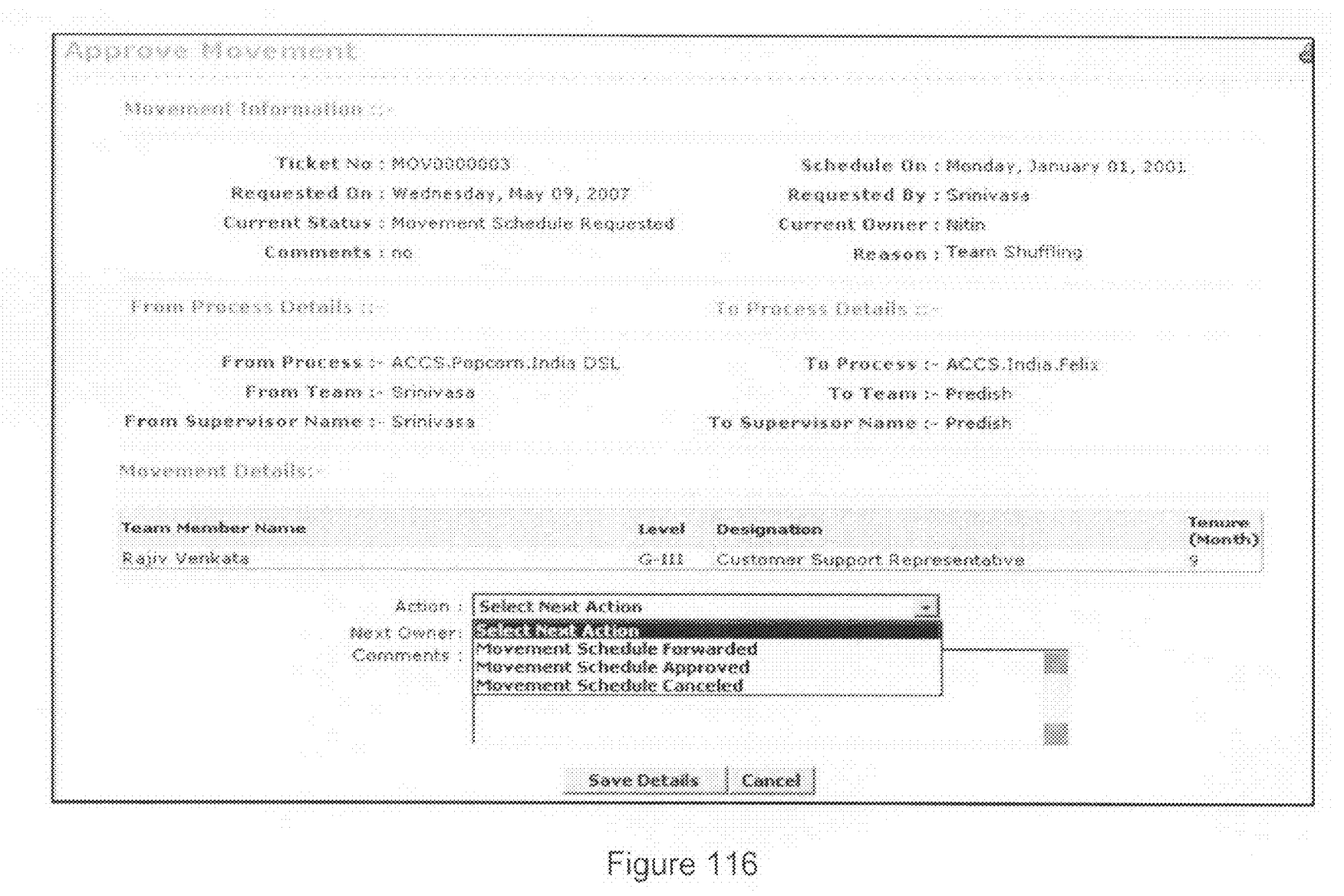

The Approve Movement module in the ID management application 126 provides an interface through which movement requests are approved by the respective managers. An example GUI is shown in FIG. 115. The GUI may provide links 11502 in the date fields. The links result in display of the approval GUI shown in FIG. 116. The approval GUI accepts a selection of action (e.g., approval, canceled, or forwarded to another), and allows the supervisor to save the disposition.

FIG. 117 shows a data flow diagram for movement management. Movement may happen with a process (11702), out of a process (11704) or into a process (11706). The supervisor enters the from/to information, movement reason, scheduled move date and any other parameters (11708). When the supervisor selects the team hierarchy, the movement management application 126 retrieves the list of employees (11710). The supervisor selects one or more employees from the list (11712), schedules the move (11714), and submits the movement request to a manager for approval (11716). If the movement is approved, the movement process completes and is scheduled (11718). In any event, the approved or canceled movement data is stored in the master database 102.

Figure 118:
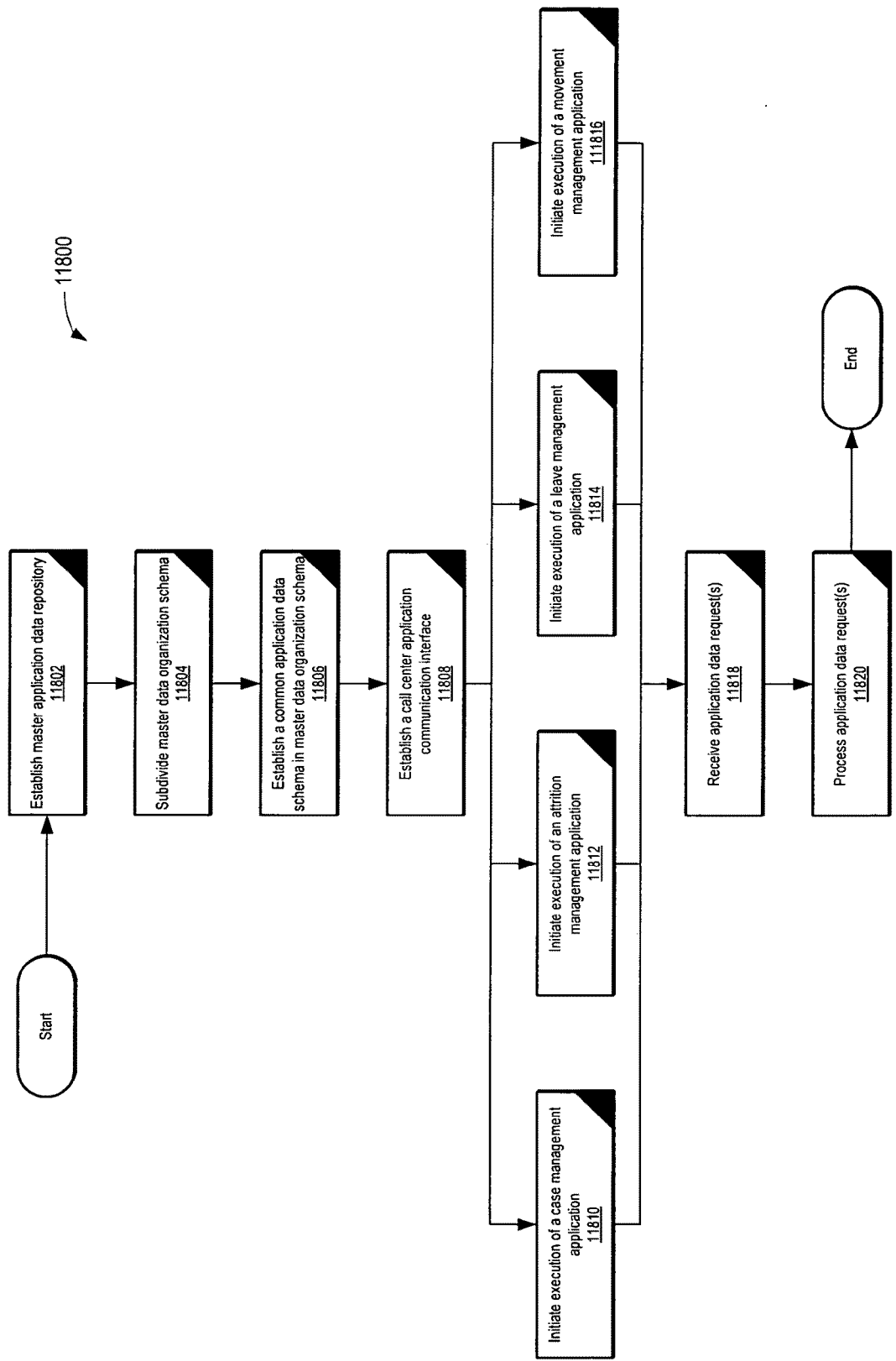
FIG. 118 shows one example of logic flow for coordinating the operation of multiple call center applications in a call center architecture.

FIG. 118 shows one example of logic flow 11800 for coordinating the operations of multiple call center applications in a call center architecture. The logic flow 11800 initially includes establishing a master application data repository according to a master data organization schema unified across multiple call center application dataset requirements (11802). The logic flow 11800 may then include subdividing the master data organization data schema (11804). In one implementation, subdividing the master data organization data schema includes subdividing the master data organization data schema into a first application data schema that supports a first application dataset requirement for a first call center application and a second application data schema that supports a second application dataset requirement for a second call center application. In addition, or alternatively, the logical flow 11800 may include establishing a common application data schema in the master data organization schema that implements a shared dataset requirement common to the first call center application and the second call center application (11806).

After subdividing the master data organization data schema (11804) and/or establishing the common application data schema (11806), the logic flow 11800 then proceeds to establishing a call center application communication interface (11808). The call center application communication interface may later be used for receiving data requests from call center applications.

The logic flow 11800 may then proceed to initiating execution of multiple call center applications. For example, logic flow 11800 may proceed to initiating execution of a case management application (11810), initiating execution of an attrition management application (11812), initiating execution of a leave management application (11814), and initiating execution of a movement management application (11816). In alternative implementations, the logic flow 11800 may include initiating execution of fewer or additional call center applications. In addition, the logic flow 11800 may include initiating execution of other call center applications, such as a human resources application or other call center application.

The call center application communication interface may then receive call center data requests from the call center applications (11818). For example, the call center application communication interface may receive a call center data request from the case management application, the attrition management application, the leave management application, and the movement management application. However, the call center application communication interface may not receive call center data requests from any of the call center applications, or the call center application communication interface may receive a call center data request from only one call center application. Other configurations are also possible.

The logic flow 11800 then proceeds to processing the received call center application data requests (11820). The logic flow 11800 may include many different types of processing including a first-in-first-out processing, first-in-last-out processing, simultaneous processing, round-robin processing, or any other type of processing. receiving a first call center application data request from the first call center application through the call center application communication interface.

Figure 119:
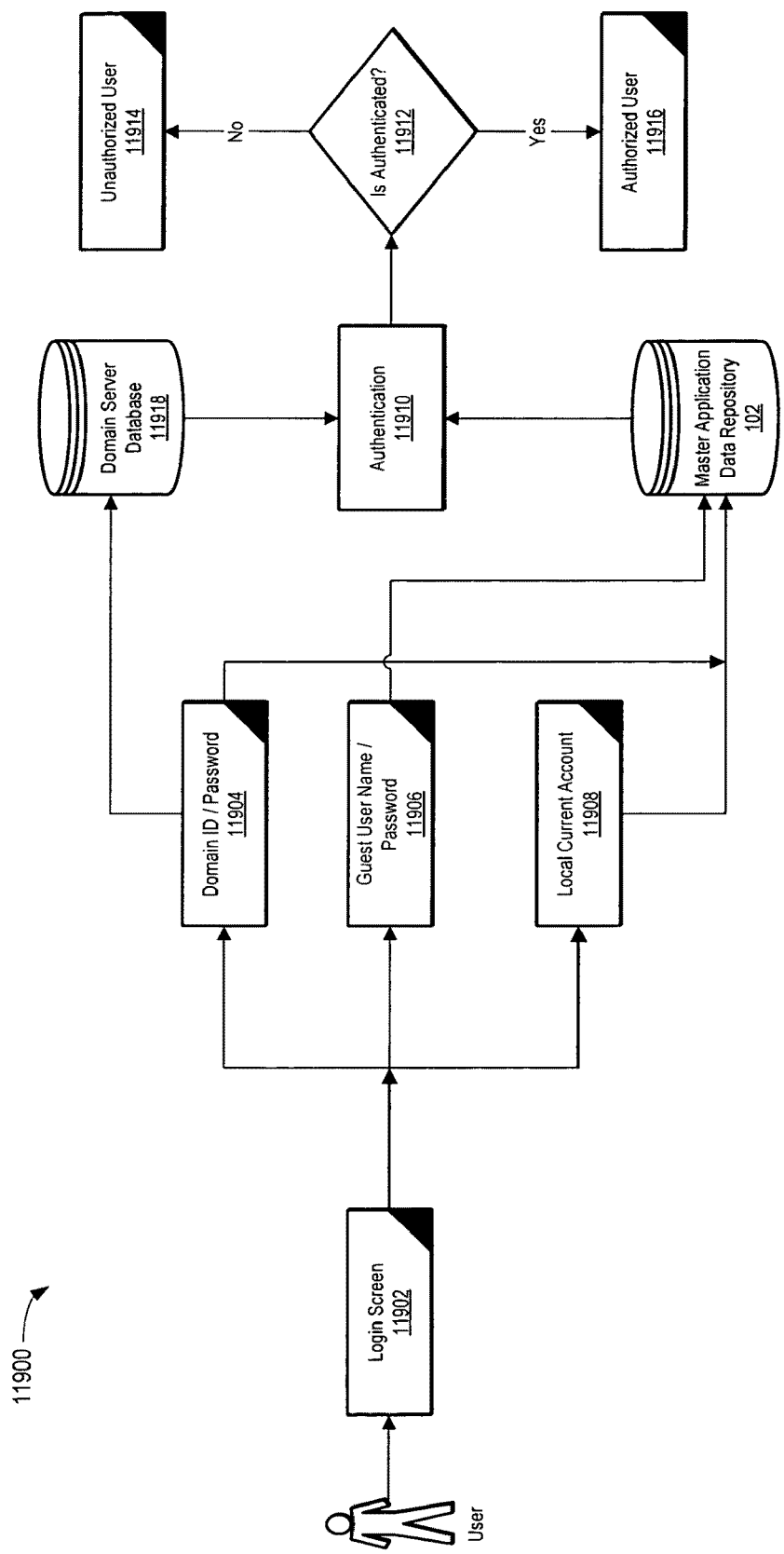
FIG. 119 shows one example of logic flow for authenticating a user.

FIG. 119 shows one example of logic flow 11900 for authenticating a user. Initially, a user may be presented with a login screen or other graphical user interface (11902). The login screen or other graphical user interface may be configured to receive authentication credentials, such as a user name and a password, from the user. However, in some implementations, the authentication credentials may only be a user name or only a password.

In general, a user may be any type of user. In one implementation, the logic flow 11900 recognizes two types of users: a permanent employee user and a contract employee user, also known as a guest user. Although the logic flow 11900 may use any type of authentication mechanism, in one implementation, the logic flow 11900 is configured to use one of three types of authentication mechanisms to authenticate the user (11904-11908). The authentication mechanisms (11904-11908) may be configured to authenticate the user based on the user type.

A first authentication mechanism authenticates the user using a domain server database 11918 where the user provides a set of authentication credentials identifying that the user is a permanent employee user (11904). In one implementation, the first authentication mechanism receives the name of a domain name server in addition to the authentication credentials provided by the user. The first authentication mechanism may use the domain name server database 11918 and the master application data repository 102 to authenticate a user.

A second authentication mechanism authenticates a user using the master application data repository 102 where the user provides a set of authentication credentials identifying the user as a contract employee or guest user (11906). In the second authentication mechanism, the logic flow 11900 may proceed to the master application data repository 102 to determine whether the user provided an acceptable set of authentication credentials for a contract employee or guest user.

Finally, a third authentication mechanism authenticates a user using a local current account, such as a domain ID, and does not use a password to validate the user (11908). The third authentication mechanism may also use the master application data repository 102 to authenticate the user.

After receiving the authentication credentials, the logic flow 11900 then proceeds to authenticate the user (11910). Authenticating the user may involve the logic flow 11900 making a decision as to whether the user is authenticated (11912). Where an authentication mechanism identifies that the user is an authenticated user, the logic flow 11900 identifies the user as an authorized user (11916). Similarly, where an authentication mechanism identifies that the user is an unauthorized user, the logic flow 11900 identifies the user as an unauthorized user (11914). Although the logic flow 11900 may involve one authentication mechanism, the logic flow 11900 may use one or more authentication mechanisms to authenticate a user. Other authentication mechanisms are also possible.

Figure 120:
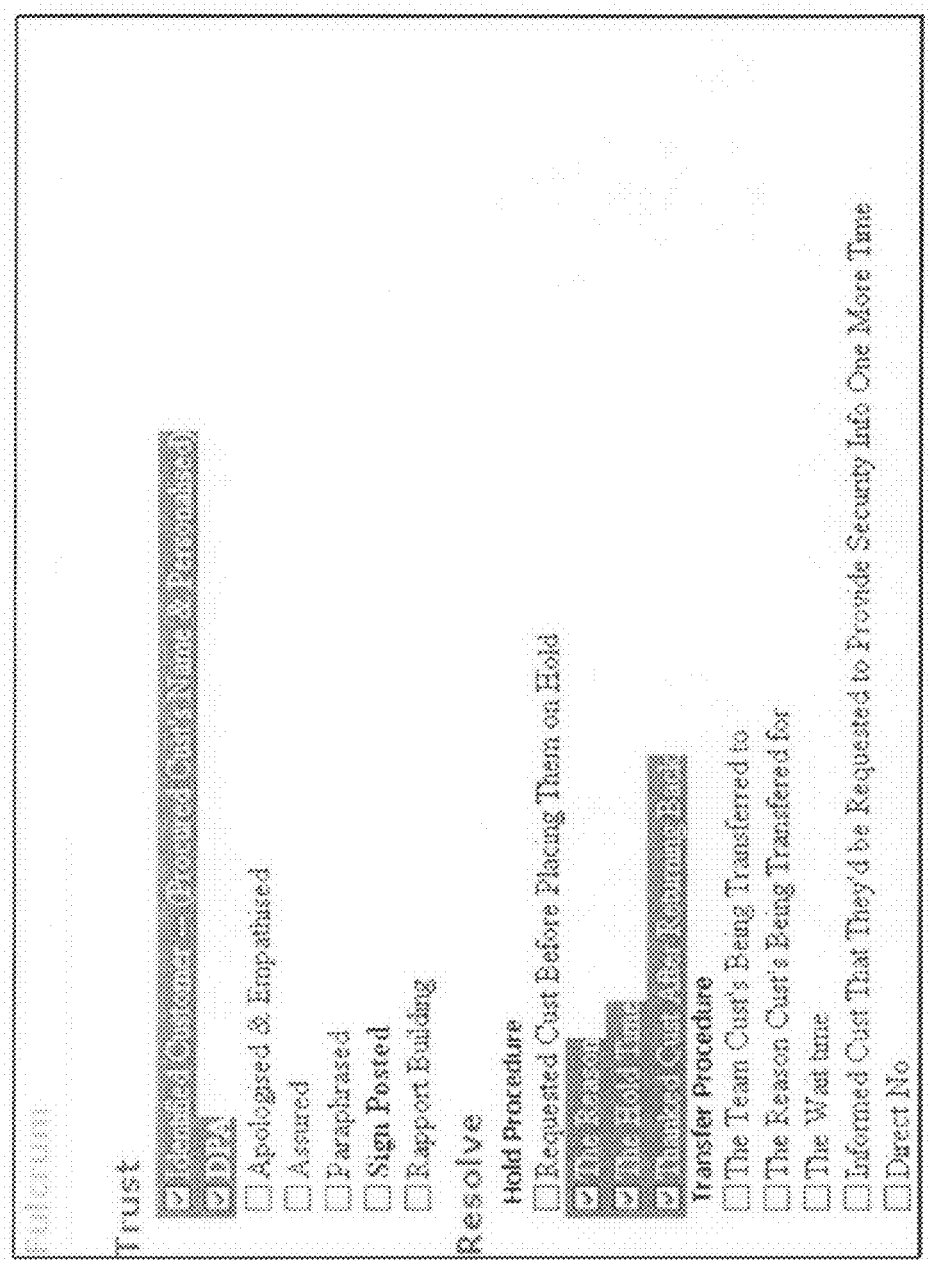
FIG. 120 shows one example of a graphical user interface that displays a checklist to a user while the user is taking a call.

FIG. 120 shows one example of a graphical user interface 12000 that displays a checklist to a user while the user is taking a call. The checklist displayed in the graphical user interface 12000 may be associated with a process. The checklist may list various actions, items, or other requirements that relate to the associated process For example, one of the actions In the checklist may read "Apologized and Empathised," which indicates to the user that the user should apologize and empathise while on a call or in a process. The graphical user interface 12000 may also display controls, such as a checkbox, radio button, or other control, that a user may activate in indicating that the user has completed an item, action, or other requirement in the checklist.

The elements illustrated in the Figures interoperate as explained in detail above. All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

7While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A call center application data and interoperation architecture, the architecture comprising:
 a master application data repository comprising a master data organization schema unified across multiple call center application dataset requirements, the master data organization schema comprising a schema subdivision defining:
  a first application data schema within the master data organization schema that is specific to a first application dataset requirement for a first call center application;
  a second application data schema within the master data organization schema that is specific to a second application dataset requirement for a second call center application;
 a call center application communication interface operable to:
  receive a first call center application data request from the first call center application in communication with the call center application communication interface;
  receive a second call center application data request from the second call center application in communication with the call center application communication interface; and
 a processor coupled to the call center application connection interface and the master application data repository and operable to:
  process the first call center application data request by performing first data manipulation responsive to the first call center application data request on the first application data schema in the master application data repository, thereby relieving the first call center application from first application local database overhead; and
  process the second call center application data request by performing second data manipulation responsive to the second call center application data request on the second application data schema in the master application data repository, thereby relieving the second call center application from second application local database overhead, where the schema subdivision further defines a common application data schema that implements a shared dataset requirement common to the first call center application and the second call center application.

2. The architecture of claim 1, where the shared dataset requirement comprises an employee dataset requirement comprising inter-related multiple dataset groups including:
 a team detail dataset group;
 an employee general information dataset group;
 an employee address information dataset group;
 an employee organization detail dataset group;
 a user login credential detail dataset group;
 an employee hierarchy detail dataset group; and,
 a user group rights detail dataset group.

3. The architecture of claim 1, where the first call center application data request comprises a supervisory management case data request component.

4. The architecture of claim 1, where the first call center application data request comprises a case allocation data request component.

5. The architecture of claim 1, where the first call center application data request comprises an SOE call tracking data request component.

6. The architecture of claim 1, where:
 the first application data schema divides the first application dataset requirement into dataset sub-requirements, the dataset sub-requirements comprising:
  a first dataset sub-requirement including:
   a case franchise dataset group;
   a batch detail dataset group;
   a case error dataset group;
   a case comment dataset group;
   a case action dataset group;
   a case current status dataset group;
   a case information dataset group; and,
   a logged case action dataset group;
  a second dataset sub-requirement including:
   a kana case action history dataset group;
   a kana case final status dataset group;
   a kana logged case action dataset group; and,
   a kana case information dataset group; and,
  a third dataset sub-requirement including:
   a logged call detail dataset group;
   a call type detail dataset group; and,
   a user call detail dataset group.

7. The architecture of claim 1, where the first call center application data request comprises a supervisory establish commitment target data request component.

8. The architecture of claim 1, where the first call center application data request comprises a supervisory manage commitment schedule data request component.

9. The architecture of claim 1, where:
 the first application data schema divides the first application dataset requirement into inter-related multiple dataset groups, the inter-related multiple dataset groups including:
  a supervisor commitment description dataset group;
  a supervisor target description dataset group;
  a target history dataset group;
  a supervisor commitment log activity target dataset group;
  an achieved commitment dataset group;
  a commitment schedule dataset group; and,
  a target description dataset group.

10. The architecture of claim 1, where:
 the first application data schema divides the first application dataset requirement into inter-related multiple dataset groups that are each assigned a subset of the first application dataset requirement; and,
 the second application data schema divides the second application dataset requirement into inter-related multiple dataset groups that are each assigned a subset of the second application dataset requirement.

11. A method for coordinating the operation of multiple call center applications in a call center architecture, the method comprising:

establishing a master application data repository according to a master data organization schema unified across multiple call center application dataset requirements;

subdividing the master data organization data schema into:
a first application data schema that supports a first application dataset requirement for a first call center application;
a second application data schema that supports a second application dataset requirement for a second call center application;

establishing a call center application communication interface;

receiving a first call center application data request from the first call center application through the call center application communication interface;

receiving a second call center application data request from the second call center application through the call center application communication interface; and processing the first call center application data request by performing first data manipulation on the first application data schema in the master application data repository, thereby relieving the first call center application from first application local database overhead;

processing the second call center application data request by performing second data manipulation on the second application data schema in the master application data repository, thereby relieving the second call center application from second application local database overhead; and establishing a common application data schema in the master data organization schema that implements a shared dataset requirement common to the first call center application and the second call center application.

12. The method of claim 11, further comprising:
initiating execution of a case management application as the first call center application; and where:
the first application data schema comprises a case management application data schema and the first application dataset requirement comprises a case management dataset requirement for the case management application.

13. The method of claim 11, further comprising:
initiating execution of an attrition management application as the first call center application; and where:
the first application data schema comprises an attrition application data schema and the first application dataset requirement comprises an attrition dataset requirement for the attrition application.

14. The method of claim 11, further comprising:
initiating execution of a leave management application as the first call center application; and where:
the first application data schema comprises a leave management application data schema and the first application dataset requirement comprises a leave management dataset requirement for the leave management application.

15. The method of claim 11, further comprising:
initiating execution of a movement management application as the first call center application; and where:
the first application data schema comprises a movement management application data schema and the first application dataset requirement comprises a movement management dataset requirement for the movement management application.

16. A product comprising:
a non-transitory machine readable medium; and
logic stored on the medium operable to:
establish a master application data repository according to a master data organization schema unified across multiple call center application dataset requirements;
subdivide the master data organization schema into:
a first application data schema that supports a first application dataset requirement for a first call center application;
a second application data schema that supports a second application dataset requirement for a second call center application;
establish a call center application communication interface;
receive a first call center application data request from the first call center application through the call center application communication interface;
receive a second call center application data request from the second call center application through the call center application communication interface;
process the first call center application data request by performing first data manipulation on the first application data schema in the master application data repository, thereby relieving the first call center application from first application local database overhead;
process the second call center application data request by performing second data manipulation on the second application data schema in the master application data repository, thereby relieving the second call center application from second application local database overhead;
establish a common application data schema in the master data organization schema that implements a shared dataset requirement common to the first call center application and the second call center application.

17. The product of claim 16, where the logic is further operable to:
initiate execution of a case management application as the first call center application; and where:
the first application data schema comprises a case management application data schema and the first application dataset requirement comprises a case management dataset requirement for the case management application.

18. The product of claim 16, where the logic is further operable to:
initiate execution of an attrition management application as the first call center application; and where:
the first application data schema comprises an attrition application data schema and the first application dataset requirement comprises an attrition dataset requirement for the attrition application.

19. The product of claim 16, where the logic is further operable to:
initiate execution of a leave management application as the first call center application; and where:
the first application data schema comprises a leave management application data schema and the first application dataset requirement comprises a leave management dataset requirement for the leave management application.

20. The product of claim 16, where the logic is further operable to:
    initiate execution of a movement management application as the first call center application; and where:
    the first application data schema comprises a movement management application data schema and the first application dataset requirement comprises a movement management dataset requirement for the movement management application.

* * * * *

UNITED STATES PATENT AND TRADEMARK OFFICE
CERTIFICATE OF CORRECTION

| | | |
|---|---|---|
| PATENT NO. | : 8,068,599 B2 | Page 1 of 1 |
| APPLICATION NO. | : 12/077803 | |
| DATED | : November 29, 2011 | |
| INVENTOR(S) | : Amit Sarin et al. | |

It is certified that error appears in the above-identified patent and that said Letters Patent is hereby corrected as shown below:

Column 6, Line 8, please delete "a" after --leave--.

Column 7, Line 34, please delete "wether" and insert --whether--.

Column 23, Line 19, please delete "Start" and insert --End--.

Column 72, Line 20, please delete "may" after --interface--.

Column 75, Line 37, please delete "to" after --may--.

Column 76, Line 10, please delete "the" after --whether--.

Column 81, Line 21, please delete "deail" and insert --detail--.

Column 83, Line 49, please delete "." and insert --, and--.

Column 84, Line 46, please insert --.-- after "process".

Column 85, Line 14, please delete "7" before --While--.

Signed and Sealed this
Seventh Day of February, 2012

David J. Kappos
*Director of the United States Patent and Trademark Office*

UNITED STATES PATENT AND TRADEMARK OFFICE
CERTIFICATE OF CORRECTION

PATENT NO. : 8,068,599 B2  Page 1 of 1
APPLICATION NO. : 12/077803
DATED : November 29, 2011
INVENTOR(S) : Sarin et al.

It is certified that error appears in the above-identified patent and that said Letters Patent is hereby corrected as shown below:

In the Claims

Column 85, Lines 47-48, Claim 1, please delete "connection" and insert --communication--.

Column 87, Line 9, Claim 11, please delete "data" between "organization" and "schema".

Column 87, line 24, Claim 11, please delete "and".

Column 87, line 54, Claim 13, please insert --management-- between "attrition" and "application".

Column 88, line 35, Claim 16, please insert --and-- after "overhead;".

Column 88, line 56, Claim 18, please insert --management-- between "attrition" and "application".

Signed and Sealed this
Twenty-fourth Day of December, 2013

Margaret A. Focarino
*Commissioner for Patents of the United States Patent and Trademark Office*